US012087023B2

(12) United States Patent
Sugio et al.

(10) Patent No.: US 12,087,023 B2
(45) Date of Patent: Sep. 10, 2024

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP); Pongsak Lasang, Singapore (SG); Chung Dean Han, Johor Bahru (MY)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 332 days.

(21) Appl. No.: 17/496,230

(22) Filed: Oct. 7, 2021

(65) Prior Publication Data
US 2022/0028120 A1    Jan. 27, 2022

Related U.S. Application Data

(63) Continuation of application No. PCT/JP2020/016970, filed on Apr. 17, 2020.
(Continued)

(51) Int. Cl.
*G06T 9/00* (2006.01)
*G06F 5/01* (2006.01)
(Continued)

(52) U.S. Cl.
CPC .............. *G06T 9/001* (2013.01); *G06F 5/01* (2013.01); *G06T 9/007* (2013.01); *H04N 19/63* (2014.11); *H04N 19/597* (2014.11)

(58) Field of Classification Search
CPC ........... G06T 9/001; G06T 9/007; G06F 5/01; H04N 19/63; H04N 19/597
See application file for complete search history.

(56) References Cited

U.S. PATENT DOCUMENTS

2014/0375638 A1    12/2014  Tomaru et al.
2017/0347122 A1*   11/2017  Chou ..................... G06T 9/00
(Continued)

FOREIGN PATENT DOCUMENTS

WO        2014/020663        2/2014

OTHER PUBLICATIONS

International Search Report (ISR) issued on Jun. 23, 2020 in International (PCT) Application No. PCT/JP2020/016970.

*Primary Examiner* — Siamak Harandi
*Assistant Examiner* — Daniella M. DiGuglielmo
(74) *Attorney, Agent, or Firm* — Wenderoth, Lind & Ponack, L.L.P.

(57) ABSTRACT

A three-dimensional data encoding method includes: transforming pieces of attribute information of three-dimensional points included in point cloud data into coefficient values; and encoding the coefficient values to generate a bitstream. In the transforming, weighting calculation is performed hierarchically to generate the coefficient values belonging to one of layers, the weighting calculation separating each of the pieces of attribute information into a high-frequency component and a low-frequency component. In the weighting calculation, the weighting calculation is performed using weights fixed or not fixed in the layers. The bitstream includes first information indicating whether to fix the weights in the layers.

10 Claims, 116 Drawing Sheets

Related U.S. Application Data

(60) Provisional application No. 62/837,427, filed on Apr. 23, 2019, provisional application No. 62/836,335, filed on Apr. 19, 2019.

(51) Int. Cl.
*H04N 19/597* (2014.01)
*H04N 19/63* (2014.01)

(56) References Cited

U.S. PATENT DOCUMENTS

| | | | |
|---|---|---|---|
| 2018/0075622 A1* | 3/2018 | Tuffreau | G06T 9/40 |
| 2019/0081638 A1* | 3/2019 | Mammou | H04N 19/436 |

* cited by examiner

FIRST SPC

GOS INDEX NUMBER (ENCODING ORDER)

FIG. 6

| OBJECT | GOS NUMBER |
|---|---|
| object(1) | 1, 2 |
| object(2) | 5 |
| object(3) | 8, 9, 10 |
| ... | ... |
| object(N) | 101, 113, 125 |

OBJECT-GOS TABLE

| COORDINATES | GOS NUMBER |
|---|---|
| (x1, y1, z1) | 1 |
| (x2, y2, z2) | 2 |
| (x3, y3, z3) | 3 |
| ... | ... |
| (xN, yN, zN) | N |

COORDINATES-GOS TABLE

| TIME | GOS NUMBER |
|---|---|
| pts(1) | 1 |
| pts(2) | 30 |
| pts(3) | 50 |
| ... | ... |
| pts(N) | 200 |

TIME-GOS TABLE

| GOS NUMBER | GOS ADDRESS |
|---|---|
| 1 | addr(1) |
| 2 | addr(2) |
| 3 | addr(3) |
| ... | ... |
| N | addr(N) |

GOS-ADDRESS TABLE

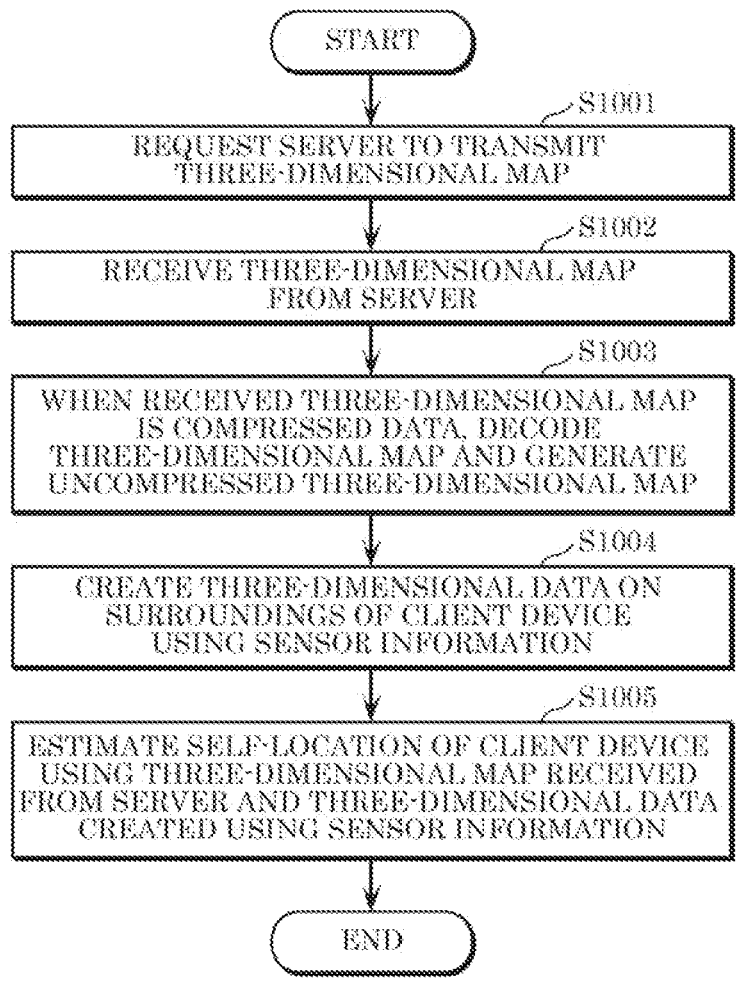
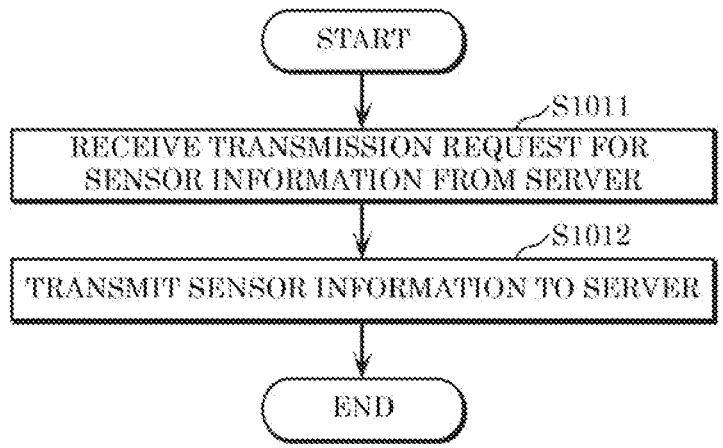

FIG. 24

A  BIT SEQUENCE WHEN SCANNING NODES AND LEAVES BREADTH-FIRST : 10010000 10000001 00000010 leaf1 leaf2 leaf3

B  BIT SEQUENCE WHEN SCANNING NODES AND LEAVES DEPTH-FIRST : 10010000 10000001 leaf1 leaf2 00000010 leaf3

| ZeroCnt | BINARIZED DATA |
|---|---|
| 0 | 0 |
| 1 | 10 |
| 2 | 110 |
| ... | ... |
| T-1 | 11111...10 |
| T | 11111...11 |

FIG. 32

```
attribute_data {
 ...
 ZeroCnt
 for (i=0; i<NumOfPoint; i++) {
  if (layerL >= TH_layer) {
   if (ZeroCnt > 0 ) {
    for (j=0; j<attribute_dimension; j++)
      value[j][i] = 0
    --ZeroCnt
   }
   else {
     for (j=0; j<attribute_dimension; j++)
       value[j][i]
     for(d=1, j=1; j<attribute_dimension; j++)
       if (value[j][i] != value[j-1][i])
         d = 0
     for(j=0; j< attribute_dimension; j++ )
       value[j][i] += d
     ZeroCnt
   }
  }
  else {
   if (ZeroCnt > 0 ) {
    value[0][i] = 0
    --ZeroCnt
   }
   else {
    value[0][i]
    value[0][i] += 1
     ZeroCnt
   }
  }
 }
 ...
}
```

FIG. 33

| FIRST DIMENSIONAL COMPONENT (R COMPONENT, v0) | : 73 50 32 15 0 12 0 0 0 ... 0 |
| SECOND DIMENSIONAL COMPONENT (G COMPONENT, v1) | : 60 20 0 0 0 10 0 0 0 ... 0 |
| THIRD DIMENSIONAL COMPONENT (B COMPONENT, v2) | : 58 10 12 0 0 12 0 0 0 ... 0 |

↓

| 0 | 73 | 60 | 58 | 0 | 50 | 20 | 10 | 0 | 32 | 0 | 12 | ... |
|---|----|----|----|---|----|----|----|---|----|----|----|----|
|   | v0 | v1 | v2 |   | v0 | v1 | v2 |   | v0 | v1 | v2 |    |

| ... | 0 | 15 | 0 | 0 | 1 | 12 | 10 | 12 | N |
|-----|---|----|----|----|----|----|----|----|----|
|     | ZeroCnt | v0 | v1 | v2 | ZeroCnt | v0 | v1 | v2 | ZeroCnt |

FIG. 43

```
attribute_data {
 ...
 TotalZeroCnt
 ZeroCnt
 for (i=0; i<NumOfPoint; i++) {
  if (layerL >= TH_layer) {
   if (ZeroCnt > 0 ) {
     for (j=0; j<attribute_dimension; j++)
        value[j][i] = 0
    --ZeroCnt
   }
   else {
     for (j=0; j<attribute_dimension; j++)
       value[j][i]
     for(d=1, j=1; j<attribute_dimension; j++)
       if (value[j][i] != value[j-1][i])
         d = 0
     for(j=0; j< attribute_dimension; j++ )
       value[j][i] += d
     if (TotalZeroCnt > 0) {
        ZeroCnt
       TotalZeroCnt = TotalZeroCnt - ZeroCnt
      }
    }
   }
  else {
   if (ZeroCnt > 0 ) {
    value[0][i] = 0
    --ZeroCnt
   }
   else {
     value[0][i]
     value[j][i] += 1
     if (TotalZeroCnt > 0) {
        ZeroCnt
       TotalZeroCnt = TotalZeroCnt - ZeroCnt
      }
    }
   }
  }
  ...
}
```

FIG. 44

```
FIRST DIMENSIONAL
COMPONENT           : 73 50 32 15  0 12  0  0  0 ... 0
(R COMPONENT, v0)

SECOND DIMENSIONAL
COMPONENT           : 60 20  0  0  0 10  0  0  0 ... 0
(G COMPONENT, v1)

THIRD DIMENSIONAL
COMPONENT           : 58 10 12  0  0 12  0  0  0 ... 0
(B COMPONENT, v2)
                                 ↓
    TotalZeroCnt
```

| M | N | 12 | 10 | 12 | 1 | 15 | 0 | 0 | ... |
|---|---|----|----|----|---|----|---|---|-----|
| ZeroCnt | | v0 | v1 | v2 | ZeroCnt | v0 | v1 | v2 | |

| ... | 32 | 0 | 12 | 50 | 20 | 10 | 73 | 60 | 58 |
|-----|----|----|----|----|----|----|----|----|----|
| | v0 | v1 | v2 | v0 | v1 | v2 | v0 | v1 | v2 |

FIG. 47

```
attribute_data {
...
ZeroCnt
for (i=0; i<NumOfPoint; i++) {
  if (ZeroCnt > 0 ) {
    for (j=0; j<attribute_dimension; j++)
        value[j][i] = 0
    --ZeroCnt
  }
  else {
    for (j=0; j<attribute_dimension; j++)
      value[j][i]_greater_zero_flag
      if (value[j][i]_greater_zero_flag == 1) {
          value[j][i]_greater_one_flag
          if (value[j][i]_greater_one_flag == 1) {
             value[j][i]
             value[j][i] = value[j][i] + 2
          }
          else
             value[j][i] = 1
      }
      else
         value[j][i] = 0
    for(d=1, j=1; j<attribute_dimension; j++)
      if (value[j][i] != value[j-1][i])
        d = 0
    for(j=0; j< attribute_dimension; j++ )
      value[j][i] += d
    ZeroCnt
  }
}
...
}
```

FIG. 60

```
Attribute header information(){
 QPbase
 NumLayer
 for (i=0; i<NumLayer; i++) {
  Delta_Layer[i]
 }
}
```

FIG. 61

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
}
```

FIG. 63

```
Attribute header information(){
  QPbase
  NumLayer
  for (i=0; i<NumLayer; i++) {
    Delta_Layer[i]
  }
  NumADelta
  for (i=0; i<NumADelta; i++) {
    NumPointADelta[i]
    ADelta_QP[i]
  }
}
```

FIG. 64

```
Attribute header information(){
  QPbase
  delta_Layer_present_flag
  if (delta_Layer_present_flag) {
    NumLayer
    for (i=0; i<NumLayer; i++) {
      Delta_Layer[i]
    }
  }
  additional_delta_QP_present_flag
  if (additional_delta_QP_present_flag) {
    NumADelta_minus1
    for (i=0; i<NumADelta; i++) {
      NumPointADelta[i]
      ADelta_QP[i]
    }
  }
}
```

FIG. 65

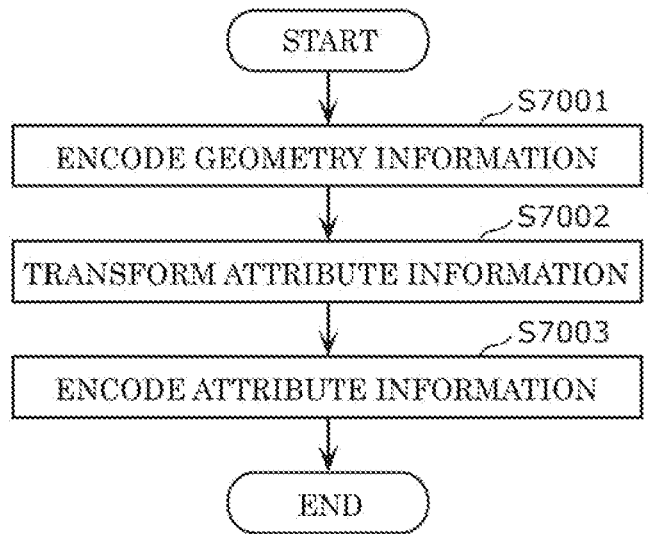

FIG. 73

```
Attribute_header_information(){
 QPbase
 NumLayer
 for (i=0; i<NumLayer; i++) {
  Delta_Layer[i]
 }
 NumADelta
 for (i=0; i<NumADelta; i++) {
  NumPointADelta[i]
  ADelta_QP[i]
 }
}
```

FIG. 74

```
Attribute_header_information(){
 QPbase
 delta_Layer_present_flag
 if (delta_Layer_present_flag) {
  NumLayer
  for (i=0; i<NumLayer; i++) {
   Delta_Layer[i]
  }
 }
 additional_delta_QP_present_flag
 if (additional_delta_QP_present_flag) {
  NumADelta_minus1
  for (i=0; i<NumADelta; i++) {
   NumPointADelta[i]
   ADelta_QP[i]
  }
 }
}
```

FIG. 75

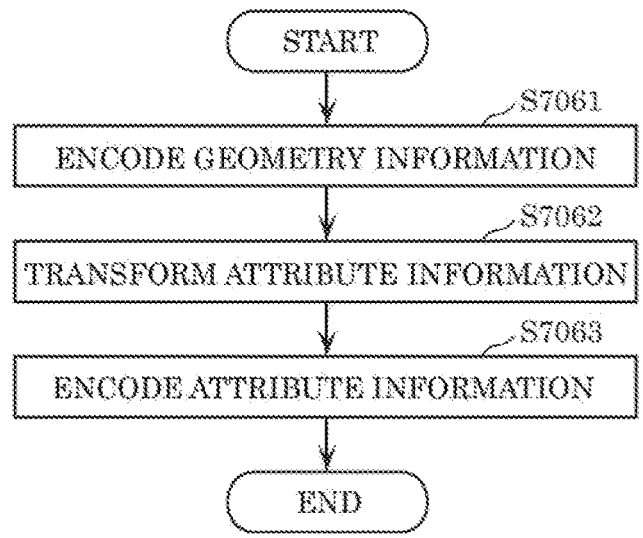

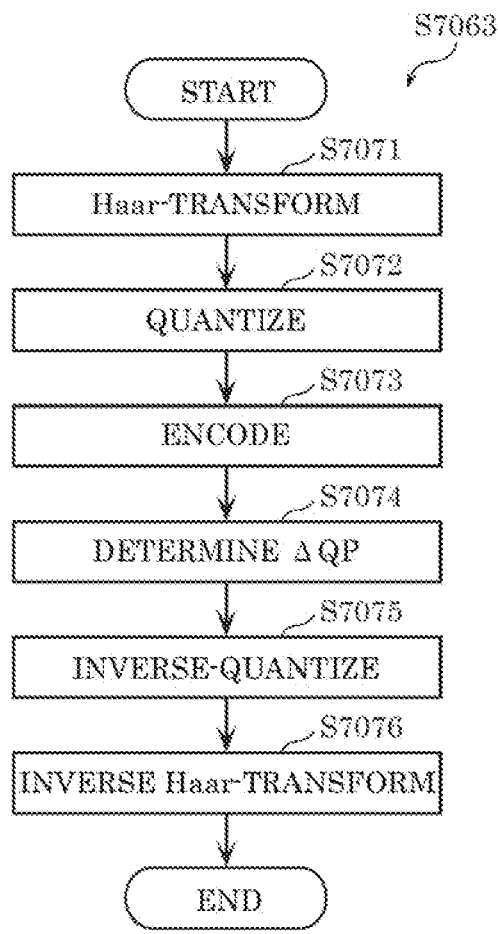
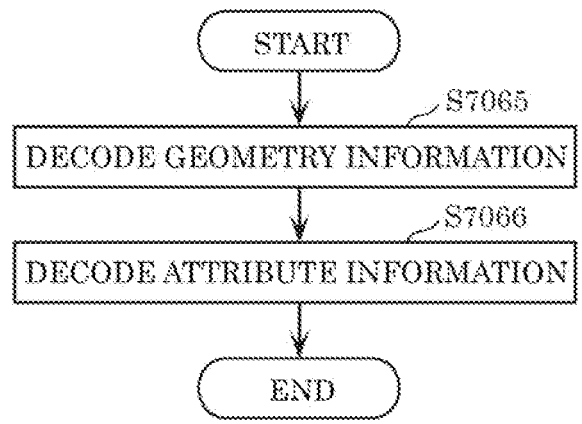

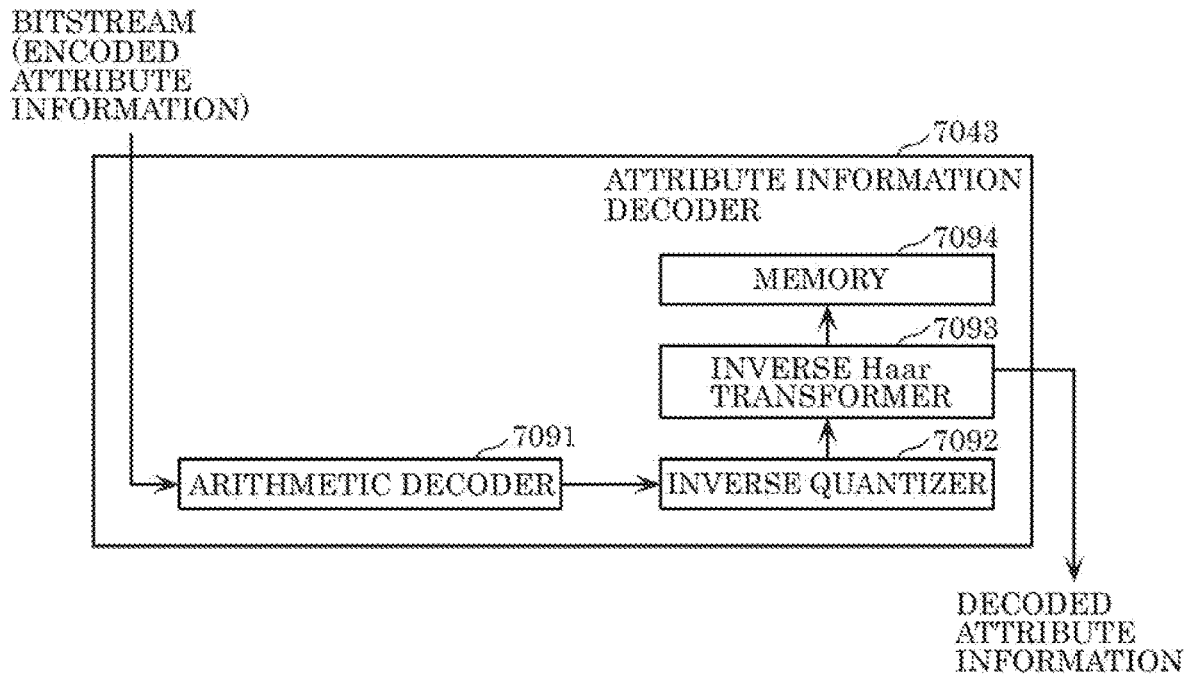

FIG. 86
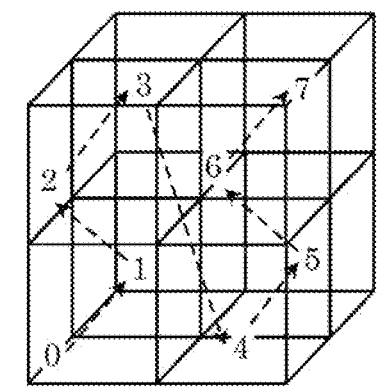
(a)
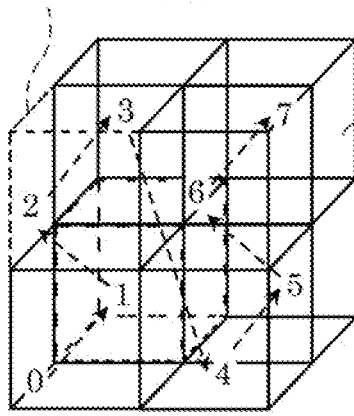
(b)
(c)

FIG. 141

| HEADER | LOSSLESS_FLAG | b0 | b1 | b2 | ... | ... | bn |

FIG. 142

| HEADER | QP | b0 | b1 | b2 | ... | ... | bn |

FIG. 143
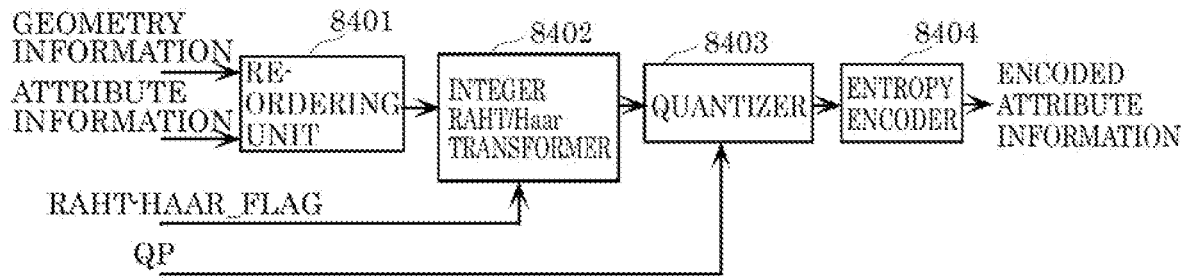
FIG. 144
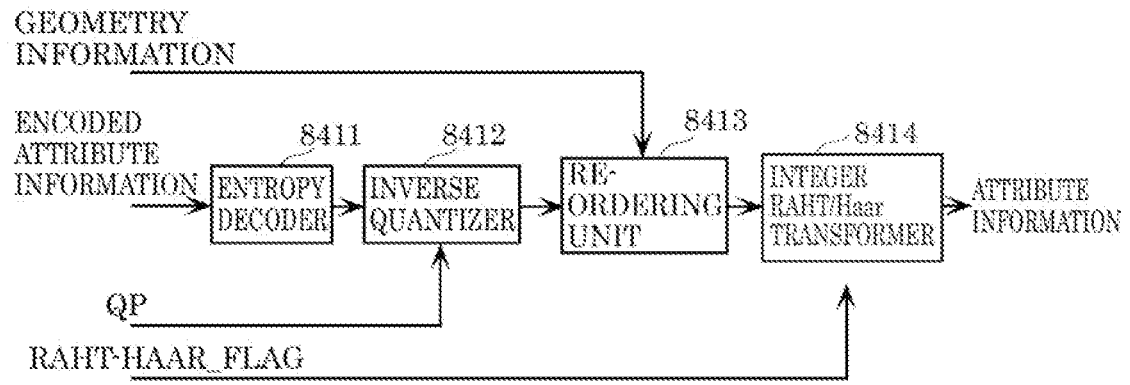
FIG. 145
| HEADER | QP | RAHT-HAAR FLAG | b0 | b1 | b2 | ... | ... | bn |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2020/016970 filed on Apr. 17, 2020, claiming the benefit of priority of U.S. Provisional Patent Application No. 62/836,335 filed on Apr. 19, 2019 and U.S. Provisional Patent Application No. 62/837,427 filed on Apr. 23, 2019, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space. In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include MPEG-4 AVC and HEVC standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle is known (for example, see International Publication WO 2014/020663).

SUMMARY

There has been a demand for improving accuracy in a three-dimensional data encoding process.

The present disclosure has an object to provide a three-dimensional data encoding method, a three-dimensional data decoding method, a three-dimensional data encoding device, or a three-dimensional data decoding device that is capable of improving accuracy.

A three-dimensional data encoding method according to one aspect of the present disclosure includes: transforming pieces of attribute information of three-dimensional points included in point cloud data into coefficient values; and encoding the coefficient values to generate a bitstream. In the transforming, weighting calculation is performed hierarchically to generate the coefficient values belonging to one of layers, the weighting calculation separating each of the pieces of attribute information into a high-frequency component and a low-frequency component. In the weighting calculation, the weighting calculation is performed using weights fixed or not fixed in the layers. The bitstream includes first information indicating whether to fix the weights in the layers.

A three-dimensional data decoding method according to one aspect of the present disclosure includes: obtaining, from a bitstream, first information indicating whether to fix weights in layers; decoding coefficient values from the bitstream; and inverse transforming the coefficient values to generate pieces of attribute information of three-dimensional points included in point cloud data. The coefficient values belong to one of the layers. In the inverse transforming, inverse weighting calculation is performed to generate the pieces of attribute information, the inverse weighting calculation combining the coefficient values with a high-frequency component and a low-frequency component. In the inverse weighting calculation, the inverse weighting calculation is performed using the weights fixed or not fixed in the layers, according to the first information.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is a diagram showing an example of meta information according to Embodiment 1;

FIG. 13 is a flowchart of a three-dimensional data creation process performed by the client device according to Embodiment 4;

FIG. 14 is a flowchart of a sensor information transmission process performed by the client device according to Embodiment 4;

FIG. 24 is a diagram showing an example of bit sequences of the volume according to Embodiment 6;

FIG. 32 is a diagram showing a syntax example of the attribute information according to Embodiment 7;

FIG. 33 is a diagram showing an example of a coding coefficient and ZeroCnt according to Embodiment 7;

FIG. 43 is a diagram showing a syntax example of the attribute information according to the modification of Embodiment 7;

FIG. 44 is a diagram showing an example of a coding coefficient, ZeroCnt, and TotalZeroCnt according to the modification of Embodiment 7;

FIG. 47 is a diagram showing a syntax example of the attribute information according to the modification of Embodiment 7;

FIG. 60 is a diagram showing a syntax example of an attribute information header according to Embodiment 8;

FIG. 61 is a diagram showing a syntax example of an attribute information header according to Embodiment 8;

FIG. 63 is a diagram showing a syntax example of an attribute information header according to Embodiment 8;

FIG. 64 is a diagram showing a syntax example of an attribute information header according to Embodiment 8;

FIG. 65 is a flowchart of a three-dimensional data encoding process according to Embodiment 8;

FIG. 73 is a diagram showing a syntax example of an attribute information header according to Embodiment 8;

FIG. 74 is a diagram showing a syntax example of an attribute information header according to Embodiment 8;

FIG. 75 is a flowchart of a three-dimensional data encoding process according to Embodiment 8;

FIG. 76 is a flowchart of an attribute information encoding process according to Embodiment 8;

FIG. 77 is a flowchart of a three-dimensional data decoding process according to Embodiment 8;

FIG. 80 is a block diagram of an attribute information decoder according to Embodiment 8;

FIG. 81 is a diagram showing a syntax example of an attribute information header according to Embodiment 8;

FIG. 86 is a diagram for illustrating a re-ordering process according to Embodiment 9;

FIG. 119 is a flowchart of an attribute information decoding process according to Embodiment 10;

FIG. 120 is a block diagram of attribute information encoder included in a three-dimensional data encoding device according to Embodiment 10;

FIG. 121 is a block diagram of attribute information decoder included in a three-dimensional data decoding device according to Embodiment 10;

FIG. 122 is a diagram showing a configuration of a three-dimensional data encoding device according to Embodiment 11;

FIG. 123 is a diagram showing a configuration of a three-dimensional data decoding device according to Embodiment 11;

FIG. 124 is a diagram for illustrating RAHT according to Embodiment 11;

FIG. 125 is a diagram for illustrating an integer-to-integer transform according to Embodiment 11;

FIG. 126 is a diagram for illustrating a hierarchical transform processing according to Embodiment 11;

FIG. 127 is a block diagram of a three-dimensional data encoding device according to Embodiment 11;

FIG. 128 is a block diagram of a lossless attribute information encoder according to Embodiment 11;

FIG. 129 is a block diagram of an integer transformer according to Embodiment 11;

FIG. 130 is a block diagram of a three-dimensional data decoding device according to Embodiment 11;

Figure 131:
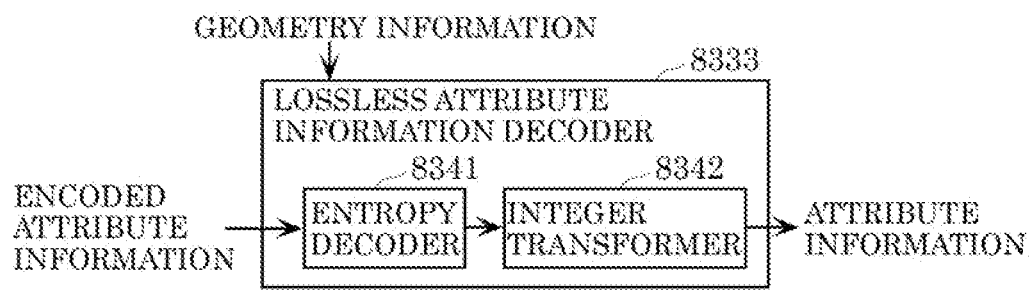
Figure 132:
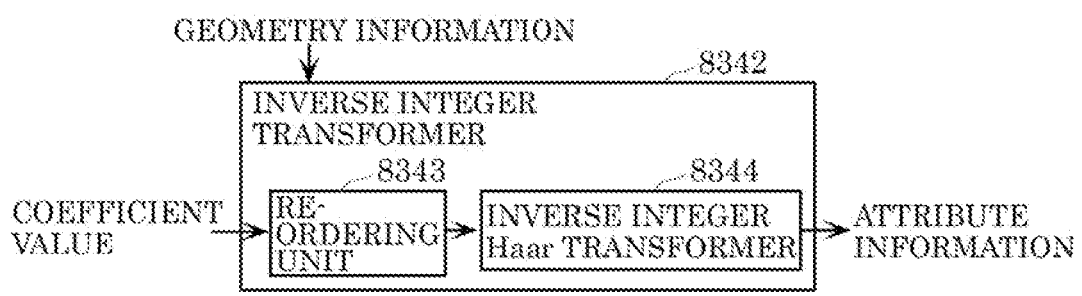
Figure 133:
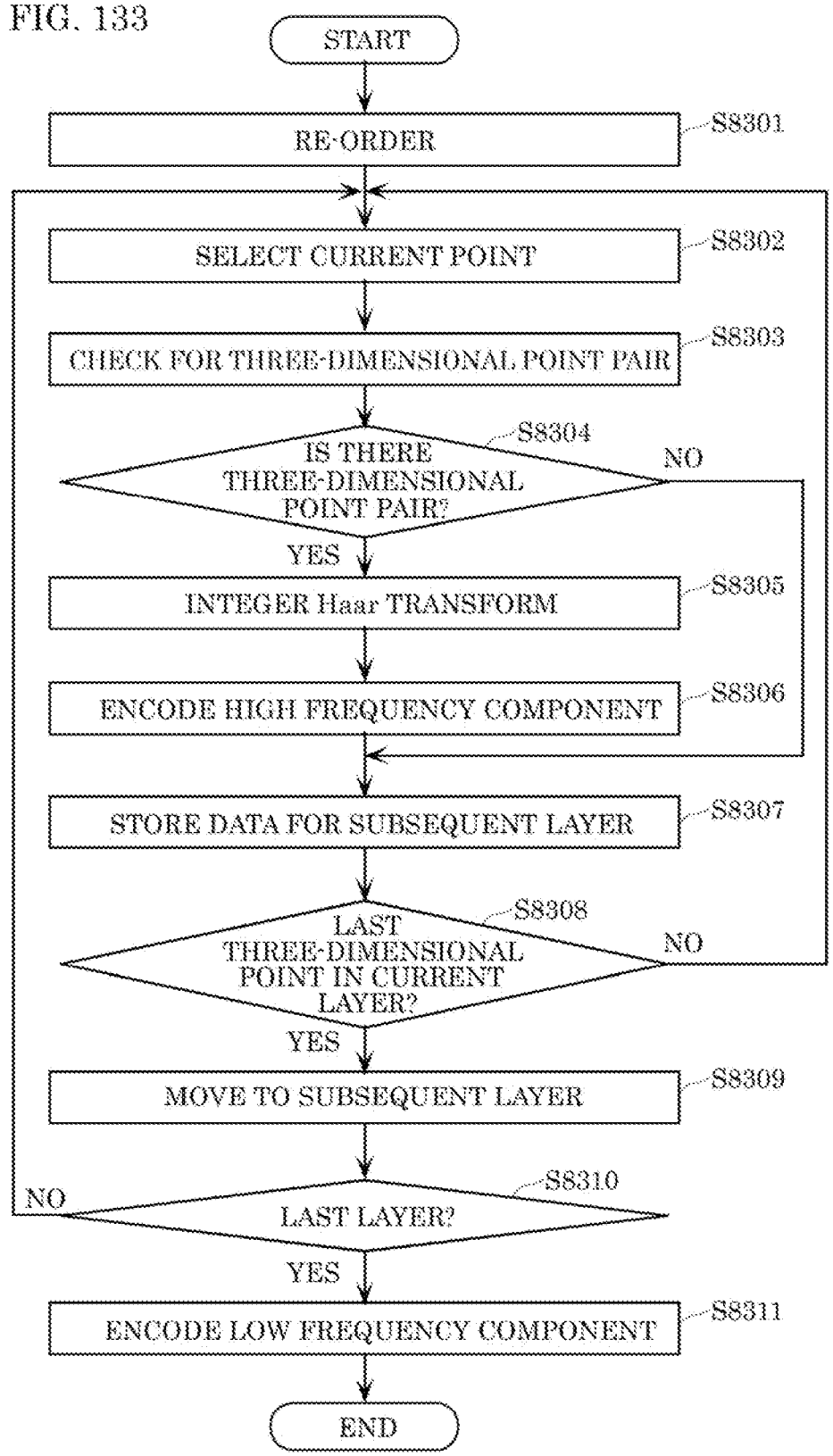
Figure 134:
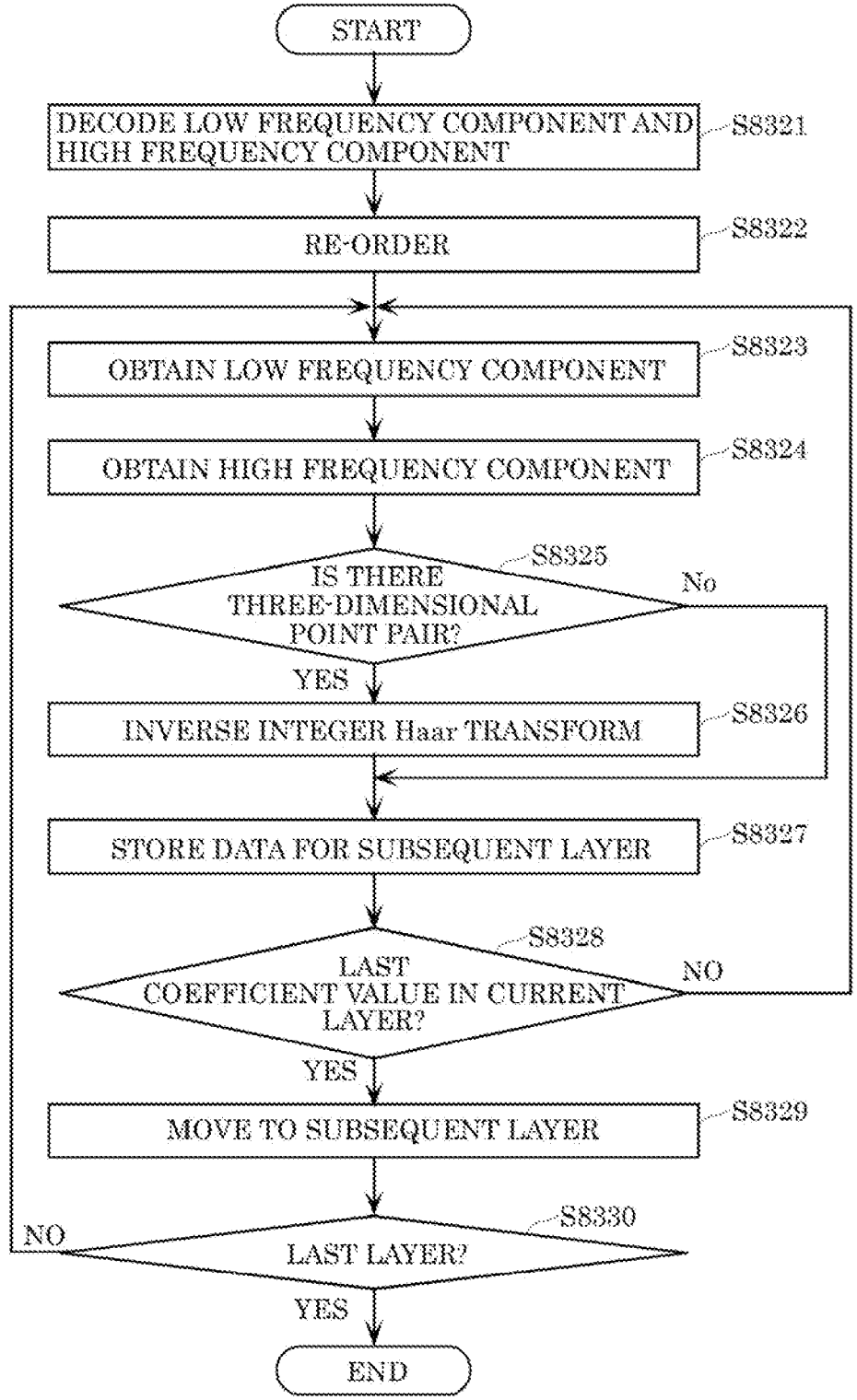
Figure 135:
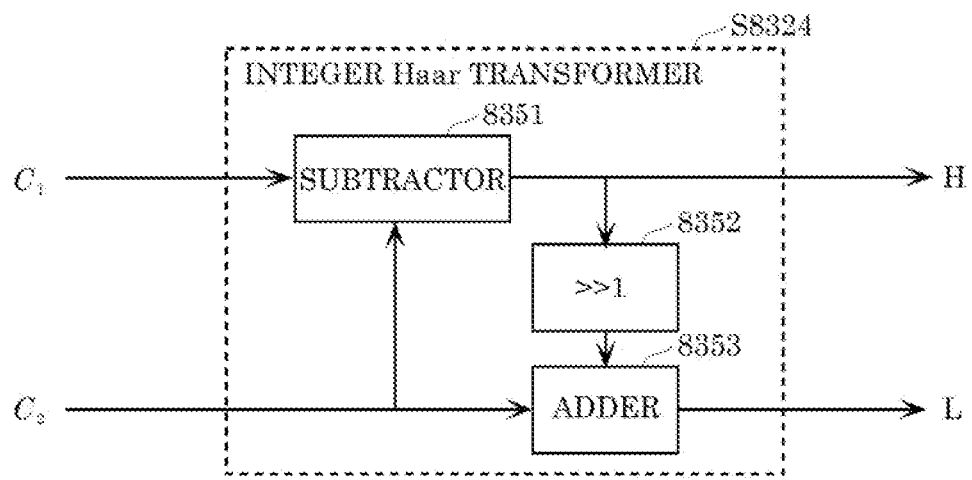
Figure 136:
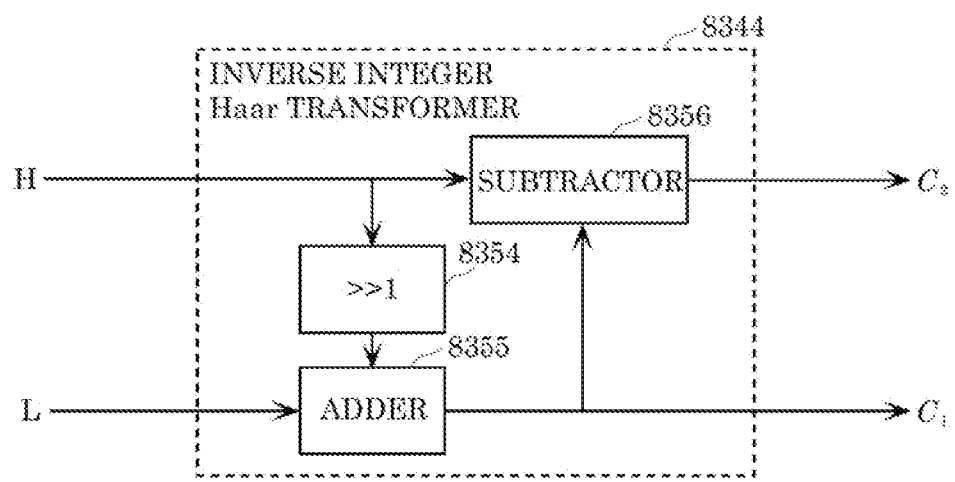
Figure 137:
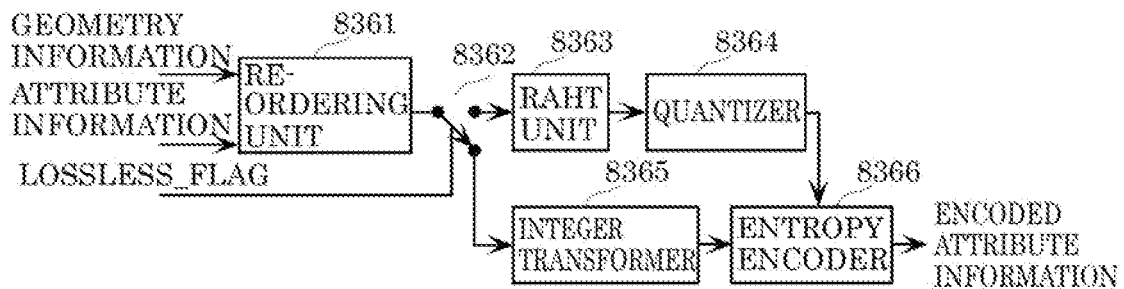
Figure 138:
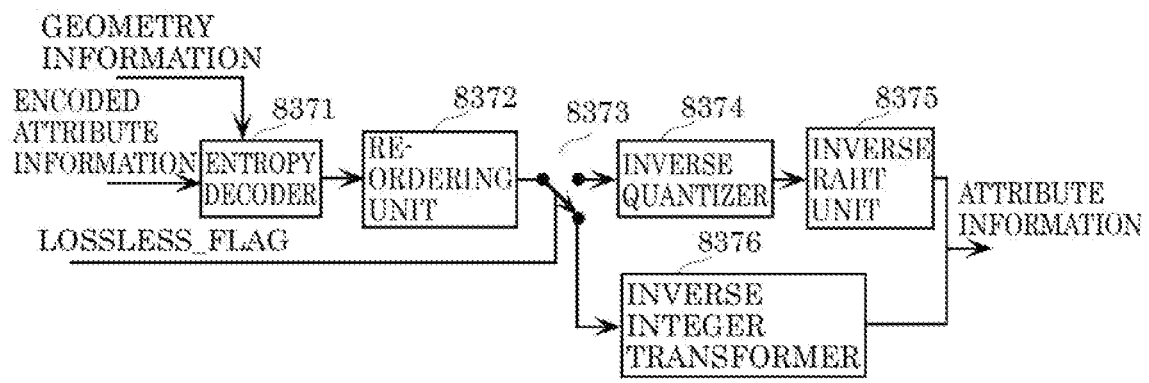
Figure 139:
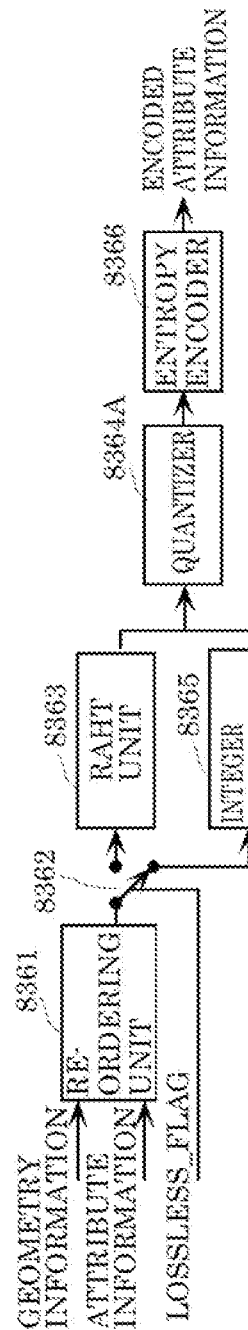
Figure 140:
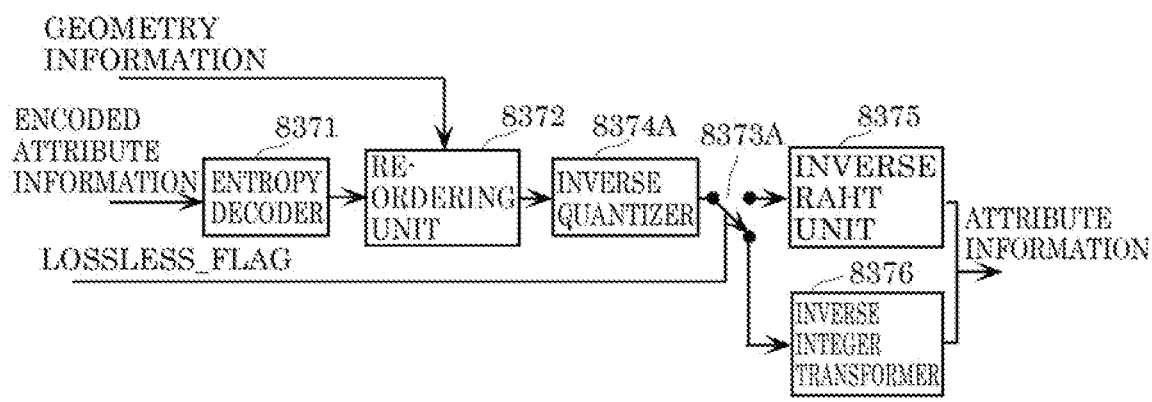
Figure 146:
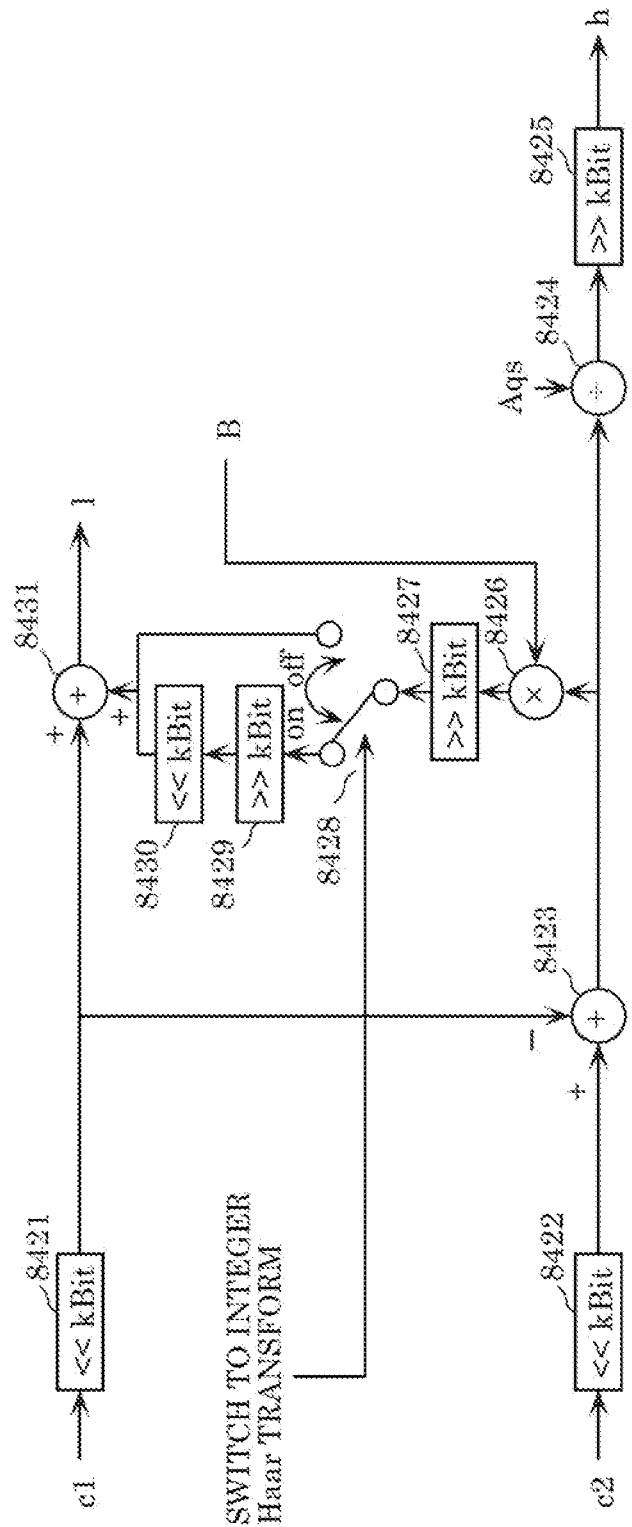
Figure 147:
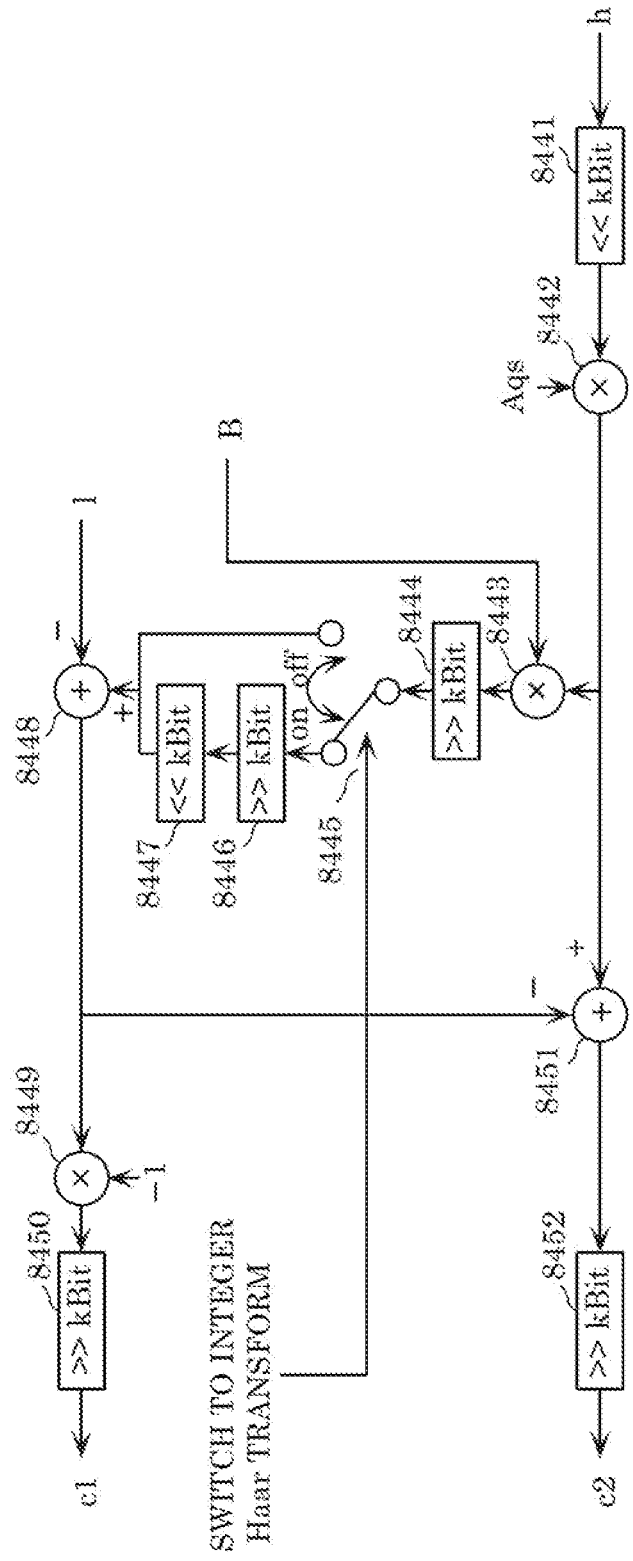
Figure 148:
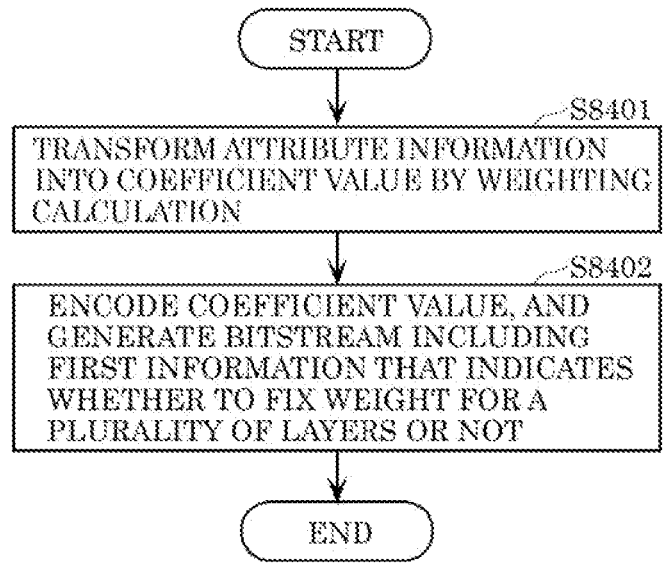
Figure 149:
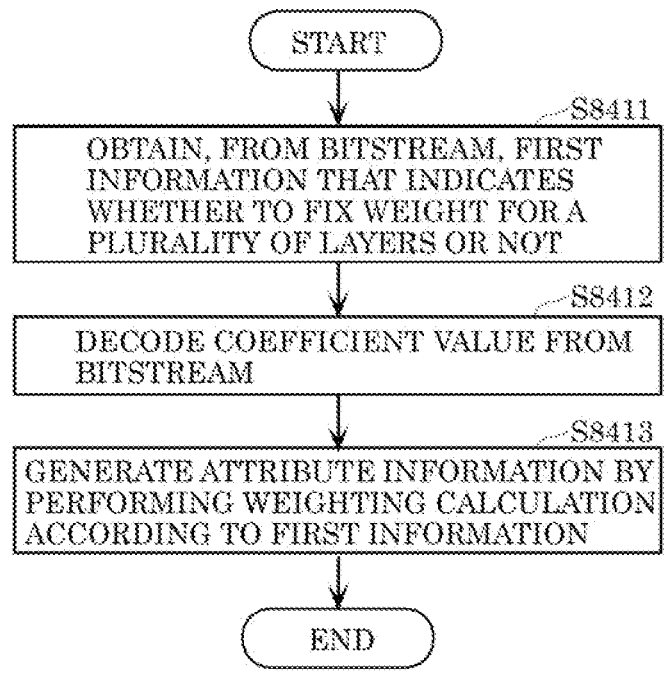

FIG. 131 is a block diagram of a lossless attribute information decoder according to Embodiment 11;

FIG. 132 is a block diagram of an inverse integer transformer according to Embodiment 11;

FIG. 133 is a flowchart of a lossless attribute information encoding processing according to Embodiment 11;

FIG. 134 is a flowchart of a lossless attribute information decoding processing according to Embodiment 11;

FIG. 135 is a diagram showing an example configuration of an integer Haar transformer according to Embodiment 11;

FIG. 136 is a diagram showing an example configuration of an inverse integer Haar transformer according to Embodiment 11;

FIG. 137 is a diagram showing a configuration of a three-dimensional data encoding device according to Embodiment 11;

FIG. 138 is a diagram showing a configuration of a three-dimensional data decoding device according to Embodiment 11;

FIG. 139 is a diagram showing a configuration of a three-dimensional data encoding device according to Embodiment 11;

FIG. 140 is a diagram showing a configuration of a three-dimensional data decoding device according to Embodiment 11;

FIG. 141 is a diagram showing an example configuration of a bitstream according to Embodiment 11;

FIG. 142 is a diagram showing an example configuration of a bitstream according to Embodiment 11;

FIG. 143 is a diagram showing a configuration of a three-dimensional data encoding device according to Embodiment 12;

FIG. 144 is a diagram showing a configuration of a three-dimensional data decoding device according to Embodiment 12;

FIG. 145 is a diagram showing an example configuration of a bitstream according to Embodiment 12;

FIG. 146 is a diagram showing an example configuration of an integer RAHT/Haar transformer according to Embodiment 12;

FIG. 147 is a diagram showing an example configuration of an inverse integer RAHT/Haar transformer according to Embodiment 12;

FIG. 148 is a flowchart of a three-dimensional data encoding process according to Embodiment 12; and FIG. 149 is a flowchart of a three-dimensional data decoding process according to Embodiment 12.

DETAILED DESCRIPTION OF THE EMBODIMENTS

A three-dimensional data encoding method according to one aspect of the present disclosure includes: transforming pieces of attribute information of three-dimensional points included in point cloud data into coefficient values; and encoding the coefficient values to generate a bitstream. In the transforming, weighting calculation is performed hierarchically to generate the coefficient values belonging to one of layers, the weighting calculation separating each of the pieces of attribute information into a high-frequency component and a low-frequency component. In the weighting calculation, the weighting calculation is performed using weights fixed or not fixed in the layers. The bitstream includes first information indicating whether to fix the weights in the layers.

According to the three-dimensional data encoding method, the weight is fixed for a plurality of layers, so that the loss caused by the transform can be reduced, and the accuracy can be improved.

For example, when the weights are fixed in the layers, the weights may be fixed to 1.

For example, in the weighting calculation: first attribute information may be subtracted from second attribute information to calculate a first value, the first attribute information and the second attribute information being included in the pieces of attribute information; and the first value may be divided by a first coefficient to calculate the high-frequency component. The first coefficient may depend on a quantization step and the weights.

For example, in the weighting calculation: the first value may be multiplied by a second coefficient depending on the weights to calculate a second value; the second value may be shifted down by a predetermined bit count and shifted up by the predetermined bit count to calculate a third value; and the third value may be added to the first attribute information to calculate the low-frequency component.

A three-dimensional data decoding method according to one aspect of the present disclosure includes: obtaining, from a bitstream, first information indicating whether to fix weights in layers; decoding coefficient values from the bitstream; and inverse transforming the coefficient values to generate pieces of attribute information of three-dimensional points included in point cloud data. The coefficient values belong to one of the layers. In the inverse transforming, inverse weighting calculation is performed to generate the pieces of attribute information, the inverse weighting calculation combining the coefficient values with a high-frequency component and a low-frequency component. In the inverse weighting calculation, the inverse weighting calculation is performed using the weights fixed or not fixed in the layers, according to the first information.

According to the three-dimensional data decoding method, the weight is fixed for a plurality of layers, so that the loss caused by the transform can be reduced, and the accuracy can be improved.

For example, when the weights are fixed in the layers, the weights may be fixed to 1.

For example, in the inverse weighting calculation: the high-frequency component may be multiplied by a first coefficient to calculate a first value; first attribute information included in the pieces of attribute information may be calculated from a second value based on the low-frequency component; and the second value may be subtracted from the first value to calculate second attribute information included in the pieces of attribute information. The first coefficient may depend on a quantization step and the weights.

For example, in the inverse weighting calculation: the first value may be multiplied by a second coefficient depending on the weights to calculate a third value; the third value may be shifted down by a predetermined bit count and shifted up by the predetermined bit count to calculate a fourth value; and the low-frequency component is subtracted from the fourth value to calculate the second value.

A three-dimensional data encoding device according to one aspect of the present disclosure includes a processor and memory. Using the memory, the processor: transforms pieces of attribute information of three-dimensional points included in point cloud data into coefficient values; and encodes the coefficient values to generate a bitstream. In the transforming, weighting calculation is performed hierarchically to generate the coefficient values belonging to one of layers, the weighting calculation separating each of the pieces of attribute information into a high-frequency component and a low-frequency component. In the weighting calculation, the weighting calculation is performed using weights fixed or not fixed in the layers. The bitstream includes first information indicating whether to fix the weights in the layers.

With this, since the three-dimensional data encoding device is capable of reducing the loss caused by the transform, by fixing the weight for a plurality of layers, the three-dimensional data encoding device is capable of improving the accuracy.

A three-dimensional data decoding device according to one aspect of the present disclosure includes a processor and memory. Using the memory, the processor: obtains, from a bitstream, first information indicating whether to fix weights in layers; decodes coefficient values from the bitstream; and inverse transforms the coefficient values to generate pieces of attribute information of three-dimensional points included in point cloud data. The coefficient values belong to one of the layers. In the inverse transforming, inverse weighting calculation is performed to generate the pieces of attribute information, the inverse weighting calculation combining the coefficient values with a high-frequency component and a low-frequency component. In the inverse weighting calculation, the inverse weighting calculation is performed using the weights fixed or not fixed in the layers, according to the first information.

With this, since the three-dimensional data decoding device is capable of reducing the loss caused by the transform, by fixing the weight for a plurality of layers, the three-dimensional data decoding device is capable of improving the accuracy.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. It is to be noted that the following embodiments indicate exemplary embodiments of the present disclosure. The numerical values, shapes, materials, constituent elements, the arrangement and connection of the constituent elements, steps, the processing order of the steps, etc. indicated in the following embodiments are mere examples, and thus are not intended to limit the present disclosure. Of the constituent elements described in the following embodiments, constituent elements not recited in any one of the independent claims that indicate the broadest concepts will be described as optional constituent elements.

Embodiment 1

Figure 1:
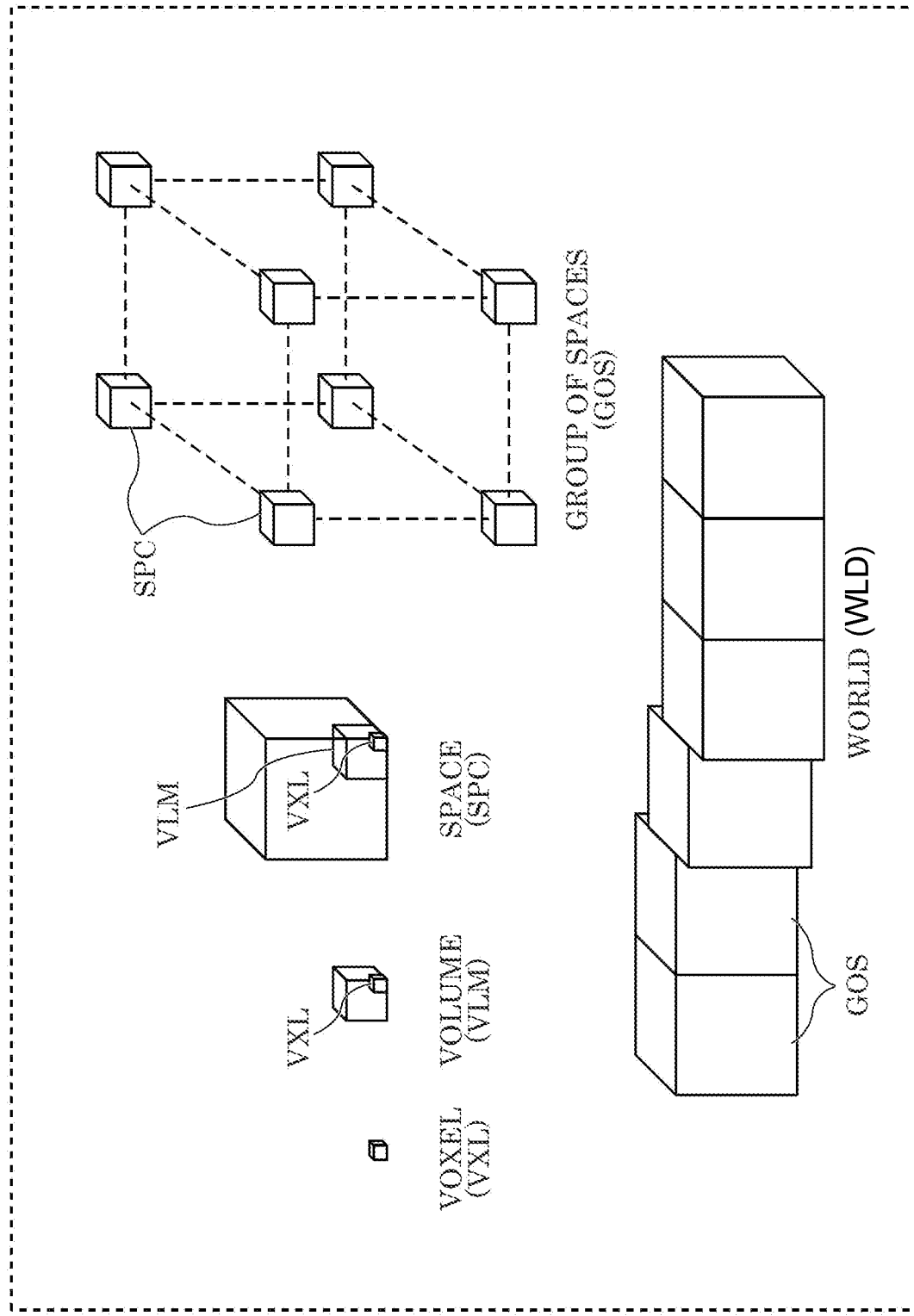
FIG. 1 is a diagram showing the structure of encoded three-dimensional data according to Embodiment 1.

First, the data structure of encoded three-dimensional data (hereinafter also referred to as encoded data) according to the present embodiment will be described. FIG. 1 is a diagram showing the structure of encoded three-dimensional data according to the present embodiment. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or its lower levels (the lower levels of the n-th level) may be sequentially indicated. For example, when only the n-th level is decoded, and the n−1th level or its lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
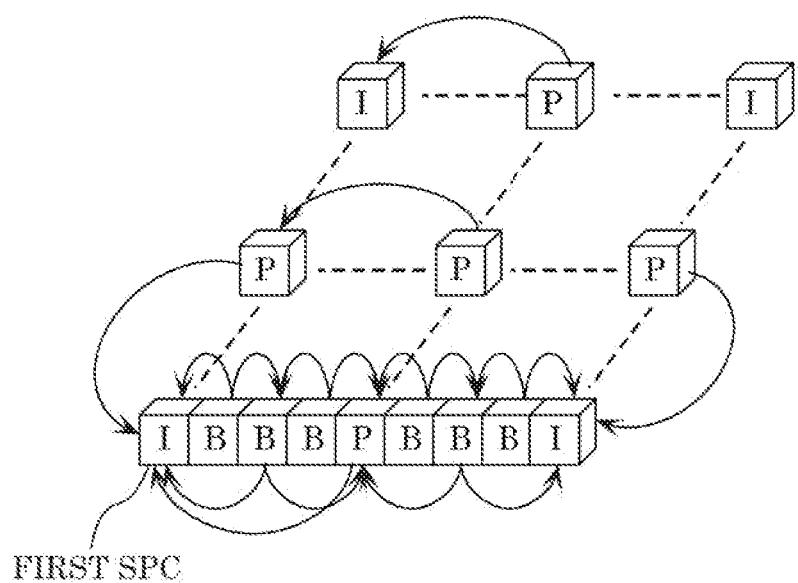
FIG. 2 is a diagram showing an example of prediction structures among SPCs that belong to the lowermost layer in a GOS according to Embodiment 1.
Figure 3:
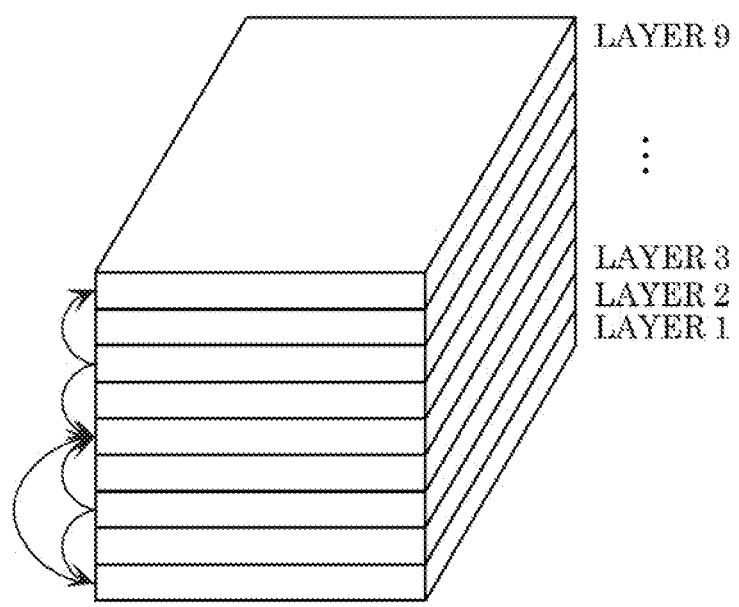
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
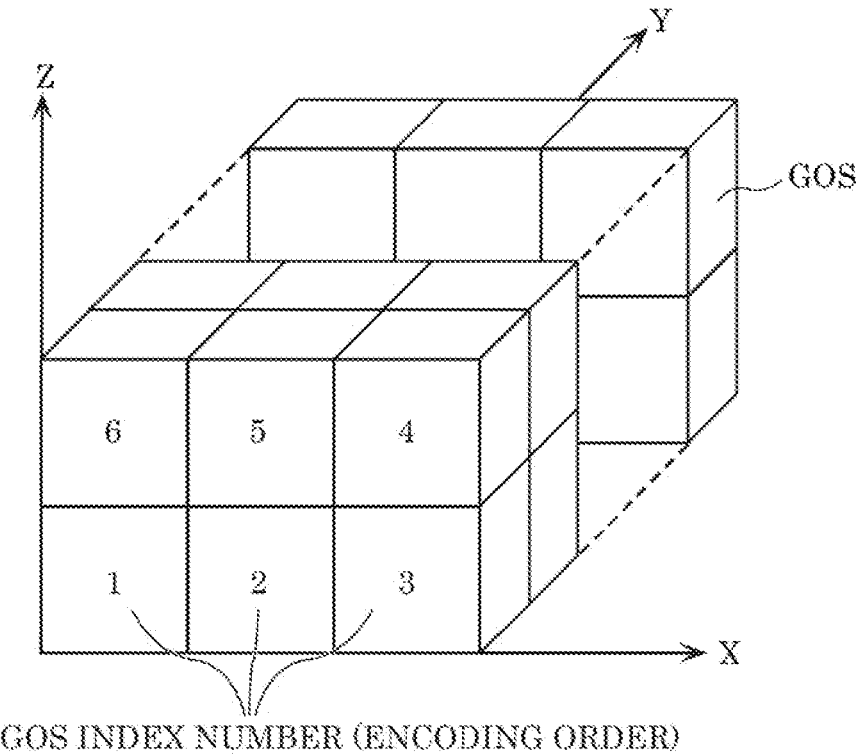
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently, the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
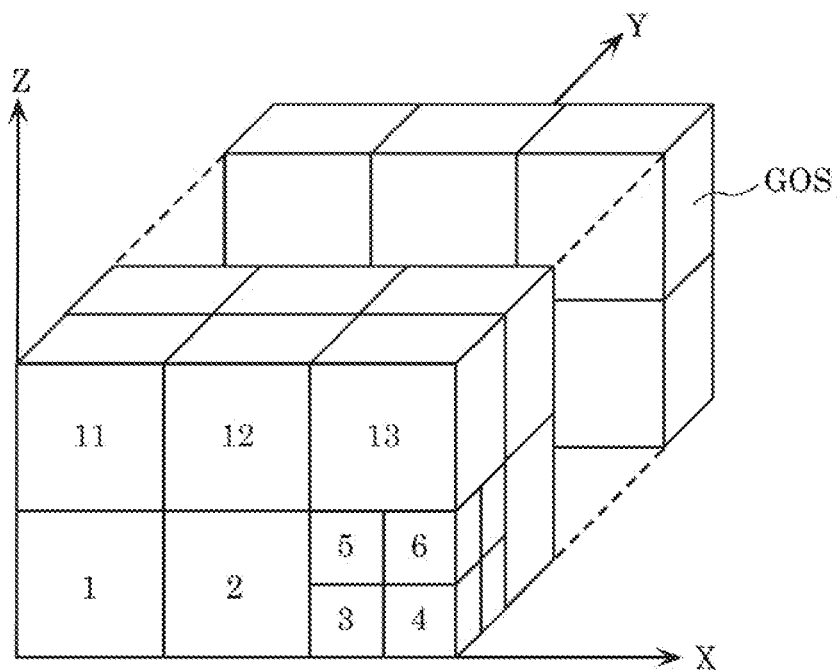
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Embodiment 2

The present embodiment will describe a method of transmitting/receiving three-dimensional data between vehicles.

Figure 7:
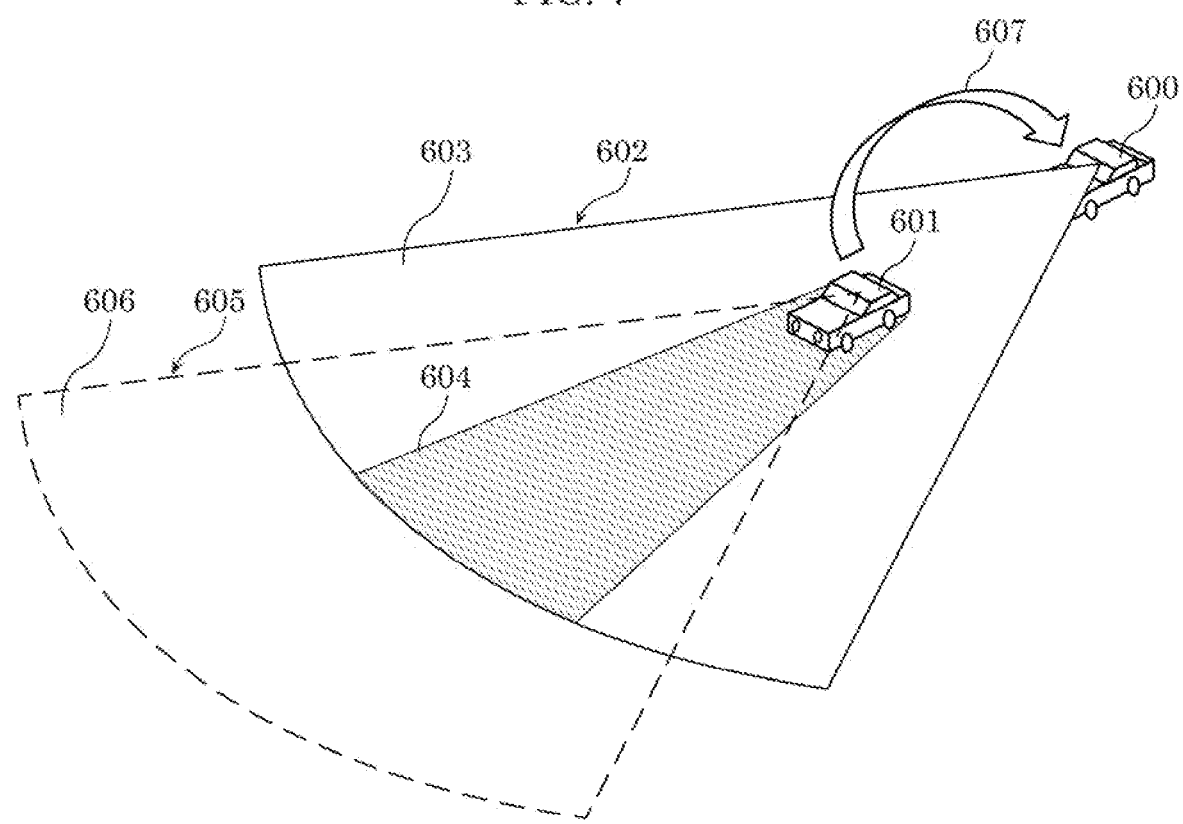
FIG. 7 is a schematic diagram showing three-dimensional data being transmitted/received between vehicles according to Embodiment 2.

FIG. 7 is a schematic diagram showing three-dimensional data 607 being transmitted/received between own vehicle 600 and nearby vehicle 601.

In three-dimensional data that is obtained by a sensor mounted on own vehicle 600 (e.g., a distance sensor such as a rangefinder, as well as a stereo camera and a combination of a plurality of monocular cameras), there appears a region, three-dimensional data of which cannot be created, due to an obstacle such as nearby vehicle 601, despite that such region is included in sensor detection range 602 of own vehicle 600 (such region is hereinafter referred to as occlusion region 604). Also, while the obtainment of three-dimensional data of a larger space enables a higher accuracy of autonomous operations, a range of sensor detection only by own vehicle 600 is limited.

Sensor detection range 602 of own vehicle 600 includes region 603, three-dimensional data of which is obtainable, and occlusion region 604. A range, three-dimensional data of which own vehicle 600 wishes to obtain, includes sensor detection range 602 of own vehicle 600 and other regions. Sensor detection range 605 of nearby vehicle 601 includes occlusion region 604 and region 606 that is not included in sensor detection range 602 of own vehicle 600.

Nearby vehicle 601 transmits information detected by nearby vehicle 601 to own vehicle 600. Own vehicle 600 obtains the information detected by nearby vehicle 601, such as a preceding vehicle, thereby obtaining three-dimensional data 607 of occlusion region 604 and region 606 outside of sensor detection range 602 of own vehicle 600. Own vehicle 600 uses the information obtained by nearby vehicle 601 to complement the three-dimensional data of occlusion region 604 and region 606 outside of the sensor detection range.

The usage of three-dimensional data in autonomous operations of a vehicle or a robot includes self-location estimation, detection of surrounding conditions, or both. For example, for self-location estimation, three-dimensional data is used that is generated by own vehicle 600 on the basis of sensor information of own vehicle 600. For detection of surrounding conditions, three-dimensional data obtained from nearby vehicle 601 is also used in addition to the three-dimensional data generated by own vehicle 600.

Nearby vehicle 601 that transmits three-dimensional data 607 to own vehicle 600 may be determined in accordance with the state of own vehicle 600. For example, the current nearby vehicle 601 is a preceding vehicle when own vehicle 600 is running straight ahead, an oncoming vehicle when own vehicle 600 is turning right, and a following vehicle when own vehicle 600 is rolling backward. Alternatively, the driver of own vehicle 600 may directly specify nearby vehicle 601 that transmits three-dimensional data 607 to own vehicle 600.

Alternatively, own vehicle 600 may search for nearby vehicle 601 having three-dimensional data of a region that is included in a space, three-dimensional data of which own vehicle 600 wishes to obtain, and that own vehicle 600 cannot obtain. The region own vehicle 600 cannot obtain is occlusion region 604, or region 606 outside of sensor detection range 602, etc.

Own vehicle 600 may identify occlusion region 604 on the basis of the sensor information of own vehicle 600. For example, own vehicle 600 identifies, as occlusion region 604, a region which is included in sensor detection range 602 of own vehicle 600, and three-dimensional data of which cannot be created.

Figure 8:
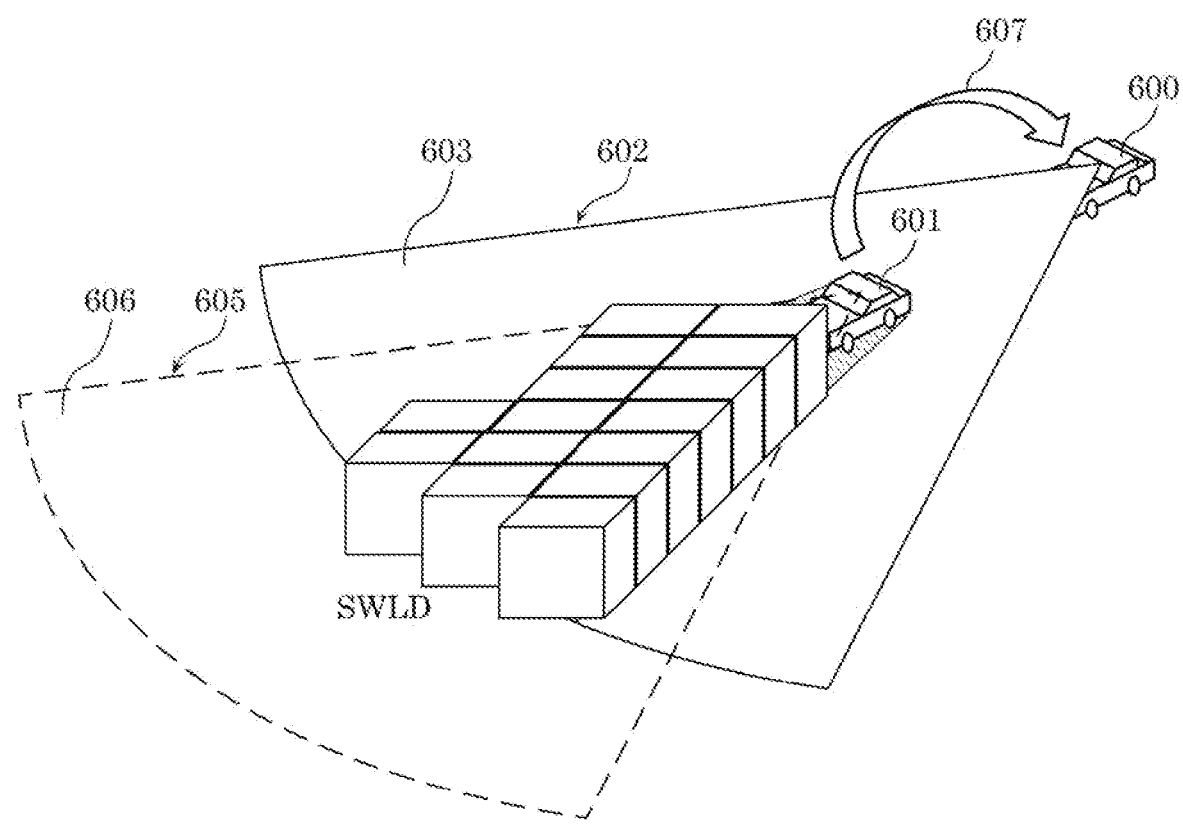
FIG. 8 is a diagram showing an example of three-dimensional data transmitted between vehicles according to Embodiment 2.

The following describes example operations to be performed when a vehicle that transmits three-dimensional data 607 is a preceding vehicle. FIG. 8 is a diagram showing an example of three-dimensional data to be transmitted in such case.

As FIG. 8 shows, three-dimensional data 607 transmitted from the preceding vehicle is, for example, a sparse world (SWLD) of a point cloud. Stated differently, the preceding vehicle creates three-dimensional data (point cloud) of a WLD from information detected by a sensor of such preceding vehicle, and extracts data having an amount of features greater than or equal to the threshold from such three-dimensional data of the WLD, thereby creating three-dimensional data (point cloud) of the SWLD. Subsequently, the preceding vehicle transmits the created three-dimensional data of the SWLD to own vehicle 600.

Own vehicle 600 receives the SWLD, and merges the received SWLD with the point cloud created by own vehicle 600.

The SWLD to be transmitted includes information on the absolute coordinates (the position of the SWLD in the coordinates system of a three-dimensional map). The merge is achieved by own vehicle 600 overwriting the point cloud generated by own vehicle 600 on the basis of such absolute coordinates.

The SWLD transmitted from nearby vehicle 601 may be: a SWLD of region 606 that is outside of sensor detection range 602 of own vehicle 600 and within sensor detection range 605 of nearby vehicle 601; or a SWLD of occlusion region 604 of own vehicle 600; or the SWLDs of the both. Of these SWLDs, a SWLD to be transmitted may also be a SWLD of a region used by nearby vehicle 601 to detect the surrounding conditions.

Nearby vehicle 601 may change the density of a point cloud to transmit, in accordance with the communication available time, during which own vehicle 600 and nearby vehicle 601 can communicate, and which is based on the speed difference between these vehicles. For example, when the speed difference is large and the communication available time is short, nearby vehicle 601 may extract three-dimensional points having a large amount of features from the SWLD to decrease the density (data amount) of the point cloud.

The detection of the surrounding conditions refers to judging the presence/absence of persons, vehicles, equipment for roadworks, etc., identifying their types, and detecting their positions, travelling directions, traveling speeds, etc.

Own vehicle 600 may obtain braking information of nearby vehicle 601 instead of or in addition to three-dimensional data 607 generated by nearby vehicle 601. Here, the braking information of nearby vehicle 601 is, for example, information indicating that the accelerator or the brake of nearby vehicle 601 has been pressed, or the degree of such pressing.

In the point clouds generated by the vehicles, the three-dimensional spaces are segmented on a random access unit, in consideration of low-latency communication between the vehicles. Meanwhile, in a three-dimensional map, etc., which is map data downloaded from the server, a three-dimensional space is segmented in a larger random access unit than in the case of inter-vehicle communication.

Data on a region that is likely to be an occlusion region, such as a region in front of the preceding vehicle and a region behind the following vehicle, is segmented on a finer random access unit as low-latency data.

Data on a region in front of a vehicle has an increased importance when on an expressway, and thus each vehicle creates a SWLD of a range with a narrowed viewing angle on a finer random access unit when running on an expressway.

When the SWLD created by the preceding vehicle for transmission includes a region, the point cloud of which own vehicle 600 can obtain, the preceding vehicle may remove the point cloud of such region to reduce the amount of data to transmit.

Embodiment 3

The present embodiment describes a method, etc. of transmitting three-dimensional data to a following vehicle.

Figure 9:
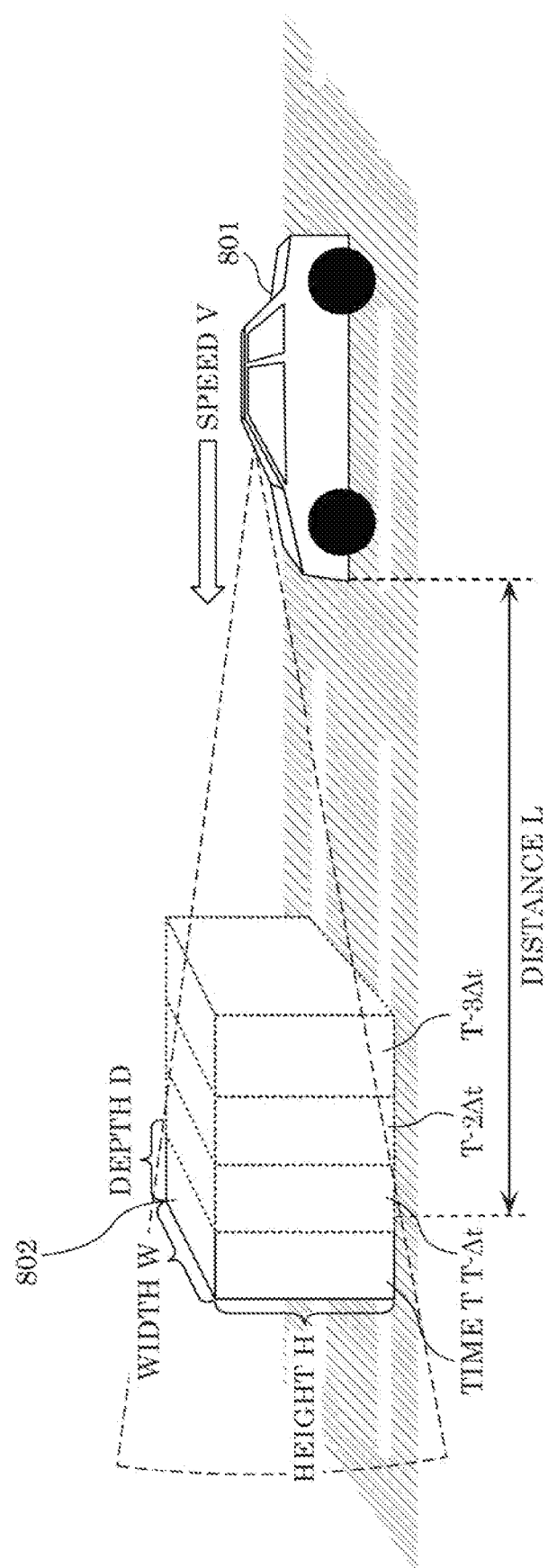
FIG. 9 is a diagram that illustrates processes of transmitting three-dimensional data according to Embodiment 3.

FIG. 9 is a diagram showing an exemplary space, three-dimensional data of which is to be transmitted to a following vehicle, etc.

Vehicle 801 transmits, at the time interval of $\Delta t$, three-dimensional data, such as a point cloud (a point group) included in a rectangular solid space 802, having width W, height H, and depth D, located ahead of vehicle 801 and distanced by distance L from vehicle 801, to a cloud-based traffic monitoring system that monitors road situations or a following vehicle.

When a change has occurred in the three-dimensional data of a space that is included in space 802 already transmitted in the past, due to a vehicle or a person entering space 802 from outside, for example, vehicle 801 also transmits three-dimensional data of the space in which such change has occurred.

Although FIG. 9 illustrates an example in which space 802 has a rectangular solid shape, space 802 is not necessarily a rectangular solid so long as space 802 includes a space on the forward road that is hidden from view of a following vehicle.

Distance L may be set to a distance that allows the following vehicle having received the three-dimensional data to stop safely. For example, set as distance L is the sum of; a distance traveled by the following vehicle while receiving the three-dimensional data; a distance traveled by the following vehicle until the following vehicle starts speed reduction in accordance with the received data; and a distance required by the following vehicle to stop safely after starting speed reduction. These distances vary in accordance with the speed, and thus distance L may vary in accordance with speed V of the vehicle, just like $L = a \times V + b$ (a and b are constants).

Width W is set to a value that is at least greater than the width of the lane on which vehicle 801 is traveling. Width W may also be set to a size that includes an adjacent space such as right and left lanes and a side strip.

Depth D may have a fixed value, but may vary in accordance with speed V of the vehicle, just like $D = c \times V + d$ (c and d are constants). Also, D that is set to satisfy $D > V \times \Delta t$ enables the overlap of a space to be transmitted and a space transmitted in the past. This enables vehicle 801 to transmit a space on the traveling road to the following vehicle, etc. completely and more reliably.

As described above, vehicle 801 transmits three-dimensional data of a limited space that is useful to the following vehicle, thereby effectively reducing the amount of the three-dimensional data to be transmitted and achieving low-latency, low-cost communication.

Embodiment 4

In Embodiment 3, an example is described in which a client device of a vehicle or the like transmits three-dimensional data to another vehicle or a server such as a cloud-based traffic monitoring system. In the present embodiment, a client device transmits sensor information obtained through a sensor to a server or a client device.

Figure 10:
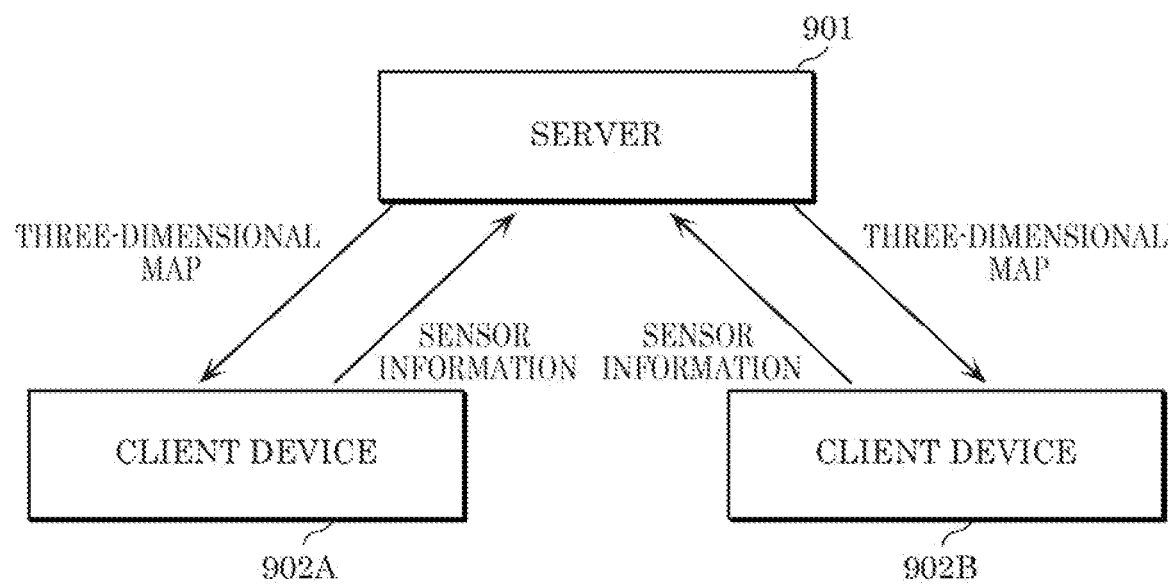
FIG. 10 is a diagram showing a structure of a system according to Embodiment 4.

A structure of a system according to the present embodiment will first be described. FIG. 10 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LIDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 11:
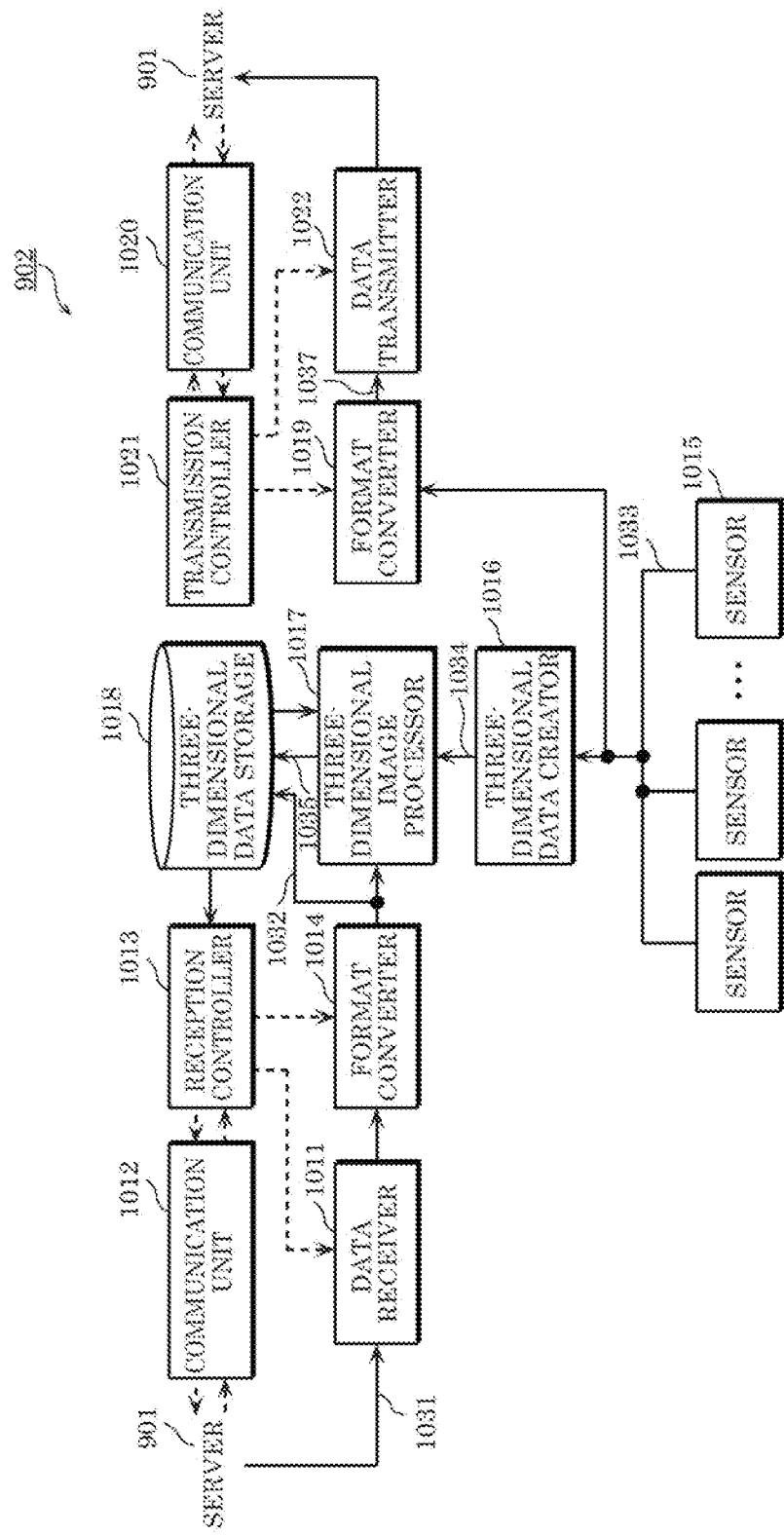
FIG. 11 is a block diagram of a client device according to Embodiment 4.

FIG. 11 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 815 are a group of sensors, such as LIDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LIDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LIDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LIDAR, a luminance image obtained by a visible light camera, an infrared image obtained by an infrared camera, a depth image obtained by a depth sensor, sensor position information, and sensor speed information.

Figure 12:
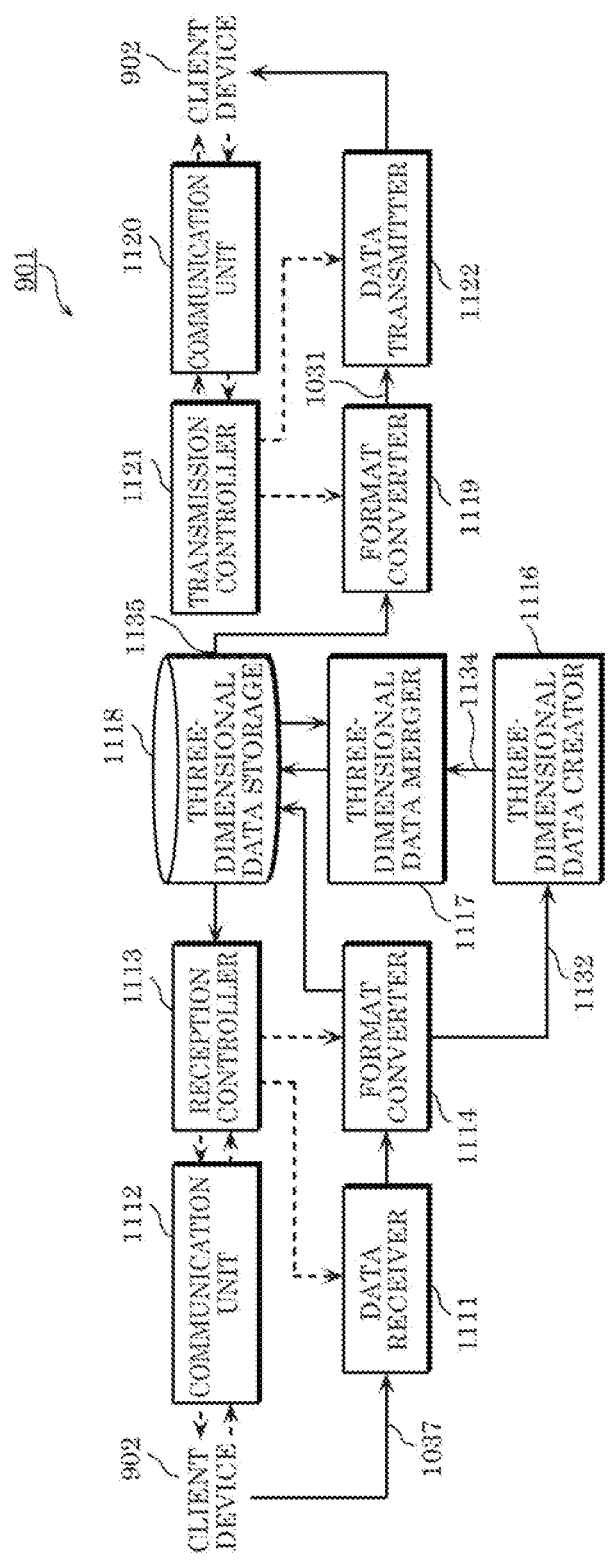
FIG. 12 is a block diagram of a server according to Embodiment 4.

A structure of server 901 will be described next. FIG. 12 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LIDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when the received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LIDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

An operational flow of client device 902 will be described next. FIG. 13 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

FIG. 14 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 15:
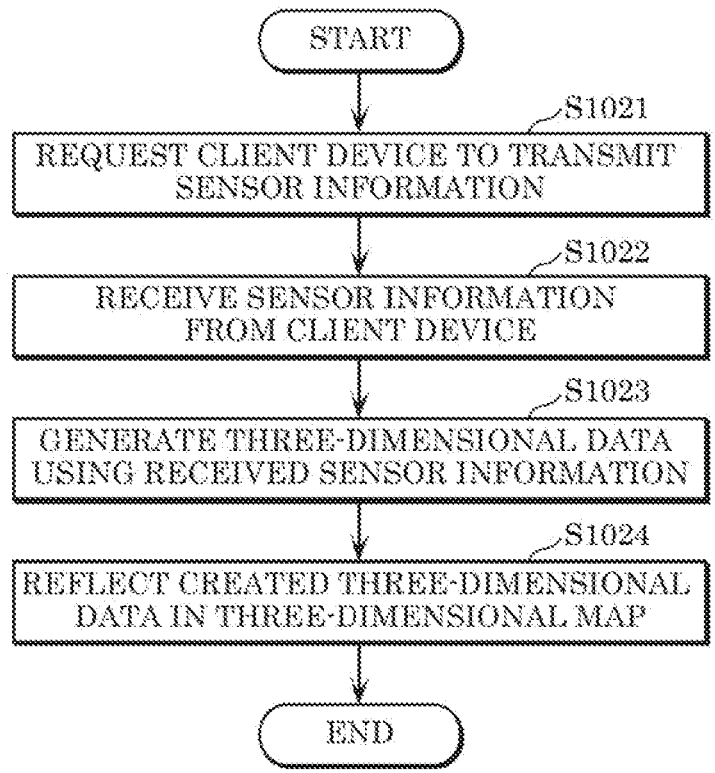
FIG. 15 is a flowchart of a three-dimensional data creation process performed by the server according to Embodiment 4.

An operational flow of server 901 will be described next. FIG. 15 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 16:
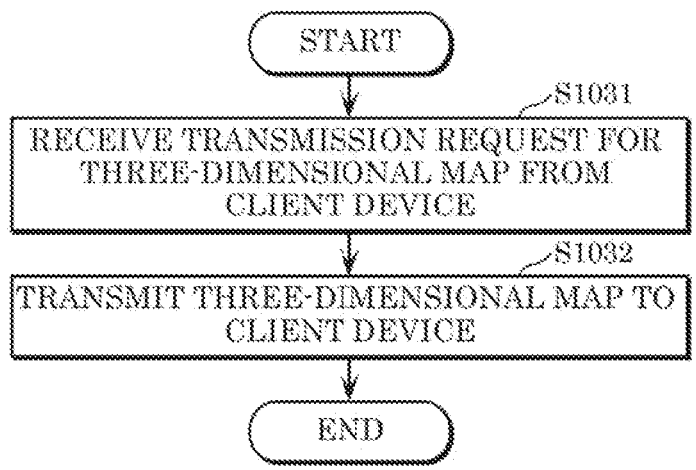
FIG. 16 is a flowchart of a three-dimensional map transmission process performed by the server according to Embodiment 4.

FIG. 16 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LIDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using the obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 17:
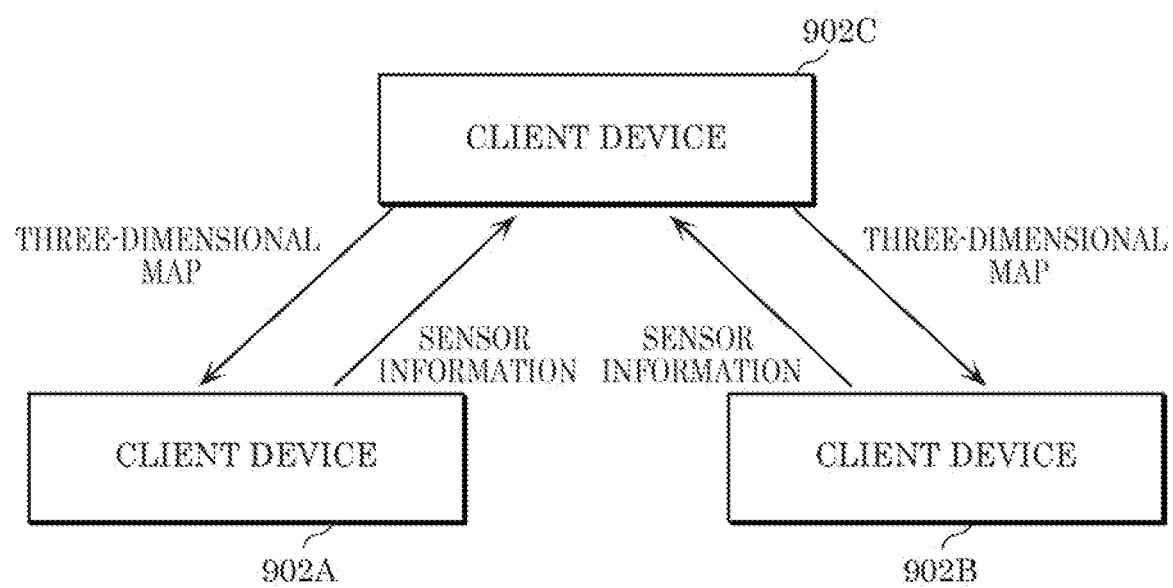
FIG. 17 is a diagram showing a structure of a variation of the system according to Embodiment 4.

Server 901 is not limited to only being a server such as a cloud-based traffic monitoring system, and may also be another (vehicle-mounted) client device. FIG. 17 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 18:
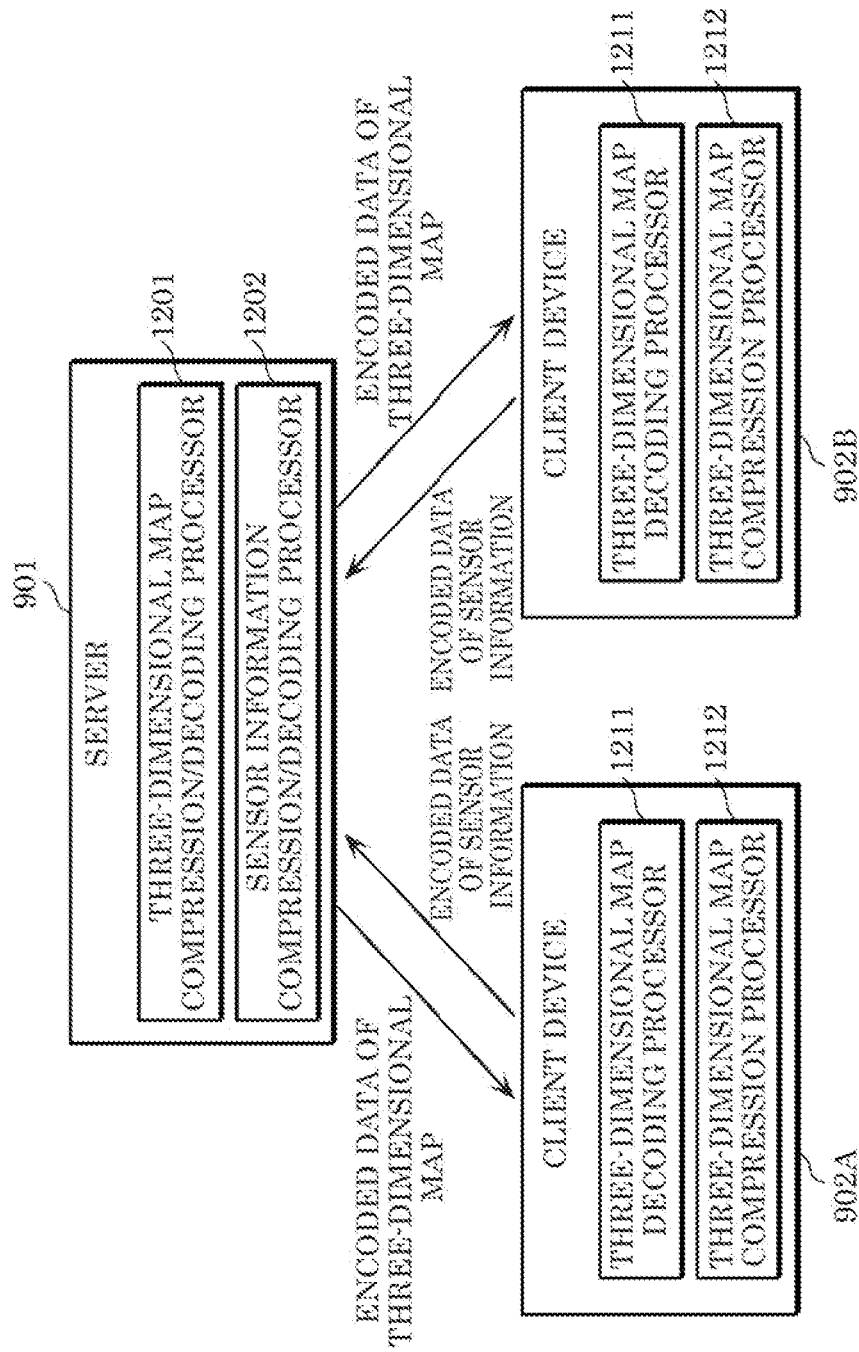
FIG. 18 is a diagram showing a structure of the server and client devices according to Embodiment 4.

FIG. 18 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits the obtained sensor information 1033 to server 901 or another mobile object.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1034 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another mobile object 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using the received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses the received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Embodiment 5

Figure 19:
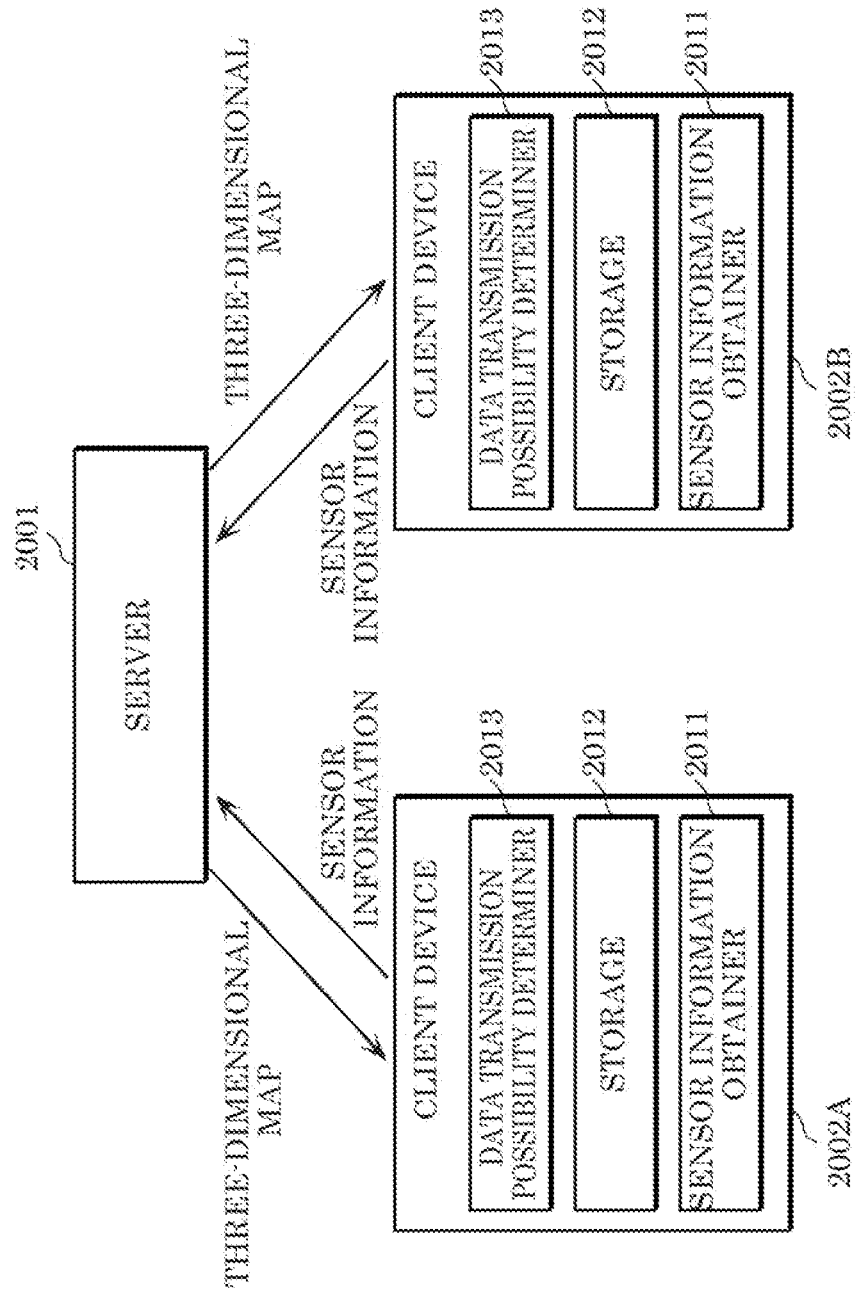
FIG. 19 is a diagram illustrating a configuration of a server and a client device according to Embodiment 5.

In the present embodiment, a variation of Embodiment 4 will be described. FIG. 19 is a diagram illustrating a configuration of a system according to the present embodiment. The system illustrated in FIG. 19 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration. Additionally, when client device 2002A and client device 2002B are not particularly distinguished below, client device 2002A and client device 2002B are also referred to as client device 2002.

Figure 20:
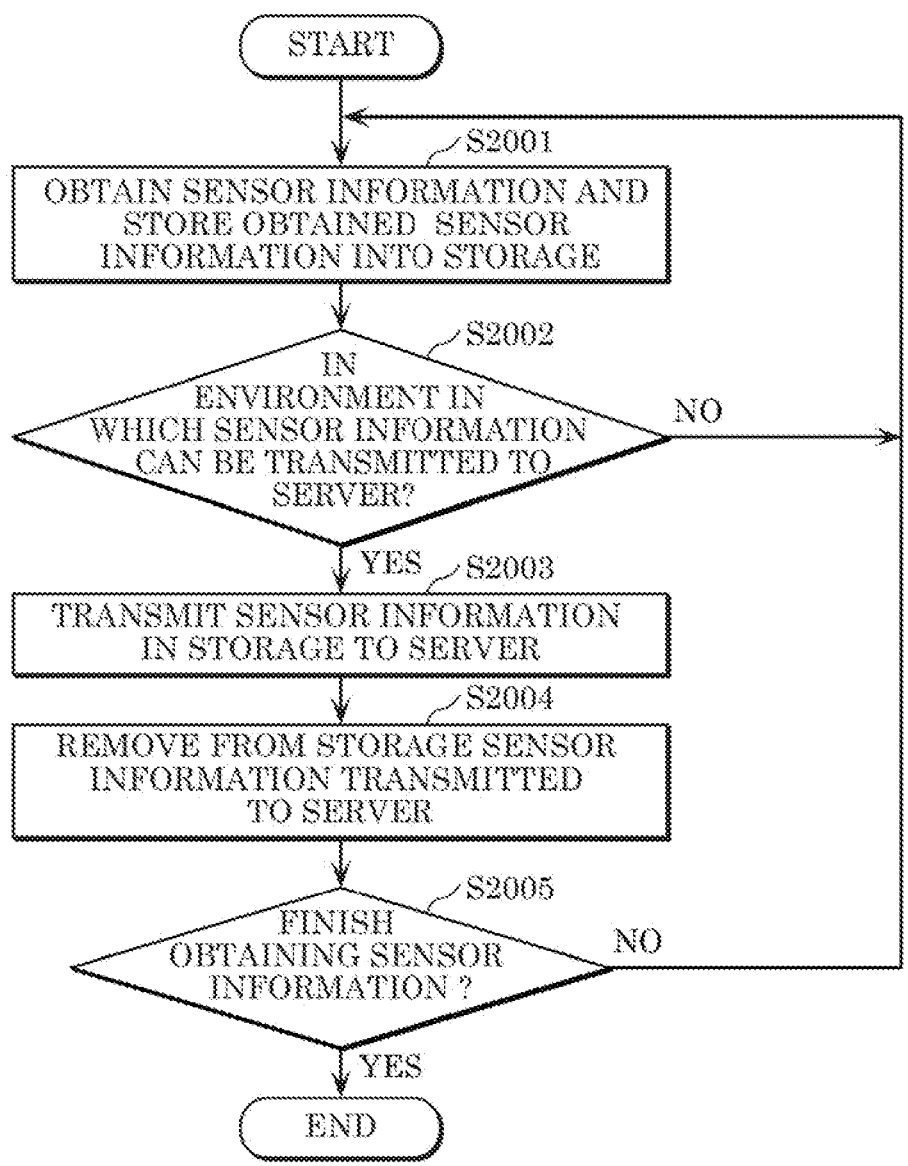
FIG. 20 is a flowchart of a process performed by the client device according to Embodiment 5.

FIG. 20 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions.

Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t-N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Figure 21:
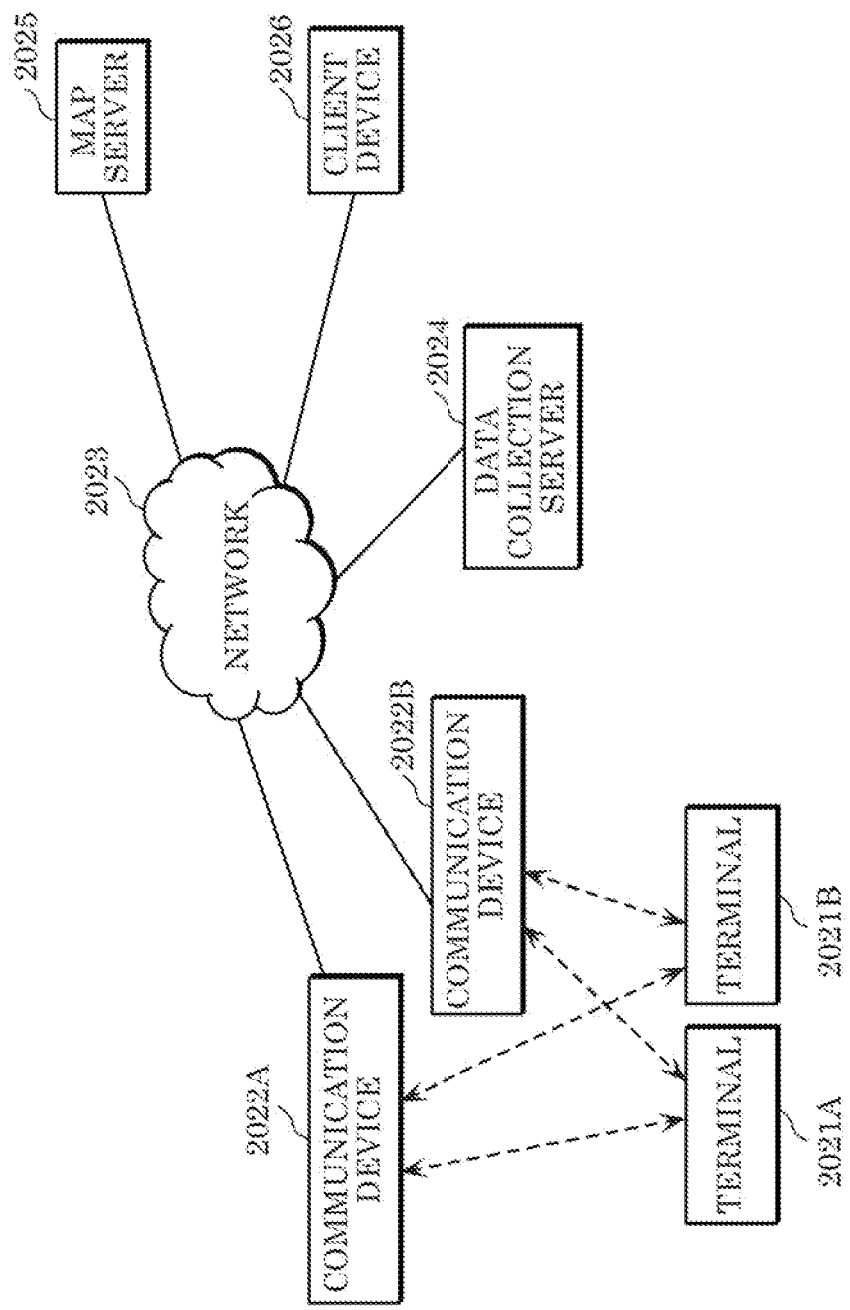
FIG. 21 is a diagram illustrating a configuration of a sensor information collection system according to Embodiment 5.

Next, a sensor information collection system according to the present embodiment will be described. FIG. 21 is a diagram illustrating a configuration of the sensor information collection system according to the present embodiment. As illustrated in FIG. 21, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems. Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 11. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDER or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDER or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

Embodiment 6

Figure 22:
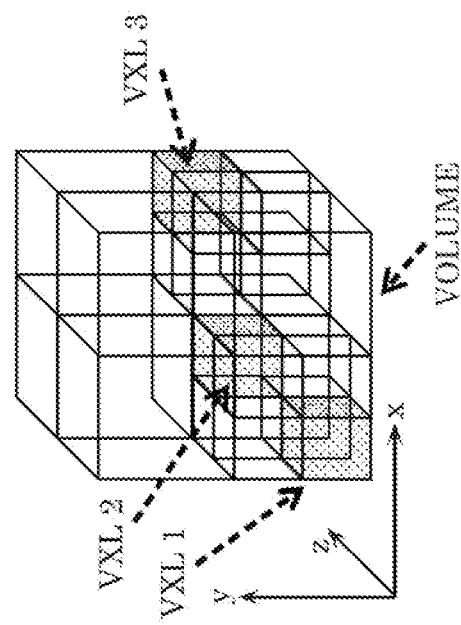
FIG. 22 is a diagram showing an example of a volume according to Embodiment 6.
Figure 23:
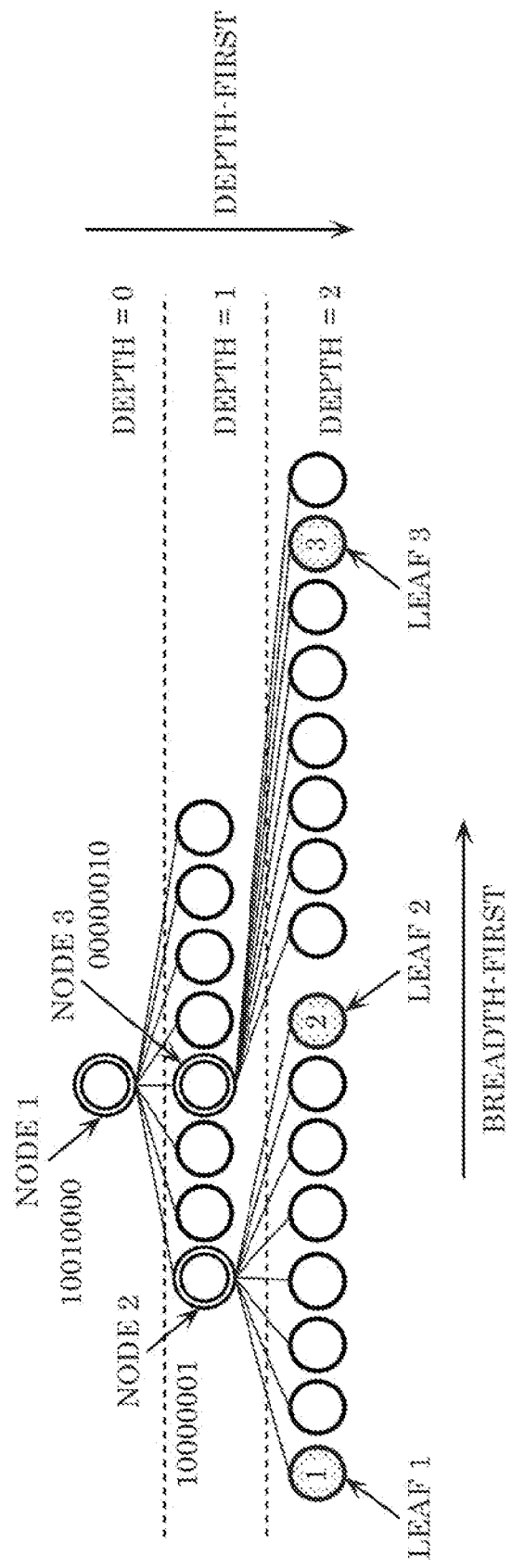
FIG. 23 is a diagram showing an example of an octree representation of the volume according to Embodiment 6.

Hereinafter, a scan order of an octree representation and voxels will be described. A volume is encoded after being converted into an octree structure (made into an octree). The octree structure includes nodes and leaves. Each node has eight nodes or leaves, and each leaf has voxel (VXL) information. FIG. 22 is a diagram showing an example structure of a volume including voxels. FIG. 23 is a diagram showing an example of the volume shown in FIG. 22 having been converted into the octree structure. Among the leaves shown in FIG. 23, leaves 1, 2, and 3 respectively represent VXL 1, VXL 2, and VXL 3, and represent VXLs including a point group (hereinafter, active VXLs).

An octree is represented by, for example, binary sequences of 1s and 0s. For example, when giving the nodes or the active VXLs a value of 1 and everything else a value of 0, each node and leaf is assigned with the binary sequence shown in FIG. 23. Thus, this binary sequence is scanned in accordance with a breadth-first or a depth-first scan order. For example, when scanning breadth-first, the binary sequence shown in A of FIG. 24 is obtained. When scanning depth-first, the binary sequence shown in B of FIG. 24 is obtained. The binary sequences obtained through this scanning are encoded through entropy encoding, which reduces an amount of information.

Depth information in the octree representation will be described next. Depth in the octree representation is used in order to control up to how fine a granularity point cloud information included in a volume is stored. Upon setting a great depth, it is possible to reproduce the point cloud information to a more precise level, but an amount of data for representing the nodes and leaves increases. Upon setting a small depth, however, the amount of data decreases, but some information that the point cloud information originally held is lost, since pieces of point cloud information including different positions and different colors are now considered as pieces of point cloud information including the same position and the same color.

Figure 25:
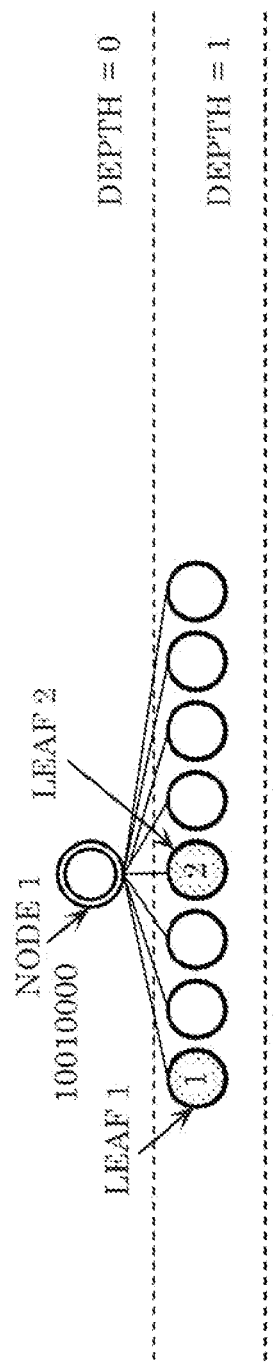
FIG. 25 is a diagram showing an example of an octree representation of a volume according to Embodiment 6.

For example, FIG. 25 is a diagram showing an example in which the octree with a depth of 2 shown in FIG. 23 is represented with a depth of 1. The octree shown in FIG. 25 has a lower amount of data than the octree shown in FIG. 23. In other words, the binarized octree shown in FIG. 25 has a lower bit count than the octree shown in FIG. 23. Leaf 1 and leaf 2 shown in FIG. 23 are represented by leaf 1 shown in FIG. 24. In other words, the information on leaf 1 and leaf 2 being in different positions is lost.

Figure 26:
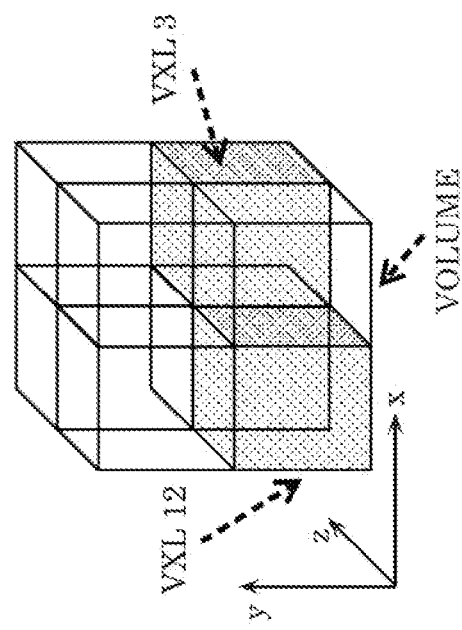
FIG. 26 is a diagram showing an example of the volume according to Embodiment 6.

FIG. 26 is a diagram showing a volume corresponding to the octree shown in FIG. 25. VXL 1 and VXL 2 shown in FIG. 22 correspond to VXL 12 shown in FIG. 26. In this case, the three-dimensional data encoding device generates color information of VXL 12 shown in FIG. 26 using color information of VXL 1 and VXL 2 shown in FIG. 22. For example, the three-dimensional data encoding device calculates an average value, a median, a weighted average value, or the like of the color information of VXL 1 and VXL 2 as the color information of VXL 12. In this manner, the three-dimensional data encoding device may control a reduction of the amount of data by changing the depth of the octree.

The three-dimensional data encoding device may set the depth information of the octree to units of worlds, units of spaces, or units of volumes. In this case, the three-dimensional data encoding device may append the depth information to header information of the world, header information of the space, or header information of the volume. In all worlds, spaces, and volumes associated with different times, the same value may be used as the depth information. In this case, the three-dimensional data encoding device may append the depth information to header information managing the worlds associated with all times.

Embodiment 7

Figure 27:
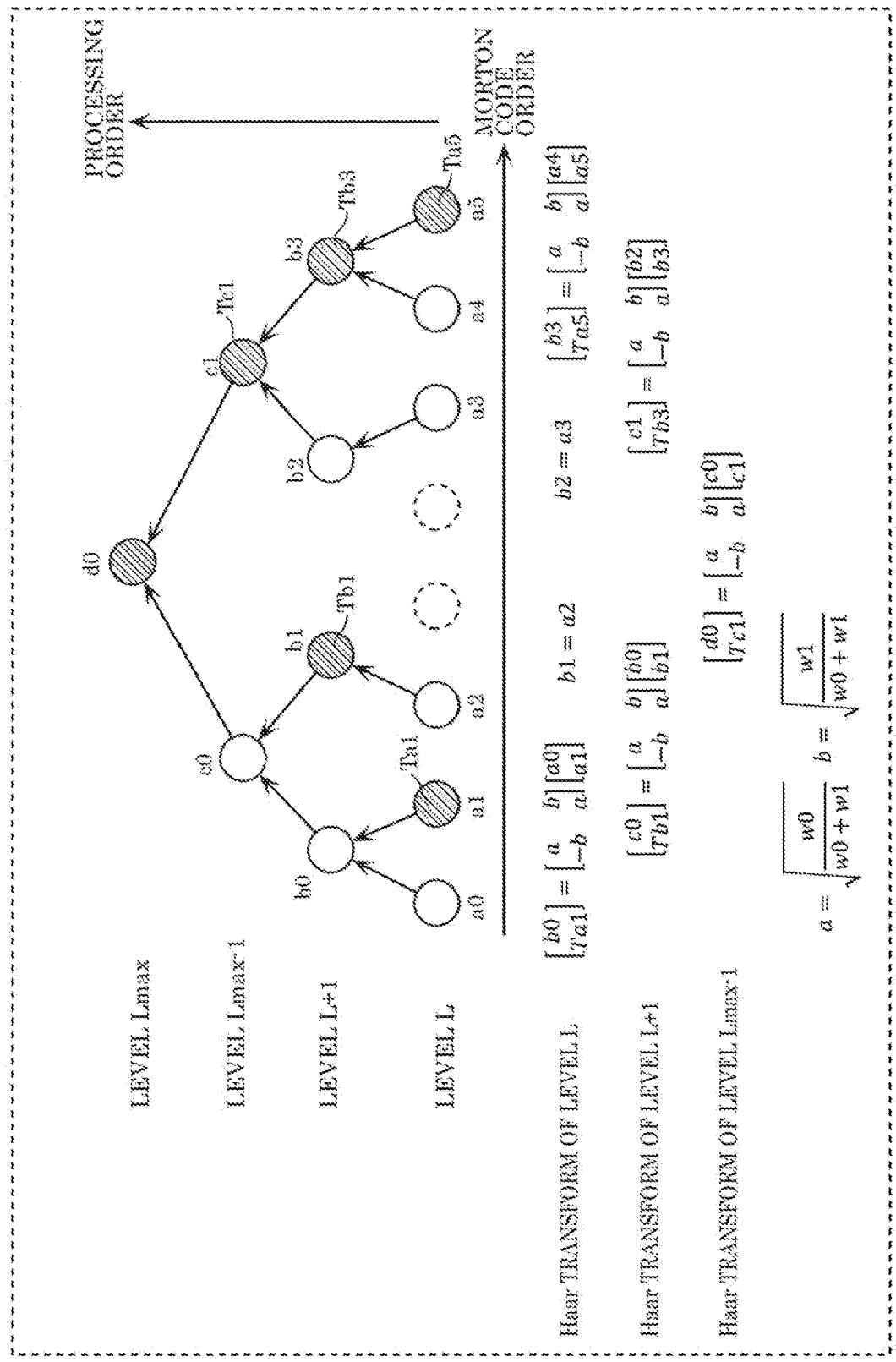
FIG. 27 is a diagram for describing the encoding of the attribute information by using a RAHT according to Embodiment 7.

Hereinafter, a method using a RAHT (Region Adaptive Hierarchical Transform) will be described as another method of encoding the attribute information of a three-dimensional point. FIG. 27 is a diagram for describing the encoding of the attribute information by using a RAHT.

First, the three-dimensional data encoding device generates Morton codes based on the geometry information of three-dimensional points, and sorts the attribute information of the three-dimensional points in the order of the Morton codes. For example, the three-dimensional data encoding device may perform sorting in the ascending order of the Morton codes. Note that the sorting order is not limited to the order of the Morton codes, and other orders may be used.

Next, the three-dimensional data encoding device generates a high-frequency component and a low-frequency component of the layer L by applying the Haar conversion to the attribute information of two adjacent three-dimensional points in the order of the Morton codes. For example, the three-dimensional data encoding device may use the Haar conversion of 2×2 matrices. The generated high-frequency component is included in a coding coefficient as the high-frequency component of the layer L, and the generated low-frequency component is used as the input value for the higher layer L+1 of the layer L.

After generating the high-frequency component of the layer L by using the attribute information of the layer L, the three-dimensional data encoding device subsequently performs processing of the layer L+1. In the processing of the layer L+1, the three-dimensional data encoding device generates a high-frequency component and a low-frequency component of the layer L+1 by applying the Haar conversion to two low-frequency components obtained by the Haar conversion of the attribute information of the layer L. The generated high-frequency component is included in a coding coefficient as the high-frequency component of the layer L+1, and the generated low-frequency component is used as the input value for the higher layer L+2 of the layer L+1.

The three-dimensional data encoding device repeats such layer processing, and determines that the highest layer Lmax has been reached at the time when a low-frequency component that is input to a layer becomes one. The three-dimensional data encoding device includes the low-frequency component of the layer Lmax−1 that is input to the Layer Lmax in a coding coefficient. Then, the value of the low-frequency component or high-frequency component included in the coding coefficient is quantized, and is encoded by using entropy encoding or the like.

Note that, when only one three-dimensional point exists as two adjacent three-dimensional points at the time of application of the Haar conversion, the three-dimensional data encoding device may use the value of the attribute information of the existing one three-dimensional point as the input value for a higher layer.

In this manner, the three-dimensional data encoding device hierarchically applies the Haar conversion to the input attribute information, generates a high-frequency component and a low-frequency component of the attribute information, and performs encoding by applying quantization described later or the like. Accordingly, the coding efficiency can be improved.

When the attribute information is N dimensional, the three-dimensional data encoding device may independently apply the Haar conversion for each dimension, and may calculate each coding coefficient. For example, when the attribute information is color information (RGB, YUV, or the like), the three-dimensional data encoding device applies the Haar conversion for each component, and calculates each coding coefficient.

The three-dimensional data encoding device may apply the Haar conversion in the order of the layers L, L+1, . . . , Lmax. The closer to the layer Lmax, a coding coefficient including the more low-frequency components of the input attribute information is generated.

w0 and w1 shown in FIG. 27 are the weights assigned to each three-dimensional point. For example, the three-dimensional data encoding device may calculate the weight based on the distance information between two adjacent three-dimensional points to which the Haar conversion is applied, or the like. For example, the three-dimensional data encoding device may improve the coding efficiency such that the closer the distance, the greater the weight. Note that the three-dimensional data encoding device may calculate this weight with another technique, or need not use the weight.

In the example shown in FIG. 27, the pieces of the input attribute information are a0, a1, a2, a3, a4, and a5. Additionally, Ta1, Ta5, Tb1, Tb3, Tc1, and d0 are encoded among the coding coefficients after the Haar conversion. The other coding coefficients (b0, b2, c0 and the like) are medians, and are not encoded.

Specifically, in the example shown in FIG. 27, the high-frequency component Ta1 and the low-frequency component b0 are generated by performing the Haar conversion on a0 and a1. Here, when the weights w0 and w1 are equal, the low-frequency component b0 is the average value of a0 and a1, and the high-frequency component Ta1 is the difference between a0 and a1.

Since there is no attribute information to be paired with a2, a2 is used as b1 as is. Similarly, since there is no attribute information to be paired with a3, a3 is used as b2 as is. Additionally, the high-frequency component Ta5 and the low-frequency component b3 are generated by performing the Haar conversion on a4 and a5.

In the layer L+1, the high-frequency component Tb1 and the low-frequency component c0 are generated by performing the Haar conversion on b0 and b1. Similarly, the high-frequency component Tb3 and the low-frequency component c1 are generated by performing the Haar conversion on b2 and b3.

In the layer Lmax-1, the High-frequency component Tc1 and the low-frequency component d0 are generated by performing the Haar conversion on c0 and el.

The three-dimensional data encoding device may encode the coding coefficients to which the Haar conversion has been applied, after quantizing the coding coefficients. For example, the three-dimensional data encoding device performs quantization by dividing the coding coefficient by the quantization scale (also called the quantization step (QS)). In this case, the smaller the quantization scale, the smaller the error (quantization error) that may occur due to quantization. Conversely, the larger the quantization scale, the larger the quantization error.

Figure 28:
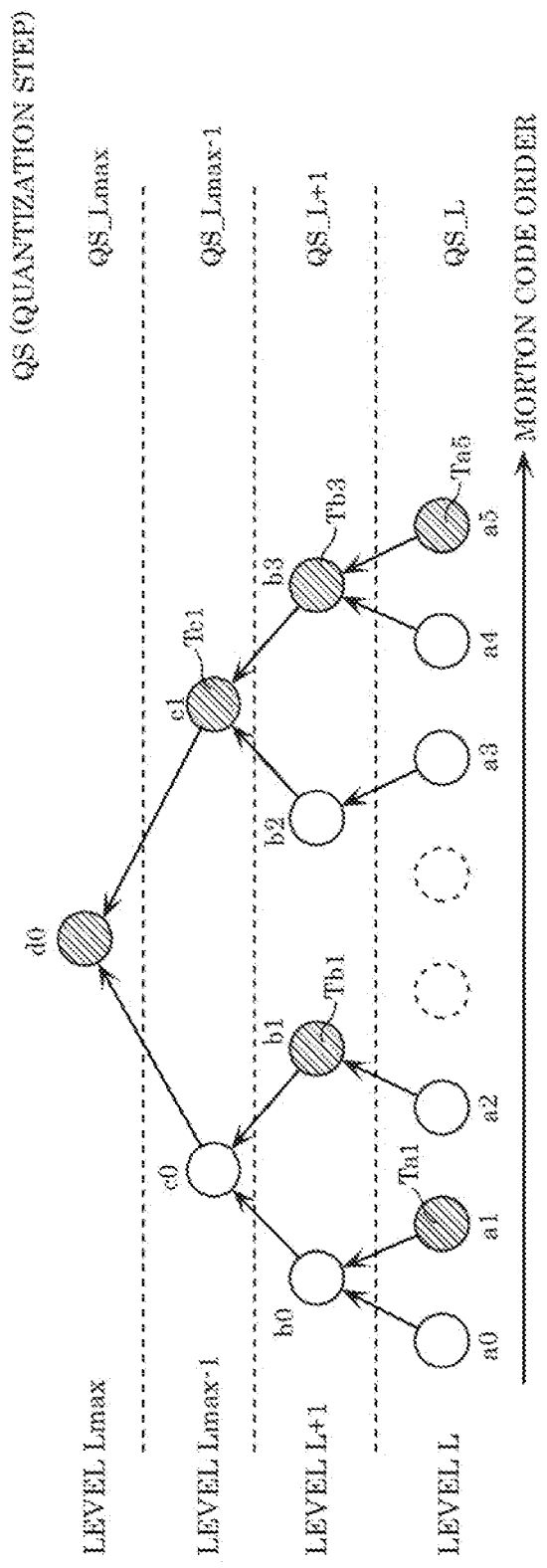
FIG. 28 is a diagram showing an example of setting a quantization scale for each hierarchy according to Embodiment 7.

Note that the three-dimensional data encoding device may change the value of the quantization scale for each layer. FIG. 28 is a diagram showing an example of setting the quantization scale for each layer. For example, the three-dimensional data encoding device sets smaller quantization scales to the higher layers, and larger quantization scales to the lower layers. Since the coding coefficients of the three-dimensional points belonging to the higher layers include more low-frequency components than the lower layers, there is a high possibility that the coding coefficients are important components in human visual characteristics and the like. Therefore, by suppressing the quantization error that may occur in the higher layers by making the quantization scales for the higher layers small, visual deterioration can be suppressed, and the coding efficiency can be improved.

Note that the three-dimensional data encoding device may add the quantization scale for each layer to a header or the like. Accordingly, the three-dimensional decoding device can correctly decode the quantization scale, and can appropriately decode a bitstream.

Additionally, the three-dimensional data encoding device may adaptively switch the value of the quantization scale according to the importance of a current three-dimensional point to be encoded. For example, the three-dimensional data encoding device uses a small quantization scale for a three-dimensional point with high importance, and uses a large quantization scale for a three-dimensional point with low importance. For example, the three-dimensional data encoding device may calculate the importance from the weight at the time of the Haar conversion, or the like. For example, the three-dimensional data encoding device may calculate the quantization scale by using the sum of w0 and w1. In this manner, by making the quantization scale of a three-dimensional point with high importance small, the quantization error becomes small, and the coding efficiency can be improved.

Additionally, the value of the QS may be made smaller for the higher layers. Accordingly, the higher the layer, the larger the value of the QW, and the prediction efficiency can be improved by suppressing the quantization error of the three-dimensional point.

Here, a coding coefficient Ta1q after quantization of the coding coefficient Ta1 of the attribute information a1 is represented by Ta1/QS_L. Note that QS may be the same value in all the layers or a part of the layers.

The QW (Quantization Weight) is the value that represents the importance of a current three-dimensional point to be encoded. For example, the above-described sum of w0 and w1 may be used as the QW. Accordingly, the higher the layer, the larger the value of the QW, and the prediction efficiency can be improved by suppressing the quantization error of the three-dimensional point.

For example, the three-dimensional data encoding device may first initialize the values of the QWs of all the three-dimensional points with 1, and may update the QW of each three-dimensional point by using the values of w0 and w1 at the time of the Haar conversion. Alternatively, the three-dimensional data encoding device may change the initial value according to the layers, without initializing the values of the QWs of all the three-dimensional points with a value of 1. For example, the quantization scales for the higher layers becomes small by setting larger QW initial values for the higher layers. Accordingly, since the prediction error in the higher layers can be suppressed, the prediction accuracy of the lower layers can be increased, and the coding efficiency can be improved. Note that the three-dimensional data encoding device need not necessarily use the QW.

When using the QW, the quantized value Ta1q of Ta1 is calculated by (Formula K1) and (Formula K2).

[Math. 1]

$$Ta1q = \frac{Ta1 + \frac{QS\_L}{2}}{QS\_LoD1} \times QWTa1 \qquad \text{(Formula K1)}$$

$$QWTa1 = 1 + \sum_{i=0}^{1} w_i \qquad \text{(Formula K2)}$$

Additionally, the three-dimensional data encoding device scans and encodes the coding coefficients (unsigned integer values) after quantization in a certain order. For example, the three-dimensional data encoding device encodes a plurality of three-dimensional points from the three-dimensional points included in the higher layers toward the lower layers in order.

For example, in the example shown in FIG. 27, the three-dimensional data encoding device encodes a plurality of three-dimensional points in the order of Tc1, Tb1, Tb3, Ta1, and Ta5 from d0 included in the higher layer Lmax. Here, there is a tendency that the lower the layer L, the more likely it is that the coding coefficient after quantization becomes 0. This can be due to the following and the like.

Since the coding coefficient of the lower layer L shows a higher frequency component than the higher layers, there is a tendency that the coding coefficient becomes 0 depending on a current three-dimensional point. Additionally, by switching the quantization scale according to the above-described importance or the like, the lower the layer, the larger the quantization scales, and the more likely it is that the coding coefficient after quantization becomes 0.

Figures 29, 30:
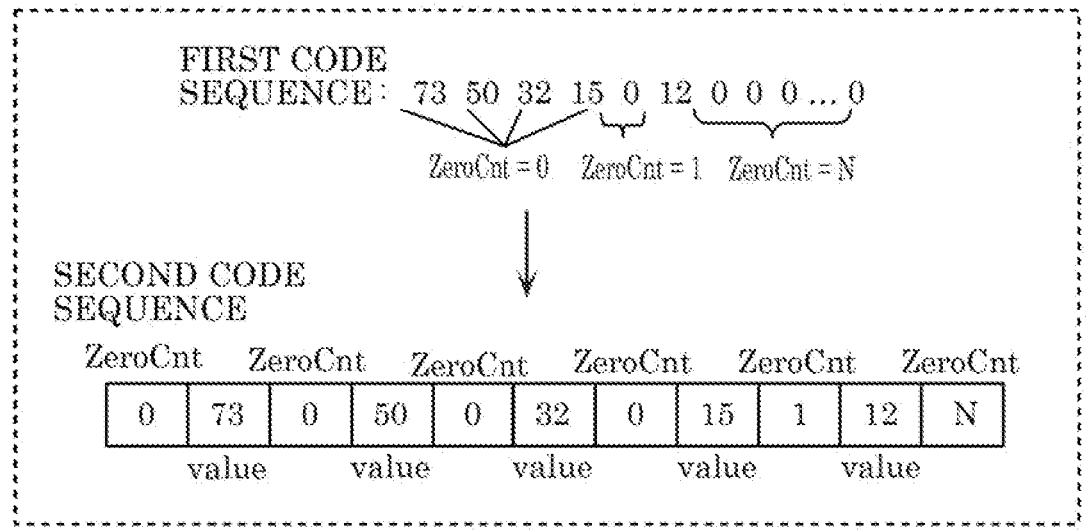
FIG. 29 is a diagram showing an example of a first code sequence and a second code sequence according to Embodiment 7.
FIG. 30 is a diagram showing an example of a truncated unary code according to Embodiment 7.

In this manner, the lower the layer, the more likely it is that the coding coefficient after quantization becomes 0, and the value α consecutively occurs in the first code sequence. FIG. 29 is a diagram showing an example of the first code sequence and the second code sequence.

The three-dimensional data encoding device counts the number of times that the value 0 occurs in the first code sequence, and encodes the number of times that the value 0 consecutively occurs, instead of the consecutive values 0. That is, the three-dimensional data encoding device generates a second code sequence by replacing the coding coefficient of the consecutive values 0 in the first code sequence with the number of consecutive times (ZeroCnt) of 0. Accordingly, when there are consecutive values 0 of the coding coefficients after quantization, the coding efficiency can be improved by encoding the number of consecutive times of 0, rather than encoding a lot of 0s.

Additionally, the three-dimensional data encoding device may entropy encode the value of ZeroCnt. For example, the three-dimensional data encoding device binarizes the value of ZeroCnt with the truncated unary code of the total number T of the encoded three-dimensional points, and arithmetically encodes each bit after the binarization. FIG. 30 is a diagram showing an example of the truncated unary code in the case where the total number of encoded three-dimensional points is T. At this time, the three-dimensional data encoding device may improve the coding efficiency by using a different coding table for each bit. For example, the three-dimensional data encoding device uses coding table 1 for the first bit, uses coding table 2 for the second bit, and coding table 3 for the subsequent bits. In this manner, the three-dimensional data encoding device can improve the coding efficiency by switching the coding table for each bit.

Additionally, the three-dimensional data encoding device may arithmetically encode ZeroCnt after binarizing ZeroCnt with an Exponential-Golomb. Accordingly, when the value of ZeroCnt easily becomes large, the efficiency can be more improved than the binarized arithmetic encoding with the truncated unary code. Note that the three-dimensional data encoding device may add a flag for switching between using the truncated unary code and using the Exponential-Golomb to a header. Accordingly, the three-dimensional data encoding device can improve the coding efficiency by selecting the optimum binarization method. Additionally, the three-dimensional data decoding device can correctly decode a bitstream by referring to the flag included in the header to switch the binarization method.

The three-dimensional decoding device may convert the decoded coding coefficient after the quantization from an unsigned integer value to a signed integer value with a method contrary to the method performed by the three-dimensional data encoding device. Accordingly, when the coding coefficient is entropy encoded, the three-dimensional decoding device can appropriately decode a bitstream generated without considering the occurrence of a negative integer. Note that the three-dimensional decoding device does not necessarily need to convert the coding coefficient from an unsigned integer value to a signed integer value. For example, when decoding a bitstream including an encoded bit that has been separately entropy encoded, the three-dimensional decoding device may decode the sign bit.

The three-dimensional decoding device decodes the coding coefficient after the quantization converted to the signed integer value, by the inverse quantization and the inverse Haar conversion. Additionally, the three-dimensional decoding device utilizes the coding coefficient after the decoding for the prediction after the current three-dimensional point to be decoded. Specifically, the three-dimensional decoding device calculates the inverse quantized value by multiplying the coding coefficient after the quantization by the decoded quantization scale. Next, the three-dimensional decoding device obtains the decoded value by applying the inverse Haar conversion described later to the inverse quantized value.

For example, the three-dimensional decoding device converts the decoded unsigned integer value to a signed integer value with the following method. When the LSB (least significant bit) of the decoded unsigned integer value a2u is 1, the signed integer value Ta1q is set to $-((a2u+1)>>1)$. When the LSB of the decoded unsigned integer value a2u is not 1 (when it is 0), the signed integer value Ta1q is set to $(a2u>>1)$.

Additionally, the inverse quantized value of Ta1 is represented by Ta1q×QS_L. Here, Ta1q is the quantized value of Ta1. In addition, QS_L is the quantization step for the layer L.

Additionally, the QS may be the same value for all the layers or a part of the layers. In addition, the three-dimensional data encoding device may add the information indicating the QS to a header or the like. Accordingly, the three-dimensional decoding device can correctly perform inverse quantization by using the same QS as the QS used by the three-dimensional data encoding device.

Figure 31:
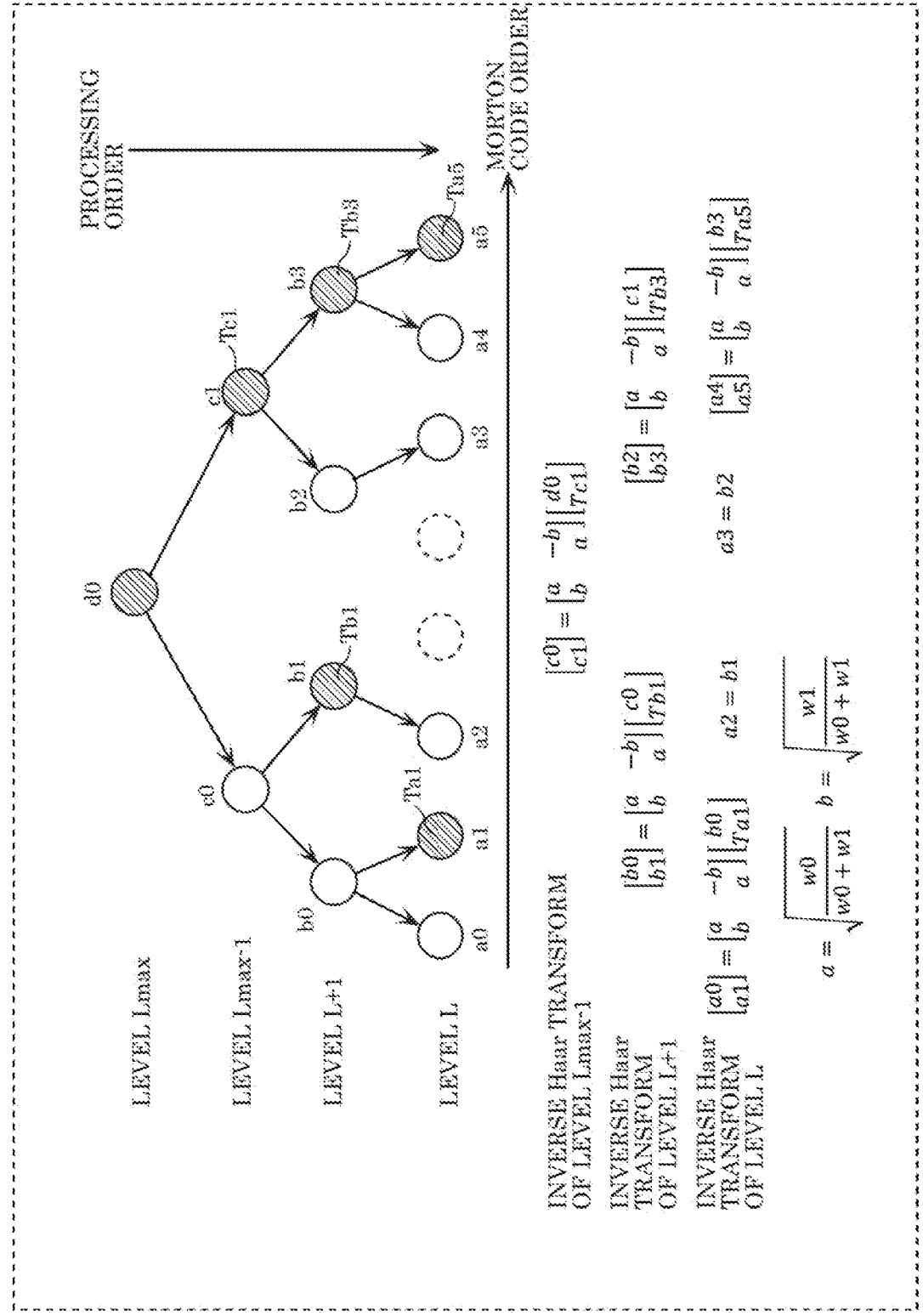
FIG. 31 is a diagram for describing the inverse Haar conversion according to Embodiment 7.

Next, the inverse Haar conversion will be described. FIG. 31 is a diagram for describing the inverse Haar conversion. The three-dimensional decoding device decodes the attribute value of a three-dimensional point by applying the inverse Haar conversion to the coding coefficient after the inverse quantization.

First, the three-dimensional decoding device generates the Morton codes based on the geometry information of three-dimensional points, and sorts the three-dimensional points in the order of the Morton codes. For example, the three-dimensional decoding device may perform the sorting in ascending order of the Morton codes. Note that the sorting order is not limited to the order of the Morton codes, and the other order may be used.

Next, the three-dimensional decoding device restores the attribute information of three-dimensional points that are adjacent to each other in the order of the Morton codes in the layer L, by applying the inverse Haar conversion to the coding coefficient including the low-frequency component of the layer L+1, and the coding coefficient including the high-frequency component of the layer L. For example, the three-dimensional decoding device may use the inverse Haar conversion of a 2×2 matrix. The attribute information of the restored layer L is used as the input value for the lower layer L−1.

The three-dimensional decoding device repeats such layer processing, and ends the processing when all the attribute information of the bottom layer is decoded. Note that, when only one three-dimensional point exists as two three-dimensional points that are adjacent to each other in the layer L−1 at the time of application of the inverse Haar conversion, the three-dimensional decoding device may assign the value of the encoding component of the layer L to the attribute value of the one existing three-dimensional point. Accordingly, the three-dimensional decoding device can correctly decode a bitstream with improved coding efficiency by applying the Haar conversion to all the values of the input attribute information.

When the attribute information is N dimensional, the three-dimensional decoding device may independently apply the inverse Haar conversion for each dimension, and may decode each coding coefficient. For example, when the attribute information is color information (RGB, YUV, or the like), the three-dimensional data decoding device applies the inverse Haar conversion to the coding coefficient for each component, and decodes each attribute value.

The three-dimensional decoding device may apply the inverse Haar conversion in the order of Layers Lmax, L+1, . . . , L. Additionally, w0 and w1 shown in FIG. 31 are the weights assigned to each three-dimensional point. For example, the three-dimensional data decoding device may calculate the weight based on the distance information between two adjacent three-dimensional points to which the inverse Haar conversion is applied, or the like. For example, the three-dimensional data encoding device may decode a bitstream with improved coding efficiency such that the closer the distance, the greater the weight.

In the example shown in FIG. 31, the coding coefficients after the inverse quantization are Ta1, Ta5, Tb1, Tb3, Tc1, and d0, and a0, a1, a2, a3, a4, and a5 are obtained as the decoded values.

FIG. 32 is a diagram showing a syntax example of the attribute information (attribute_data). The attribute information (attribute_data) includes the number of consecutive zeros (ZeroCnt), the number of attribute dimensions (attribute_dimension), and the coding coefficient (value [j] [i]).

The number of consecutive zeros (ZeroCnt) indicates the number of times that the value 0 continues in the coding coefficient after quantization. Note that the three-dimensional data encoding device may arithmetically encode ZeroCnt after binarizing ZeroCnt.

Additionally, as shown in FIG. 32, the three-dimensional data encoding device may determine whether or not the layer L (layerL) to which the coding coefficient belongs is equal to or more than a predefined threshold value TH_layer, and may switch the information added to a bitstream according to the determination result. For example, when the determination result is true, the three-dimensional data encoding device adds all the coding coefficients of the attribute information to a bitstream. In addition, when the determination result is false, the three-dimensional data encoding device may add a part of the coding coefficients to a bitstream.

Specifically, when the determination result is true, the three-dimensional data encoding device adds the encoded result of the three-dimensional information of the color information RGB or YUV to a bitstream. When the determination result is false, the three-dimensional data encoding device may add a part of information such as G or Y of the color information to a bitstream, and need not to add the other components to the bitstream. In this manner, the three-dimensional data encoding device can improve the coding efficiency by not adding a part of the coding coefficients of the layer (the layer smaller than TH_layer) including the coding coefficients indicating the high-frequency component with less visually noticeable degradation to a bitstream.

The number of attribute dimensions (attribute_dimension) indicates the number of dimensions of the attribute information. For example, when the attribute information is the color information (RGB, YUV, or the like) of a three-dimensional point, since the color information is three-dimensional, the number of attribute dimensions is set to a value 3. When the attribute information is the reflectance, since the reflectance is one-dimensional, the number of attribute dimensions is set to a value 1. Note that the number of attribute dimensions may be added to the header of the attribute information of a bit stream or the like.

The coding coefficient (value W [i]) indicates the coding coefficient after quantization of the attribute information of the j-th dimension of the i-th three-dimensional point. For example, when the attribute information is color information, value [99] [1] indicates the coding coefficient of the second dimension (for example, the G value) of the 100th three-dimensional point. Additionally, when the attribute information is reflectance information, value [119] [0] indicates the coding coefficient of the first dimension (for example, the reflectance) of the 120th three-dimensional point.

Note that, when the following conditions are satisfied, the three-dimensional data encoding device may subtract the value 1 from value W [i], and may entropy encode the obtained value. In this case, the three-dimensional data decoding device restores the coding coefficient by adding the value 1 to value W [i] after entropy decoding.

The above-described conditions are (1) when attribute_dimension=1, or (2) when attribute_dimension is 1 or more, and when the values of all the dimensions are equal. For example, when the attribute information is the reflectance, since attribute_dimension=1, the three-dimensional data encoding device subtracts the value 1 from the coding coefficient to calculate value, and encodes the calculated value. The three-dimensional decoding device calculates the coding coefficient by adding the value 1 to the value after decoding.

More specifically, for example, when the coding coefficient of the reflectance is 10, the three-dimensional data encoding device encodes the value 9 obtained by subtracting the value 1 from the value 10 of the coding coefficient. The three-dimensional data decoding device adds the value 1 to the decoded value 9 to calculate the value 10 of the coding coefficient.

Additionally, since attribute_dimension=3 when the attribute information is the color, for example, when the coding coefficient after quantization of each of the components R, G, and B is the same, the three-dimensional data encoding device subtracts the value 1 from each coding coefficient, and encodes the obtained value. The three-dimensional data decoding device adds the value 1 to the value after decoding. More specifically, for example, when the coding coefficient of R, G, and B=(1, 1, 1), the three-dimensional data encoding device encodes (0, 0, 0). The three-dimensional data decoding device adds 1 to each component of (0, 0, 0) to calculate (1, 1, 1). Additionally, when the coding coefficients of R, G, and B=(2, 1, 2), the three-dimensional data encoding device encodes (2, 1, 2) as is. The three-dimensional data decoding device uses the decoded (2, 1, 2) as is as the coding coefficients.

In this manner, by providing ZeroCnt, since the pattern in which all the dimensions are 0 as value is not generated, the value obtained by subtracting 1 from the value indicated by value can be encoded. Therefore, the coding efficiency can be improved.

Additionally, value [0] [i] shown in FIG. 32 indicates the coding coefficient after quantization of the attribute information of the first dimension of the i-th three-dimensional point. As shown in FIG. 32, when the layer L (layerL) to which the coding coefficient belongs is smaller than the threshold value TH_layer, the code amount may be reduced by adding the attribute information of the first dimension to a bitstream (not adding the attribute information of the second and following dimensions to the bitstream).

The three-dimensional data encoding device may switch the calculation method of the value of ZeroCnt depending on the value of attribute_dimension. For example, when attribute_dimension=3, the three-dimensional data encoding device may count the number of times that the values of the coding coefficients of all the components (dimensions) become 0. FIG. 33 is a diagram showing an example of the coding coefficient, ZeroCnt, and values v0 to v2 in this case, where v0 is a value of a first dimensional component, v1 is a value of a second dimensional component, and v2 is a value of a third dimensional component. For example, in the case of the color information shown in FIG. 33, the three-dimensional data encoding device counts the number of the consecutive coding coefficients having 0 for all of the R, G, and B components, and adds the counted number to a bitstream as ZeroCnt. Accordingly, it becomes unnecessary to encode ZeroCnt for each component, and the overhead can be reduced. Therefore, the coding efficiency can be improved. Note that the three-dimensional data encoding device may calculate ZeroCnt for each dimension even when attribute_dimension is two or more, and may add the calculated ZeroCnt to a bitstream.

Figure 34:
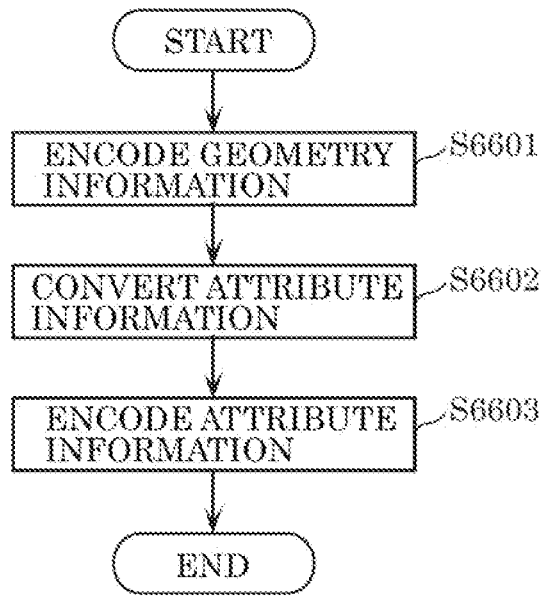
FIG. 34 is a flowchart of the three-dimensional data encoding processing according to Embodiment 7.

FIG. 34 is a flowchart of the three-dimensional data encoding processing according to the present embodiment. First, the three-dimensional data encoding device encodes geometry information (geometry) (S6601). For example, the three-dimensional data encoding device performs encoding by using an octree representation.

Next, the three-dimensional data encoding device converts the attribute information (S6602). For example, after the encoding of the geometry information, when the position of a three-dimensional point is changed due to quantization or the like, the three-dimensional data encoding device reassigns the attribute information of the original three-dimensional point to the three-dimensional point after the change. Note that the three-dimensional data encoding device may interpolate the value of the attribute information according to the amount of change of the position to perform the reassignment. For example, the three-dimensional data encoding device detects N three-dimensional points before the change near the three dimensional position after the change, performs the weighted averaging of the value of the attribute information of the N three-dimensional points based on the distance from the three-dimensional position after the change to each of the N three-dimensional points, and sets the obtained value as the value of the attribute information of the three-dimensional point after the change. Additionally, when two or more three-dimensional points are changed to the same three-dimensional position due to quantization or the like, the three-dimensional data encoding device may assign the average value of the attribute information in the two or more three-dimensional points before the change as the value of the attribute information after the change.

Next, the three-dimensional data encoding device encodes the attribute information (S6603). For example, when encoding a plurality of pieces of attribute information, the three-dimensional data encoding device may encode the plurality of pieces of attribute information in order. For example, when encoding the color and the reflectance as the attribute information, the three-dimensional data encoding device generates a bitstream to which the encoding result of the reflectance is added after the encoding result of the color. Note that a plurality of encoding results of the attribute information added to a bitstream may be in any order.

Additionally, the three-dimensional data encoding device may add the information indicating the start location of the encoded data of each attribute information in a bitstream to a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data encoding device may encode a plurality of pieces of attribute information in parallel, and may integrate the encoding results into one bitstream. Accordingly, the three-dimensional data encoding device can encode a plurality of pieces of attribute information at high speed.

Figure 35:
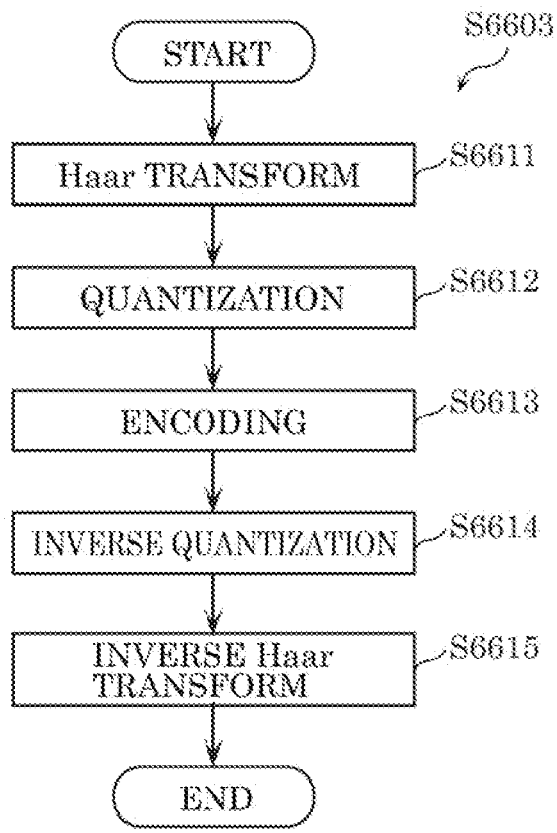
FIG. 35 is a flowchart of the attribute information encoding processing according to Embodiment 7.

FIG. 35 is a flowchart of the attribute information encoding processing (S6603). First, the three-dimensional data encoding device generates a coding coefficient from attribute information by the Haar conversion (S6611). Next, the three-dimensional data encoding device applies quantization to the coding coefficient (S6612). Next, the three-dimensional data encoding device generates encoded attribute information (bitstream) by encoding the coding coefficient after the quantization (S6613).

Additionally, the three-dimensional data encoding device applies inverse quantization to the coding coefficient after the quantization (S6614). Next, the three-dimensional decoding device decodes the attribute information by applying the inverse Haar conversion to the coding coefficient after the inverse quantization (S6615). For example, the decoded attribute information is referred to in the following encoding.

Figure 36:
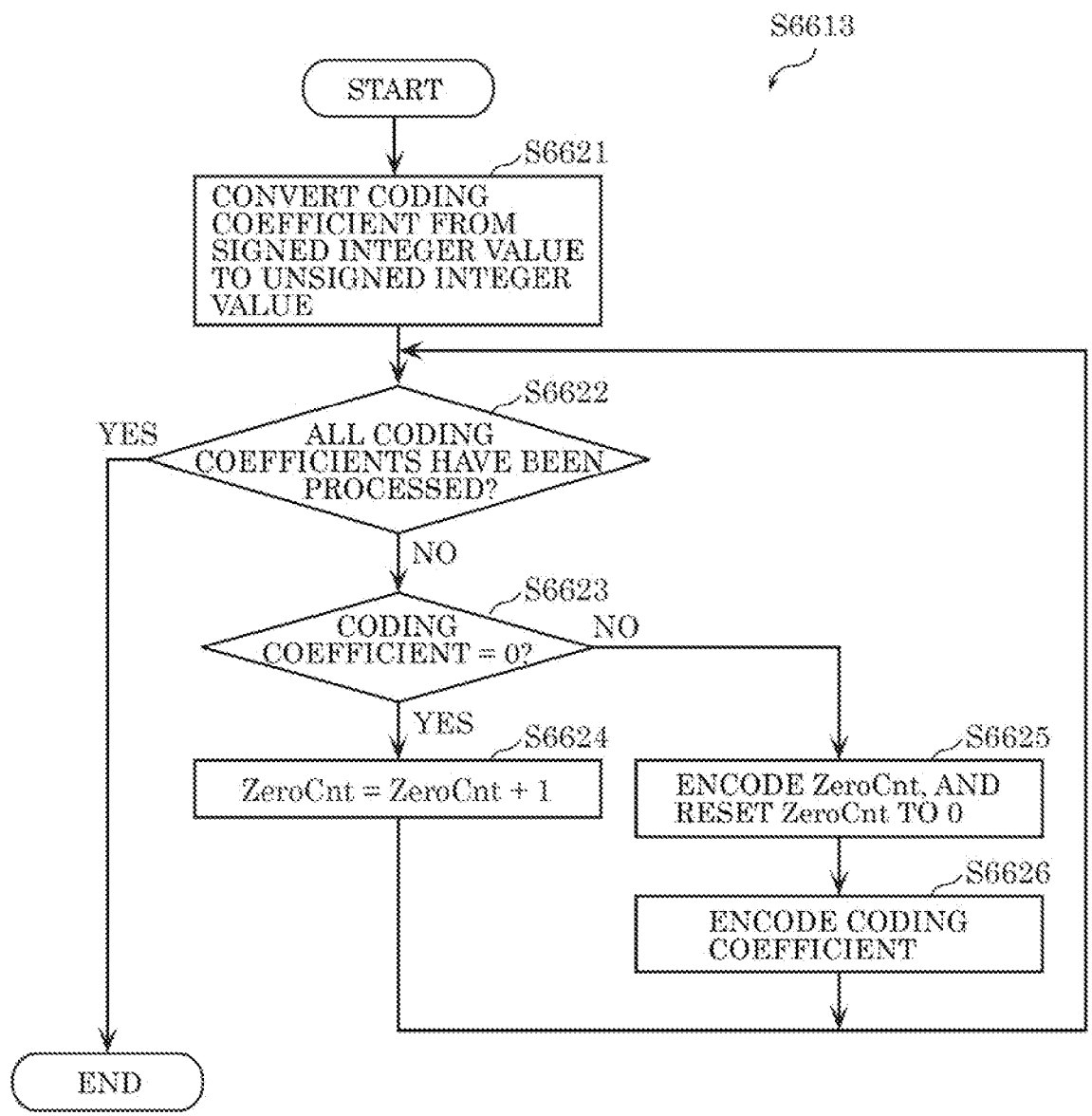
FIG. 36 is a flowchart of the coding coefficient encoding processing according to Embodiment 7.

FIG. 36 is a flowchart of the coding coefficient encoding processing (S6613). First, the three-dimensional data encoding device converts a coding coefficient from a signed integer value to an unsigned integer value (S6621). For example, the three-dimensional data encoding device converts a signed integer value to an unsigned integer value as follows. When signed integer value Ta1q is smaller than 0, the unsigned integer value is set to $-1-(2\times\text{Ta1q})$. When the signed integer value Ta1q is equal to or more than 0, the unsigned integer value is set to $2\times\text{Ta1q}$. Note that, when the coding coefficient does not become a negative value, the three-dimensional data encoding device may encode the coding coefficient as the unsigned integer value as is.

When not all coding coefficients have been processed (No in S6622), the three-dimensional data encoding device determines whether the value of the coding coefficient to be processed is zero (S6623). When the value of the coding coefficient to be processed is zero (Yes in S6623), the three-dimensional data encoding device increments ZeroCnt by 1 (S6624), and returns to step S6622.

When the value of the coding coefficient to be processed is not zero (No in S6623), the three-dimensional data encoding device encodes ZeroCnt, and resets ZeroCnt to zero (S6625). Additionally, the three-dimensional data encoding device arithmetically encodes the coding coefficient to be processed (S6626), and returns to step S6622. For example, the three-dimensional data encoding device performs binary arithmetic encoding. In addition, the three-dimensional data encoding device may subtract the value 1 from the coding coefficient, and may encode the obtained value.

Additionally, the processing of steps S6623 to S6626 is repeatedly performed for each coding coefficient. In addition, when all the coding coefficients have been processed (Yes in S6622), the three-dimensional data encoding device ends the processing.

Figure 37:
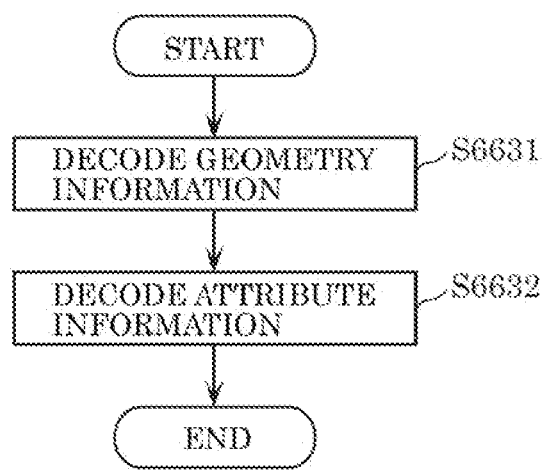
FIG. 37 is a flowchart of the three-dimensional data decoding processing according to Embodiment 7.

FIG. 37 is a flowchart of the three-dimensional data decoding processing according to the present embodiment. First, the three-dimensional decoding device decodes geometry information (geometry) from a bitstream (S6631). For example, the three-dimensional data decoding device performs decoding by using an octree representation.

Next, the three-dimensional decoding device decodes the attribute information from the bitstream (S6632). For example, when decoding a plurality of pieces of attribute information, the three-dimensional decoding device may decode the plurality of pieces of attribute information in order. For example, when decoding the color and the reflectance as the attribute information, the three-dimensional data decoding device decodes the encoding result of the color and the encoding result of the reflectance according to the order in which they are added to the bitstream. For example, when the encoding result of the reflectance is added after the encoding result of the color in a bitstream, the three-dimensional data decoding device decodes the encoding result of the color, and thereafter decodes the encoding result of the reflectance. Note that the three-dimensional data decoding device may decode the encoding results of the attribute information added to a bitstream in any order.

Additionally, the three-dimensional decoding device may obtain the information indicating the start location of the encoded data of each attribute information in a bitstream by decoding a header or the like. Accordingly, since the three-dimensional data decoding device can selectively decode the attribute information that needs to be decoded, the decoding processing of the attribute information that does not need to be decoded can be omitted. Therefore, the processing amount of the three-dimensional decoding device can be reduced. Additionally, the three-dimensional data decoding device may decode a plurality of pieces of attribute information in parallel, and may integrate the decoding results into one three-dimensional point cloud. Accordingly, the three-dimensional data decoding device can decode a plurality of pieces of attribute information at high speed.

Figure 38:
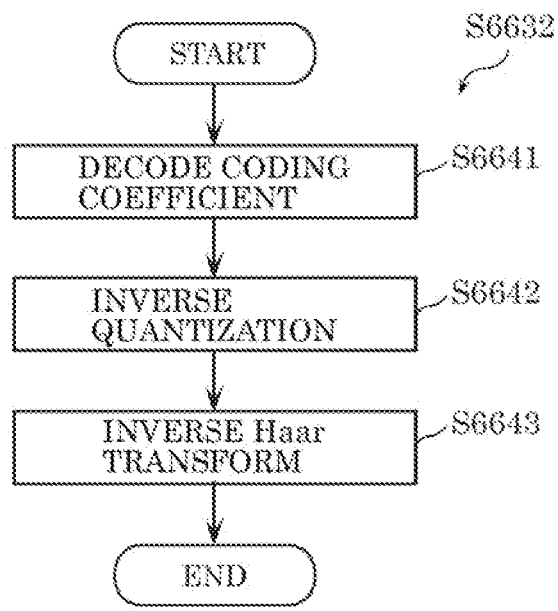
FIG. 38 is a flowchart of the attribute information decoding processing according to Embodiment 7.

FIG. 38 is a flowchart of the attribute information decoding processing (S6632). First, the three-dimensional decoding device decodes a coding coefficient from a bitstream (S6641). Next, the three-dimensional decoding device applies the inverse quantization to the coding coefficient (S6642). Next, the three-dimensional decoding device decodes the attribute information by applying the inverse Haar conversion to the coding coefficient after the inverse quantization (S6643).

Figure 39:
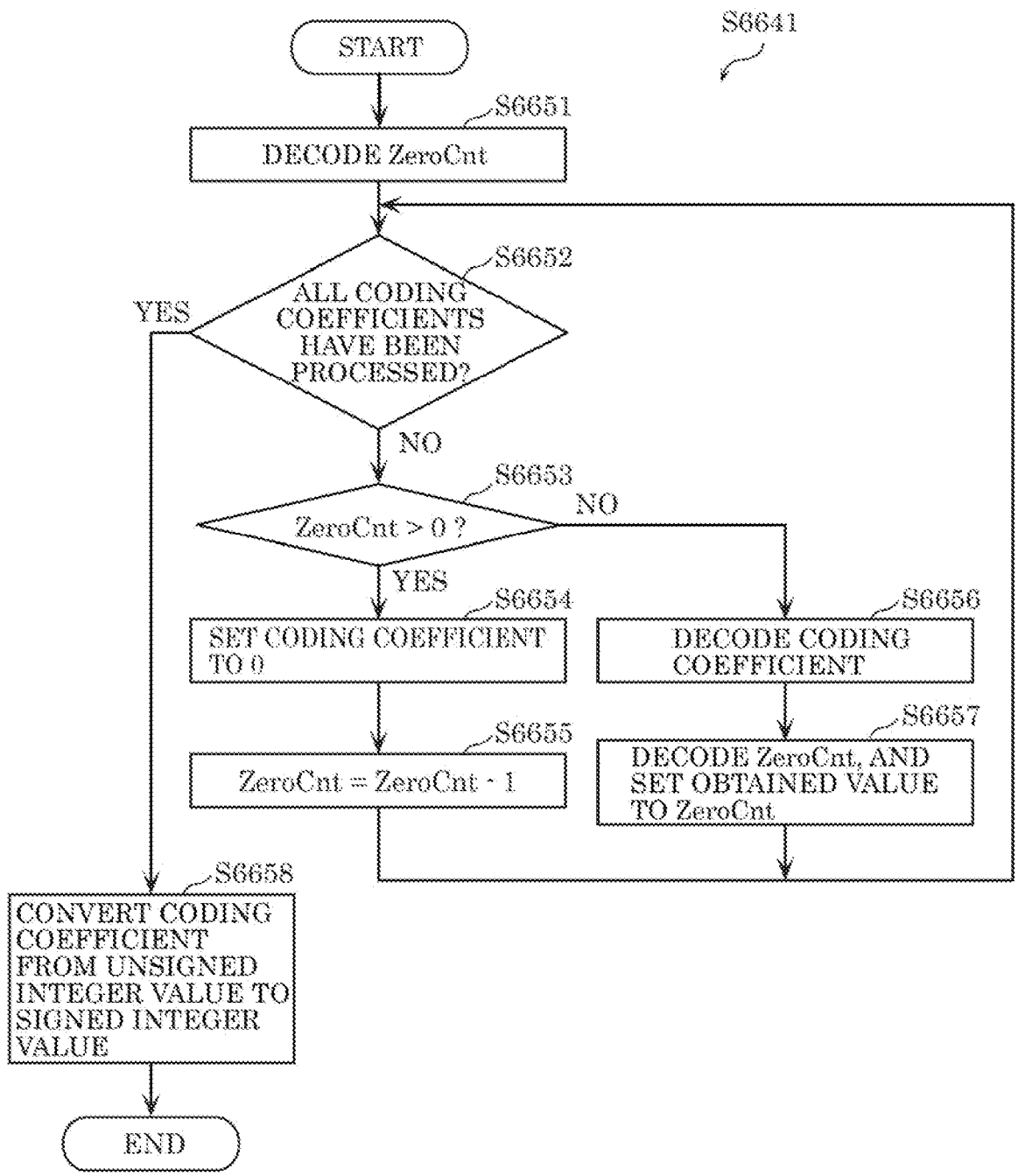
FIG. 39 is a flowchart the coding coefficient decoding processing according to Embodiment 7.

FIG. 39 is a flowchart of the coding coefficient decoding processing (S6641). First, the three-dimensional decoding device decodes ZeroCnt from a bitstream (S6651). When not all coding coefficients have been processed (No in S6652), the three-dimensional decoding device determines whether ZeroCnt is larger than 0 (S6653).

When ZeroCnt is larger than zero (Yes in S6653), the three-dimensional decoding device sets the coding coefficient to be processed to 0 (S6654). Next, the three-dimensional decoding device subtracts 1 from ZeroCnt (S6655), and returns to step S6652.

When ZeroCnt is zero (No in S6653), the three-dimensional decoding device decodes the coding coefficient to be processed (S6656). For example, the three-dimensional decoding device uses binary arithmetic decoding. Additionally, the three-dimensional decoding device may add the value 1 to the decoded coding coefficient.

Next, the three-dimensional decoding device decodes ZeroCnt, sets the obtained value to ZeroCnt (S6657), and returns to step S6652.

Additionally, the processing of steps S6653 to S6657 is repeatedly performed for each coding coefficient. In addition, when all the coding coefficients have been processed (Yes in S6652), the three-dimensional data encoding device converts a plurality of decoded coding coefficients from unsigned integer values to signed integer values (S6658). For example, the three-dimensional data decoding device may convert the decoded coding coefficients from unsigned integer values to signed integer values as follows. When the LSB (least significant bit) of the decoded unsigned integer value Ta1u is 1, the signed integer value Ta1q is set to $-((Ta1u+1)>>1)$. When the LSB of the decoded unsigned integer value Ta1u is not 1 (when it is 0), the signed integer value Ta1q is set to $(Ta1u>>1)$. Note that, when the coding coefficient does not become a negative value, the three-dimensional data decoding device may use the decoded coding coefficient as is as the signed integer value.

Figure 40:
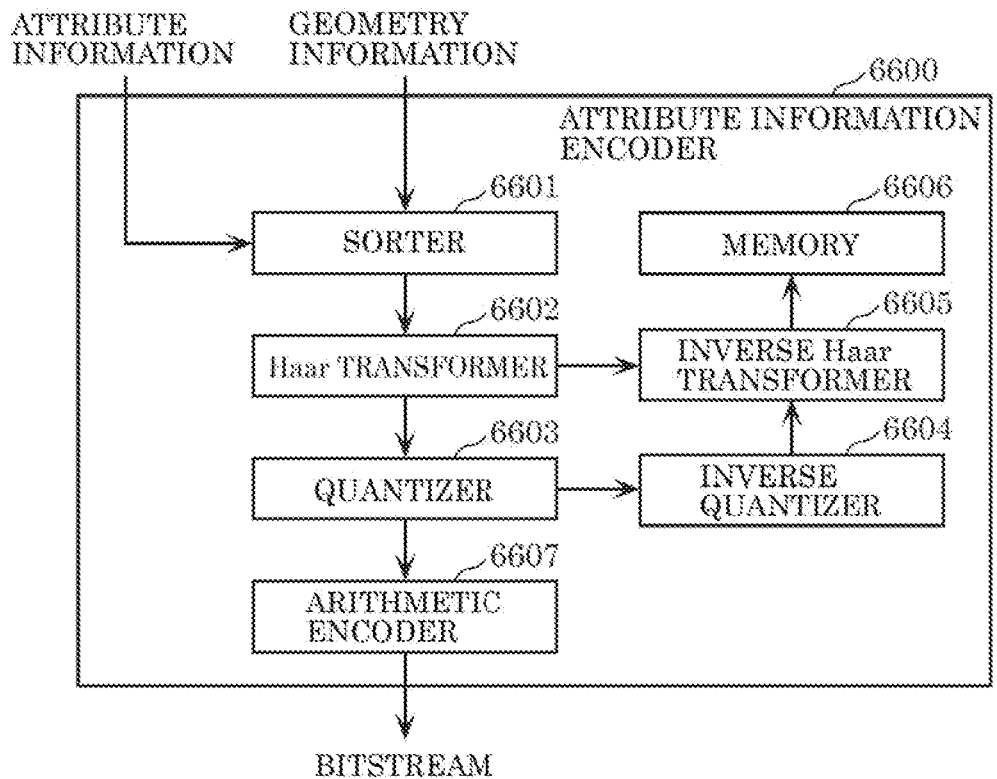
FIG. 40 is a block diagram of an attribute information encoder according to Embodiment 7.

FIG. 40 is a block diagram of attribute information encoder 6600 included in the three-dimensional data encoding device. Attribute information encoder 6600 includes sorter 6601, Haar transformer 6602, quantizer 6603, inverse quantizer 6604, inverse Haar converter 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar conversion to the attribute information. Quantizer 6603 quantizes the coding coefficient of the attribute information.

Inverse quantizer 6604 inverse quantizes the coding coefficient after the quantization. Inverse Haar converter 6605 applies the inverse Haar conversion to the coding coefficient. Memory 6606 stores the values of pieces of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 41:
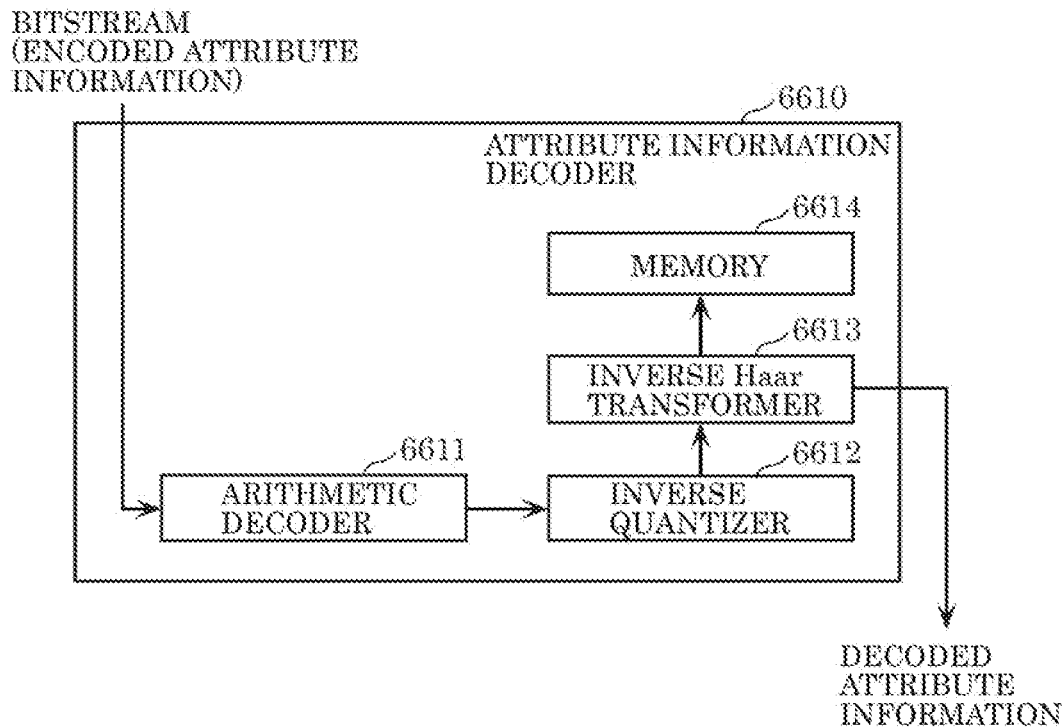
FIG. 41 is a block diagram of an attribute information decoder according to Embodiment 7.

FIG. 41 is a block diagram of attribute information decoder 6610 included in the three-dimensional decoding device. Attribute information decoder 6610 includes arithmetic decoder 6611, inverse quantizer 6612, inverse Haar converter 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar converter 6613 applies the inverse Haar conversion to the coding coefficient after the inverse quantization. Memory 6614 stores the values of pieces of attribute information of a plurality of decoded three-dimensional points. For example, the attribute information of the decoded three-dimensional points stored in memory 6614 may be utilized for prediction of an undecoded three-dimensional point.

Note that, in the above-described embodiment, although the example has been shown in which the three-dimensional points are encoded in the order of the lower layers to the higher layers as the encoding order, it is not necessarily limit to this. For example, a method may be used that scans the coding coefficients after the Haar conversion in the order of the higher layers to the lower layers. Note that, also in this case, the three-dimensional data encoding device may encode the number of consecutive times of the value 0 as ZeroCnt.

Additionally, the three-dimensional data encoding device may switch whether or not to use the encoding method using ZeroCnt described in the present embodiment per WLD, SPC, or volume. In this case, the three-dimensional data encoding device may add the information indicating whether or not the encoding method using ZeroCnt has been applied to the header information. Accordingly, the three-dimensional decoding device can appropriately perform decoding. As an example of the switching method, for example, the three-dimensional data encoding device counts the number of times of occurrence of the coding coefficient having a value of 0 with respect to one volume. When the count value exceeds a predefined threshold value, the three-dimensional data encoding device applies the method using ZeroCnt to the next volume, and when the count value is equal to or less than the threshold value, the three-dimensional data encoding device does not apply the method using ZeroCnt to the next volume. Accordingly, since the three-dimensional data encoding device can appropriately switch whether or not to apply the encoding method using ZeroCnt according to the characteristic of a current three-dimensional point to be encoded, the coding efficiency can be improved.

Hereinafter, another technique (modification) of the present embodiment will be described. The three-dimensional data encoding device scans and encodes the coding coefficients (unsigned integer values) after the quantization according to a certain order. For example, the three-dimensional data encoding device encodes a plurality of three-dimensional points from the three-dimensional points included in the lower layers toward the higher layers in order.

Figure 42:
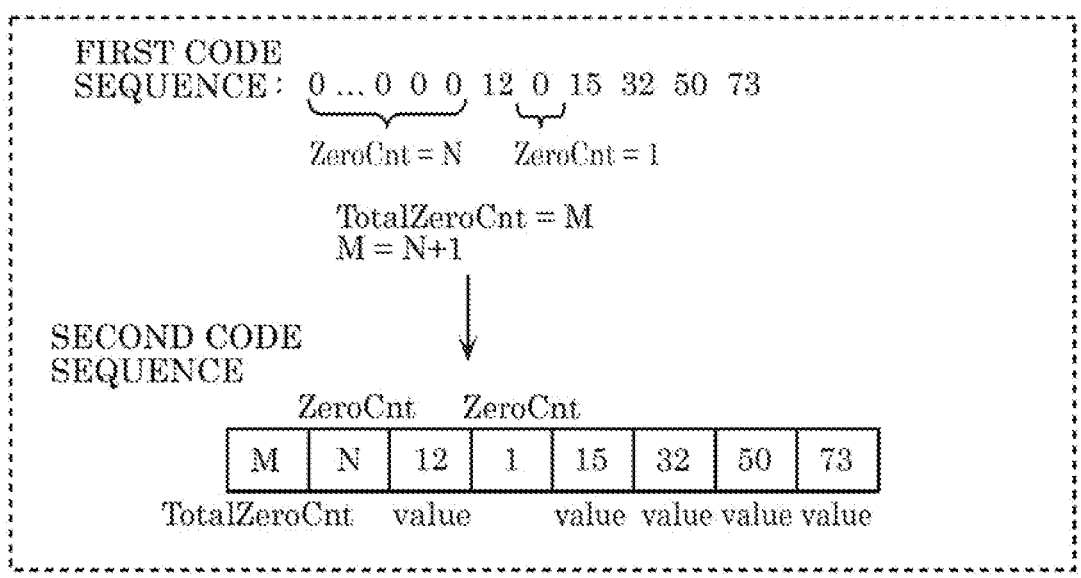
FIG. 42 is a diagram showing an example of a first code sequence and a second code sequence according to a modification of Embodiment 7.

FIG. 42 is a diagram showing an example of the first code sequence and the second code sequence in the case where this technique is used for the attribute information shown in FIG. 27. In the case of this example, the three-dimensional data encoding device encodes a plurality of coding coefficients in the order of Ta5, Tb1, Tb3, Tc1, and do from Ta1 included in the lower layer L. Here, there is a tendency that the lower the layer, the more likely it is that the coding coefficient after quantization becomes 0. This can be due to the following and the like.

Since the coding coefficients of the lower layers L show a higher frequency component than the higher layers, the coding coefficients tend to be 0 depending on the current three-dimensional point to be encoded. Additionally, by switching the quantization scale according to the above-described importance or the like. The lower the layer, the larger the quantization scale, and the coding coefficient after the quantization easily become 0.

In this manner, the lower the layer, the more likely it is that the coding coefficient after the quantization becomes 0, and the value 0 is likely to be consecutively generated for the first code sequence. The three-dimensional data encoding device counts the number of times that the value 0 occurs in the first code sequence, and encodes the number of times (ZeroCnt) that the value 0 consecutively occurs, instead of the consecutive values 0. Accordingly, when there are consecutive values 0 of the coding coefficients after the quantization, the coding efficiency can be improved by encoding the number of consecutive times of 0, rather than encoding a lot of 0s.

Additionally, the three-dimensional data encoding device may encode the information indicating the total number of times of occurrence of the value 0. Accordingly, the overhead of encoding ZeroCnt can be reduced, and the coding efficiency can be improved.

For example, the three-dimensional data encoding device encodes the total number of the coding coefficients having a value of 0 as TotalZeroCnt. Accordingly, in the example shown in FIG. 42, at the time when the three-dimensional data decoding device decodes the second ZeroCnt (value 1) included in the second code sequence, the total number of decoded ZeroCnts will be N+1 (=TotalZeroCnt). Therefore, the three-dimensional data decoding device can identify that 0 does not occur after this. Therefore, subsequently, it becomes unnecessary for the three-dimensional data encoding device to encode ZeroCnt for each value, and the code amount can be reduced.

Additionally, the three-dimensional data encoding device may entropy encode TotalZeroCnt. For example, the three-dimensional data encoding device binarizes the value of TotalZeroCnt with the truncated unary code of the total number T of the encoded three-dimensional points, and arithmetically encodes each bit after binarization. At this time, the three-dimensional data encoding device may improve the coding efficiency by using a different coding table for each bit. For example, the three-dimensional data encoding device uses coding table 1 for the first bit, uses coding table 2 for the second bit, and coding table 3 for the subsequent bits. In this manner, the three-dimensional data encoding device can improve the coding efficiency by switching the coding table for each bit.

Additionally, the three-dimensional data encoding device may arithmetically encode TotalZeroCnt after binarizing TotalZeroCnt with an Exponential-Golomb. Accordingly, when the value of TotalZeroCnt easily becomes large, the efficiency can be more improved than the binarized arithmetic encoding with the truncated unary code. Note that the three-dimensional data encoding device may add a flag for switching between using the truncated unary code and using the Exponential-Golomb to a header. Accordingly, the three-dimensional data encoding device can improve the coding efficiency by selecting the optimum binarization method. Additionally, the three-dimensional data decoding device can correctly decode a bitstream by referring to the flag included in the header to switch the binarization method.

FIG. 43 is a diagram showing a syntax example of the attribute information (attribute_data) in the present modification. The attribute information (attribute_data) shown in FIG. 43 further includes the total number of zeros (TotalZeroCnt) in addition to the attribute information shown in FIG. 32. Note that the other information is the same as that in FIG. 32. The total number of zeros (TotalZeroCnt) indicates the total number of the coding coefficients having a value of 0 after quantization.

Additionally, the three-dimensional data encoding device may switch the calculation method of the values of TotalZeroCnt and ZeroCnt depending on the value of attribute_dimension. For example, when attribute_dimension=3, the three-dimensional data encoding device may count the number of times that the values of the coding coefficients of all the components (dimensions) become 0. FIG. 44 is a diagram showing an example of the coding coefficient, ZeroCnt, and TotalZeroCnt in this case. For example, in the case of the color information shown in FIG. 44, the three-dimensional data encoding device counts the number of the consecutive coding coefficients having 0 for all of the R, G, and B components, and adds the counted number to a bitstream as TotalZeroCnt and ZeroCnt. Accordingly, it becomes unnecessary to encode Total ZeroCnt and ZeroCnt for each component, and the overhead can be reduced. Therefore, the coding efficiency can be improved. Note that the three-dimensional data encoding device may calculate TotalZeroCnt and ZeroCnt for each dimension even when attribute_dimension is two or more, and may add the calculated TotalZeroCnt and ZeroCnt to a bitstream.

Figure 45:
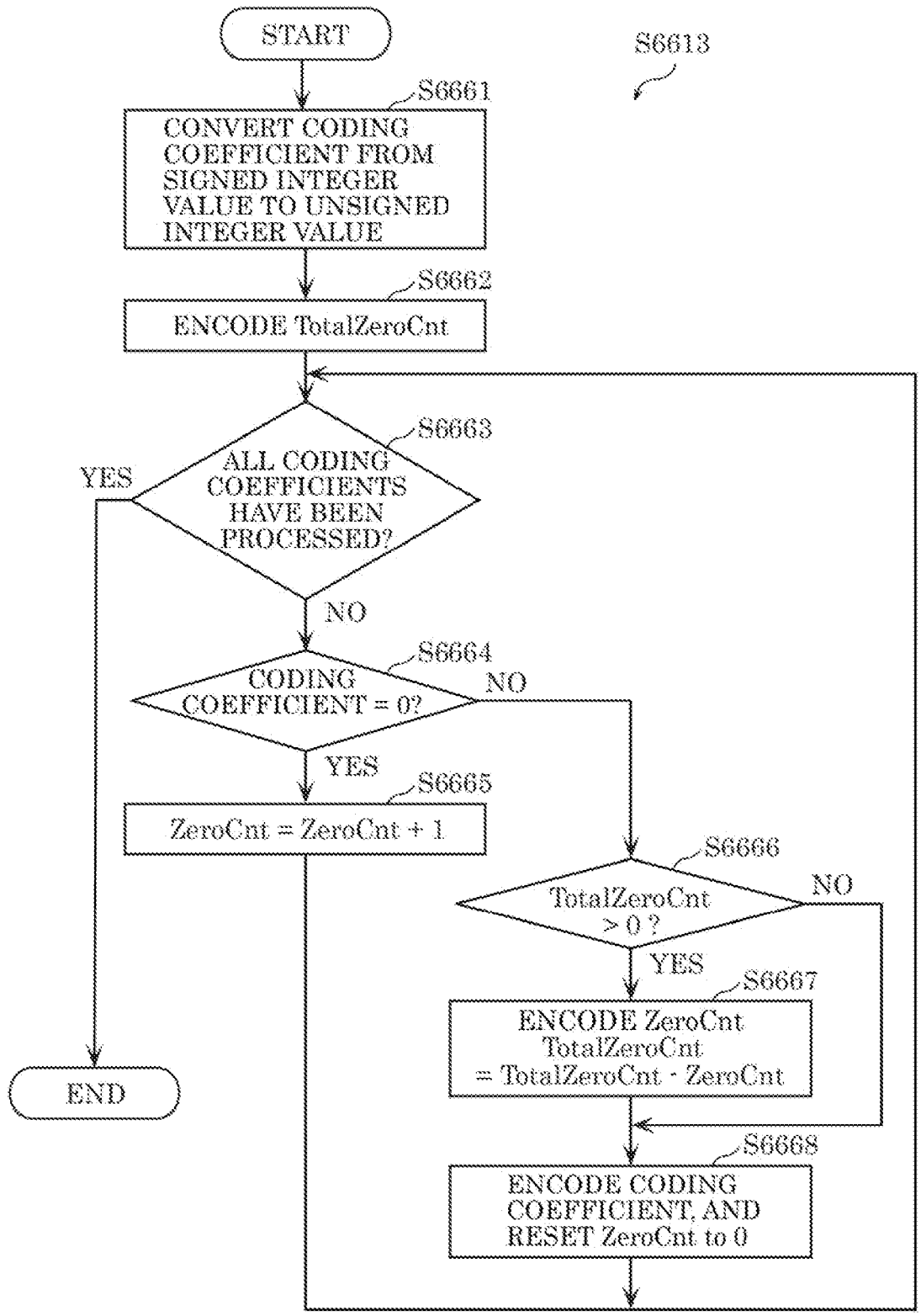
FIG. 45 is a flowchart of the coding coefficient encoding processing according to the modification of Embodiment 7.

FIG. 45 is a flowchart of the coding coefficient encoding processing (S6613) in the present modification. First, the three-dimensional data encoding device converts the coding coefficient from a signed integer value to an unsigned integer value (S6661). Next, the three-dimensional data encoding device encodes TotalZeroCnt (S6662).

When not all coding coefficients have been processed (No in S6663), the three-dimensional data encoding device determines whether the value of the coding coefficient to be processed is zero (S6664). When the value of the coding coefficient to be processed is zero (Yes in S6664), the three-dimensional data encoding device increments ZeroCnt by 1 (S6665), and returns to step S6663.

When the value of the coding coefficient to be processed is not zero (No in S6664), the three-dimensional data encoding device determines whether TotalZeroCnt is larger than 0 (S6666). When TotalZeroCnt is larger than 0 (Yes in S6666), the three-dimensional data encoding device encodes ZeroCnt, and sets TotalZeroCnt to TotalZeroCnt−ZeroCnt (S6667).

After step S6667, or when TotalZeroCnt is 0 (No in S6666), the three-dimensional data encoding device encodes the coding coefficient, resets ZeroCnt to 0 (S6668), and returns to step S6663. For example, the three-dimensional data encoding device performs binary arithmetic encoding. Additionally, the three-dimensional data encoding device may subtract the value 1 from the coding coefficient, and encode the obtained value.

Additionally, the processing of steps S6664 to S6668 is repeatedly performed for each coding coefficient. In addition, when all the coding coefficients have been processed (Yes in S6663), the three-dimensional data encoding device ends processing.

Figure 46:
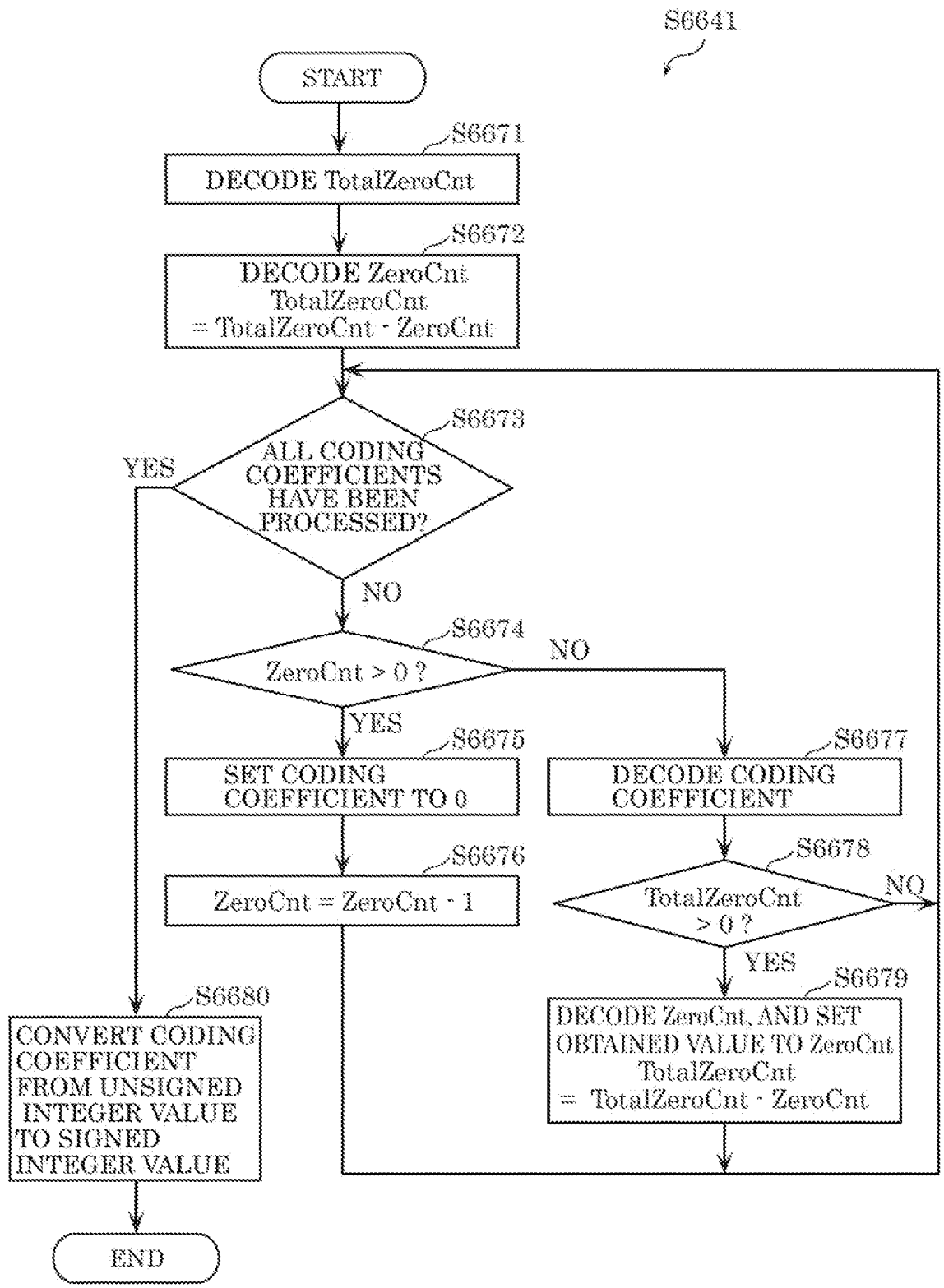
FIG. 46 is a flowchart of the coding coefficient decoding processing according to the modification of Embodiment 7.

FIG. 46 is a flowchart of the coding coefficient decoding processing (S6641) in the present modification. First, the three-dimensional decoding device decodes TotalZeroCnt from a bitstream (S6671). Next, the three-dimensional decoding device decodes ZeroCnt from the bitstream, and sets TotalZeroCnt to TotalZeroCnt−ZeroCnt (S6672).

When not all coding coefficients have been processed (No in S6673), the three-dimensional data encoding device determines whether ZeroCnt is larger than 0 (S6674).

When ZeroCnt is larger than zero (Yes in S6674), the three-dimensional data decoding device sets the coding coefficient to be processed to 0 (S6675). Next, the three-dimensional data decoding device subtracts 1 from ZeroCnt (S6676), and returns to step S6673.

When ZeroCnt is zero (No in S6674), the three-dimensional data decoding device decodes the coding coefficient to be processed (S6677). For example, the three-dimensional data decoding device uses binary arithmetic decoding. Additionally, the three-dimensional data decoding device may add the value 1 to the decoded coding coefficient.

Next, the three-dimensional data decoding device determines whether TotalZeroCnt is larger than 0 (S6678). When TotalZeroCnt is larger than 0 (Yes in S6678), the three-dimensional data decoding device decodes ZeroCnt, sets the obtained value to ZeroCnt, sets TotalZeroCnt to TotalZeroCnt−ZeroCnt (S6679), and returns to step S6673. Additionally, when TotalZeroCnt is 0 (No in S6678), the three-dimensional decoding device returns to step S6673.

Additionally, the processing of steps S6674 to S6679 is repeatedly performed for each coding coefficient. In addition, when all the coding coefficients have been processed (Yes in S6673), the three-dimensional data encoding device converts the decoded coding coefficient from an unsigned integer value to a signed integer value (S6680).

FIG. 47 is a diagram showing another syntax example of the attribute information (attribute_data). The attribute information (attribute_data) shown in FIG. 47 includes value [j] [i]_greater_zero_flag, value [j] [i]_greater_one_flag, and value [j] [i], instead of the coding coefficient (value [j] [i]) shown in FIG. 32. Note that the other information is the same as that in FIG. 32.

Value [j] [i]_greater_zero_flag indicates whether or not the value of the coding coefficient (value [j] [i]) is larger than 0. In other words, value [j] [i]_greater_zero_flag indicates whether or not the value of the coding coefficient (value [j] [i]) is 0.

For example, when the value of the coding coefficient is larger than 0, value [j] [i]_greater_zero_flag is set to the value 1, and when the value of the coding coefficient is 0, value [j] [i]_greater_zero_flag is set to the value 0. When the value of value [j] [i]_greater_zero_flag is 0, the three-dimensional data encoding device need not add value [j] [i] to a bitstream. In this case, the three-dimensional decoding device may determine that the value of value [j] [i] is the value 0. Accordingly, the code amount can be reduced.

Value [j] [i]_greater_one_flag indicates whether or not the value of the coding coefficient (value [j] [i]) is larger than 1 (is equal to or larger than 2). In other words, value [j] [i]_greater_one_flag indicates whether or not the value of the coding coefficient (value [j] RD is 1.

For example, when the value of the coding coefficient is larger than 1, value [j] [i]_greater_one_flag is set to the value 1. Otherwise (when the value of the coding coefficient is equal to or less than 1), value [j] [i]_greater_one_flag is set to the value 0. When the value of value [j] [i]_greater_one_flag is 0, the three-dimensional data encoding device need not add value [j] [i] to a bitstream. In this case, the three-dimensional decoding device may determine that the value of value [j] [i] is the value 1.

Value [j] [i] indicates the coding coefficient after quantization of the attribute information of the j-th dimension of the i-th three-dimensional point. For example, when the attribute information is color information, value [99] [1] indicates the coding coefficient of the second dimension (for example, the G value) of the 100th three-dimensional point. Additionally, when the attribute information is reflectance information, value [119] [0] indicates the coding coefficient of the first dimension (for example, the reflectance) of the 120th three-dimensional point.

When value [j] [i]_greater_zero_flag=1, and value [j] [i]_greater_one_flag=1, the three-dimensional data encoding device may add value [j] [i] to a bitstream. Additionally, the three-dimensional data encoding device may add the value obtained by subtracting 2 from value [j] [i] to the bitstream. In this case, the three-dimensional decoding device calculates the coding coefficient by adding the value 2 to the decoded value [j] [i].

The three-dimensional data encoding device may entropy encode value [j] [i]_greater_zero_flag and value [j] [i]_greater_one_flag. For example, binary arithmetic encoding and binary arithmetic decoding may be used. Accordingly, the coding efficiency can be improved.

Embodiment 8

To achieve high compression, attribute information included in Point Cloud Compression (PCC) data is transformed in a plurality of methods, such as Lifting, Region Adaptive Hierarchical Transform (RAHT) and other transformation methods. Here, Lifting is one of transformation methods using Level of Detail (LoD).

Important signal information tends to be included in a low frequency component, and therefore the code amount is reduced by quantizing a high frequency component. That is, the transformation process has strong energy compression characteristics. In addition, the precision is reduced by the quantization according to the magnitude of the quantization parameter.

Figure 48:
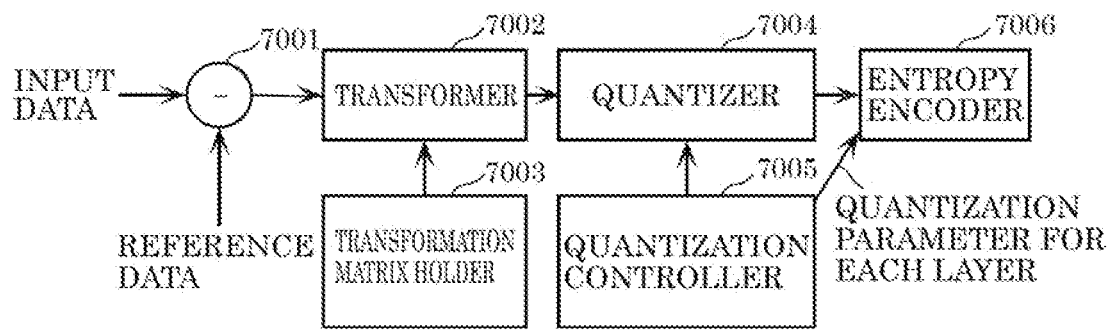
FIG. 48 is a block diagram showing a configuration of a three-dimensional data encoding device according to Embodiment 8.

FIG. 48 is a block diagram showing a configuration of a three-dimensional data encoding device according to this embodiment. The three-dimensional data encoding device includes subtractor 7001, transformer 7002, transformation matrix holder 7003, quantizer 7004, quantization controller 7005, and entropy encoder 7006.

Subtractor 7001 calculates a coefficient value that is the difference between input data and reference data. For example, the input data is attribute information included in point cloud data, and the reference data is a predicted value of the attribute information.

Transformer 7002 performs a transformation process on the coefficient value. For example, the transformation process is a process of classifying a plurality of pieces of attribute information into LoDs. Note that the transformation process may be Haar transformation or the like. Transformation matrix holder 7003 holds a transformation matrix used for the transformation process by transformer 7002. For example, the transformation matrix is a Haar transformation matrix. Note that although an example is shown here in which the three-dimensional data encoding device has both a function of performing a transformation process using LoDs and a function of performing a transformation process such as Haar transformation, the three-dimensional data encoding device may have only any one of the functions. Alternatively, the three-dimensional data encoding device may selectively use any of these two kinds of transformation processes. Alternatively, the three-dimensional data encoding device may change the transformation process to be used for each predetermined processing unit.

Quantizer 7004 quantizes the coefficient value to generate a quantized value. Quantization controller 7005 controls a quantization parameter used for the quantization by quantizer 7004. For example, quantization controller 7005 may change the quantization parameter (or quantization step) according to the hierarchical structure for the encoding. In this way, an appropriate quantization parameter can be selected for each layer of the hierarchical structure, so that the amount of codes occurring in each layer can be controlled. Quantization controller 7005 also sets quantization parameters for a certain layer and the layers lower than the certain layer that include a frequency component that has a small effect on the subjective image quality at a maximum value, and sets quantization coefficients for the certain layer and the layers lower than the certain layer at 0, for example. In this way, the occurring code amount can be reduced while reducing the deterioration of the subjective image quality. Quantization controller 7005 can also finely control the subjective image quality and the occurring code amount. The "layer" herein refers to a layer (at a depth in a tree structure) in LoD or RAHT (Haar transformation).

Entropy encoder 7006 entropy-encodes (arithmetically encodes, for example) the quantization coefficient to generate a bitstream. Entropy encoder 7006 also encodes the quantization parameter for each layer set by quantization controller 7005.

Figure 49:
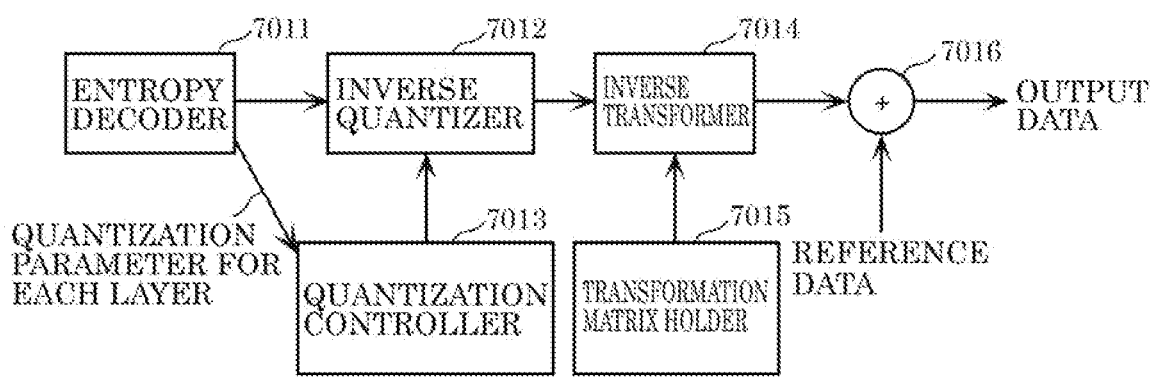
FIG. 49 is a block diagram showing a configuration of a three-dimensional data decoding device according to Embodiment 8.

FIG. 49 is a block diagram showing a configuration of a three-dimensional data decoding device according to this embodiment. The three-dimensional data decoding device includes entropy decoder 7011, inverse quantizer 7012, quantization controller 7013, inverse transformer 7014, transformation matrix holder 7015, and adder 7016.

Entropy decoder 7011 decodes the quantization coefficient and the quantization parameter for each layer from the bitstream. Inverse quantizer 7012 inverse-quantizes the quantization coefficient to generate the coefficient value. Quantization controller 7013 controls the quantization parameter used for the inverse quantization by inverse quantizer 7012 based on the quantization parameter for each layer obtained in entropy decoder 7011.

Inverse transformer 7014 inverse-transforms the coefficient value. For example, inverse transformer 7014 performs inverse Haar transformation on the coefficient value. Transformation matrix holder 7015 holds a transformation matrix used for the inverse transformation process by inverse transformer 7014. For example, the transformation matrix is inverse Haar transformation matrix.

Adder 7016 adds the reference data to the coefficient value to generate output data. For example, the output data is attribute information included in point cloud data, and the reference data is a predicted value of the attribute information.

Next, the setting of a quantization parameter for each layer will be described. In the encoding of attribute information, such as Predicting/Lifting, a different quantization parameter is used for each LoD layer. For example, quantization parameters for lower layers are set to be smaller to increase the precision for the lower layers. In this way, the prediction precision for higher layers can be improved. Quantization parameters for higher layers can be set to be greater, thereby reducing the data amount. In this way, a quantization tree value (Qt) can be separately set for each LoD, according to the use plan of the user. Here, the quantization tree value is the quantization parameter, for example.

Figure 50:
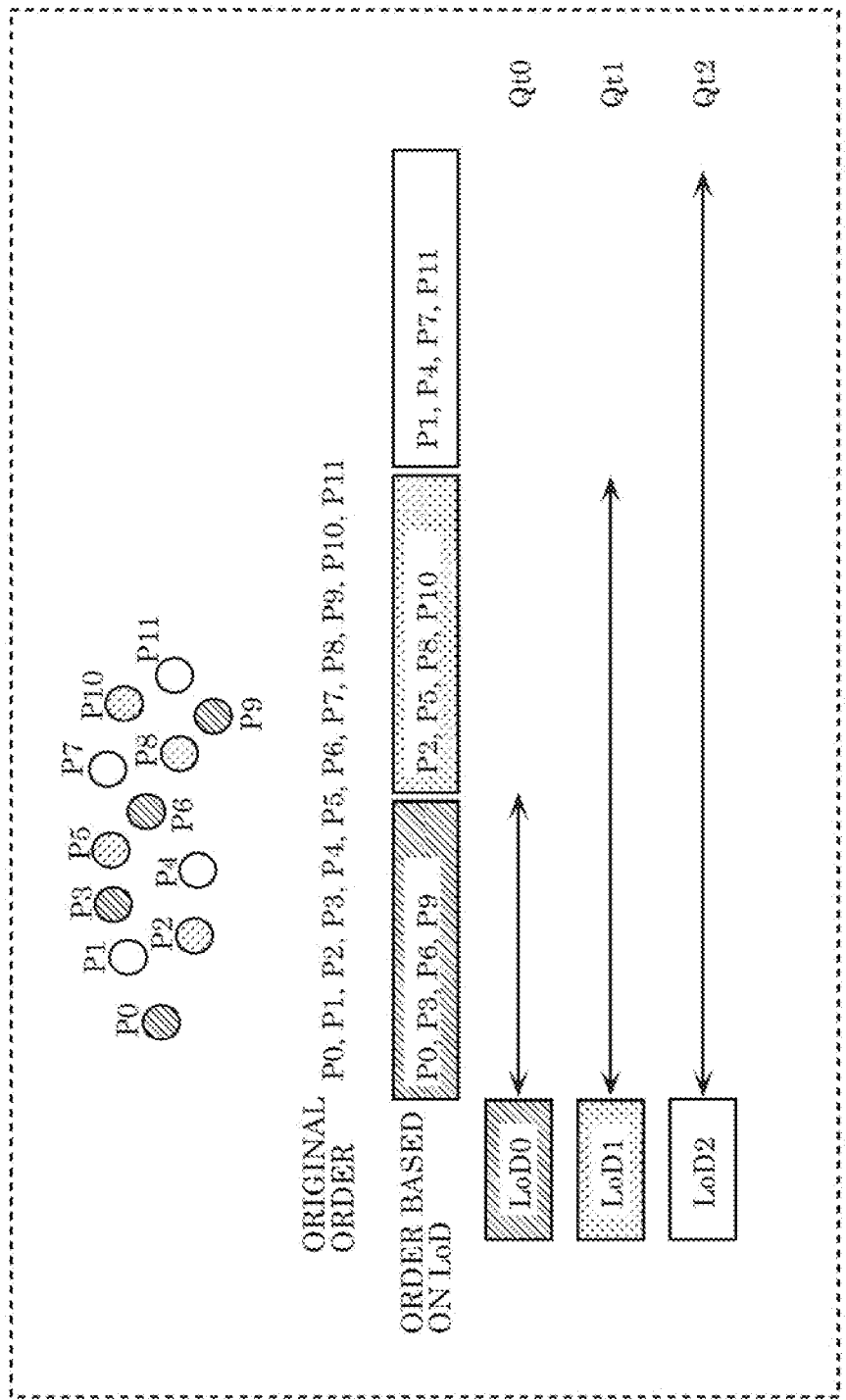
FIG. 50 is a diagram showing an example of the setting of LoDs according to Embodiment 8.

FIG. 50 is a diagram showing an example of the setting of LoDs. As shown in FIG. 50, for example, when points P0 to P11 are present, independent Qt0 to Qt2 are set for LoD0 to LoD2.

In the encoding of the attribute information using RAHT, different quantization parameters are used according to the depth in the tree structure. For example, quantization parameters for lower layers are set to be smaller to increase the precision for the lower layers. In this way, the prediction precision for higher layers can be improved. Quantization parameters for higher layers can be set to be greater, thereby reducing the data amount. In this way, a quantization tree value (Qt) can be separately set for each depth in the tree structure, according to the use plan of the user.

Figure 51:
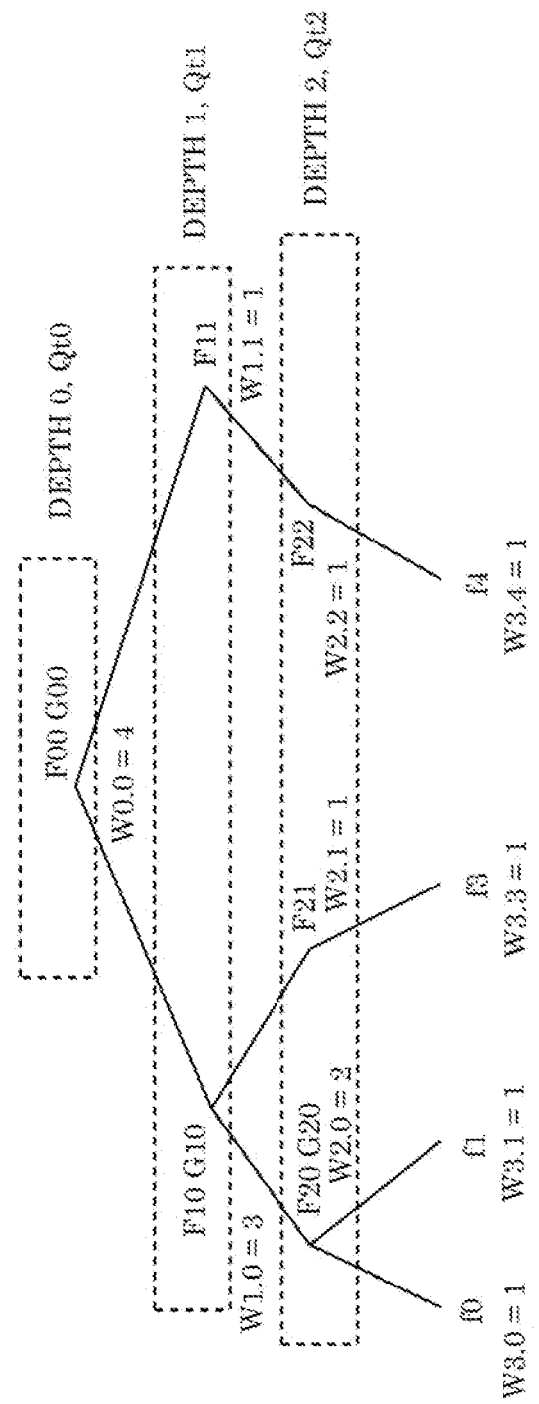
FIG. 51 is a diagram showing an example of a hierarchical structure of RAHT according to Embodiment 8.

FIG. 51 is a diagram showing an example of a hierarchical structure (tree structure) of RAHT. As shown in FIG. 51, for example, independent Qt0 to Qt2 are set for depths in the tree structure, where f0 to f4, F00, G00, F10, G10, F11, F20, G20, F21, and F22 are each a coefficient, and W0.0, W1.0, W1.1, W2.0, W2.1, W2.2, W3.0, W3.1, W3.2, W3.3, and W3.4 are each a weight.

Figure 52:
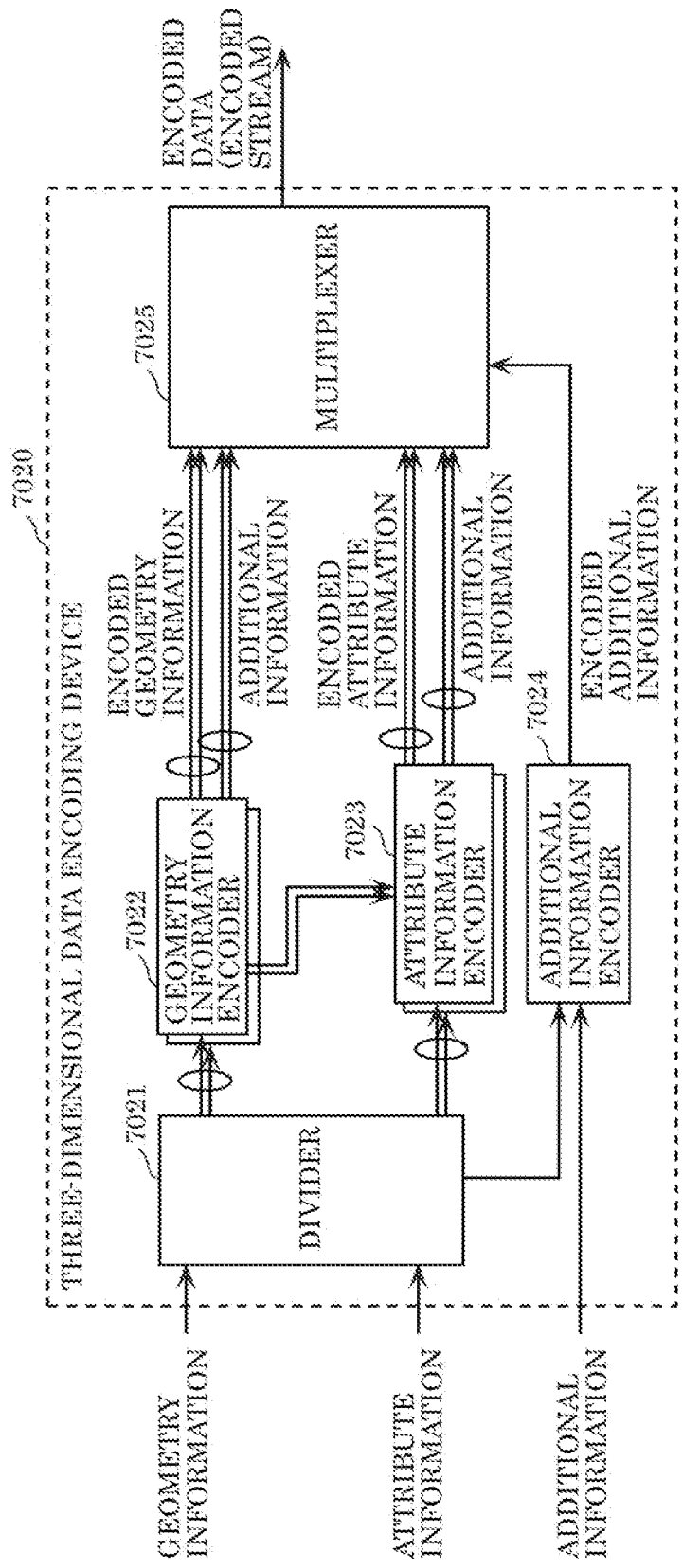
FIG. 52 is a block diagram of a three-dimensional data encoding device according to Embodiment 8.

In the following, a configuration of a three-dimensional data encoding device according to this embodiment will be described. FIG. 52 is a block diagram showing a configuration of three-dimensional data encoding device 7020 according to this embodiment. Three-dimensional data encoding device 7020 encodes point cloud data (point cloud) to generate encoded data (encoded stream). Three-dimensional data encoding device 7020 includes divider 7021, a plurality of geometry information encoders 7022, a plurality of attribute information encoders 7023, additional information encoder 7024, and multiplexer 7025.

Divider 7021 generates a plurality of pieces of divisional data by dividing point cloud data. Specifically, divider 7021 generates a plurality of pieces of divisional data by dividing a space of point cloud data into a plurality of subspaces. Here, a subspace is a combination of tiles or slices or a combination of tiles and slices. More specifically, point cloud data includes geometry information, attribute information (such as color or reflectance), and additional information. Divider 7021 divides geometry information into a plurality of pieces of divisional geometry information, and divides attribute information into a plurality of pieces of divisional attribute information. Divider 7021 also generates additional information concerning the division.

Divider 7021 first divides a point cloud into tiles, for example. Divider 7021 then further divides the resulting tiles into slices.

The plurality of geometry information encoders 7022 generate a plurality of pieces of encoded geometry information by encoding a plurality of pieces of divisional geometry information. For example, geometry information encoders 7022 encode divisional geometry information using an N-ary tree structure, such as an octree. Specifically, in the case of an octree, a current space is divided into eight nodes (subspaces), and 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined layer is reached or the number of the point clouds included in each node becomes equal to or less than a threshold. For example, the plurality of geometry information encoders 7022 process a plurality of pieces of divisional geometry information in parallel.

Attribute information encoder 7023 generates encoded attribute information, which is encoded data, by encoding attribute information using configuration information generated by geometry information encoder 7022. For example, attribute information encoder 7023 determines a reference point (reference node) that is to be referred to in encoding a current point (current node) to be processed based on the octree structure generated by geometry information encoder 7022. For example, attribute information encoder 7023 refers to a node whose parent node in the octree is the same as the parent node of the current node, of peripheral nodes or neighboring nodes. Note that the method of determining a reference relationship is not limited to this method. The process of encoding geometry information or attribute information may include at least one of a quantization process, a prediction process, and an arithmetic encoding process. In this case, "refer to" means using a reference node for calculation of a predicted value of attribute information or using a state of a reference node (occupancy information that indicates whether a reference node includes a point cloud or not, for example) for determination of a parameter of encoding. For example, the parameter of encoding is a quantization parameter in the quantization process or a context or the like in the arithmetic encoding.

Additional information encoder 7024 generates encoded additional information by encoding the additional information included in the point cloud data and the additional information concerning the data division generated in the division by divider 7021.

Multiplexer 7025 generates encoded stream (encoded stream) by multiplexing the plurality of pieces of encoded geometry information, the plurality of pieces of encoded attribute information, and the encoded additional information, and transmits the generated encoded data. The encoded additional information is used in the decoding.

Figure 53:
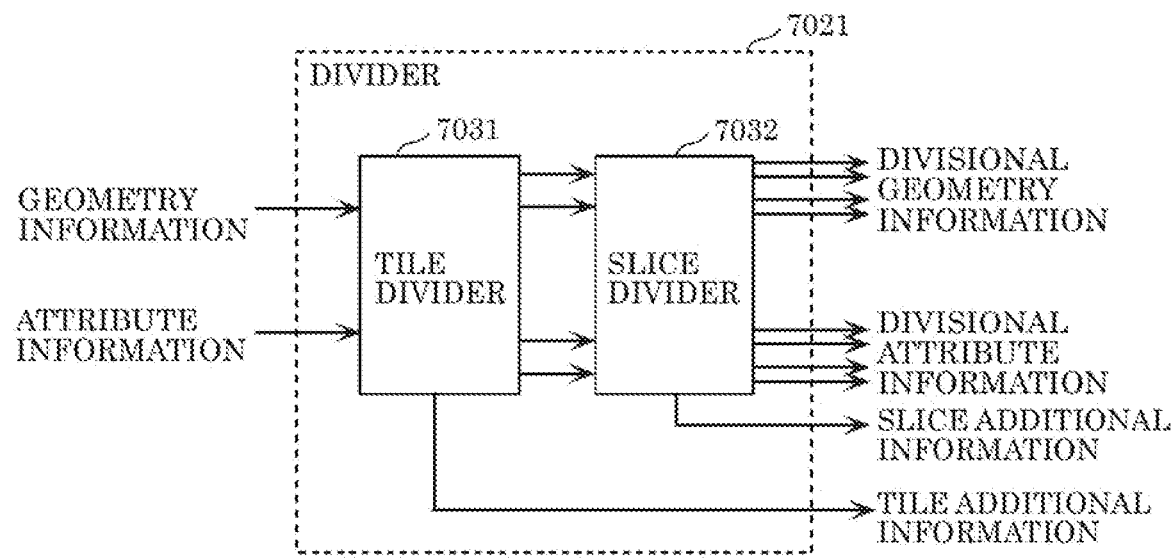
FIG. 53 is a block diagram of a divider according to Embodiment 8.

FIG. 53 is a block diagram of divider 7021. Divider 7021 includes tile divider 7031 and slice divider 7032.

Tile divider 7031 generates a plurality of pieces of tile geometry information by dividing geometry information (position (geometry)) into tiles. Tile divider 7031 generates a plurality of pieces of tile attribute information by dividing attribute information (attribute) into tiles. Tile divider 7031 also outputs tile additional information (Tile MetaData) including information concerning the tile division and information generated in the tile division.

Slice divider 7032 generates a plurality of pieces of divisional geometry information (a plurality of pieces of slice geometry information) by dividing a plurality of pieces of tile geometry information into slices. Slice divider 7032 generates a plurality of pieces of divisional attribute information (a plurality of pieces of slice attribute information) by dividing a plurality of pieces of tile attribute information into slices. Slice divider 7032 also outputs slice additional information (Slice MetaData) including information concerning the slice division and information generated in the slice division.

Tile divider 7031 and slice divider 7032 also determine a quantization tree value (quantization parameter) based on the generated additional information.

Figure 54:
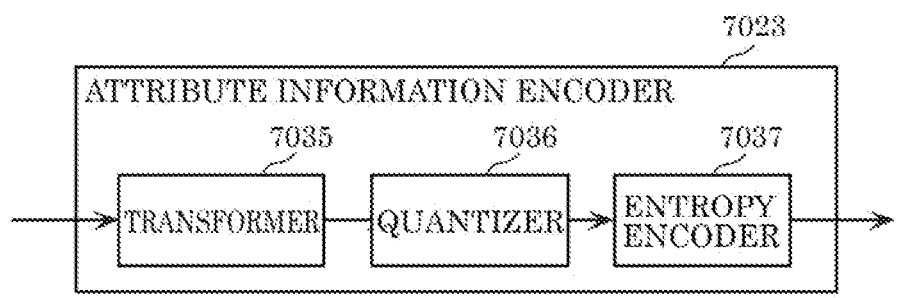
FIG. 54 is a block diagram of an attribute information encoder according to Embodiment 8.

FIG. 54 is a block diagram of attribute information encoder 7023. Attribute information encoder 7023 includes transformer 7035, quantizer 7036, and entropy encoder 7037.

Transformer 7035 classifies the divisional attribute information into layers, such as LoDs, and generates a coefficient value (difference value) by calculating the difference between the divisional attribute information and the predicted value. Note that transformer 7035 may generate the coefficient value by performing the Haar transformation on the divisional attribute information.

Quantizer 7036 generates a quantized value by quantizing the coefficient value. Specifically, quantizer 7036 divides the coefficient by a quantization step based on the quantization parameter. Entropy encoder 7037 generates encoded attribute information by entropy-encoding the quantized value.

Figure 55:
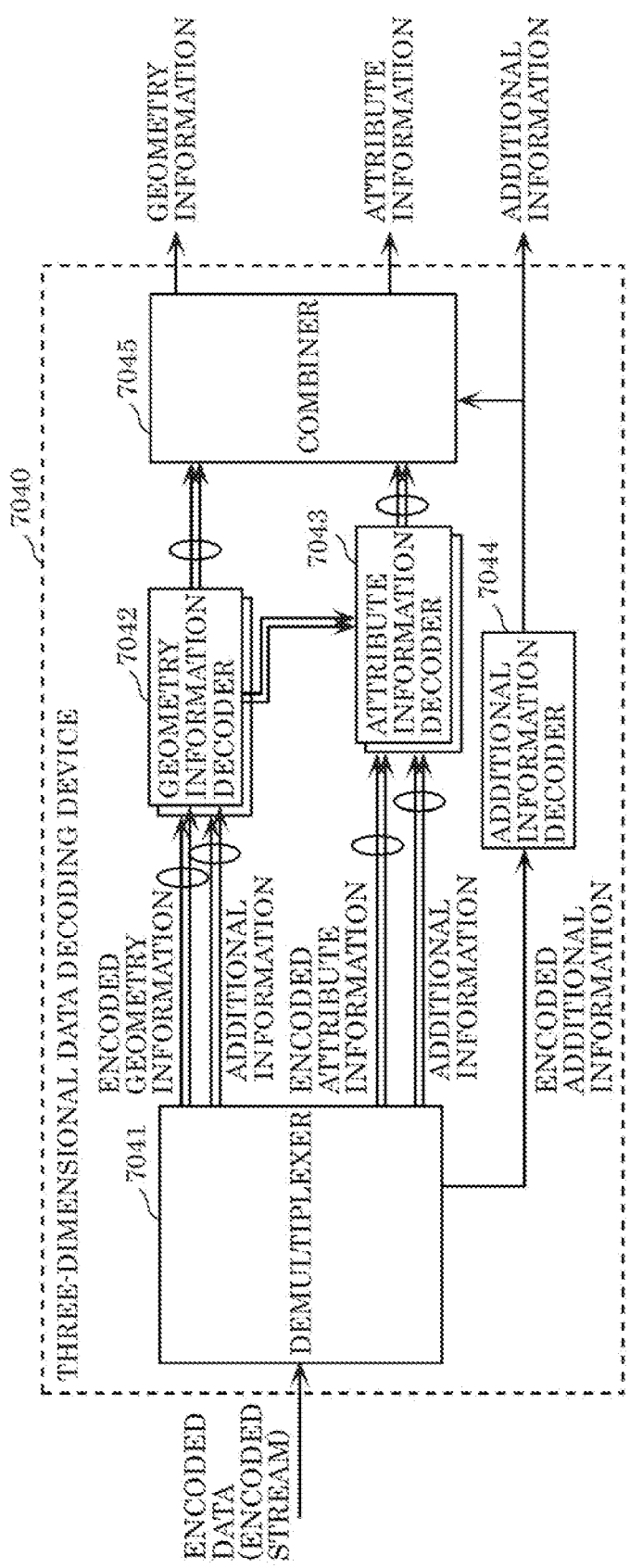
FIG. 55 is a block diagram of a three-dimensional data decoding device according to Embodiment 8.

In the following, a configuration of a three-dimensional data decoding device according to this embodiment will be described. FIG. 55 is a block diagram showing a configuration of three-dimensional data decoding device 7040. Three-dimensional data decoding device 7040 reproduces point cloud data by decoding encoded data (encoded stream) generated by encoding the point cloud data. Three-dimensional data decoding device 7040 includes demultiplexer 7041, a plurality of geometry information decoders 7042, a plurality of attribute information decoders 7043, additional information decoder 7044, and combiner 7045.

Demultiplexer 7041 generates a plurality of pieces of encoded geometry information, a plurality of pieces of encoded attribute information, and encoded additional information by demultiplexing encoded data (encoded stream).

The plurality of geometry information decoders 7042 generates a plurality of pieces of divisional geometry information by decoding a plurality of pieces of encoded geometry information. For example, the plurality of geometry information decoders 7042 process a plurality of pieces of encoded geometry information in parallel.

The plurality of attribute information decoders 7043 generate a plurality of pieces of divisional attribute information by decoding a plurality of pieces of encoded attribute information. For example, the plurality of attribute information decoders 7043 process a plurality of pieces of encoded attribute information in parallel.

A plurality of additional information decoders 7044 generate additional information by decoding encoded additional information.

Combiner 7045 generates geometry information by combining a plurality of pieces of divisional geometry information using additional information. Combiner 7045 generates attribute information by combining a plurality of pieces of divisional attribute information using additional information.

Figure 56:
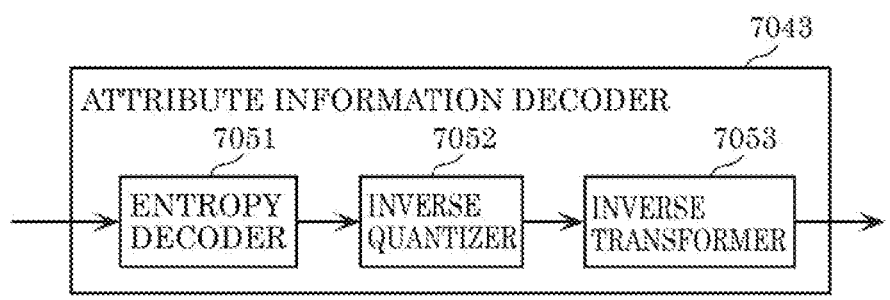
FIG. 56 is a block diagram of a attribute information decoder according to Embodiment 8.

FIG. 56 is a block diagram of attribute information decoder 7043. Attribute information decoder 7043 includes entropy decoder 7051, inverse quantizer 7052, and inverse transformer 7053. Entropy decoder 7051 generates a quantized value by entropy-decoding encoded attribute information. Inverse quantizer 7052 generates a coefficient value by inverse-quantizing the quantized value. Specifically, inverse quantizer 7052 multiplies the coefficient value by a quantization step based on the quantization tree value (quantization parameter) obtained from the bitstream. Inverse transformer 7053 generates divisional attribute information by inverse-transforming the coefficient value. Here, the inverse transformation is a process of adding the predicted value to the coefficient value, for example. Alternatively, the inverse transformation is the inverse Haar transformation.

Figure 57:
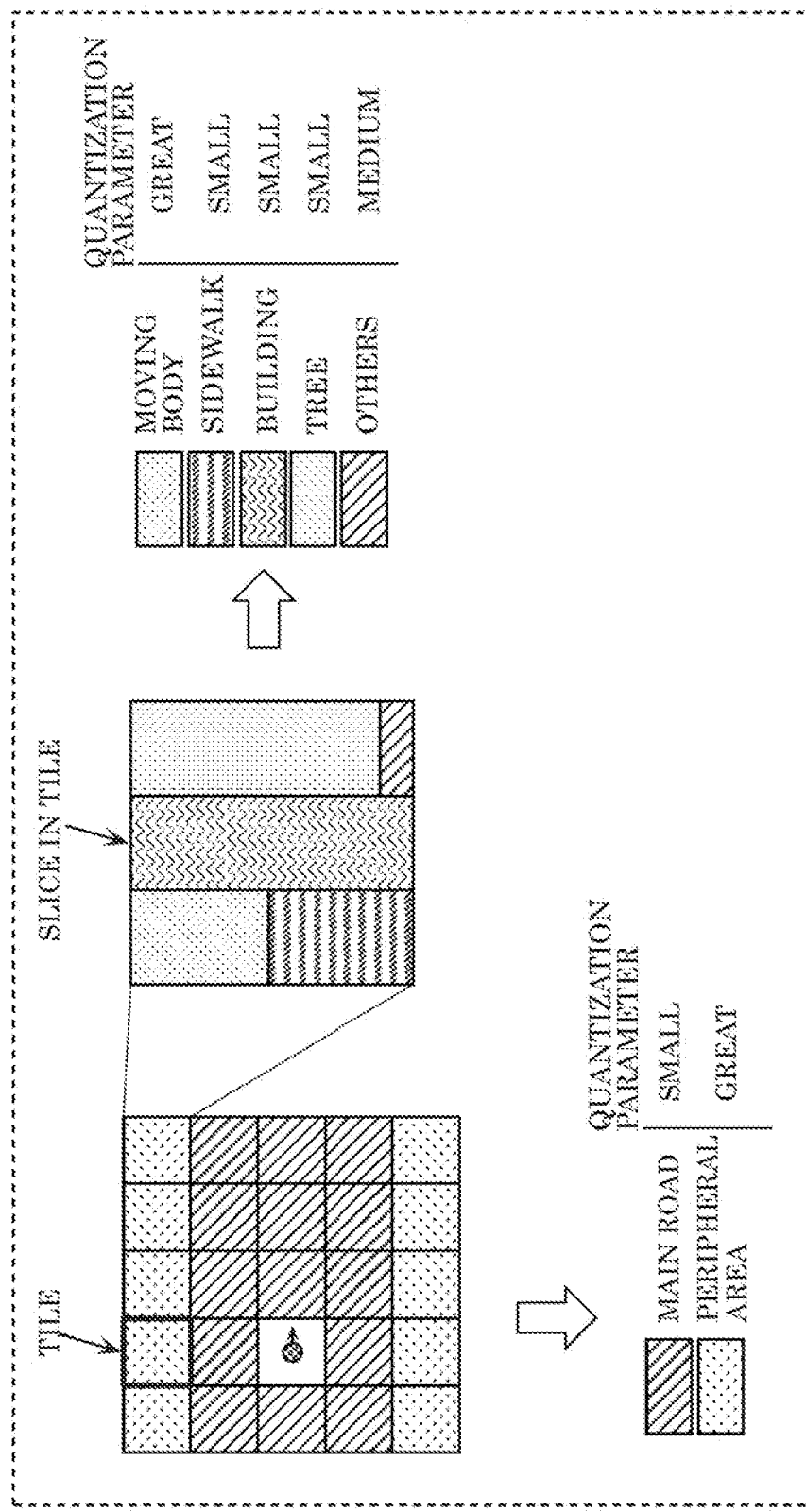
FIG. 57 is a diagram showing an example of the setting of a quantization parameter in the tile division and the slice division according to Embodiment 8.

In the following, an example of a method of determining a quantization parameter will be described. FIG. 57 is a diagram showing an example of the setting of a quantization parameter in the tile division and the slice division.

When the value of the quantization parameter is small, the original information is likely to be maintained. For example, a default value of the quantization parameter is 1. For example, in the encoding process using tiles of PCC data, a quantization parameter for a tile of a main road is set to be a small value, in order to maintain the data quality. On the other hand, a quantization parameter for a tile of a peripheral area is set to be a great value. In this way, the coding efficiency can be improved, while the data quality of the peripheral area decreases.

Similarly, in the encoding process using slices of PCC data, a sidewalk, a tree, and a building are important in the self-position estimation and mapping, and a quantization parameter for a slice of a sidewalk, a tree, or a building is set to be a small value. On the other hand, a moving body or other objects is less important, so that a quantization parameter for a slice of a moving body or other objects is set to be a great value.

When ΔQP (DeltaQP) described later is used, in the encoding of a three-dimensional point belonging to an important area, such as a main road, the three-dimensional data encoding device may perform the encoding by setting the value of ΔQP to be a negative value to reduce the quantization error, in order to decrease the quantization parameter. In this way, the decoded attribute value of the three-dimensional point belonging to the important area can be brought close to the value before the encoding. In the encoding of a three-dimensional point belonging to an area that is not important, such as a peripheral area, the three-dimensional data encoding device may set the value of ΔQP to be a positive value to reduce the information amount, in order to increase the quantization parameter. In this way, the total code amount can be reduced, while maintaining the amount of information on the important area.

In the following, an example of information that indicates a quantization parameter for each layer will be described. In encoding attribute information on a three-dimensional point by quantization, a scheme for controlling quantization parameters on a finer unit basis is introduced in addition to quantization parameter QPbase for a frame, a slice, a tile, or the like. For example, when encoding attribute information using LoDs, the three-dimensional data encoding device perform the encoding by changing the value of the quantization parameter for each LoD by providing Delta_Layer for each LoD and adding Delta_Layer to the value of QPbase for each LoD. The three-dimensional data encoding device also adds Delta_Layer used for the encoding to a header or the like of the bitstream. In this way, the three-dimensional data encoding device can encode attribute information on a three-dimensional point by changing the quantization parameter for each LoD according to a desired code amount and an actual code amount, for example, and therefore can finally generate a bitstream having a code amount close to the desired code amount. The three-dimensional data decoding device can properly decode the bitstream by decoding QPbase and Delta_Layer included in the header to generate the quantization parameters used by the three-dimensional data encoding device.

Figure 58:
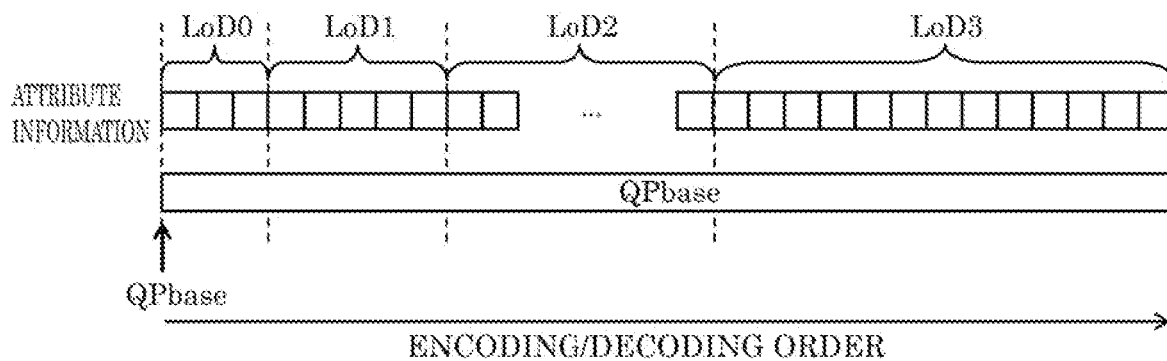
FIG. 58 is a diagram showing an example of the setting of a quantization parameter according to Embodiment 8.
Figure 59:
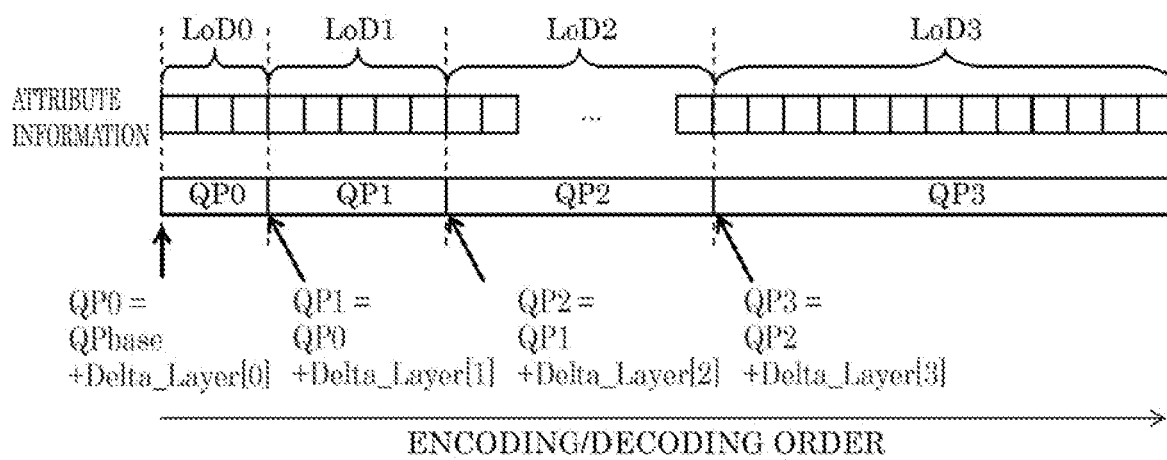
FIG. 59 is a diagram showing an example of the setting of a quantization parameter according to Embodiment 8.

FIG. 58 is a diagram showing an example in which attribute information on all three-dimensional points are encoded using quantization parameter QPbase. FIG. 59 is a diagram showing an example in which encoding is performed by changing the quantization parameter for each LoD layer. In the example shown in FIG. 59, the quantization parameter for the leading LoD is calculated by adding Delta_Layer of the leading LoD to QPbase. For the second and following LoDs, the quantization parameter for the LoD being processed is calculated by adding Delta_Layer of the LoD being processed to the quantization parameter for the immediately preceding LoD. For example, quantization parameter QP3 of at the head of LoD3 is calculated according to QP3=QP2+Delta_Layer[3].

Note that Delta_Layer[i] for each LoD may indicate the difference value with respect to QPbase. That is, quantization parameter QPi of i-th LoDi is indicated by QPi=QPbase+Delta_Layer[i]. For example, QP1=QPbase+Delta_Layer[1], and QP2=QPbase+Delta_Layer[2].

FIG. 60 is a diagram showing a syntax example of an attribute information header (attribute header information). Here, the attribute information header is a header on a frame, slice or tile basis, for example, and is a header of attribute information. As shown in FIG. 60, the attribute information header includes QPbase (reference quantization parameter), NumLayer (number of layers), and Delta_Layer[i] (differential quantization parameter).

QPbase indicates the value of a reference quantization parameter for a frame, a slice, a tile, or the like. NumLayer indicates the number of layers of LoD or RAHT. In other words, NumLayer indicates the number of all Delta_Layer [i] included in the attribute information header.

Delta_Layer[i] indicates the value of ΔQP for layer i. Here, ΔQP is a value obtained by subtracting the quantization parameter for layer i from the quantization parameter for layer i−1. Note that ΔQP may be a value obtained by subtracting the quantization parameter for layer i from QPbase. ΔQP can assume a positive or negative value. Note that Delta_Layer[0] need not be added to the header. In that case, the quantization parameter for layer 0 is equal to QPbase. In this way, the code amount of the header can be reduced.

FIG. 61 is a diagram showing another syntax example of an attribute information header (attribute header information). The attribute information header shown in FIG. 61 differs from the attribute information header shown in FIG. 60 in that the attribute information header further includes delta_Layer_present_flag.

delta_Layer_present_flag is a flag that indicates whether Delta_Layer is included in the bitstream or not. For example, a value of 1 indicates that Delta_Layer is included in the bitstream, and a value of 0 indicates that Delta_Layer is not included in the bitstream. When delta_Layer_present_flag is 0, the three-dimensional data decoding device performs the following decoding process by setting Delta_Layer to be 0, for example.

Note that although examples have been described here in which the quantization parameter is indicated by QPbase and Delta_Layer, a quantization step may be indicated by QPbase and Delta_Layer. The quantization step is calculated from the quantization parameter using a formula, a table or the like determined in advance. In the quantization process, the three-dimensional data encoding device divides the coefficient value by the quantization step. In the inverse quantization process, the three-dimensional data decoding device reproduces the coefficient value by multiplying the quantized value by the quantization step.

Figure 62:
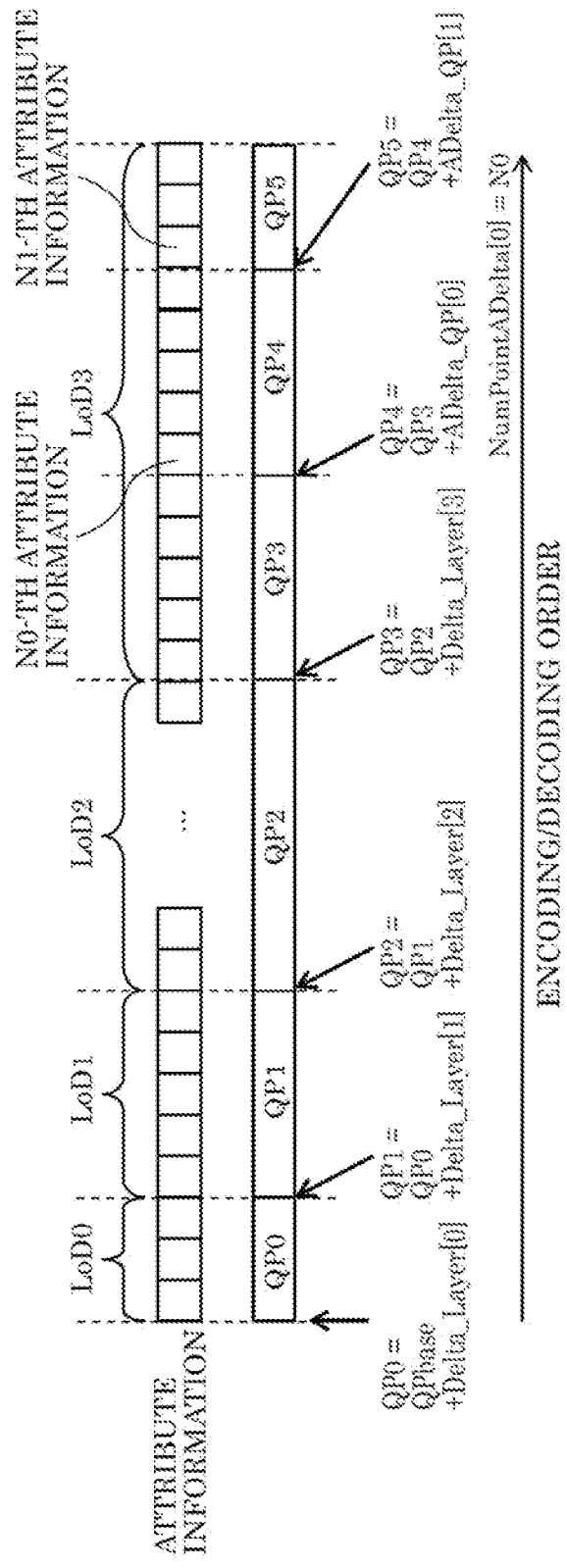
FIG. 62 is a diagram showing an example of the setting of a quantization parameter according to Embodiment 8.

Next, an example in which the quantization parameters are controlled on a finer unit basis will be described. FIG. 62 is a diagram showing an example in which the quantization parameters are controlled on a basis of a unit finer than LoD.

For example, when encoding attribute information using LoD, the three-dimensional data encoding device defines ADelta_QP and NumPointADelta, which represents the geometry information on a three-dimensional point to which ADelta_QP is to be added, in addition to Delta_Layer for each LoD layer. The three-dimensional data encoding device performs the encoding by changing the value of the quantization parameter based on Delta_Layer, ADelta_QP, and NumPointADelta.

The three-dimensional data encoding device may add ADelta and NumPointADelta used for the encoding to the header or the like of the bitstream. This allows the three-dimensional data encoding device to encode attribute information on a plurality of three-dimensional points by changing the quantization parameter for each three-dimensional point according to the desired code amount and the actual code amount, for example. In this way, the three-dimensional data encoding device can finally generate a bitstream having a code amount close to the desired code amount. The three-dimensional data decoding device can properly decode the bitstream by decoding QPbase, Delta_Layer, and ADelta included in the header to generate the quantization parameters used by the three-dimensional data encoding device.

For example, as shown in FIG. 62, quantized value QP4 of N0-th attribute information is calculated according to QP4=QP3+ADelta_QP[0].

An encoding/decoding order reverse to the encoding/decoding order shown in FIG. 62 can also be used. For example, encoding/decoding can also be performed in the order of LoD3, LoD2, LoD1, and then LoD0.

FIG. 63 is a diagram showing a syntax example of an attribute information header (attribute header information) in the case where the example shown in FIG. 62 is used. The attribute information header shown in FIG. 63 differs from the attribute information header shown in FIG. 60 in that the attribute information header further includes NumADelta, NumPointADelta[i], and ADelta_QP[i].

NumADelta indicates the number of all ADelta_QP included in the bitstream. NumPointADelta[i] indicates an identification number of three-dimensional point A to which ADelta_QP[i] is applied. For example, NumPointADelta[i] indicates the number of the three-dimensional points from the leading three-dimensional point to three-dimensional point A in the encoding/decoding order. NumPointADelta[i] may also indicates the number of the three-dimensional points from the first three-dimensional point to three-dimensional point A in the LoD to which three-dimensional point A belongs.

Alternatively, NumPointADelta[i] may indicate the difference value between the identification number of the three-dimensional point indicated by NumPointADelta[i−1] and the identification number of three-dimensional point A. In this way, the value of NumPointADelta[i] can be reduced, so that the code amount can be reduced.

ADelta_QP[i] indicates the value of ΔQP of the three-dimensional point indicated by NumPointADelta[i]. That is, ADelta_QP[i] indicates the difference between the quantization parameter of the three-dimensional point indicated by NumPointADelta[i] and the quantization parameter of the three-dimensional point immediately preceding that three-dimensional point.

FIG. 64 is a diagram showing another syntax example of an attribute information header (attribute header information) in the case where the example shown in FIG. 62 is used. The attribute information header shown in FIG. 64 differs from the attribute information header shown in FIG. 63 in that the attribute information header further includes delta_Layer_present_flag and additional_delta_QP_present_flag and includes NumADelta_minus1 instead of NumADelta.

delta_Layer_present_flag is the same as that already described with reference to FIG. 61.

additional_delta_QP_present_flag is a flag that indicates whether ADelta_QP is included in the bitstream or not. For example, a value of 1 indicates that ADelta_QP is included in the bitstream, and a value of 0 indicates that ADelta_QP is not included in the bitstream. When additional_delta_QP_present_flag is 0, the three-dimensional data decoding device performs the following decoding process by setting ADelta_QP to be 0, for example.

NumADelta_minus1 indicates the number of all ADelta_QP included in the bitstream minus 1. In this way, by adding the value obtained by subtracting 1 from the number of ADelta_QP to the header, the code amount of the header can be reduced. For example, the three-dimensional data decoding device calculates NumADelta=NumADelta_minus1+1. ADelta_QP[i] indicates the value of i-th ADelta_QP. Note that ADelta_QP[i] can be set to be not only a positive value but also a negative value.

FIG. 65 is a flowchart of a three-dimensional data encoding process according to this embodiment. First, the three-dimensional data encoding device encodes geometry information (geometry) (S7001). For example, the three-dimensional data encoding device performs the encoding using an octree representation.

The three-dimensional data encoding device then transforms attribute information (S7002). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7003). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

Figure 66:
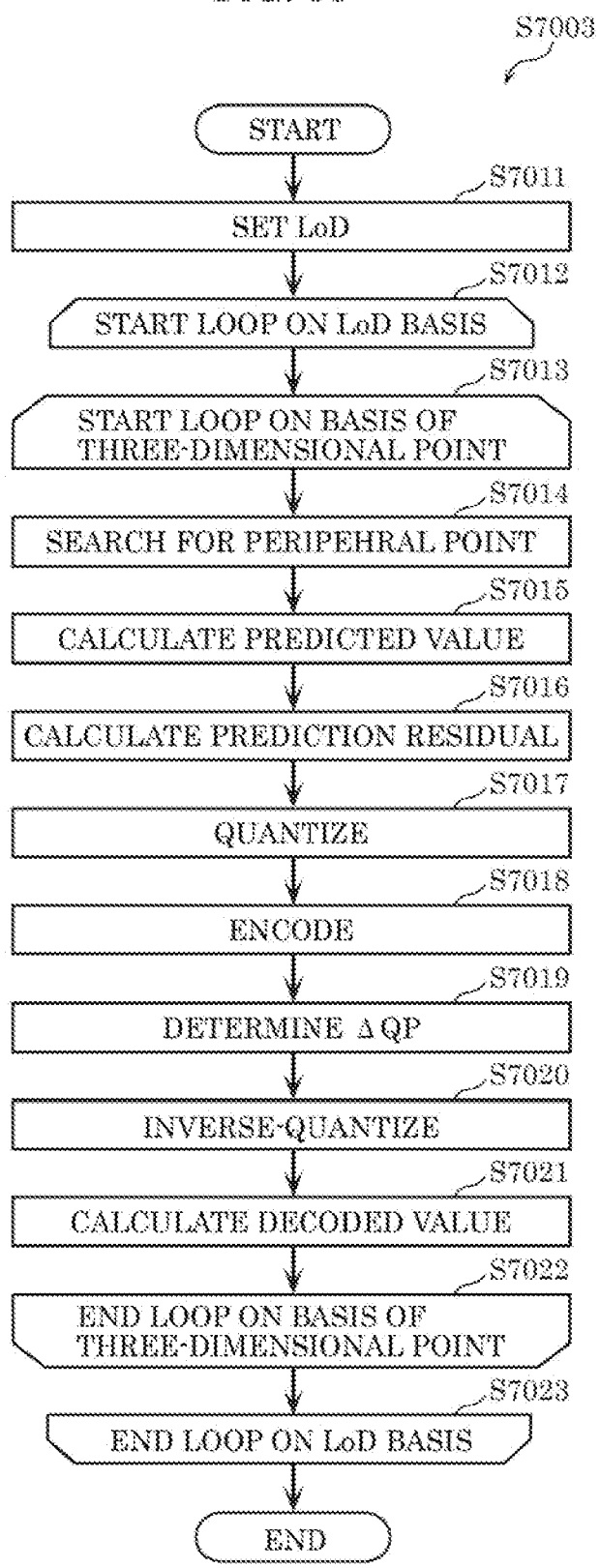
FIG. 66 is a flowchart of an attribute information encoding process according to Embodiment 8.

FIG. 66 is a flowchart of the attribute information encoding process (S7003). First, the three-dimensional data encoding device sets an LoD (S7011). That is, the three-dimensional data encoding device assigns each three-dimensional point to any of a plurality of LoDs.

The three-dimensional data encoding device then starts a loop on an LoD basis (S7012). That is, the three-dimensional data encoding device repeatedly performs the process from step S7013 to step S7021 for each LoD.

The three-dimensional data encoding device then starts a loop on a basis of a three-dimensional point (S7013). That is, the three-dimensional data encoding device repeatedly performs the process from step S7014 to step S7020 for each three-dimensional point.

First, the three-dimensional data encoding device searches for a plurality of peripheral points, which are three-dimensional points present in the periphery of the current three-dimensional point, that are to be used for calculation of a predicted value of the current three-dimensional point to be processed (S7014). The three-dimensional data encoding device then calculates a weighted average of values of the attribute information on the plurality of peripheral points, and sets the obtained value as predicted value P (S7015). The three-dimensional data encoding device then calculates a prediction residual, which is the difference between the attribute information and the predicted value of the current three-dimensional point (S7016). The three-dimensional data encoding device then calculates a quantized value by quantizing the prediction residual (S7017). The three-dimensional data encoding device then arithmetically encodes the quantized value (S7018). The three-dimensional data encoding device then determines ΔQP (S7019). ΔQP determined here is used for determining a quantization parameter used for quantization of a subsequent prediction residual.

The three-dimensional data encoding device then calculates an inverse-quantized value by inverse-quantizing the quantized value (S7020). The three-dimensional data encoding device then generates a decoded value by adding the predicted value to the inverse-quantized value (S7021). The three-dimensional data encoding device then ends the loop on a basis of a three-dimensional point (S7022). The three-dimensional data encoding device also ends the loop on a LoD basis (S7023).

Figure 67:
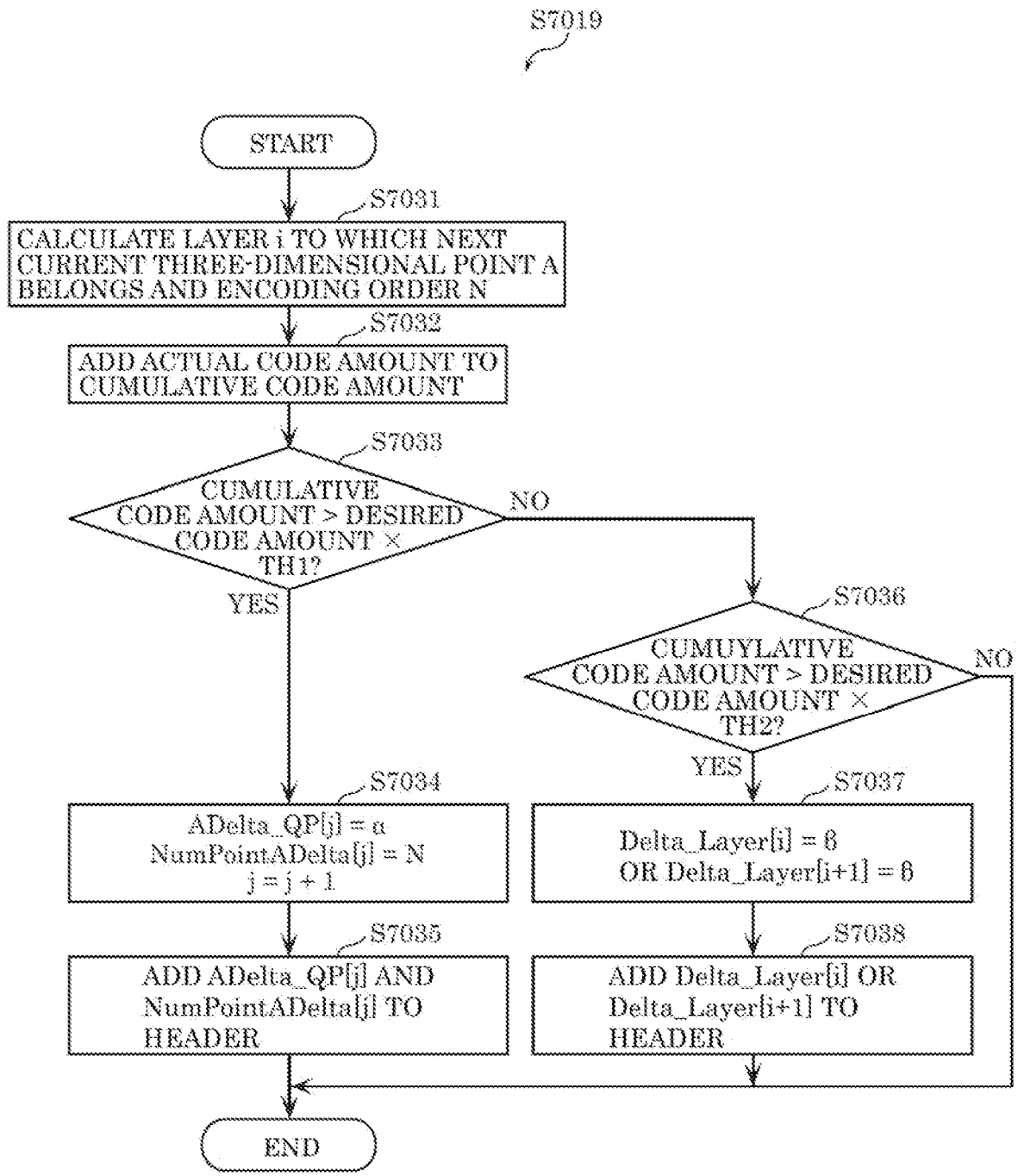
FIG. 67 is a flowchart of a ΔQP determination process according to Embodiment 8.

FIG. 67 is a flowchart of the ΔQP determination process (S7019). First, the three-dimensional data encoding device calculates layer i to which current three-dimensional point A to be encoded next belongs and encoding order N (S7031). Layer i indicates a LoD layer or a RAHT layer, for example. The three-dimensional data encoding device then adds the actual code amount to a cumulative code amount (S7032). Here, the cumulative code amount refers to a cumulative code amount for one frame, one slice, or one tile of the current three-dimensional point. Note that the cumulative code amount may refer to a cumulative code amount for a plurality of frames, a plurality of slices, or a plurality of tiles. Alternatively, a cumulative code amount of attribute information may be used, or a cumulative code amount of both geometry information and attribute information may be used.

The three-dimensional data encoding device then determines whether the cumulative code amount is greater than the desired code amount×TH1 or not (S7033). Here, the desired code amount refers to a desired code amount for one frame, one slice, or one tile of the current three-dimensional point. Note that the desired code amount may refer to a desired code amount for a plurality of frames, a plurality of slices, or a plurality of tiles. Alternatively, a desired code amount of attribute information may be used, or a desired code amount of both geometry information and attribute information may be used.

When the cumulative code amount is equal to or smaller than the desired code amount×TH1 (if No in S7033), the three-dimensional data encoding device determines whether the cumulative code amount is greater than the desired code amount×TH2 or not (S7036).

Here, as thresholds TH1 and TH2, values from 0.0 to 1.0 are set, for example. In addition, TH1>TH2. For example, when the cumulative code amount is greater than the value of the desired code amount×TH1 (if Yes in S7033), the three-dimensional data encoding device determines that the code amount needs to be reduced as early as possible, and sets ADelta_QP to value a in order to increase the quantization parameter for next three-dimensional point N. The three-dimensional data encoding device also sets NumPointADelta to value N, and increment j by 1 (S7034). The three-dimensional data encoding device then adds ADelta_QP=a and NumPointADelta=N to the header (S7035). Note that value a may be a fixed value or a variable value. For example, the three-dimensional data encoding device may determine value a based on the magnitude of the difference between the cumulative code amount and the desired code amount×TH1. For example, the three-dimensional data encoding device sets value a to be greater as the difference between the cumulative code amount and the desired code amount×TH1 increases. In this way, the three-dimensional data encoding device can control the quantization parameter so that the cumulative code amount does not exceed the desired code amount.

When the cumulative code amount is greater than the desired code amount×TH2 (if Yes in S7036), the three-dimensional data encoding device sets Delta_Layer to value β in order to increase the quantization parameter for layer i to which current three-dimensional point A belongs or the subsequent layer i+1 (S7037). For example, the three-dimensional data encoding device sets Delta_Layer[i] of layer i to be value β when current three-dimensional point A is at the top of layer i, and sets Delta_Layer[i+1] of layer i+1 to be value β when current three-dimensional point A is not at the top of layer i.

The three-dimensional data encoding device adds Delta_Layer=13 of layer i or layer i+1 to the header (S7038). Note that value β may be a fixed value or a variable value. For example, the three-dimensional data encoding device may determine value β based on the magnitude of the difference between the cumulative code amount and the desired code amount×TH2. For example, the three-dimensional data encoding device sets value β to be greater as the difference between the cumulative code amount and the desired code amount×TH2 increases. In this way, the three-dimensional data encoding device can control the quantization parameter so that the cumulative code amount does not exceed the desired code amount.

If the cumulative code amount exceeds or is about to exceed the desired code amount, the three-dimensional data encoding device may set the value of ADelta_QP or Delta_Layer so that the quantization parameter assumes the maximum value supported by the standard or the like. In this way, the three-dimensional data encoding device can set the quantization coefficient for points subsequent to three-dimensional point A or layers subsequent to layer i to be 0, thereby reducing the increase of the actual code amount and preventing the cumulative code amount from exceeding the desired code amount. If the cumulative code amount is smaller than the desired code amount×TH3, the three-dimensional data encoding device may decrease the quantization parameter so that the actual code amount increases. For example, the three-dimensional data encoding device may decrease the quantization parameter by setting the value of Delta_Layer or ADelta_QP to be a negative value depending on the difference between the cumulative code amount and the desired code amount. In this way, the three-dimensional data encoding device can generate a bitstream having a code amount close to the desired code amount.

Figure 68:
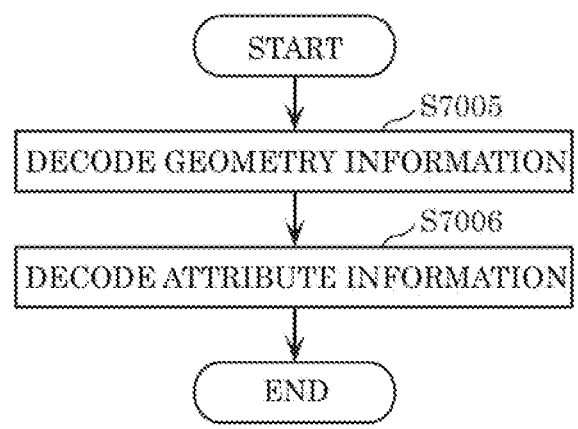
FIG. 68 is a flowchart of a three-dimensional data decoding process according to Embodiment 8.

FIG. 68 is a flowchart of a three-dimensional data decoding process according to this embodiment. First, the three-dimensional data decoding device decodes geometry information (geometry) from the bitstream (S7005). For example, the three-dimensional data decoding device performs the decoding using an octree representation.

The three-dimensional data decoding device then decodes attribute information from the bitstream (S7006). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device may decode the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

Figure 69:
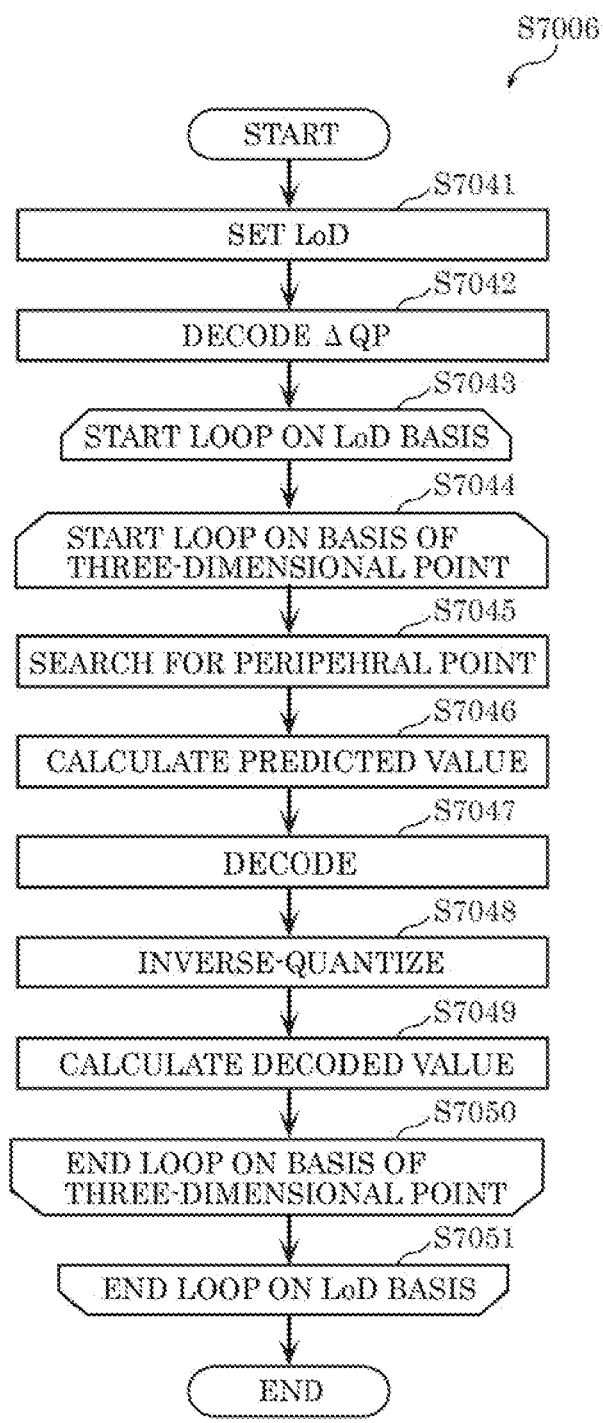
FIG. 69 is a flowchart of an attribute information decoding process according to Embodiment 8.

FIG. 69 is a flowchart of the attribute information decoding process (S7006). First, the three-dimensional data decoding device sets an LoD (S7041). That is, the three-dimensional data decoding device assigns each of a plurality of three-dimensional points having decoded geometry information to any of a plurality of LoDs. For example, the method of the assignment is the same as the method of assignment used in the three-dimensional data encoding device.

The three-dimensional data decoding device then decodes ΔQP from the bitstream (S7042). Specifically, the three-dimensional data decoding device decodes Delta_Layer, ADelta_QP, and NumPointADelta from the header of the bitstream.

The three-dimensional data decoding device then starts a loop on an LoD basis (S7043). That is, the three-dimensional data decoding device repeatedly performs the process from step S7044 to step S7050 for each LoD. The three-dimensional data decoding device then starts a loop on a basis of a three-dimensional point (S7044). That is, the three-dimensional data decoding device repeatedly performs the process from step S7045 to step S7049 for each three-dimensional point.

First, the three-dimensional data decoding device searches for a plurality of peripheral points, which are three-dimensional points present in the periphery of the current three-dimensional point, that are to be used for calculation of a predicted value of the current three-dimensional point to be processed (S7045). The three-dimensional data decoding device then calculates a weighted average of values of the attribute information on the plurality of peripheral points, and sets the obtained value as predicted value P (S7046). Note that these processings are the same as those in the three-dimensional data encoding device.

The three-dimensional data decoding device then arithmetically decodes the quantized value from the bitstream (S7047). The three-dimensional data decoding device then calculates an inverse-quantized value by inverse-quantizing the decoded quantized value (S7048). In this inverse quantization, a quantization parameter calculated using ΔQP obtained in step S7042 is used.

The three-dimensional data decoding device then generates a decoded value by adding the predicted value to the inverse-quantized value (S7049). The three-dimensional data decoding device then ends the loop on a basis of a three-dimensional point (S7050). The three-dimensional data decoding device also ends the loop on a LoD basis (S7051).

Figure 70:
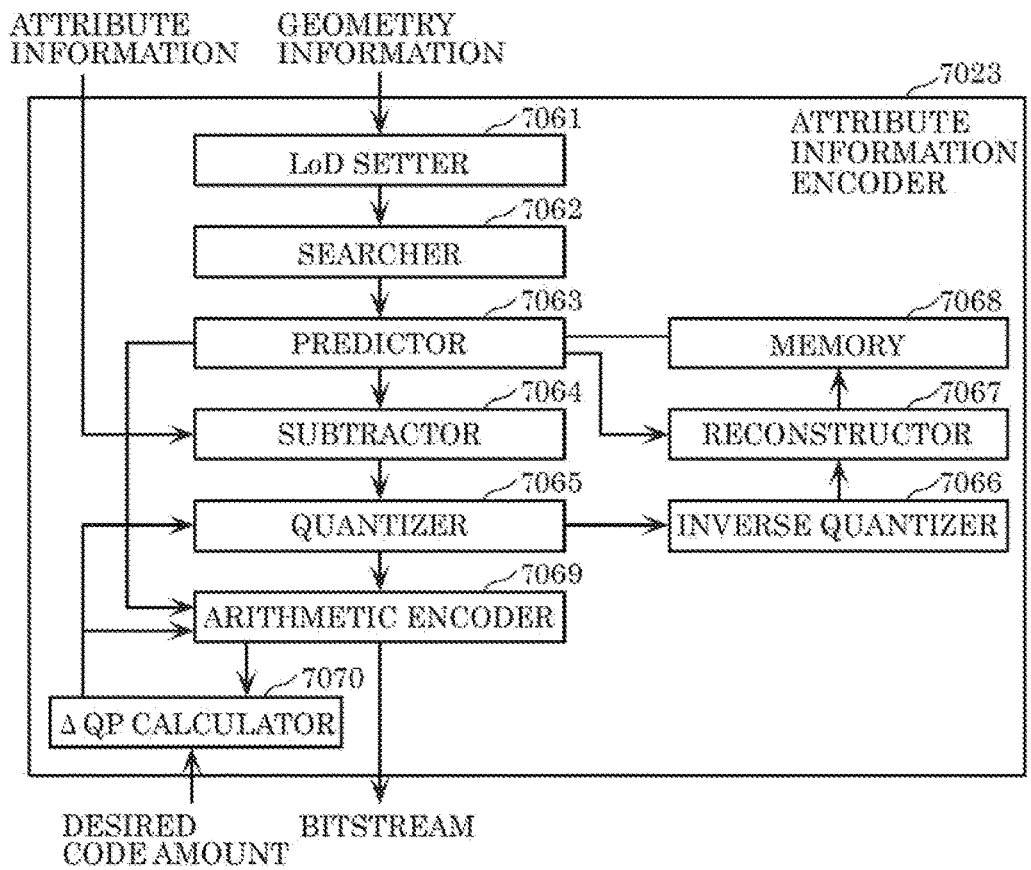
FIG. 70 is a block diagram of an attribute information encoder according to Embodiment 8.

FIG. 70 is a block diagram of attribute information encoder 7023. Attribute information encoder 7023 includes LoD setter 7061, searcher 7062, predictor 7063, subtractor 7064, quantizer 7065, inverse quantizer 7066, reconstructor 7067, memory 7068, and ΔQP calculator 7070.

LoD setter 7061 generates a LoD using geometry information on a three-dimensional point. Searcher 7062 searches for a neighboring three-dimensional point of each three-dimensional point using a LoD generation result and distance information between three-dimensional points. Predictor 7063 generates a predicted value of attribute information of a current three-dimensional point. Predictor 7063 also assigns a predicted value to a plurality of prediction modes 0 to M−1, and selects a prediction mode to be used from the plurality of prediction modes.

Subtractor 7064 generates a prediction residual by subtracting the predicted value from the attribute information. Quantizer 7065 quantizes the prediction residual of the attribute information. Inverse quantizer 7066 inverse-quantizes the quantized prediction residual. Reconstructor 7067 generates a decoded value by summing the predicted value and the inverse-quantized prediction residual. Memory 7068 stores the value (decoded value) of the decoded attribute information on each three-dimensional point. The decoded attribute information on the three-dimensional points stored in memory 7068 is used for prediction of a three-dimensional point yet to be encoded by predictor 7063.

Arithmetic encoder 7069 calculates ZeroCnt from the quantized prediction residual, and arithmetically encodes ZeroCnt. Arithmetic encoder 7069 also arithmetically encodes any quantized prediction residual that is not zero. Arithmetic encoder 7069 may binarize the prediction residual before the arithmetic encoding. Arithmetic encoder 7069 may generate and encode various kinds of head information. Arithmetic encoder 7069 may arithmetically encode prediction mode information (PredMode) that indicates the prediction mode used for the encoding by predictor 7063, and add the information to the bitstream.

ΔQP calculator 7070 determines values of Delta_Layer, ADelta_QP, and NumPointADelta from the actual code amount obtained by arithmetic encoder 7069 and the predetermined desired code amount. The quantization by quantizer 7065 is performed using a quantization parameter based on the determined Delta_Layer, ADelta_QP, and NumPointADelta. Arithmetic encoder 7069 arithmetically encodes Delta_Layer, ADelta_QP, and NumPointADelta and adds these values to the bitstream.

Figure 71:
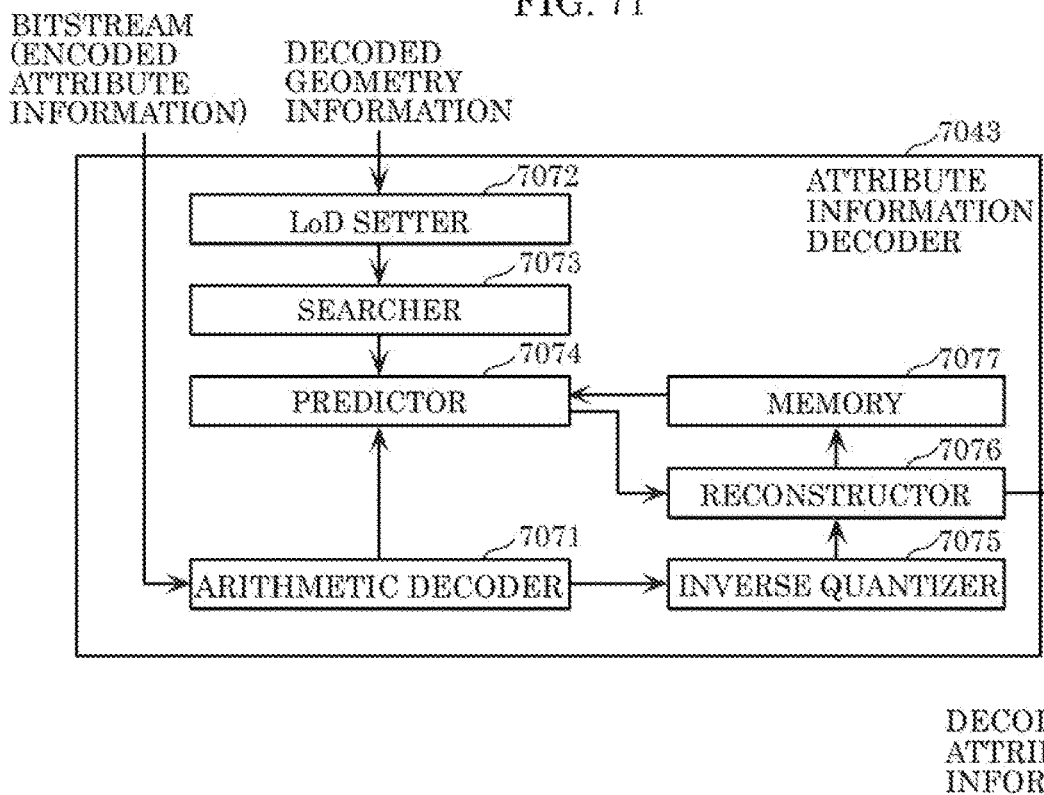
FIG. 71 is a block diagram of an attribute information decoder according to Embodiment 8.

FIG. 71 is a block diagram of attribute information decoder 7043. Attribute information decoder 7043 includes arithmetic decoder 7071, LoD setter 7072, searcher 7073, predictor 7074, inverse quantizer 7075, reconstructor 7076, and memory 7077.

Arithmetic decoder 7071 arithmetically decodes ZeroCnt and the prediction residual included in the bitstream. Arithmetic decoder 7071 also decodes various kinds of header information. Arithmetic decoder 7071 also arithmetically decodes prediction mode information (PredMode) from the bitstream, and outputs the obtained prediction mode information to predictor 7074. Arithmetic decoder 7071 also decodes Delta_Layer, ADelta_QP, and NumPointADelta from the header of the bitstream.

LoD setter 7072 generates a LoD using decoded geometry information on a three-dimensional point. Searcher 7073 searches for a neighboring three-dimensional point of each three-dimensional point using a LoD generation result and distance information between three-dimensional points.

Predictor 7074 generates a predicted value of attribute information of a current three-dimensional point to be decoded. Inverse quantizer 7075 inverse-quantizes the arithmetically decoded prediction residual. Specifically, inverse quantizer 7075 performs inverse quantization using a quantization parameter based on the decoded Delta_Layer, ADelta_QP, and NumPointADelta.

Reconstructor 7076 generates a decoded value by summing the predicted value and the inverse-quantized prediction residual. Memory 7077 stores the value (decoded value) of the decoded attribute information on each three-dimensional point. The decoded attribute information on the three-dimensional points stored in memory 7077 is used for prediction of a three-dimensional point yet to be decoded by predictor 7074.

Figure 72:
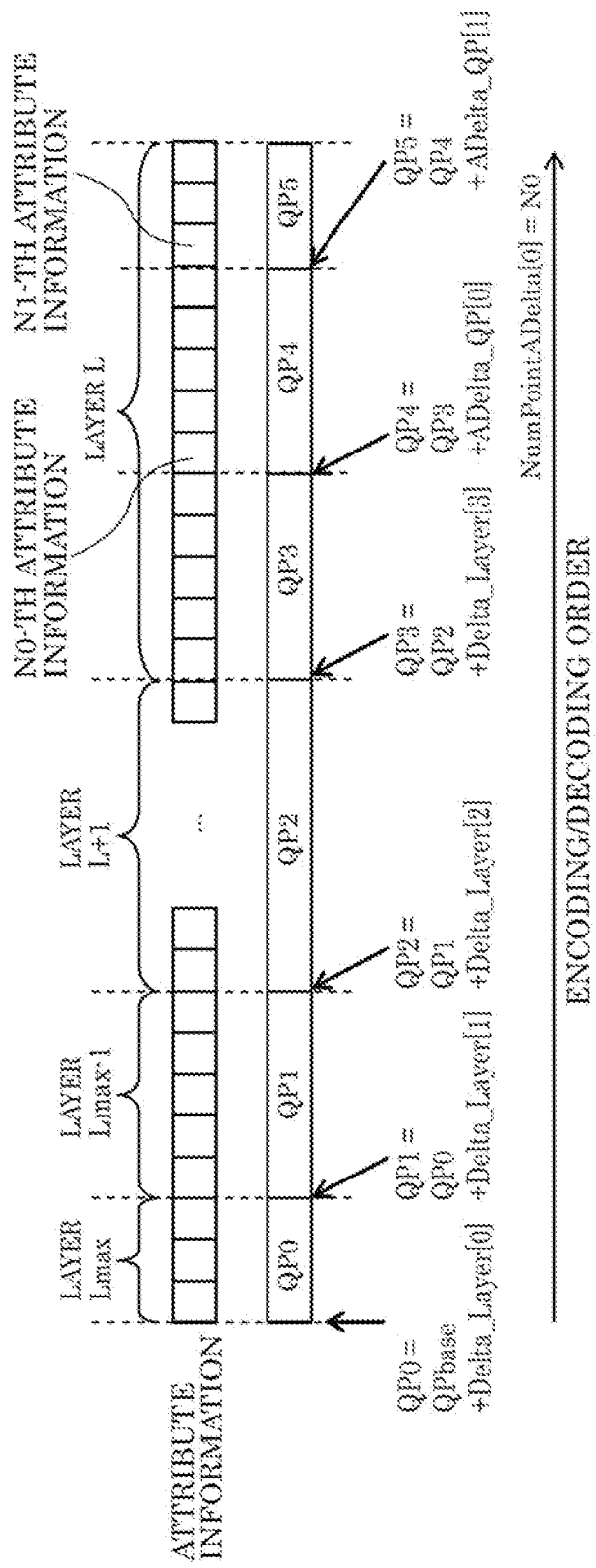
FIG. 72 is a diagram showing an example of the setting of a quantization parameter according to Embodiment 8.

In the following, an example in which RAHT layers are used instead of the LoD layers will be described. FIG. 72 is a diagram showing an example in which the quantization parameters are controlled on a basis of a finer unit when attribute information is encoded using RAHT. For example, when encoding attribute information using RAHT, the three-dimensional data encoding device defines ADelta_QP and NumPointADelta, which represents the geometry information on a three-dimensional point to which ADelta_QP is to be added, in addition to Delta_Layer for each RAHT layer. The three-dimensional data encoding device performs the encoding by changing the value of the quantization parameter based on Delta_Layer, ADelta_QP, and NumPointADelta.

The three-dimensional data encoding device may add ADelta and NumPointADelta used for the encoding to the header or the like of the bitstream. This allows the three-dimensional data encoding device to encode attribute information on three-dimensional points by changing the quantization parameter for each three-dimensional point according to the desired code amount and the actual code amount, for example. In this way, the three-dimensional data encoding device can finally generate a bitstream having a code amount close to the desired code amount. The three-dimensional data decoding device can properly decode the bitstream by decoding QPbase, Delta_Layer, and ADelta included in the header to generate the quantization parameters used by the three-dimensional data encoding device.

For example, quantized value QP4 of N0-th attribute information is calculated according to QP4=QP3+ADelta_QP[0]. Each ADelta_QP[i] may be the difference value with respect to QPbase, like QP4=QPbase+ADelta_QP[0].

FIG. 73 is a diagram showing a syntax example of an attribute information header (attribute header information) in the case where the example shown in FIG. 72 is used. The attribute information header shown in FIG. 73 is basically the same as the attribute information header shown in FIG. 63 but differs in that RAHT layers are used instead of LoD layers.

NumADelta indicates the number of all ADelta_QP included in the bitstream. NumPointADelta[i] indicates an identification number of three-dimensional point A to which ADelta_QP[i] is applied. For example, NumPointADelta[i] indicates the number of the three-dimensional points from the leading three-dimensional point to three-dimensional point A in the encoding/decoding order. NumPointADelta[i] may also indicates the number of the three-dimensional points from the first three-dimensional point to three-dimensional point A in the layer to which three-dimensional point A belongs.

Alternatively, NumPointADelta[i] may indicate the difference value between the identification number of the three-dimensional point indicated by NumPointADelta[i−1] and the identification number of three-dimensional point A. In this way, the value of NumPointADelta[i] can be reduced, so that the code amount can be reduced.

FIG. 74 is a diagram showing another syntax example of an attribute information header (attribute header information) in the case where the example shown in FIG. 72 is used. Note that the attribute information header shown in FIG. 74 is basically the same as the attribute information header shown in FIG. 64 but differs in that RAHT layers are used instead of LoD layers.

additional_delta_QP_present_flag is a flag that indicates whether ADelta_QP is included in the bitstream or not. For example, a value of 1 indicates that ADelta_QP is included in the bitstream, and a value of 0 indicates that ADelta_QP is not included in the bitstream. When additional_delta_QP_present_flag is 0, the three-dimensional data decoding device performs the following decoding process by setting ADelta_QP to be 0, for example.

NumADelta_minus1 indicates the number of all ADelta_QP included in the bitstream minus 1. In this way, by adding the value obtained by subtracting 1 from the number of ADelta_QP to the header, the code amount of the header can be reduced. For example, the three-dimensional data decoding device calculates NumADelta=NumADelta_minus1+1. ADelta_QP[i] indicates the value of i-th ADelta_QP. Note that ADelta_QP[i] can be set to be not only a positive value but also a negative value.

FIG. 75 is a flowchart of a three-dimensional data encoding process in the case where RAHT is used. First, the three-dimensional data encoding device encodes geometry information (geometry) (S7061). For example, the three-dimensional data encoding device performs the encoding using an octree representation.

The three-dimensional data encoding device then transforms attribute information (S7062). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7063). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

FIG. 76 is a flowchart of the attribute information encoding process (S7063). First, the three-dimensional data encoding device generates a coding coefficient from attribute information by Haar transformation (S7071).

The three-dimensional data encoding device then applies quantization to the coding coefficient (S7072). The three-dimensional data encoding device then generates encoded attribute information (bitstream) by encoding the quantized coding coefficient (S7073).

The three-dimensional data encoding device then determines ΔQP (S7074). Note that the method of determining ΔQP is the same as step S7019 in the case where LoD layers are used. Determined ΔQP is used for determining a quantization parameter used for quantization of a subsequent coding coefficient.

The three-dimensional data encoding device applies inverse quantization to the quantized coding coefficient (S7075). The three-dimensional data encoding device then decodes the attribute information by applying inverse Haar transformation to the inverse-quantized coding coefficient (S7076). For example, the decoded attribute information is referred to in the subsequent encoding.

FIG. 77 is a flowchart of a three-dimensional data decoding process in the case where RAHT is used. First, the three-dimensional data decoding device decodes geometry information (geometry) from the bitstream (S7065). For example, the three-dimensional data decoding device performs the decoding using an octree representation.

The three-dimensional data decoding device then decodes attribute information from the bitstream (S7066). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device decodes the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

Figure 78:
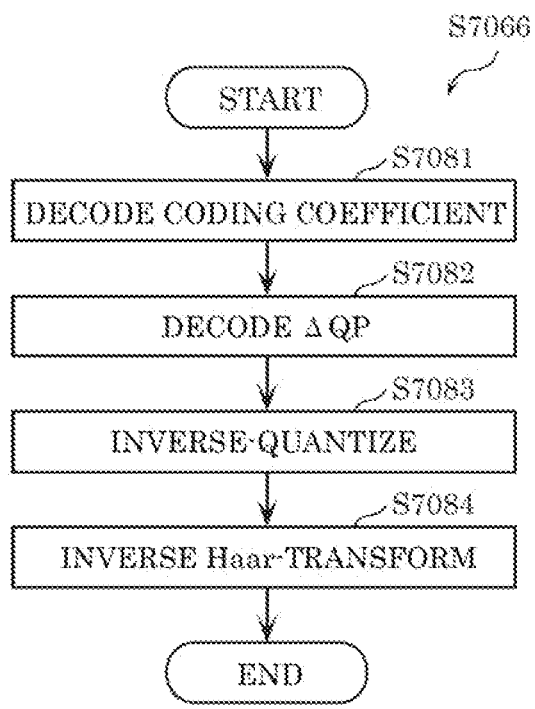
FIG. 78 is a flowchart of an attribute information decoding process according to Embodiment 8.

FIG. 78 is a flowchart of the attribute information decoding process (S7066). First, the three-dimensional data decoding device decodes the coding coefficient from the bitstream (S7081). The three-dimensional data decoding device then decodes ΔQP from the bitstream (S7082). Specifically, the three-dimensional data decoding device decodes Delta_Layer, ADelta_QP, and NumPointADelta from the header of the bitstream.

The three-dimensional data decoding device then applies inverse quantization to the coding coefficient (S7083). In this inverse quantization, a quantization parameter calculated using ΔQP obtained in step S7082 is used. The three-dimensional data decoding device then decodes the attribute information by applying inverse Haar transformation to the inverse-quantized coding coefficient (S7084).

Figure 79:
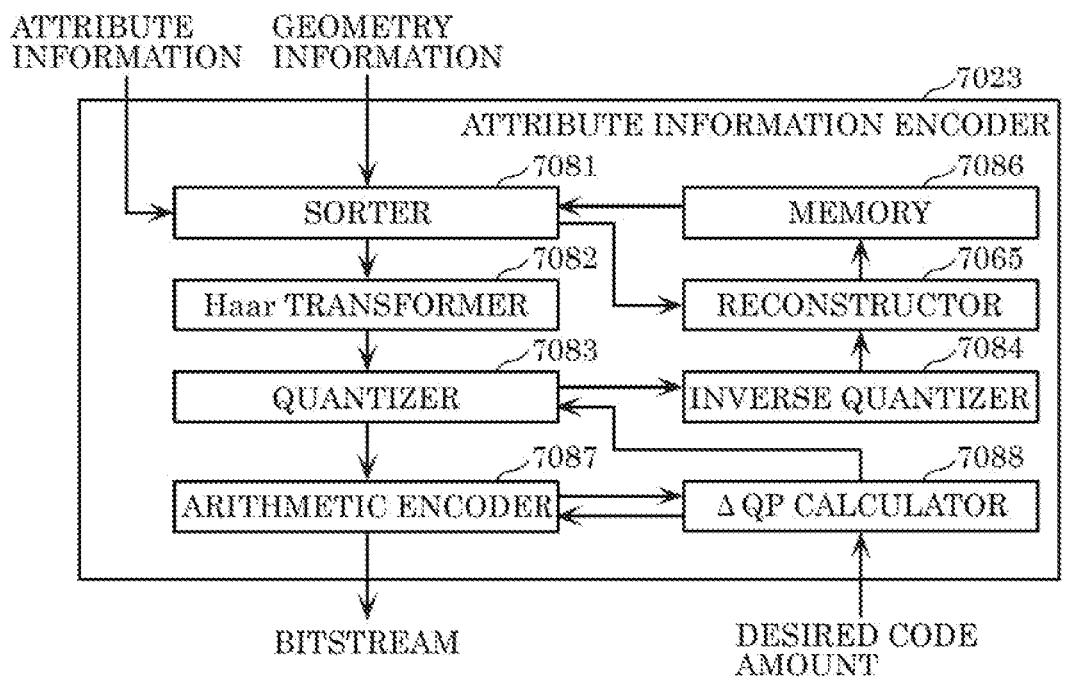
FIG. 79 is a block diagram of an attribute information encoder according to Embodiment 8.

FIG. 79 is a block diagram of attribute information encoder 7023 in the case where RAHT is used. Attribute information encoder 7023 includes sorter 7081, Haar transformer 7082, quantizer 7083, inverse quantizer 7084, inverse Haar transformer 7085, memory 7086, arithmetic encoder 7087, and ΔQP calculator 7088.

Sorter 7081 generates a Morton code using geometry information on a three-dimensional point, and sorts a plurality of three-dimensional points in the order of Morton codes. Haar transformer 7082 generates a coding coefficient by applying Haar transformation to attribute information. Quantizer 7083 quantizes the coding coefficient of the attribute information.

Inverse quantizer 7084 inverse-quantizes the quantized coding coefficient. Inverse Haar transformer 7085 applies inverse Haar transformation to the coding coefficient. Memory 7086 stores values of the decoded attribute information on the plurality of three-dimensional points. For example, the decoded attribute information on the three-dimensional points stored in memory 7086 may be used for prediction or the like of a three-dimensional point yet to be encoded.

Arithmetic encoder 7087 calculates ZeroCnt from the quantized coding coefficient, and arithmetically encodes ZeroCnt. Arithmetic encoder 7087 also arithmetically encodes any quantized coding coefficient that is not zero. Arithmetic encoder 7087 may binarize the coding coefficient before the arithmetic encoding. Arithmetic encoder 7087 may generate and encode various kinds of head information.

ΔQP calculator 7088 determines values of Delta_Layer, ADelta_QP, and NumPointADelta from the actual code amount obtained by arithmetic encoder 7087 and the pre-determined desired code amount. The quantization by quantizer 7083 is performed using a quantization parameter based on the determined Delta_Layer, ADelta_QP, and NumPointADelta. Arithmetic encoder 7087 arithmetically encodes Delta_Layer, ADelta_QP, and NumPointADelta and adds these values to the bitstream.

FIG. 80 is a block diagram of attribute information decoder 7043 in the case where RAHT is used. Attribute information decoder 7043 includes arithmetic decoder 7091, inverse quantizer 7092, inverse Haar transformer 7093, and memory 7094.

Arithmetic decoder 7091 arithmetically decodes ZeroCnt and the coding coefficient included in the bitstream. Arithmetic decoder 7091 may decode various kinds of header information. Arithmetic decoder 7091 also decodes Delta_Layer, ADelta_QP, and NumPointADelta from the header of the bitstream.

Inverse quantizer 7092 inverse-quantizes the arithmetically decoded coding coefficient. Specifically, inverse quantizer 7092 performs the inverse quantization using a quantization parameter based on the decoded Delta_Layer, ADelta_QP, and NumPointADelta.

Inverse Haar transformer 7093 applies inverse Haar transformation to the inverse-quantized coding coefficient. Memory 7094 stores values of the decoded attribute information on the plurality of three-dimensional points. For example, the decoded attribute information on the three-dimensional points stored in memory 7094 may be used for prediction of a three-dimensional point yet to be decoded.

In the following, a variation of this embodiment will be described. The three-dimensional data encoding device may encode a quantization parameter of attribute information on each three-dimensional point as new attribute information.

In the following, an example of a process performed by the three-dimensional data encoding device in this case will be described. The three-dimensional data encoding device encodes attribute information A (such as color) by calculating a quantization parameter according to the flow shown in FIG. 66. In this process, as a new attribute value of each three-dimensional point, the three-dimensional data encoding device encodes the quantization parameter used. In this case, the three-dimensional data encoding device may perform the encoding by changing the value of the quantization parameter for each three-dimensional point. For example, if the cumulative code amount is greater than the value of the desired code amount×TH1, the three-dimensional data encoding device can set the value of the quantization parameter to be greater, in order to reduce the actual code amount. If the cumulative code amount is smaller than the value of the desired code amount×TH3, the three-dimensional data encoding device can set the value of the quantization parameter to be smaller, in order to increase the actual code amount.

After the encoding of attribute information A, the three-dimensional data encoding device encodes the quantization parameter assigned to each three-dimensional point as new attribute information A'. In this process, the three-dimensional data encoding device may apply lossless encoding to prevent losing of the amount of information on the quantization parameters. The three-dimensional data encoding device may add, to the header or the like, information that indicates that the encoded attribute information is a quantization parameter. In this way, the three-dimensional data decoding device can properly decode the quantization parameter used by the three-dimensional data encoding device.

When performing predictive encoding of attribute information using N three-dimensional points in the periphery of a current three-dimensional point, the three-dimensional data encoding device may encode a quantization parameter on the supposition that N=1. In this way, the calculation amount can be reduced.

Next, an example of a process performed by the three-dimensional data decoding device will be described. First, the three-dimensional data decoding device decodes attribute information A' among the attribute information in the bitstream to obtain a quantization parameter used for the decoding of attribute information A. The three-dimensional data decoding device then decodes attribute information A using the decoded quantization parameter.

Note that the three-dimensional data encoding device may encode, as new attribute information A', ΔQP, which is the amount of change of the quantization parameter between three-dimensional points, instead of the quantization parameter described above. When ΔQP assumes a positive or negative value, the three-dimensional data encoding device may transform signed ΔQP into a positive value before encoding ΔQP as described below. When signed ΔQP (deltaQP_s) is smaller than 0, unsigned ΔQP (deltaQP_u) is set to be −1−(2×deltaQP_s). When signed ΔQP (deltaQP_s) is equal to or greater than 0, unsigned ΔQP (deltaQP_u) is set to be 2×deltaQP_s.

The three-dimensional data encoding device may encode, as attribute information, a quantization parameter used for encoding of each attribute information. For example, the three-dimensional data encoding device may encode a quantization parameter of attribute information A on color as attribute information A', and encode a quantization parameter of attribute information B on reflectance as attribute information B'. In this way, the quantization parameter can be changed for each attribute information. For example, if the quantization parameter of attribute information having higher priority is set to be smaller, and the quantization parameter of attribute information having lower priority is set to be greater, the total code amount can be reduced while preserving the attribute information having higher priority.

When quantizing and encoding a prediction residual for attribute information on a three-dimensional point, if delta_Layer_present_flag, additional_delta_QP_present_flag and the like indicate that Delta_Layer and ADelta_QP are set in the header, the three-dimensional data encoding device need not use the value of a quantization weight (QW) that indicates the importance of a three-dimensional point. For example, when QW is used, the quantization parameter is set to be smaller when QW is greater (the importance is higher). In this way, it can be chosen whether to perform the quantization based on the importance determined by an internal process such as prediction or based on a value set in the header by the user, so that the two manners can be selectively used depending on the purpose of the user.

The three-dimensional data encoding device may add, to the header, a flag that indicates whether to use the value of the quantization weight (QW) or not. In this way, it can be chosen whether to perform the quantization by combining the values of Delta_Layer and ADelta_QP and QW or not, the two manners can be selectively used depending on the purpose of the user.

When quantizing and encoding a transformation coefficient for attribute information on a three-dimensional point using RAHT or the like, if delta_Layer_present_flag, additional_delta_QP_present_flag and the like indicate that Delta_Layer and ADelta_QP are set in the header, the three-dimensional data encoding device need not use the value of the quantization weight (QW). In this way, it can be chosen whether to perform the quantization based on the importance determined by an internal process such as prediction or based on a value set in the header by the user, so that the two manners can be selectively used depending on the purpose of the user. Furthermore, the three-dimensional data encoding device may add, to the header, a flag that indicates whether to use the value of quantization weight (QW) or not. In this way, it can be chosen whether to perform the quantization by combining the values of Delta_Layer and ADelta_QP and QW or not, the two manners can be selectively used depending on the purpose of the user.

FIG. 81 is a diagram showing a syntax example of an attribute information header (attribute header information) in this case. The attribute information header shown in FIG. 81 differs from the attribute information header shown in FIG. 64 in that the attribute information header further includes default_delta_Layer_present_flag, default_delta_Layer_index, default_additional_delta_QP_present_flag, and default_additional_delta_QP_index.

default_delta_Layer_present_flag is a flag that indicates whether to use an initially set value of Delta_Layer defined by a standard or the like or not. For example, a value of 1 indicates that initially set Delta_Layer is to be used. A value of 0 indicates that initially set Delta_Layer is not to be used. In the case of the value of 0, the three-dimensional data decoding device performs the following decoding process by setting Delta_Layer to be 0, for example.

default_delta_Layer_index is information that allows identification of Delta_Layer to be used among one or more initially set values of Delta_Layer defined by a standard or the like. For example, default_delta_Layer_index is defined as described below.

When default_delta_Layer_index=0, Delta_Layer for all layers is set to be 1. That is, the value of the quantization parameter increases by 1 every time a layer is incremented. When default_delta_Layer_index=1, Delta_Layer for all layers is set to be 2. That is, the value of the quantization parameter increases by 2 every time a layer is incremented.

If an initially set Delta_Layer is defined by a standard or the like in this way, the quantization parameter can be changed without adding the value of Delta_Layer to the header, so that the code amount of the header can be reduced.

default_additional_delta_QP_present_flag is a flag that indicates whether to use an initially set value of ADelta_QP defined by a standard or the like or not. For example, a value of 1 indicates that initially set ADelta_QP is to be used. A value of 0 indicates that initially set ADelta_QP is not to be used. In the case of the value of 0, the three-dimensional data decoding device performs the following decoding process by setting ADelta_QP to be 0, for example.

default_additional_delta_QP_index is information that allows identification of ADelta_QP to be used among one or more values of initially set ADelta_QP defined by a standard or the like. For example, default_additional_delta_QP_index is defined as described below.

When default_additional_delta_QP_index=0, ADelta_QP is set to be 1 every N three-dimensional points. That is, the value of the quantization parameter increases by 1 each time N three-dimensional points are encoded or decoded. Note that the three-dimensional data encoding device may additionally add information indicating N to the header.

When default_additional_delta_QP_index=1, ADelta_QP is set to be 2 every N three-dimensional points. That is, the value of the quantization parameter increases by 2 each time N three-dimensional points are encoded or decoded. Note that the three-dimensional data encoding device may additionally add information indicating N to the header.

If an initially set ADelta_QP is defined by a standard or the like in this way, the quantization parameter can be changed without adding the value of ADelta_QP to the header, so that the code amount of the header can be reduced.

Embodiment 9

Figure 82:
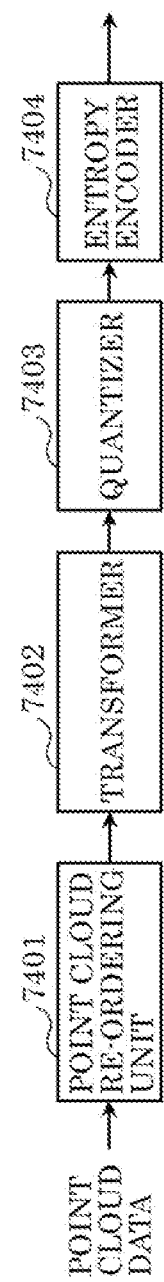
FIG. 82 is a diagram for illustrating a schematic configuration of an attribute information encoder according to Embodiment 9.
Figure 83:
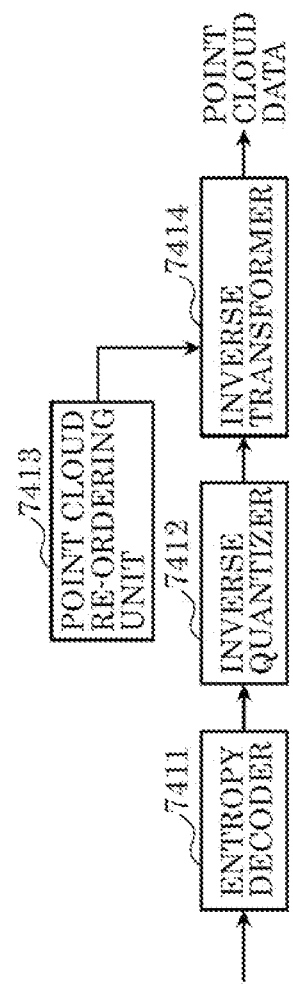
FIG. 83 is a diagram for illustrating a schematic configuration of an attribute information decoder according to Embodiment 9.

FIG. 82 is a diagram for illustrating a schematic configuration of an attribute information encoder according to this embodiment. FIG. 83 is a diagram for illustrating a schematic configuration of an attribute information decoder according to this embodiment.

To improve the coding efficiency, attribute information in the point cloud compression (PCC) is transformed in various manners (such as lifting, RAHT, or other transformation processes). The transformation process has a strong "energy compression" property. As a result of the transformation process, important signal information is included in a low frequency component. A high frequency component is quantized in order to reduce the number of bits that occur.

In this embodiment, in order to further improve the coding efficiency, that is, in order to minimize the high frequency components that are to be transformed by maximizing the relationship between the positions of three-dimensional points, the three-dimensional data encoding device modifies the order of the three-dimensional points in input point cloud data (referred to also simply as a point cloud, hereinafter) or, more specifically, the order of the transformation process performed on the three-dimensional points by using geometry information.

First, point cloud re-ordering unit 7401 of the three-dimensional data encoding device performs a process (re-ordering process (re-ordering)) of modifying the order of the three-dimensional points in input point cloud data, in which a plurality of three-dimensional points are arranged in a predetermined order. For example, pieces of data that indicate the three-dimensional points in a point cloud input to the three-dimensional data encoding device are arranged in a predetermined order. Point cloud re-ordering unit 7401 re-orders the pieces of data indicating the three-dimensional points in the input point cloud in a predetermined manner.

Transformer 7402 of the three-dimensional data encoding device then performs a transformation process (transform) on the point cloud re-ordered by the re-ordering process.

Quantizer 7403 of the three-dimensional data encoding device then performs a quantization process.

Entropy encoder 7404 of the three-dimensional data encoding device then performs an entropy encoding process. For example, entropy encoder 7404 transmits a bitstream (encoded bitstream) including encoded point cloud data to the three-dimensional data decoding device.

Entropy decoder 7411 of the three-dimensional data decoding device performs an entropy decoding process on the encoded point cloud data included in the bitstream received from the three-dimensional data encoding device, for example.

Inverse quantizer 7412 of the three-dimensional data decoding device then performs an inverse quantization process.

Inverse transformer 7414 of the three-dimensional data decoding device then performs an inverse transformation process (inverse transform).

Point cloud re-ordering unit 7413 of the three-dimensional data decoding device then performs a re-ordering process (ordering process) on the point cloud data having been subjected to the inverse transformation process. The re-ordering process here is a reverse process to the re-ordering process in the three-dimensional data encoding device. By re-ordering the decoded point cloud data in this way, the three-dimensional data decoding device can generate point cloud data in which the three-dimensional points are arranged in the same order as those in the point cloud data input to the three-dimensional data encoding device. The three-dimensional data decoding device transmits (outputs) the point cloud data subjected to the re-ordering process to another device, for example. In this way, the other device can obtain point cloud data in which the three-dimensional points are arranged in the same order as those in the point cloud data input to the three-dimensional data encoding device.

Note that the three-dimensional data decoding device may perform the re-ordering process for the point cloud in the same manner as in the three-dimensional data encoding device after performing the inverse transformation process.

For example, the three-dimensional data encoding device performs the re-ordering process by generating re-ordering information that indicates the order of points in a point cloud re-ordered using geometry information obtained by encoding and decoding of the point cloud. For example, the three-dimensional data decoding device performs the re-ordering process by generating re-ordering information in the same manner as in the three-dimensional data encoding device using the decoded geometry information.

In this way, the three-dimensional data decoding device can generate and output a point cloud (point cloud data) in which pieces of data are arranged in the same order as the pieces of data in the point cloud input to the three-dimensional data encoding device.

Note that when the three-dimensional data decoding device does not need to generate a point cloud arranged in the same order as the point cloud input to the three-dimensional data encoding device, the three-dimensional data decoding device can omit the re-ordering process.

In this way, the three-dimensional data decoding device can reduce the processing amount.

The three-dimensional data encoding device may add the re-ordering information to the bitstream. The re-ordering information is information that indicates the data order of pieces of attribute information on a plurality of three-dimensional points in the point cloud data input to the three-dimensional data encoding device (that is, the point cloud data yet to be re-ordered). The three-dimensional data decoding device may perform the re-ordering process based on the re-ordering information decoded from the bitstream. In this way, the three-dimensional data decoding device can reduce the amount of processing for generating the re-ordering information.

The method of modifying the ordering of the point cloud is not limited to the method described above.

Figure 84:
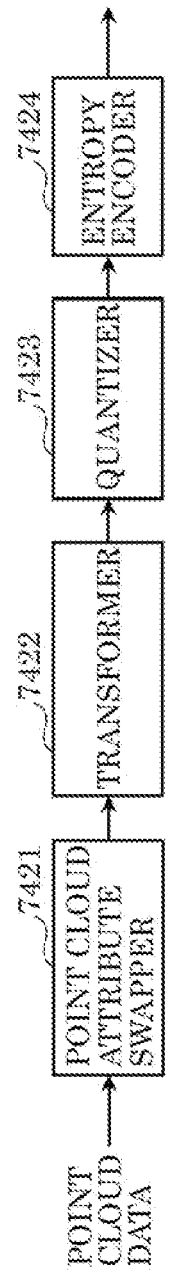
FIG. 84 is a diagram for illustrating a schematic configuration of an attribute information encoder according to a variation of Embodiment 9.
Figure 85:
FIG. 85 is a diagram for illustrating a schematic configuration of an attribute information decoder according to a variation of Embodiment 9.

FIG. 84 is a diagram for illustrating a schematic configuration of an attribute information encoder according to a variation of this embodiment. FIG. 85 is a diagram for illustrating a schematic configuration of an attribute information decoder according to a variation this embodiment.

To improve the coding efficiency, attribute information in the PCC is transformed in various manners (such as lifting, RAHT, or other transformation processes). The transformation process has a strong "energy compression" property. As a result of the transformation process, important signal information is included in a low frequency component. A high frequency component is quantized in order to reduce the number of bits that occur.

In order to further improve the coding efficiency, the three-dimensional data encoding device modifies the order of points in an input point cloud (point cloud data) using geometry information to maximize the relationship between the positions of three-dimensional points to minimize the high frequency components that are to be transformed.

First, point cloud attribute swapper 7421 of the three-dimensional data encoding device performs a process (swapping process) of modifying the order of the pieces of attribute information on the three-dimensional points in input point cloud data (referred to also simply as a point cloud, hereinafter), in which a plurality of three-dimensional points are arranged in a predetermined order. The swapping process (swapping) is an example of the re-ordering process. For example, pieces of data that indicate the three-dimensional points in a point cloud input to the three-dimensional data encoding device are arranged in a predetermined order (such as an order of Morton codes). Point cloud attribute swapper 7421 re-orders only the pieces of attribute information in a predetermined manner, without modifying the order of the Morton codes, the pieces of geometry information or the like in the input point cloud data indicating the three-dimensional points in the point cloud, for example.

For example, point cloud attribute swapper 7421 performs the swapping process of swapping pieces of attribute information without changing the Morton codes assigned to the three-dimensional points, before performing the transformation process for the attribute information of the point cloud.

For example, when Morton codes 0, 1, and 2 are assigned to three-dimensional points A, B, and C, respectively, if the three-dimensional data encoding device determines that point A and point C are close to each other based on the geometry information or the like, the three-dimensional data encoding device performs a swapping process of swapping pieces of attribute information on point B and point C before performing a transformation process, such as RAHT, using the attribute information on point A and point B.

In this way, the three-dimensional data encoding device can reduce the coefficient of a high frequency component subjected to the transformation process, and therefore can improve the coding efficiency.

Note that the three-dimensional data encoding device may add, to the header or the like of the bitstream, swapping information that indicates the way in which the three-dimensional points have been swapped.

In this way, the three-dimensional data decoding device can appropriately reassign the pieces of attribute information to the three-dimensional points (that is, perform the re-ordering process) using the swapping information decoded from the header of the bitstream after the inverse transformation process.

Note that the three-dimensional data encoding device may add the swapping information to the header using variable length encoding or the like.

In this way, the three-dimensional data encoding device can reduce the header amount.

Transformer 7422 of the three-dimensional data encoding device then performs a transformation process on the point cloud re-ordered by the swapping process.

Quantizer 7423 of the three-dimensional data encoding device then performs a quantization process.

Entropy encoder 7424 of the three-dimensional data encoding device then performs an entropy encoding process. For example, entropy encoder 7424 transmits a bitstream including encoded point cloud data to the three-dimensional data decoding device.

Entropy decoder 7431 of the three-dimensional data decoding device performs an entropy decoding process on the encoded point cloud data included in the bitstream received from the three-dimensional data encoding device, for example.

Inverse quantizer 7432 of the three-dimensional data decoding device then performs an inverse quantization process.

Inverse transformer 7433 of the three-dimensional data decoding device then performs an inverse transformation process.

After the inverse transformation process is performed, point cloud attribute swapper 7434 of the three-dimensional data decoding device then performs a swapping process of swapping pieces of attribute information in the same manner as in the three-dimensional data encoding device, for example.

For example, when Morton codes 0, 1, and 2 are assigned to decoded three-dimensional points A, B, and C, respectively, if the three-dimensional data decoding device determines that point A and point C are close to each other based on the decoded geometry information or the like, the three-dimensional data decoding device swaps the pieces of decoded attribute information on point B and point C with each other.

In this way, the three-dimensional data decoding device can decode three-dimensional points with appropriate attribute information assigned thereto. The three-dimensional data decoding device can also generate and output a point cloud (point cloud data) in which pieces of data are arranged in the same order as the pieces of data in the point cloud input to the three-dimensional data encoding device.

Note that when the three-dimensional data decoding device does not need to generate a point cloud arranged in the same order as the point cloud input to the three-dimensional data encoding device, the three-dimensional data decoding device can omit the swapping process.

In this way, the three-dimensional data decoding device can reduce the processing amount.

The three-dimensional data encoding device may add the swapping information to the bitstream. The three-dimensional data decoding device may perform the swapping process based on the swapping information decoded from the bitstream.

In this way, the three-dimensional data decoding device can reduce the amount of processing for generating the swapping information.

FIG. 86 is a diagram for illustrating the re-ordering process according to this embodiment. Specifically, part (a) of FIG. 86 is a diagram showing an example of a plurality of voxels (specifically, eight voxels) and Morton codes assigned to the plurality of voxels. Part (b) of FIG. 86 is a diagram showing another example of a plurality of voxels (specifically, eight voxels) and Morton codes assigned to the plurality of voxels. Part (c) of FIG. 86 is a diagram showing an example of an ordering of a point cloud obtained by modifying the ordering of the point cloud shown in part (b) of FIG. 86.

In each of parts (a) and (b) of FIG. 86, the left part shows the plurality of voxels, and the right part shows the ordering of the point cloud. Note that the ordering of the point cloud is indicated by Morton codes.

As shown in parts (a) and (b) of FIG. 86, for example, the point cloud is arranged in a Z order or Morton order before the transformation process is performed. Here, in part (b) of FIG. 86, for example, in order to effectively perform the transformation process, the three-dimensional data encoding device performs the re-ordering process to further re-order the point cloud arranged in a Morton order based on the geometry information on the three-dimensional points as shown in part (c) of FIG. 86, for example.

Part (a) of FIG. 86 shows an example of a point cloud arranged in a Morton order. Specifically, the example shown in part (a) of FIG. 86 is an example in which each voxel includes one three-dimensional point. In this case, for example, the Morton order of the point cloud is 0, 1, 2, 3, 4, 5, 6, 7, and the point cloud is arranged in this order.

On the other hand, part (b) of FIG. 86 shows a Morton order in the case where all the voxels are not occupied by a three-dimensional point. Specifically, voxel 1 and voxel 2 are not occupied by any three-dimensional point. In this case, for example, the Morton order of the point cloud is 0, 3, 4, 5, 6, 7, and the point cloud is arranged in this order.

The attribute information concerning the position of a three-dimensional point is obtained from the surface of a three-dimensional object, for example. Therefore, attribute information on three-dimensional points (closest three-dimensional points) whose surfaces are the closest to each other are highly correlated to each other. That is, attribute information on three-dimensional points that are close to each other are likely to have values close to each other. Therefore, the three-dimensional data encoding device performs the re-ordering process of re-ordering the point cloud so that such three-dimensional points at close positions are brought closer to each other, before performing the transformation process. For example, the three-dimensional data encoding device re-orders the point cloud from the order of 0, 3, 4, 5, 6, 7 shown in part (b) of FIG. 86 to the order of 0, 4, 3, 5, 6, 7 shown in part (c) of FIG. 86. That is, the three-dimensional data encoding device swaps the positions of the pieces of data (geometry information, attribute information or the like) on the three-dimensional point assigned with a Morton code of 3 and the three-dimensional point assigned with a Morton code of 4 with each other.

Note that the "re-ordering process" in this example may refer to a process of generating re-ordering information that indicates the order of a new point cloud generated by performing the re-ordering process on a point cloud arranged in a Morton order using distance information, geometry information or the like on three-dimensional points, for example.

Figure 87:
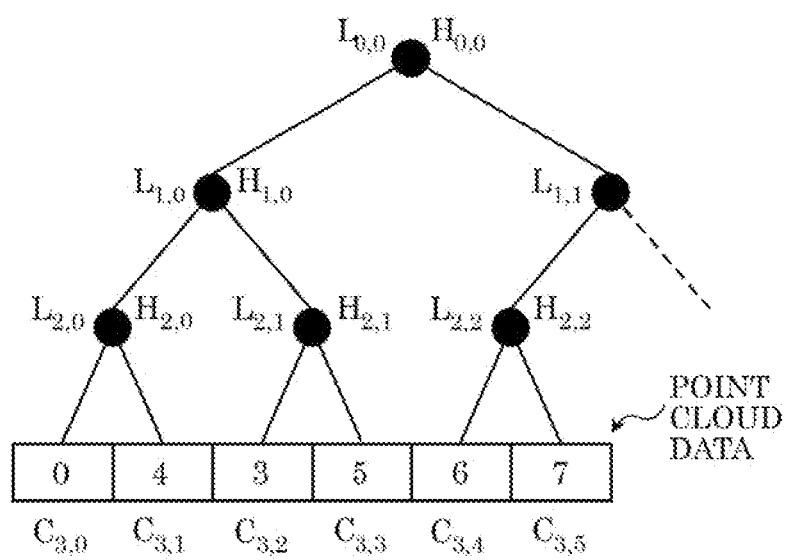
FIG. 87 is a diagram for illustrating a first example of a transformation process for attribute information according to Embodiment 9.

FIG. 87 is a diagram for illustrating a first example of the transformation process for attribute information according to this embodiment. FIG. 87 shows a hierarchical structure with which the three-dimensional data encoding device performs the transformation process, for example.

The three-dimensional data encoding device performs the transformation process on the point cloud subjected to the re-ordering process. The transformation process is RAHT (region adaptive Haar transformation), for example.

The transformation process is expressed by the following formula (Equation M1), for example.

[Math. 2]

$$\begin{bmatrix} L_{l,m} \\ H_{l,m} \end{bmatrix} = \begin{bmatrix} \alpha & \beta \\ -\beta & \alpha \end{bmatrix} \begin{bmatrix} C_{l+1,2m} \\ C_{l+1,2m+1} \end{bmatrix} \quad \text{(Equation M1)}$$

$\alpha$ and $\beta$ each represent an arbitrary number, and coefficients (transformation coefficients) represented by $\alpha$ and $\beta$ can be updated. l represents a value that indicates a level of a layer. m represents a value that indicates the order of three-dimensional points in each layer. Cl, m represents a value that indicates attribute information on the m-th three-dimensional point at level l.

A low pass sub-band (low frequency component) at level l is expressed by the following formula (Equation M2).

[Math. 3]

$$L_{l,m} = \alpha C_{l+1,2m} + \beta C_{l+1,2m+1} \quad \text{(Equation M2)}$$

A high pass sub-band (high frequency component) at level l is expressed by the following formula (Equation M3).

[Math. 4]

$$H_{l,m} = \alpha C_{l+1,2m+1} - \beta C_{l-1,2m} \quad \text{(Equation M3)}$$

The high pass sub-band is quantized and entropy-encoded. On the other hand, the low pass sub-band is moved to the next level as shown by the following formula (Equation M4).

[Math. 5]

$$C_{l,m} = L_{l,m}. \quad \text{(Equation M4)}$$

For example, the low pass sub-band and the high pass sub-band for 0-th(m=0) at level l=2 is expressed by the following formulas (Equation M5) and (Equation M6), respectively.

[Math. 6]

$$L_{2,0} = \alpha C_{3,0} + \beta C_{3,1} \quad \text{(Equation M5)}$$

$$H_{2,0} = \alpha C_{3,1} - \beta C_{3,0} \quad \text{(Equation M6)}$$

For example, when the positions of three-dimensional points are close to each other, such as those having attribute information C3,0 and attribute information C3,1, those pieces of attribute information are likely to be similar (or likely to have similar attribute values). Therefore, H, which is the value of the high pass sub-band calculated from the difference between the attribute information C3, 0 and the attribute information C3, 1, is likely to be small.

Figure 88:
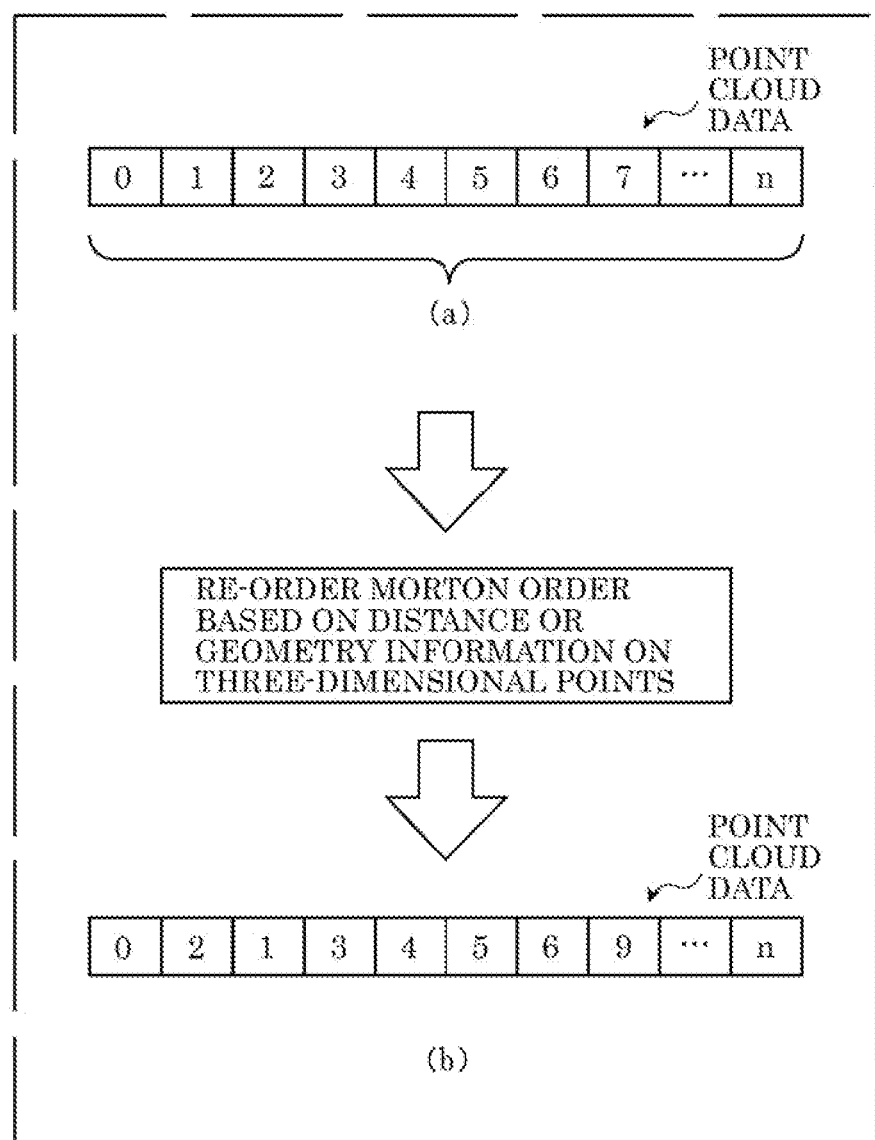
FIG. 88 is a diagram for illustrating a second example of the transformation process for attribute information according to Embodiment 9.

FIG. 88 is a diagram for illustrating a second example of the transformation process for attribute information according to this embodiment. Specifically, part (a) of FIG. 88 is a diagram showing an ordering of point cloud data yet to be subjected to the re-ordering process, and part (b) of FIG. 88 is a diagram showing an ordering of point cloud data obtained by performing the re-ordering process on the point cloud data shown in part (a) of FIG. 88.

In order to further improve the coding efficiency of attribute information, for example, the three-dimensional data encoding device performs the re-ordering process on attribute information based on distance or geometry information on three-dimensional points.

For example, as shown in part (a) of FIG. 88, it is assumed that (n+1) pieces of point data are arranged in ascending order of Morton codes of 0 to n.

For example, the three-dimensional data encoding device performs the re-ordering process of re-ordering the order of the Morton codes (that is, the pieces of data on three-dimensional points) based on distance or geometry information on three-dimensional points.

In this way, for example, the three-dimensional data encoding device generates new point cloud data in which the position of the data on the three-dimensional point assigned with a Morton code of 1 and the position of the data on the three-dimensional point assigned with a Morton code of 2 are swapped with each other, and the position of the data on the three-dimensional point assigned with a Morton code of 7 and the position of the data on the three-dimensional point assigned with a Morton code of 9 are swapped with each other.

Alternatively, the three-dimensional data encoding device may perform the re-ordering process of modifying the order of the pieces of attribute information, and retain re-ordering information that allows encoding and decoding as additional information (Meta data).

Figure 89:
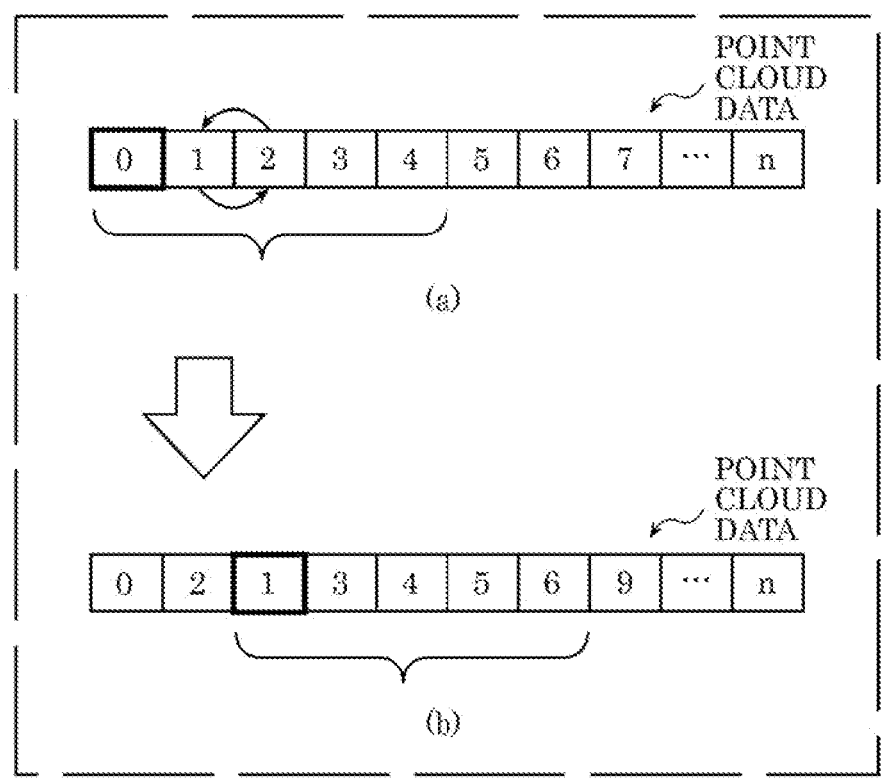
FIG. 89 is a diagram for illustrating a third example of the transformation process for attribute information according to Embodiment 9.

FIG. 89 is a diagram for illustrating a third example of the transformation process for attribute information according to this embodiment. Part (a) of FIG. 89 is a diagram showing an ordering of point cloud data yet to be subjected to the re-ordering process, and part (b) of FIG. 89 is a diagram showing an ordering of point cloud data obtained by performing the re-ordering process on the point cloud data shown in part (a) of FIG. 89. Note that FIG. 89 is a diagram showing an example in which a point cloud is re-ordered based on the distances (distance information) between three-dimensional points. For example, as shown in part (a) of FIG. 89, it is assumed that (n+1) pieces of point data are arranged in ascending order of Morton codes of 0 to n.

First, the three-dimensional data encoding device designates the three-dimensional point located at position 0 (that is, the three-dimensional point assigned with a Morton code of 0) as a reference point, and searches (by calculation) k three-dimensional points neighboring to the reference point (k=5 in this example) for the three-dimensional point closest to the reference point (closest three-dimensional point). In this example, it is assumed that the three-dimensional point located at position 2 is the three-dimensional point closest to position 0. In this case, for example, the three-dimensional data encoding device moves the data on the three-dimensional point located at position 2 to next to position 0, which is the position of the reference point.

Note that the three-dimensional data encoding device may add k, which indicates the number of the three-dimensional points in the search range, to the header of the bitstream.

In this way, the three-dimensional data decoding device can perform the re-ordering process for the three-dimensional points using the same search range as the three-dimensional data encoding device by decoding search range k included in the header of the bitstream.

The three-dimensional data encoding device then designates the three-dimensional point located at position 1 as a reference point, and searches k three-dimensional points neighboring to the reference point for the closest three-dimensional point. In this example, it is assumed that the three-dimensional point located at position 3 is the three-dimensional point closest to position 1. In this case, for example, the data on the three-dimensional point located at position 3 is located next to the data on the three-dimensional point located at position 1, which is the reference point, so that the three-dimensional data encoding device then designates the three-dimensional point located at position 3 as a new reference point, and searches for the three-dimensional point closest to the new reference point.

As described above, the three-dimensional data encoding device performs the setting of a reference point and the searching for the three-dimensional point closest to the set reference point until the three-dimensional point located at position n is reached, for example.

Figure 90:
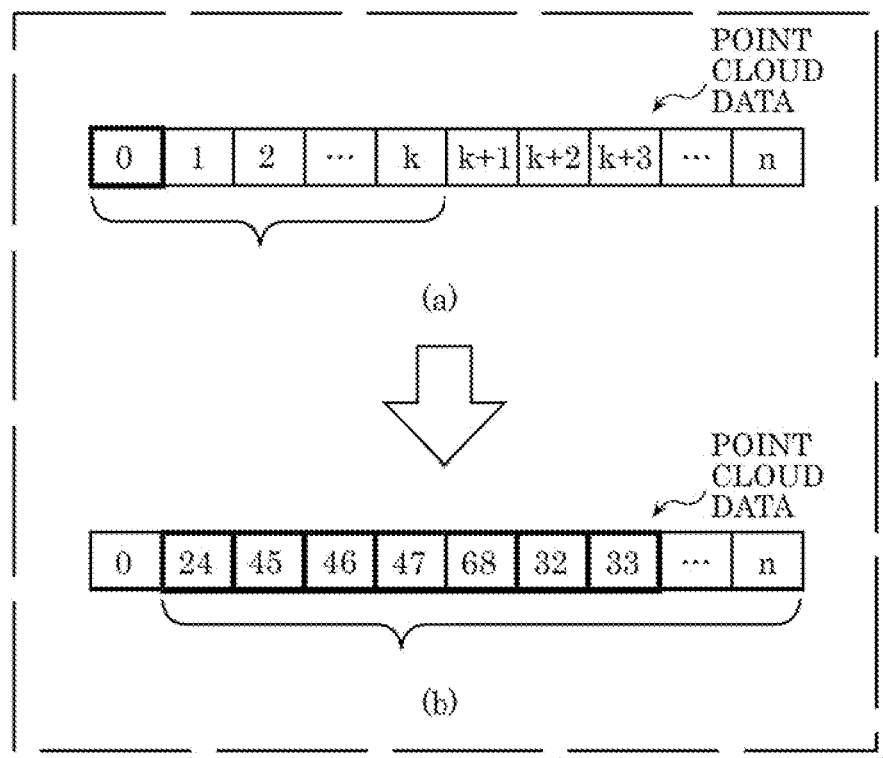
FIG. 90 is a diagram for illustrating a fourth example of the transformation process for attribute information according to Embodiment 9.

FIG. 90 is a diagram for illustrating a fourth example of the transformation process for attribute information according to this embodiment. Part (a) of FIG. 90 is a diagram showing an ordering of point cloud data yet to be subjected to the re-ordering process, and part (b) of FIG. 90 is a diagram showing an ordering of point cloud data obtained by performing the re-ordering process on the point cloud data shown in part (a) of FIG. 90.

Note that FIG. 90 is a diagram showing an example in which a point cloud is re-ordered based on the distances (distance information) between three-dimensional points. For example, as shown in part (a) of FIG. 90, it is assumed that (n+1) pieces of point data are arranged in ascending order of Morton codes of 0 to n.

First, the three-dimensional data encoding device designates the three-dimensional point located at position 0 as a reference point, and searches k three-dimensional points close to the reference point for the closest three-dimensional point. In this example, it is assumed that the three-dimensional point located at position 24 is the three-dimensional point closest to position 0.

For example, the three-dimensional data encoding device then designates the three-dimensional point located at position 24 as a reference point, and searches k three-dimensional points close to the reference point for the closest three-dimensional point. The three-dimensional data encoding device performs the re-ordering process described above for all the three-dimensional points one by one.

Note that the three-dimensional data encoding device may perform the re-ordering process for the point cloud based on Morton codes. Alternatively, the three-dimensional data encoding device may perform the re-ordering process only on the attribute information on the three-dimensional points, and maintain the positions of the Morton codes. Alternatively, the three-dimensional data encoding device may generate swapping table information (referred to also as a re-ordering table), which is swapping information on a point cloud that indicates the positions of the three-dimensional points in the point cloud yet to be subjected to the re-ordering process.

As described above, for example, the three-dimensional data encoding device performs the re-ordering process on a point cloud based on three-dimensional distances. For example, as shown in part (a) of FIG. 90, it is assumed that (n+1) pieces of point data are arranged in ascending order of Morton codes of 0 to n. For example, the three-dimensional data encoding device designates the three-dimensional point located at position 0 as a reference point, and searches k three-dimensional points close to the reference point for the closest three-dimensional point.

The three-dimensional data encoding device then expresses $X0=(x0, y0, z0)$ for the three-dimensional point at position 0 as $Xi=(xi, yi, zi)$ for the three-dimensional point at position i.

Among the k three-dimensional points close to the three-dimensional point located at position 0, the three-dimensional point closest to the three-dimensional point located at position 0 can be determined by searching for the minimum value of the Euclidean distances between I three-dimensional points as shown by the following formulas (Equation M7) and (Equation M8).

[Math. 7]

$$\min_i \|X_0 - X_i\|_2, \text{ where } i \in \{1, \ldots, k\} \quad \text{(Equation M7)}$$

$$\|X_0 - X_i\|_2 = \sqrt{(x_0 - x_i)^2 + (y_0 - y_i)^2 + (z_0 - z_i)^2} \quad \text{(Equation M8)}$$

Once the closest three-dimensional point is determined, the closest three-dimensional point is moved from position i to position 1. Note that another method may be used for determining the three-dimensional distances.

Figure 91:
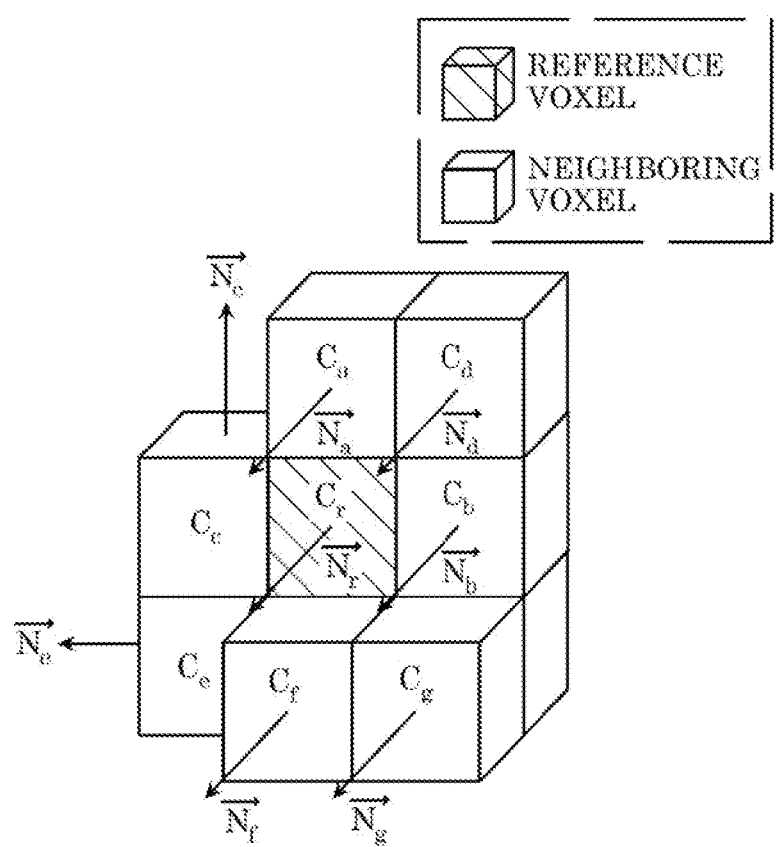
FIG. 91 is a diagram for illustrating a fifth example of the transformation process for attribute information according to Embodiment 9.
Figure 92:
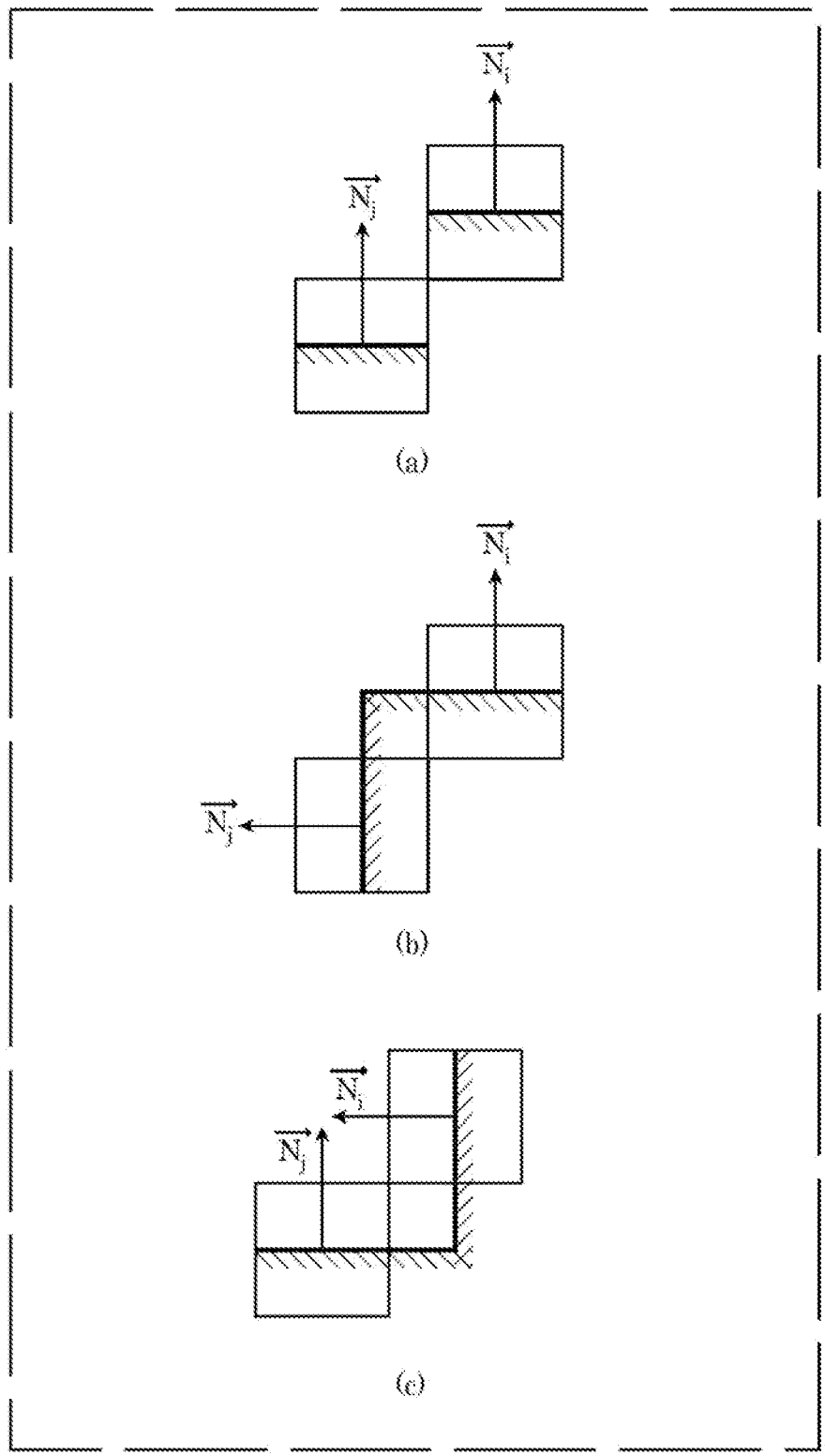
FIG. 92 is a diagram for illustrating examples of a connection between voxels and normal vectors in the examples according to Embodiment 9.

FIG. 91 is a diagram for illustrating a fifth example of the transformation process for attribute information according to this embodiment, where $N_a$, $N_b$, $N_c$, $N_d$, $N_e$, $N_f$, $N_g$, and $N_r$, are each a normal vector. FIG. 92 is a diagram for illustrating examples of a connection between voxels and normal vectors Ni and Ni in the examples according to this embodiment.

Note that FIGS. 91 and 92 are diagrams showing an example in which a point cloud is re-ordered using geometry information on three-dimensional points.

Neighboring three-dimensional points on the surface of the same object are likely to have similar attribute information, and therefore, the ordering of the point cloud data is modified so that the pieces of data on the neighboring three-dimensional points are close to each other before the transformation process in order to improve the coding efficiency. For example, a reference point (voxel) Cr that has neighboring three-dimensional points Ca, Cb, Cc, Cd, Ce, Cf, and Cg will be considered. Geometry information, such as a normal vector

[Math. 8]

$$\vec{N_r} \quad \text{(Equation M9)},$$

is used to determine a surface of a three-dimensional point.

For example, in the re-ordering process, points Ca, Cb, and Cd have a normal vector oriented in the same direction as the normal vector of point Cr and is of a connection type in which the objects of the points are connected to the object of point Cr, so that the point cloud data is re-ordered so that the pieces of data on these points are close to point Cr.

The normal vector (Equation M9) of point Cr is calculated according to the following formula (Equation M10).

[Math. 9]

$$\vec{N_r} = (C_b - C_r) \times (C_a - C_r) \quad \text{(Equation M10)}$$

Note that "×" in the formula (Equation M10) represents vector product.

Voxels may be grouped based on the normal vector and the object connection type. In that case, for example, the three-dimensional points in the point cloud data are re-ordered based on the groups resulting from the grouping.

As shown in FIG. 92, connection types include a stair-like type (Stair-like), a convex type (Convex), and a concave type (Concave), for example.

For example, the connection types described above are used for grouping for the re-ordering process. For example, three-dimensional points related in the convex connection type are grouped into the same group. On the other hand, for example, three-dimensional points related in the concave connection type or stair-like connection type are not grouped into the same group. Three-dimensional points related in the concave connection type or stair-like connection type are likely to belong to different objects or have different attribute information. For example, the concave connection type is likely to be more strongly affected by a shadow than the convex connection type. Therefore, in the grouping of a point cloud, three-dimensional points related in the concave connection type are not grouped into the same group but separated from each other.

Note that although an example has been described in which the three-dimensional data encoding device calculates perpendicular vectors (normal vectors) and uses the calculated normal vectors for the re-ordering process, the present disclosure is not necessarily limited thereto. For example, when encoding and decoding normal vectors as attribute information, the three-dimensional data encoding device may perform the re-ordering process for a point cloud by performing the grouping described above using the values of the attribute information.

Note that the three-dimensional data encoding device may generate the re-ordering information on the three-dimensional points yet to be subjected to the transformation process or the swapping information on the attribute information on the three-dimensional points using information used for encoding of the geometry information. For example, as described above, the three-dimensional data encoding device generates the re-ordering information or swapping information using neighboring node information calculated when encoding the occupancy code for each node for the geometry information.

In this example, there is a possibility that the three-dimensional data encoding device generates information that indicates that a node assigned with a Morton code of 1 is not occupied and a node assigned with a Morton code of 4 is occupied when encoding an occupancy code for a node assigned with a Morton code of 0, for example. Therefore, based on the information, the three-dimensional data encoding device may choose the node assigned with the Morton code of 4 as a pair to the node assigned with the Morton code of 0 and apply the transformation to the node. Alternatively, the attribute information on the node assigned with the Morton code of 1 and the attribute information on the node assigned with the Morton code of 4 may be swapped with each other, and the transformation process may be performed on the node assigned with the Morton code of 0 and the node assigned with the Morton code of 1.

In this way, the three-dimensional data encoding device may perform the transformation process by generating re-ordering information for three-dimensional points or swapping information for attribute information using information generated when encoding geometry information.

With such a configuration, the three-dimensional data encoding device can improve the coding efficiency while reducing the amount of processing for generation of the re-ordering information or swapping information.

The three-dimensional data decoding device may generate re-ordering information for three-dimensional points subjected to the inverse transformation process or swapping information for attribute information on three-dimensional points subjected to the inverse transformation process using information used when decoding geometry information.

For example, as described above, the three-dimensional data decoding device generates re-ordering information or swapping information using neighboring node information calculated when decoding an occupancy code for each node for geometry information.

In this example, there is a possibility that the three-dimensional data decoding device generates information that indicates that a node assigned with a Morton code of 1 is not occupied and a node assigned with a Morton code of 4 is occupied when decoding an occupancy code for a node assigned with a Morton code of 0. Therefore, based on the information, the three-dimensional data decoding device may swap the three-dimensional point assigned with the Morton code of 1 subjected to the inverse transformation process and the three-dimensional point assigned with the Morton code of 4 subjected to the inverse transformation process with each other. Alternatively, the three-dimensional data decoding device may swap the attribute information on the node assigned with the Morton code of 1 and the attribute information on the node assigned with the Morton code of 4 after the inverse transformation.

In this way, the three-dimensional data decoding device can properly decode the bitstream encoded with improved coding efficiency, while reducing the processing amount for the generation of re-ordering information or swapping information by swapping three-dimensional points or swapping pieces of attribute information after generating and inverse-transforming re-ordering information for the three-dimensional points or swapping information for the attribute information based on information generated in the decoding of geometry information.

The following describes an adaptive entropy encoding process using geometry information of a three-dimensional point.

When local geometries of two nodes in a tree structure are similar to each other, there is a chance that occupancy states (i.e., states each indicating whether a three-dimensional point is included) of child nodes are similar to each other. As a result, the three-dimensional data encoding device performs grouping using a local geometry of a parent node. This enables the three-dimensional data encoding device to group together the occupancy states of the child nodes, and use a different coding table for each group. Accordingly, it is possible to improve the entropy encoding efficiency.

Figure 93:
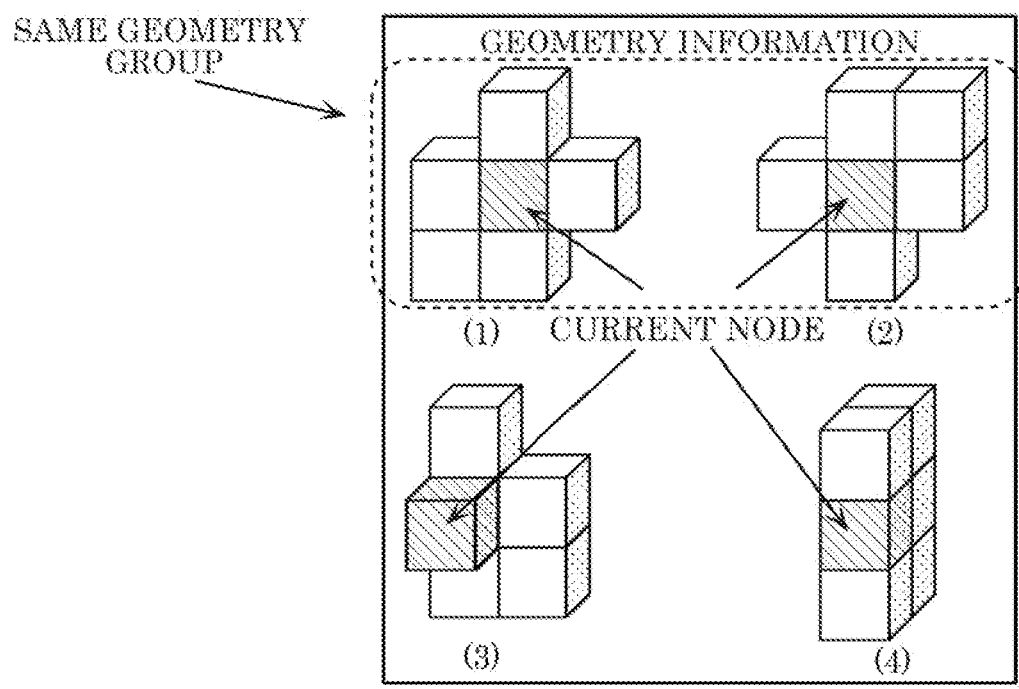
FIG. 93 is a diagram illustrating an example of geometry information according to Embodiment 9.

FIG. 93 is a diagram illustrating an example of geometry information. Geometry information includes information indicating whether each of neighboring nodes of a current node is occupied (i.e., includes a three-dimensional point). For example, the three-dimensional data encoding device calculates a local geometry of the current node using information indicating whether a neighboring node includes a three-dimensional point (is occupied or non-occupied). A neighboring node is, for example, a node spatially located around a current node, or a node located in the same position in a different time as the current node or spatially located around the position.

In FIG. 93, a hatched cube indicates a current node. A white cube is a neighboring node, and indicates a node including a three-dimensional point. In FIG. 93, the geometry pattern indicated in (2) is obtained by rotating the geometry pattern indicated in (1). Accordingly, the three-dimensional data encoding device determines that these geometry patterns have a high geometry similarity, and entropy encodes the geometry patterns using the same coding table. In addition, the three-dimensional data encoding device determines that the geometry patterns indicated in (3) and (4) have a low geometry similarity, and entropy encodes the geometry patterns using other coding tables.

Figure 94:
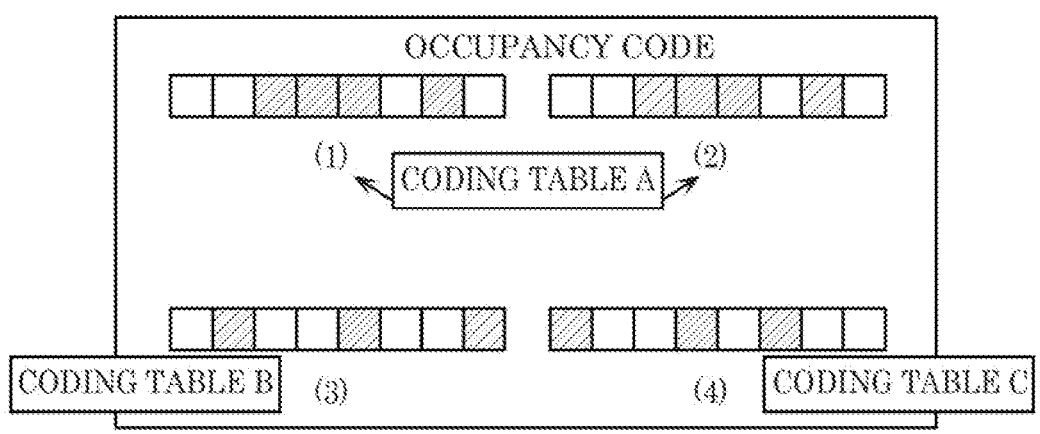
FIG. 94 is a diagram illustrating an example of selecting a coding table using geometry information according to Embodiment 9.

FIG. 94 is a diagram illustrating an example of occupancy codes of current nodes in the geometry patterns of (1) to (4) illustrated in FIG. 93, and coding tables used for entropy encoding. As illustrated above, the three-dimensional data encoding device determines that the geometry patterns of (1) and (2) are included in the same geometry group, and uses same coding table A for the geometry patterns of (1) and (2). The three-dimensional data encoding device uses coding table B and coding table C for the geometry patterns of (3) and (4), respectively.

As illustrated in FIG. 94, there is a case in which the occupancy codes of the current nodes in the geometry patterns of (1) and (2) included in the same geometry group are identical to each other.

Figure 95:
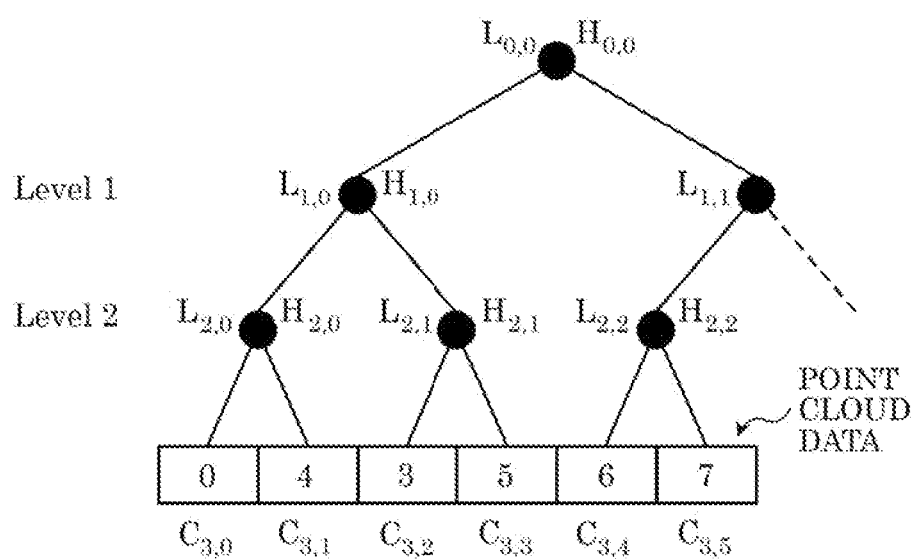
FIG. 95 is a diagram for illustrating a sixth example of the transformation process for attribute information according to Embodiment 9.

FIG. 95 is a diagram for illustrating a sixth example of the transformation process for attribute information according to this embodiment.

The three-dimensional data encoding device may perform the re-ordering process for each layer. Alternatively, the three-dimensional data encoding device may calculate a three-dimensional position used for the re-ordering process for a layer based on a three-dimensional position in a layer lower than that layer.

For example, the three-dimensional position of each three-dimensional point in layer 2 (level l=2) is calculated according to the following formulas (Equation M11), (Equation M12), and (Equation M13).

[Math. 10]

$$C_{2,0}=(C_{3,0}+C_{3,1})/2 \qquad \text{(Equation M11)}$$

$$C_{2,1}=(C_{3,2}+C_{3,3})/2 \qquad \text{(Equation M12)}$$

$$C_{2,2}=(C_{3,4}\pm C_{3,5})/2 \qquad \text{(Equation M13)}$$

For example, the three-dimensional position of each three-dimensional point in layer 1 (level l=1) is calculated according to the following formulas (Equation M14) and (Equation M15).

[Math. 11]

$$C_{1,0}=(C_{2,0}+C_{2,1})/2 \qquad \text{(Equation M14)}$$

$$C_{1,1}=C_{2,2} \qquad \text{(Equation M15)}$$

Figure 96:
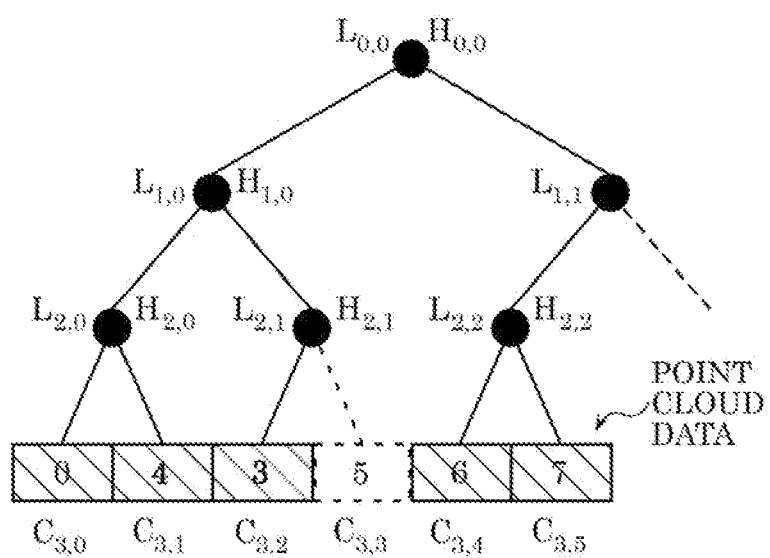
FIG. 96 is a diagram for illustrating a seventh example of the transformation process for attribute information according to Embodiment 9.

FIG. 96 is a diagram for illustrating a seventh example of the transformation process for attribute information according to this embodiment. Note that in the point cloud data shown in FIG. 96, there is no three-dimensional point at a position assigned with a Morton code of 5.

Each three-dimensional point that is not paired is not merged with any other three-dimensional point during the transformation process. The re-ordering process does not need to be performed for such a three-dimensional point. For example, the three-dimensional point located at position 0 has a valid pair to the three-dimensional point, and the re-ordering process is performed on the three-dimensional point located at position 4, which is the closest three-dimensional point. On the other hand, the three-dimensional point located at position 3 has no valid pair to the three-dimensional point, since there is no three-dimensional point at position 5. In order to prevent the three-dimensional point located at such position 3 from being used for the transformation process, no closest three-dimensional point need to be searched for.

To calculate which three-dimensional point has a valid pair for the transformation process, for example, the following method is used.

Provided that the i-th Morton code at level l is denoted as Ml, i,

If(Ml, i>>1)==(Ml, i+1>>1){
Find the nearest point to pair with the point at Ml, i.
Skip 1 position and move to next point.
} else For example, if the conditional expression holds for a three-dimensional point, the three-dimensional point has a valid pair for the transformation process, the three-dimensional data encoding device searches for the closest three-dimensional point. On the other hand, if the conditional expression does not hold for a three-dimensional point, for example, the three-dimensional point has no valid pair for the transformation process, the three-dimensional data encoding device does not need to search for the closest three-dimensional point. Therefore, with such a configuration, the three-dimensional data encoding device does not need to search for the closest three-dimensional point for a point such as a reference point to perform the re-ordering process. Therefore, the three-dimensional data encoding device can immediately proceed to process the next three-dimensional point.

Figure 97:
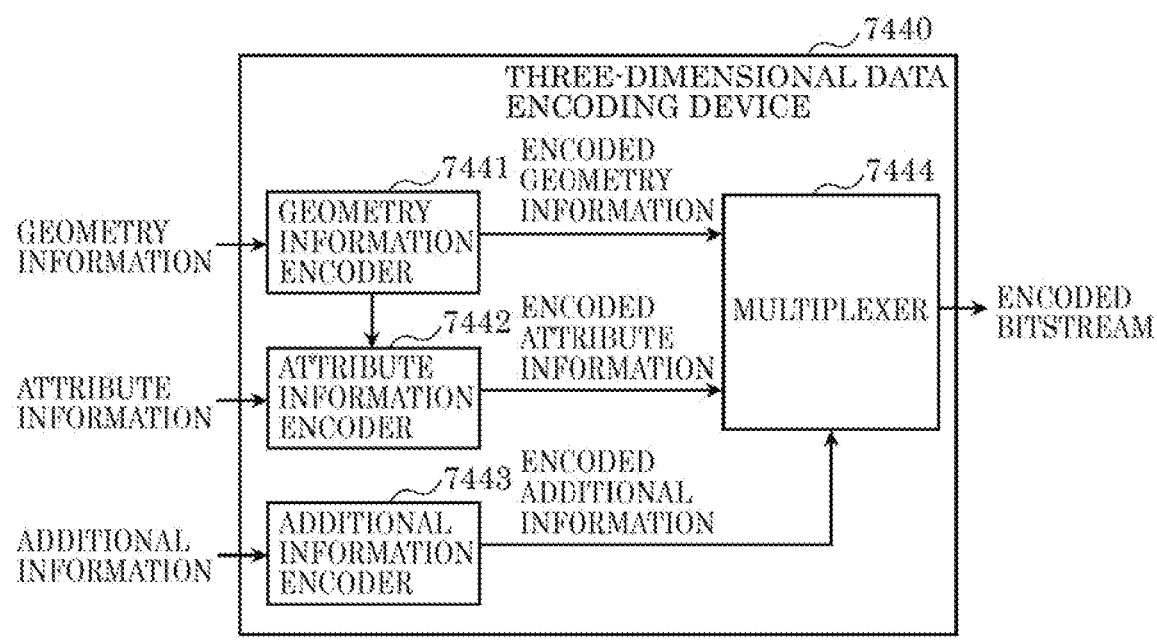
FIG. 97 is a block diagram of a three-dimensional data encoding device according to Embodiment 9.

FIG. 97 is a block diagram of three-dimensional data encoding device 7440 according to this embodiment.

Three-dimensional data encoding device 7440 includes geometry information encoder 7441, attribute information encoder 7442, additional information encoder 7443, and multiplexer (MUX) 7444.

Geometry information encoder 7441 encodes geometry information in point cloud data input to three-dimensional data encoding device 7440. Geometry information encoder 7441 outputs the geometry information encoded (encoded geometry information) to multiplexer 7444.

Attribute information encoder 7442 encodes attribute information in the point cloud data input to three-dimensional data encoding device 7440. Attribute information encoder 7442 outputs the attribute information encoded (encoded attribute information) to multiplexer 7444.

Additional information encoder 7443 encodes additional information in the point cloud data input to three-dimensional data encoding device 7440. Additional information encoder 7443 outputs the additional information encoded (encoded additional information) to multiplexer 7444.

Multiplexer 7444 generates and outputs a bitstream including the encoded geometry information, the encoded attribute information, and the encoded additional information. For example, multiplexer 7444 outputs the bitstream to a three-dimensional data decoding device.

Figure 98:
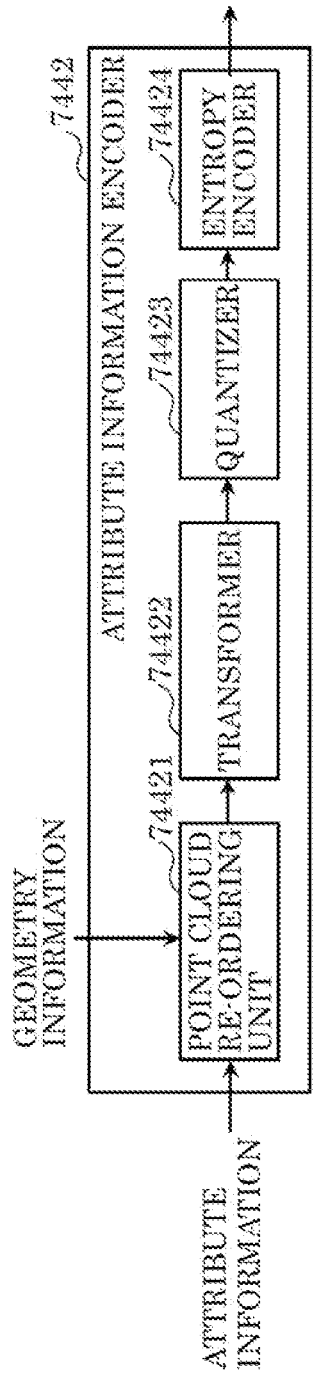
FIG. 98 is a block diagram of an attribute information encoder according to Embodiment 9.

FIG. 98 is a block diagram of attribute information encoder 7442 according to this embodiment.

Attribute information encoder 7442 includes point cloud re-ordering unit 74421, transformer 74422, quantizer 74423, and entropy encoder 74424.

Point cloud re-ordering unit 74421 performs a re-ordering process of re-ordering the data order of the point cloud data input to three-dimensional data encoding device 7440. As described above, point cloud re-ordering unit 74421 re-orders the order of pieces of attribute information based on geometry information, for example.

Transformer 74422 performs a transformation process for the attribute information in the re-ordered point cloud data.

Quantizer 74423 performs a quantization process on the point cloud data subjected to the transformation process.

Entropy encoder 74424 performs an entropy-encoding process on the quantized point cloud data.

Figure 99:
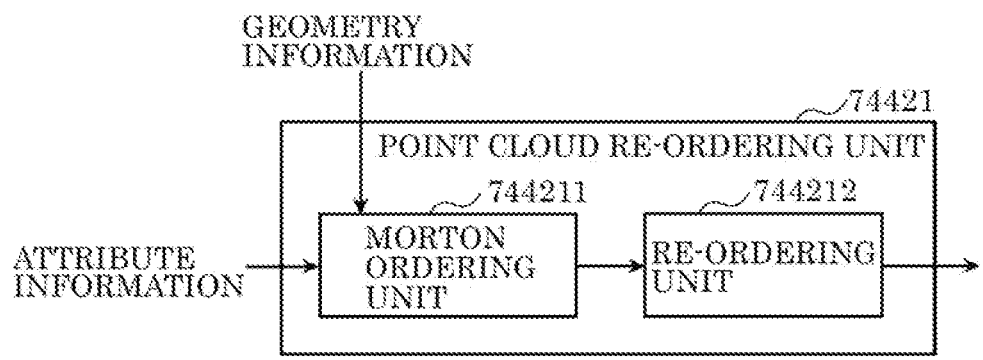
FIG. 99 is a block diagram of a point cloud re-ordering unit according to Embodiment 9.

FIG. 99 is a block diagram of point cloud re-ordering unit 74421 according to this embodiment.

Point cloud re-ordering unit 74421 includes Morton ordering unit 744211 and re-ordering unit 744212.

Morton ordering unit 744211 re-orders the pieces of attribute information in the input point cloud data in a Morton order.

Re-ordering unit 744212 re-orders the point cloud data re-ordered in the Morton order based on geometry information or three-dimensional distances as described above.

Figure 100:
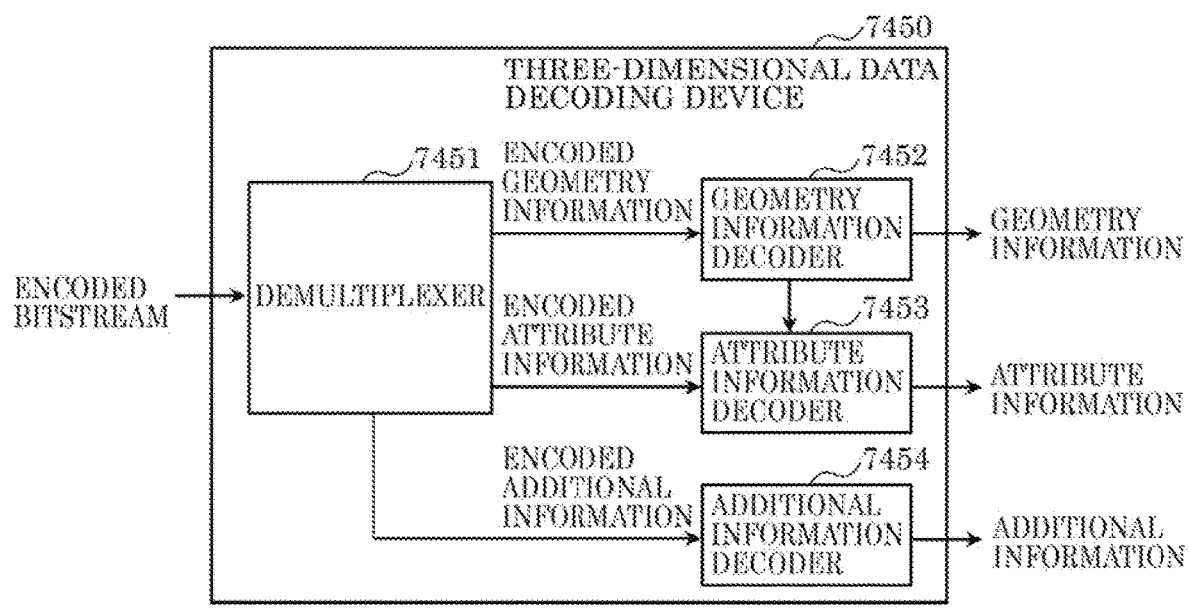
FIG. 100 is a block diagram of a three-dimensional data decoding device according to Embodiment 9.

FIG. 100 is a block diagram of three-dimensional data decoding device 7450 according to this embodiment.

Three-dimensional data decoding device 7450 includes demultiplexer (DeMUX) 7451, geometry information decoder 7452, attribute information decoder 7453, and additional information decoder 7454.

Demultiplexer 7451 divides the bitstream into the encoded geometry information, the encoded attribute information, and the encoded additional information and outputs the encoded geometry information, the encoded attribute information, and the encoded additional information. Specifically, demultiplexer 7451 outputs the encoded geometry information included in the bitstream to geometry information decoder 7452, outputs the encoded attribute information included in the bitstream to attribute information decoder 7453, and outputs the encoded additional information included in the bitstream to additional information decoder 7454.

Geometry information decoder 7452 decodes the encoded geometry information to generate geometry information, and outputs the generated geometry information.

Attribute information decoder 7453 decodes the encoded attribute information to generate attribute information, and outputs the generated attribute information.

Additional information decoder 7454 decodes the encoded additional information to generate additional information, and outputs the generated additional information.

Figure 101:
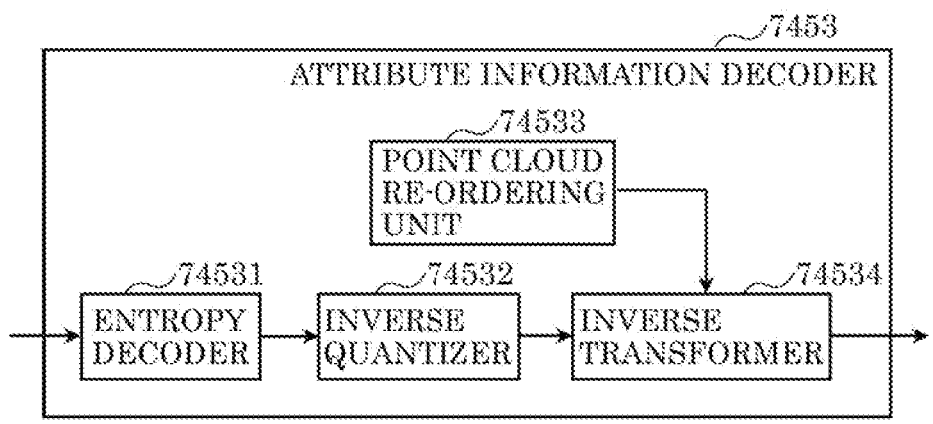
FIG. 101 is a block diagram of an attribute information decoder according to Embodiment 9.

FIG. 101 is a block diagram of attribute information decoder 7453 according to this embodiment.

Attribute information decoder 7453 includes entropy decoder 74531, inverse quantizer 74532, point cloud re-ordering unit 74533, and inverse transformer 74534.

Entropy decoder 74531 performs a variable-length decoding of the bitstream. For example, entropy decoder 74531 arithmetically decodes the encoded attribute information to generate a binary signal, and generates a quantization coefficient from the generated binary signal.

Inverse quantizer 74532 generates an inverse quantization coefficient by inverse-quantizing the quantization coefficient received from entropy decoder 74531 using the quantization parameter added to the bitstream or the like.

Inverse transformer 74534 inverse-transforms the inverse quantization coefficient received from inverse quantizer 74532. For example, inverse transformer 74534 performs a reverse process to the process by transformer 74422.

In this way, the same point cloud data as the point cloud data re-ordered by three-dimensional data encoding device 7440 is generated.

Point cloud re-ordering unit 74533 re-orders the pieces of attribute information in the point cloud data by performing a re-ordering process on the point cloud data generated by inverse transformer 74534. For example, point cloud re-ordering unit 74533 performs a reverse process to the process by point cloud re-ordering unit 74421. In this way, point cloud data in which the pieces of data are arranged in the same order as those in the point cloud data input to the three-dimensional data encoding device is generated.

Figure 102:
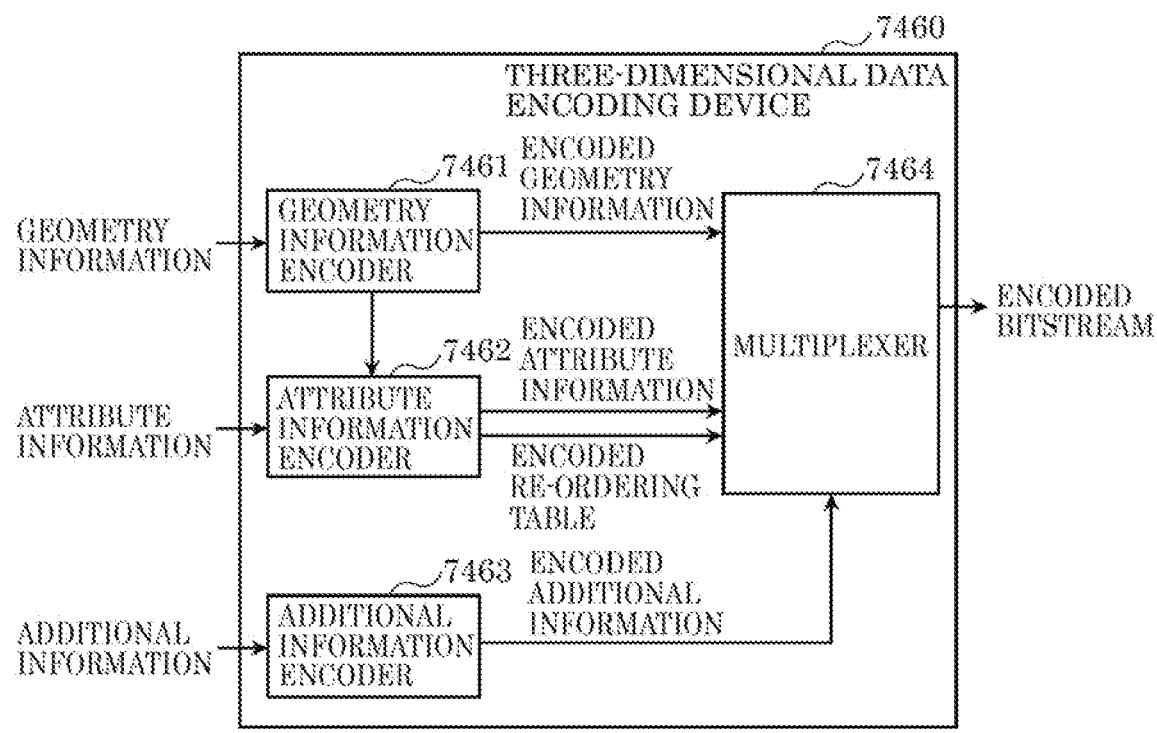
FIG. 102 is a block diagram of a three-dimensional data encoding device according to a variation of Embodiment 9.

FIG. 102 is a block diagram of three-dimensional data encoding device 7460 according to a variation of this embodiment.

Three-dimensional data encoding device 7460 includes geometry information encoder 7461, attribute information encoder 7462, additional information encoder 7463, and multiplexer 7464.

Geometry information encoder 7461 encodes geometry information in point cloud data input to three-dimensional data encoding device 7460. Geometry information encoder 7461 outputs the geometry information encoded (encoded geometry information) to multiplexer 7464.

Attribute information encoder 7462 encodes attribute information in the point cloud data input to three-dimensional data encoding device 7460. Attribute information encoder 7462 outputs the attribute information encoded (encoded attribute information) to multiplexer 7464.

Attribute information encoder 7462 also modifies the order of pieces of data in the point cloud data before encoding the attribute information. Attribute information encoder 7462 generates a re-ordering table (an example of the swapping information described above) that indicates the order of the pieces of data yet to be modified (yet to be re-ordered), encodes the generated re-ordering table, and outputs the encoded re-ordering table to multiplexer 7464.

Additional information encoder 7463 encodes additional information in the point cloud data input to three-dimensional data encoding device 7460. Additional information encoder 7463 outputs the additional information encoded (encoded additional information) to multiplexer 7464.

Multiplexer 7464 generates and outputs a bitstream including the encoded geometry information, the encoded attribute information, the encoded re-ordering table, and the encoded additional information. For example, multiplexer 7464 outputs the bitstream to a three-dimensional data decoding device.

Figure 103:
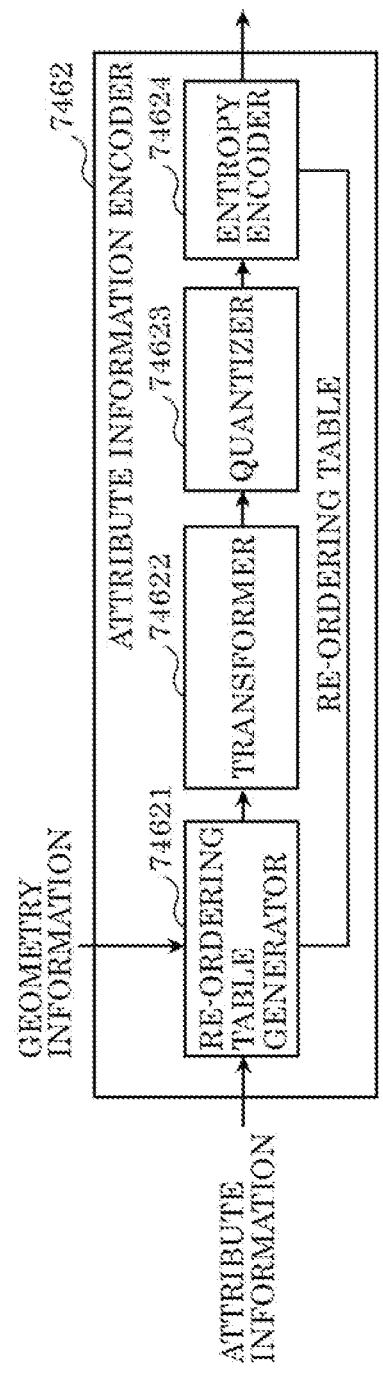
FIG. 103 is a block diagram of an attribute information encoder according to a variation of Embodiment 9.

FIG. 103 is a block diagram of attribute information encoder 7462 according to a variation of this embodiment.

Attribute information encoder 7462 includes re-ordering table generator 74621, transformer 74622, quantizer 74623, and entropy encoder 74624.

Re-ordering table generator 74621 performs a re-ordering process of re-ordering the data order of the point cloud data input to three-dimensional data encoding device 7460. As described above, re-ordering table generator 74621 re-orders the order of pieces of attribute information based on geometry information, for example. Re-ordering table generator 74621 also generates the encoded re-ordering table described above. Re-ordering table generator 74621 outputs the generated encoded re-ordering table to entropy encoder 74624, for example.

Transformer 74622 performs a transformation process for the attribute information in the re-ordered point cloud data.

Quantizer 74623 performs a quantization process on the point cloud data subjected to the transformation process.

Entropy encoder 74624 performs an entropy-encoding process on the quantized point cloud data. For example, entropy encoder 74624 outputs the point cloud data subjected to the entropy encoding process and the encoded re-ordering table to multiplexer 7464.

As described above, the three-dimensional data encoding device may generate a re-ordering table based on a transformation process and use the re-ordering table. The three-dimensional data encoding device may encode the generated re-ordering table and transmit the encoded re-ordering table to the three-dimensional data decoding device.

In this way, the three-dimensional data decoding device can more quickly perform the decoding process.

Figure 104:
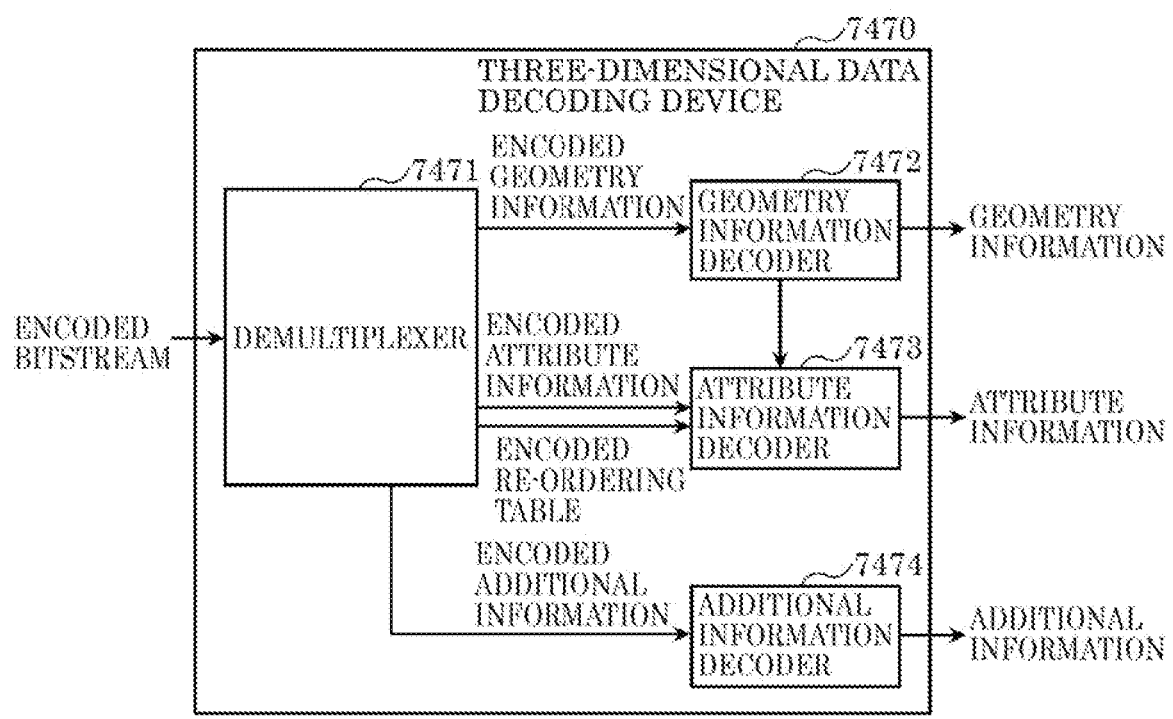
FIG. 104 is a block diagram of a three-dimensional data decoding device according to a variation of Embodiment 9.

FIG. 104 is a block diagram of three-dimensional data decoding device 7470 according to a variation of this embodiment.

Three-dimensional data decoding device 7470 includes demultiplexer 7471, geometry information decoder 7472, attribute information decoder 7473, and additional information decoder 7474.

Demultiplexer 7471 divides the bitstream into the encoded geometry information, the encoded attribute information, the encoded re-ordering table, and the encoded additional information and outputs the encoded geometry information, the encoded attribute information, the encoded re-ordering table, and the encoded additional information. Specifically, demultiplexer 7471 outputs the encoded geometry information included in the bitstream to geometry information decoder 7472, outputs the encoded attribute information and the encoded re-ordering table included in the bitstream to attribute information decoder 7473, and outputs the encoded additional information included in the bitstream to additional information decoder 7474.

Geometry information decoder 7472 decodes the encoded geometry information to generate geometry information, and outputs the generated geometry information.

Attribute information decoder 7473 decodes the encoded re-ordering table to generate a re-ordering table. Attribute information decoder 7473 also decodes the encoded attribute information to generate attribute information, and outputs the generated attribute information.

Additional information decoder 7474 decodes the encoded additional information to generate additional information, and outputs the generated additional information.

Figure 105:
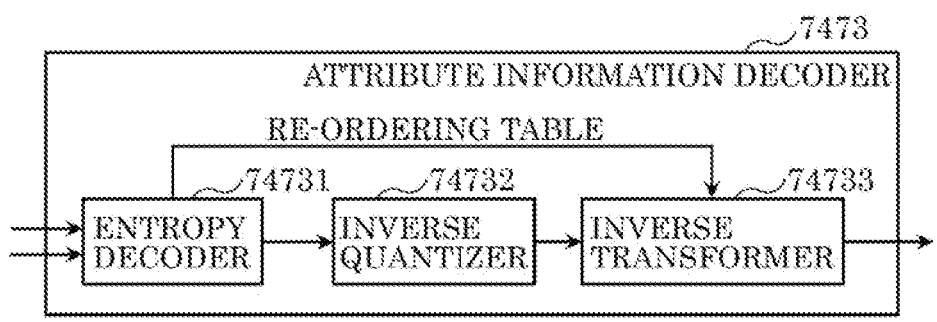
FIG. 105 is a block diagram of an attribute information decoder according to a variation of Embodiment 9.

FIG. 105 is a block diagram of attribute information decoder 7473 according to a variation of this embodiment.

Attribute information decoder 7473 includes entropy decoder 74731, inverse quantizer 74732, and inverse transformer 74733.

Entropy decoder 74731 performs a variable-length decoding of the bitstream. For example, entropy decoder 74731 arithmetically decodes the encoded attribute information to generate a binary signal, and generates a quantization coefficient from the generated binary signal. Entropy decoder 74731 also decodes the encoded re-ordering table to generate a re-ordering table, and outputs the generated re-ordering table to inverse transformer 74733.

Inverse quantizer 74732 generates an inverse quantization coefficient by inverse-quantizing the quantization coefficient received from entropy decoder 74731 using the quantization parameter added to the bitstream or the like.

Inverse transformer 74733 inverse-transforms the inverse quantization coefficient received from inverse quantizer 74732. For example, inverse transformer 74733 performs a reverse process to the process by transformer 74622.

In this way, the same point cloud data as the point cloud data re-ordered by three-dimensional data encoding device 7440 is generated. Inverse transformer 74733 re-orders the pieces of attribute information in the point cloud data by performing a re-ordering process on the point cloud data generated by the inverse transformation process based on the re-ordering table.

In this way, point cloud data in which the pieces of data are arranged in the same order as those in the point cloud data input to the three-dimensional data encoding device is generated.

Figure 106:
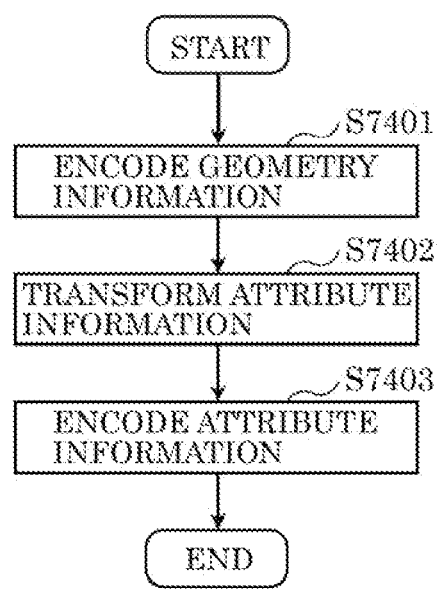
FIG. 106 is a flowchart of a three-dimensional data encoding process according to Embodiment 9.

FIG. 106 is a flowchart of a three-dimensional data encoding process according to this embodiment.

First, the three-dimensional data encoding device encodes geometry information (geometry) (S7401). For example, the three-dimensional data encoding device performs the encoding using an octree representation.

The three-dimensional data encoding device then performs a transformation process on attribute information (S7402). For example, after the encoding of geometry information, if the position of a three-dimensional point is changed because of quantization or the like, the three-dimensional data encoding device reassigns the attribute information on the original three-dimensional point to the three-dimensional point changed in position.

Note that the three-dimensional data encoding device may perform the reassignment by interpolation of values of the attribute information according to the amount of change in position. For example, the three-dimensional data encoding device may detect N three-dimensional points yet to be changed in position close to the three-dimensional position of the three-dimensional point changed in position, take a weighted average of the values of the attribute information on the N three-dimensional points based on the distance between the three-dimensional positions of the three-dimensional point changed in position and each of the N three-dimensional points, and determine the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information subjected to the transformation process (S7403).

Note that, when the three-dimensional data encoding device encodes a plurality of pieces of attribute information, the three-dimensional data encoding device may sequentially encode the plurality of pieces of attribute information. For example, when the three-dimensional data encoding device encodes color and reflectance as attribute information, the three-dimensional data encoding device may generate a bitstream including the result of encoding of color followed by the result of encoding of reflectance.

Note that the order of the results of encoding of the attribute information added to the bitstream is not limited to the order described above, and can be any order.

The three-dimensional data encoding device may add a starting point of the encoded data of each attribute information in the bitstream to the header or the like.

In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced.

The three-dimensional data encoding device may encode a plurality of pieces of attribute information in parallel, and integrate the results of the encoding into one bitstream.

In this way, the three-dimensional data encoding device can encode a plurality of pieces of attribute information at a high speed.

Figure 107:
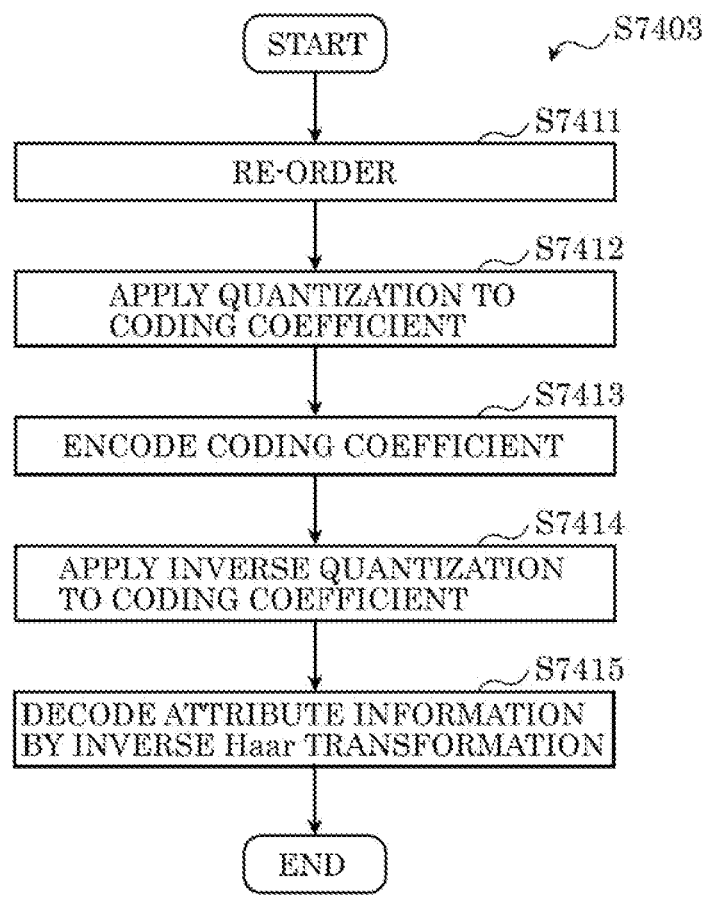
FIG. 107 is a flowchart of an attribute information encoding process according to Embodiment 9.

FIG. 107 is a flowchart of the attribute information encoding process (S7403) according to this embodiment.

First, the three-dimensional data encoding device performs a re-ordering process on the attribute information in the input point cloud data (S7411).

The three-dimensional data encoding device then generates a coding coefficient from the attribute information by Haar transformation as described above, for example, and applies quantization to the generated coding coefficient (S7412). That is, the three-dimensional data encoding device generates a coding coefficient for the point cloud data re-ordered by the re-ordering process, and performs a quantization process on the generated coding coefficient.

The three-dimensional data encoding device then encodes the quantized coding coefficient to generate encoded attribute information (S7413).

The three-dimensional data encoding device then applies inverse quantization to the quantized coding coefficient (S7414).

The three-dimensional data encoding device then applies inverse Haar transformation to the inverse-quantized coding coefficient to decode attribute information (S7415). For example, the decoded attribute information is referred to in the subsequent encoding.

Figure 108:
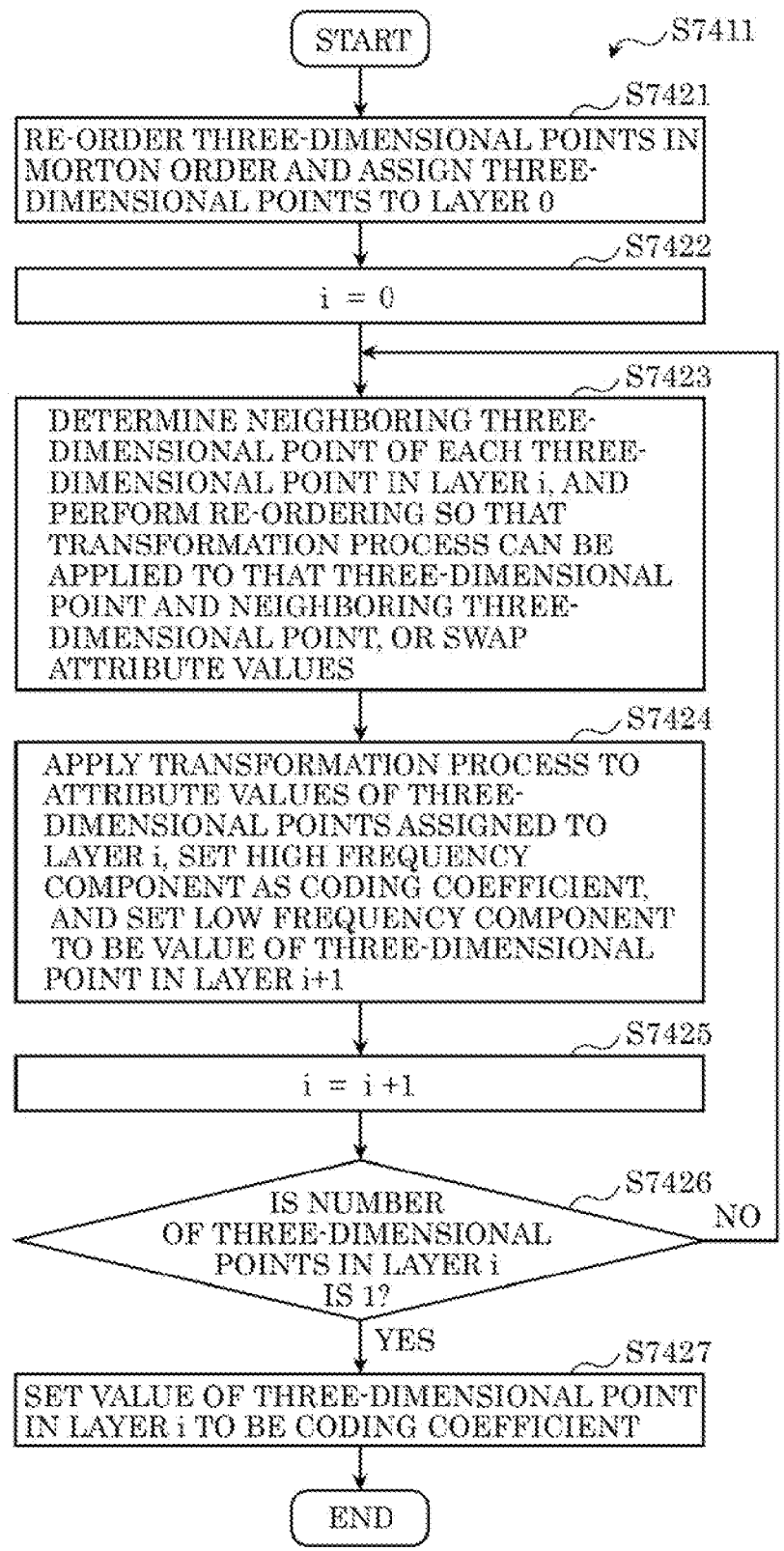
FIG. 108 is a flowchart of an attribute information re-ordering process according to Embodiment 9.

FIG. 108 is a flowchart of the attribute information re-ordering process (S7411) according to this embodiment.

First, the three-dimensional data encoding device re-orders the three-dimensional points in the input point cloud data in a Morton order, and assigns layer 0 to the three-dimensional points (S7421).

The three-dimensional data encoding device then sets i=0 (S7422). The three-dimensional data encoding device then determines a three-dimensional point (neighboring three-dimensional point) neighboring to each three-dimensional point in layer i, and performs the re-ordering process on each three-dimensional point so that the transformation process can be applied to the three-dimensional point and the neighboring three-dimensional point. Alternatively, the three-dimensional data encoding device performs the swapping process of swapping the attribute values (values indicated by the attribute information) of the three-dimensional points (S7423).

For example, the three-dimensional data encoding device may re-order three-dimensional points or swap only attribute values indicated by the attribute information on three-dimensional points in the manner described above.

Note that threshold $\alpha$ may be provided in advance. In that case, for example, the three-dimensional data encoding device may apply the re-ordering process or swapping process when $i<\alpha$, and does not need to apply the re-ordering process or swapping process when i is equal to or greater than $\alpha$. For example, by setting $\alpha=1$ in advance, the three-dimensional data encoding device may be configured to perform the re-ordering process or swapping process for layer 0.

In this way, the three-dimensional data encoding device can reduce the processing amount.

Note that the three-dimensional data encoding device may add the value of a to the header or the like of the bitstream.

In this way, the three-dimensional data decoding device can determine up to which layer the re-ordering process or swapping process is to be performed based on a added to the header or the like, and therefore can properly decode the bitstream.

The three-dimensional data encoding device then calculates a high frequency component and a low frequency component by applying the transformation process to the attribute values of the three-dimensional points assigned to layer i, designates the calculated high frequency component as a coding coefficient, and sets the calculated low frequency component to be a value for layer i+1 (S7424).

The three-dimensional data encoding device then sets i=i+1 (S7425).

The three-dimensional data encoding device then determines whether the number of three-dimensional points in layer i is 1 or not (S7426).

When the three-dimensional data encoding device determines that the number of three-dimensional points in layer i is not 1 (if No in S7426), the three-dimensional data encoding device returns the process to step S7423.

On the other hand, when the three-dimensional data encoding device determines that the number of three-dimensional points in layer i is 1 if Yes in S7426), the three-dimensional data encoding device sets the value of the three-dimensional point in layer i to be coding coefficient (S7427).

Note that, although an example has been shown above in which the three-dimensional data encoding device repeats the loop (S7423 to S7426) until the number of the three-dimensional points in layer i becomes 1, the present disclosure is not necessarily limited thereto. For example, threshold 13 may be provided in advance. In that case, the three-dimensional data encoding device may repeat the loop until the number of the three-dimensional points in layer i equals to $\beta$.

In this way, the three-dimensional data encoding device can reduce the processing amount.

Note that the three-dimensional data encoding device may add the value of $\beta$ to the header or the like of the bitstream.

In this way, the three-dimensional data decoding device can determine up to which layer the transformation process is to be performed based on β added to the header or the like, and therefore can properly decode the bitstream.

Figure 109:
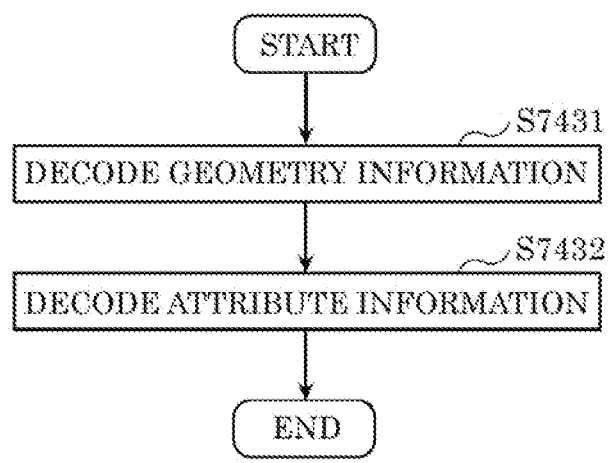
FIG. 109 is a flowchart of a three-dimensional data decoding process according to Embodiment 9.

FIG. 109 is a flowchart of a three-dimensional data decoding device according to this embodiment.

First, the three-dimensional data decoding device decodes geometry information (geometry) from the bitstream (S7431). For example, the three-dimensional data decoding device performs the decoding using an octree representation.

The three-dimensional data decoding device then decodes attribute information from the bitstream (S7432). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device may decode the result of encoding of color and the result of encoding of reflectance in the order thereof in the bitstream.

Note that the three-dimensional data decoding device can decode the results of encoding of attribute information in the bitstream in any order.

The three-dimensional data decoding device may obtain the information indicating the starting point of the encoded data of each piece of attribute information in the bitstream by decoding the header or the like.

In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced.

The three-dimensional data decoding device may decode a plurality of pieces of attribute information in parallel, and integrate the results of the decoding into one three-dimensional point cloud.

In this way, the three-dimensional data decoding device can decode a plurality of pieces of attribute information at a high speed.

Figure 110:
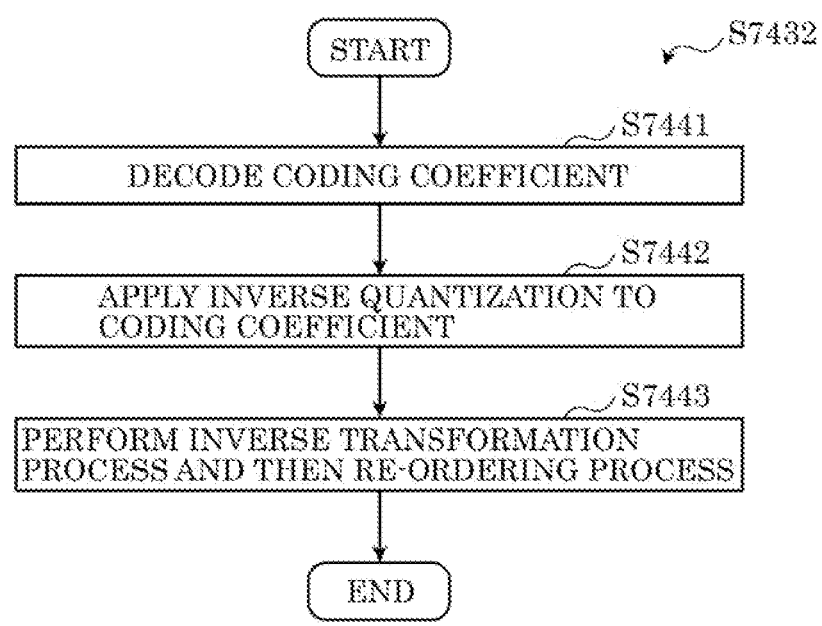
FIG. 110 is a flowchart of an attribute information decoding process according to Embodiment 9.

FIG. 110 is a flowchart of the attribute information decoding process (S7432) according to this embodiment.

First, the coding three-dimensional data decoding device decodes the coding coefficient from the bitstream (S7441).

The three-dimensional data decoding device then applies inverse quantization to the coding coefficient (S7442).

The three-dimensional data decoding device then applies inverse Haar transformation to the inverse-quantized coding coefficient to decode the attribute information, and performs the re-ordering process on the decoded attribute information (S7443).

Figure 111:
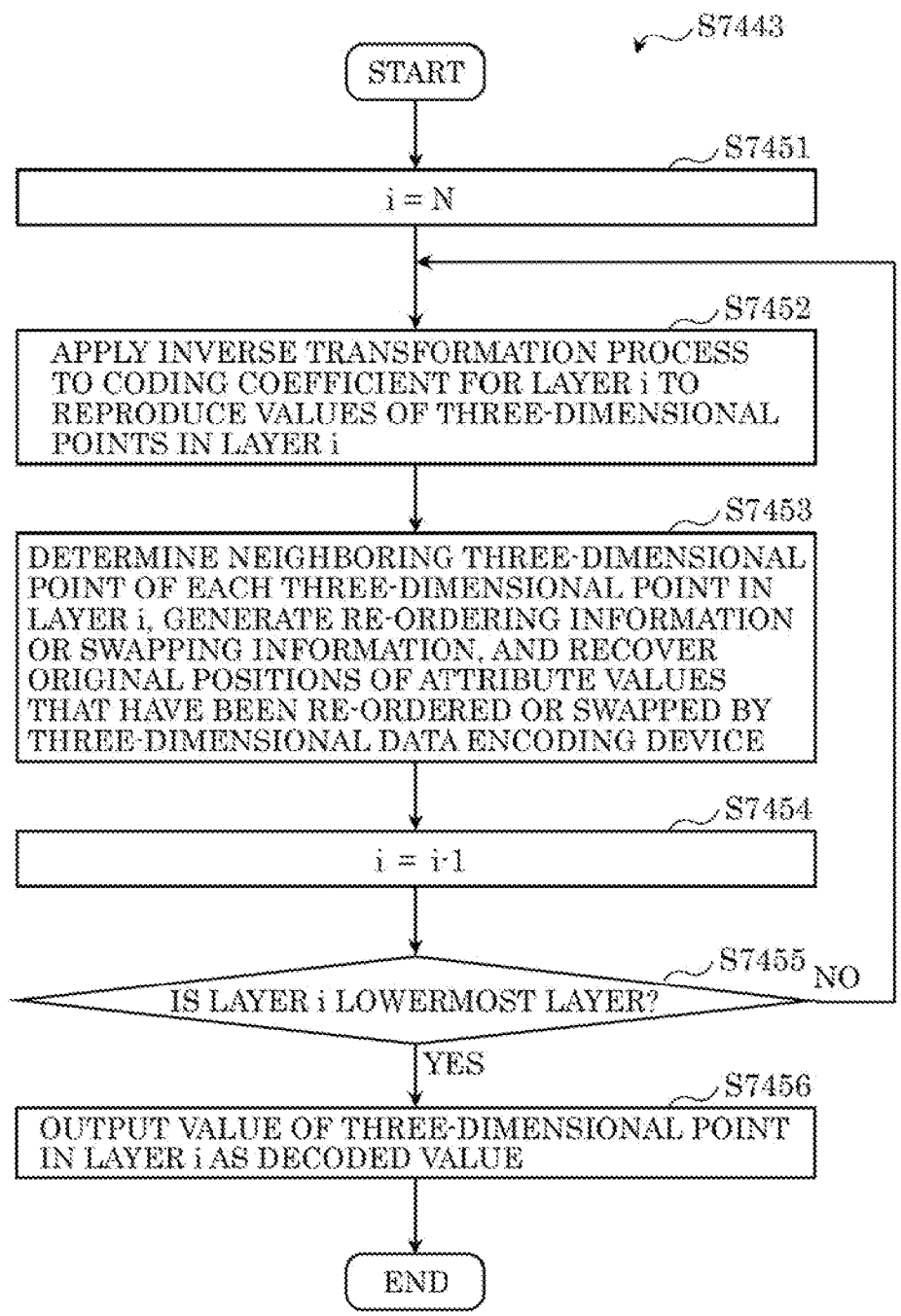
FIG. 111 is a flowchart of an attribute information re-ordering process according to Embodiment 9.

FIG. 111 is a flowchart of the attribute information re-ordering process (S7443) according to this embodiment.

First, the three-dimensional data decoding device sets i=N (S7451). Here, N represents the number of layers, and is calculated based on the geometry information on the three-dimensional points included in the point cloud data, for example.

The three-dimensional data decoding device then applies an inverse transformation process to the coding coefficient for layer i to reproduce the values of three-dimensional points in layer i (S7452).

The three-dimensional data decoding device then determines a neighboring three-dimensional point of each three-dimensional point in layer i, generates the re-ordering information or swapping information, and performs the re-ordering process of recovering the original positions of the attribute values that have been re-ordered or swapped by the three-dimensional data encoding device (S7453).

For example, the three-dimensional data decoding device generates the re-ordering information or the swapping information on the attribute values indicated by the attribute information in the manner described above.

Note that threshold α may be provided in advance. In that case, the three-dimensional data decoding device may generate the re-ordering information or swapping information when i<α, and does not need to generate re-ordering information or swapping information when i is equal to or greater than α.

For example, by setting α=1 in advance, the three-dimensional data decoding device may generate the re-ordering information or swapping information for layer 0.

In this way, the three-dimensional data decoding device can reduce the processing amount.

Note that the three-dimensional data decoding device may decode and obtain the value of a added to the header or the like of the bitstream.

The three-dimensional data decoding device then sets i=i−1 (S7454).

The three-dimensional data decoding device then determines whether layer i is the lowermost layer or not (S7455).

When the three-dimensional data decoding device determines that layer i is not the lowermost layer (if No in S7455), the three-dimensional data decoding device returns the process to step S7452.

On the other hand, when the three-dimensional data decoding device determines that layer i is the lowermost layer (if Yes in S7455), the three-dimensional data decoding device outputs the value of the three-dimensional point in layer i as a decoded value (that is, an attribute value) (S7456).

Next, a three-dimensional data encoding device and a three-dimensional data decoding device according to a variation of this embodiment will be described.

Although an example has been described above in which the three-dimensional data encoding device uses distance information or geometry information on three-dimensional points to re-order the three-dimensional points or swaps pieces of attribute information on the three-dimensional points before the transformation process, the present disclosure is not necessarily limited thereto.

For example, the point cloud data input to the three-dimensional data encoding device may include information that indicates whether to perform the re-ordering process or not or information that indicates whether to perform the swapping process or not added to the header or the like thereof. In that case, the three-dimensional data encoding device may determine and choose whether to perform the re-ordering process or not or whether to perform the swapping process or not based on the information.

Specifically, when giving priority to improving the coding efficiency, for example, the three-dimensional data encoding device performs the re-ordering process or swapping process before the transformation process, adds a flag that indicates that the re-ordering process or swapping process has been performed to the header or the like, and turn on the flag.

On the other hand, when giving priority to reducing the processing amount, the three-dimensional data encoding device performs the transformation process without performing the re-ordering process or swapping process, adds the flag described above to the header or the like, and turn off the flag.

In that case, for example, the three-dimensional data decoding device decodes the flag described above from the header of the received bitstream. And the three-dimensional data decoding device performs the re-ordering process or swapping process after performing the inverse transformation process if the flag is on, and does not perform the re-ordering process or swapping process if the flag is off.

In this way, providing the flag in the bitstream allows the three-dimensional data decoding device to properly determine whether the three-dimensional data encoding device has given priority to improving the coding efficiency or reducing the processing amount.

Although an example has been described in which the three-dimensional data encoding device adds the re-ordering information or swapping information to the header or the like, the present disclosure is not necessarily limited thereto. For example, the three-dimensional data encoding device may encode the re-ordering information or swapping information as new attribute information (attribute) on the three-dimensional points. Specifically, the three-dimensional data encoding device encodes, as attribute information, ordering information on the three-dimensional points yet to be subjected to the re-ordering process or swapping process. The three-dimensional data decoding device can recognize the ordering information on the three-dimensional points yet to be subjected to the re-ordering process or swapping process by decoding the ordering information, which is attribute information, and therefore can recover the original ordering of the three-dimensional points in the point cloud data having been subjected to the re-ordering process or swapping process.

Embodiment 10

When encoding attribute information on a three-dimensional point included in point cloud data to be encoded using Region Adaptive Hierarchical Transform (RAHT), the three-dimensional data encoding device may encode the attribute information without applying a RAHT process if the number of the input three-dimensional points is 1.

Figure 112:
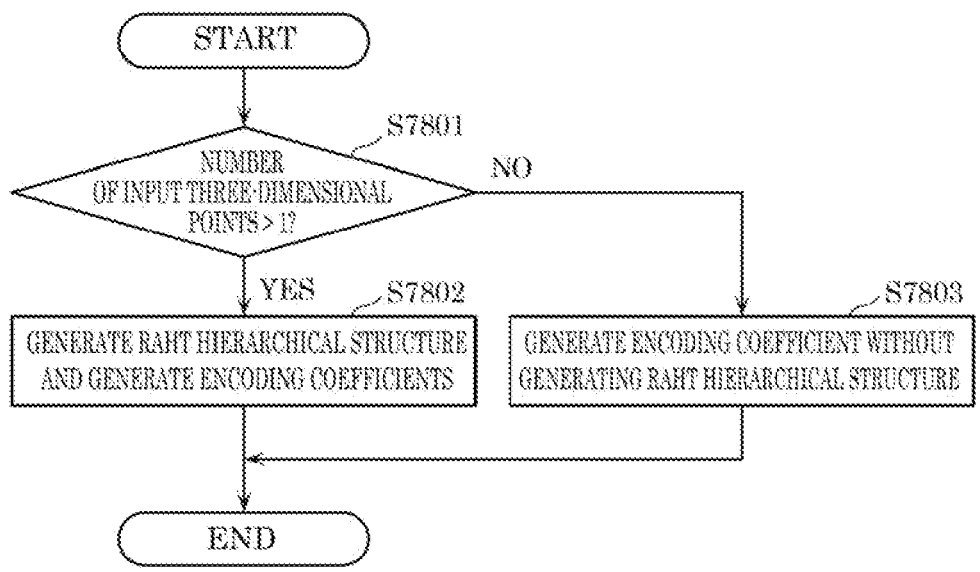
FIG. 112 is a flowchart of a three-dimensional data encoding method according to Embodiment 10.

FIG. 112 is a flowchart of a three-dimensional data encoding method according to this embodiment.

The three-dimensional data encoding device determines whether or not the number of the input three-dimensional points is greater than 1 (S7801). Note that the input three-dimensional points are the three-dimensional points included in the point cloud data to be encoded. Here, the three-dimensional points included in the point cloud data to be encoded are the three-dimensional points to be encoded on an encoding unit basis. The encoding unit is a slice or a tile, for example.

Figure 113:
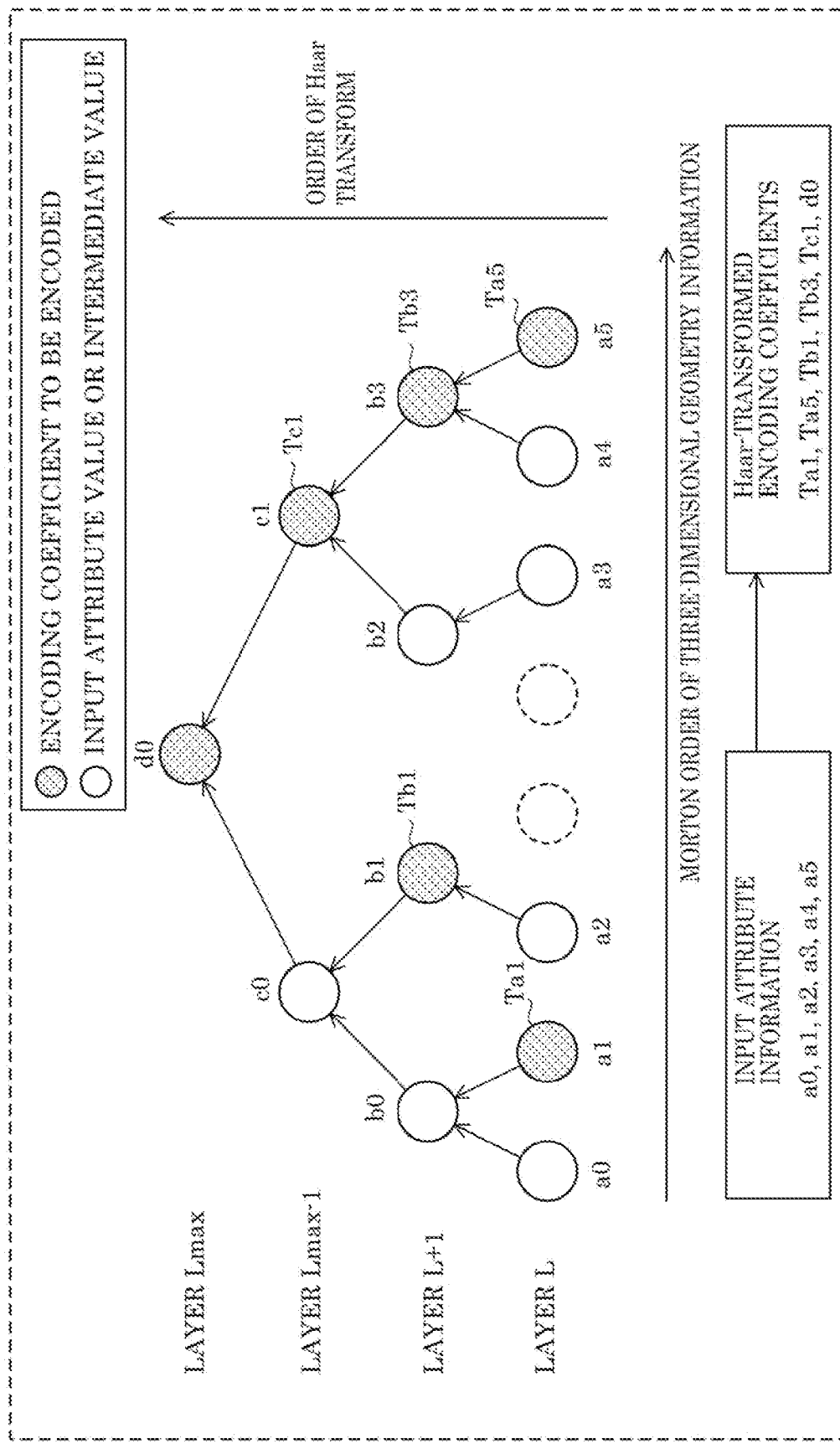
FIG. 113 is a diagram for illustrating encoding of attribute information using RAHT according to Embodiment 10.

When the number of the input three-dimensional points is greater than 1 (if Yes in S7801), the three-dimensional data encoding device generates a RAHT hierarchical structure, such as that shown in FIG. 113, for the plurality of three-dimensional points, and calculates an encoding coefficient as described above in Embodiment 7 with reference to FIG. 30 or the like (S7802). Specifically, the three-dimensional data encoding device calculates Haar-transformed encoding coefficients Ta1, Ta5, Tb1, Tb3, Tc1, and d0 by applying a Haar transform on two pieces of attribute information that are adjacent in the order of Morton codes among a plurality of pieces of attribute information a0, a1, a2, a3, a4, and a5 on a plurality of input three-dimensional points to generate attribute information in an upper layer and repeating such generation. The three-dimensional data encoding device then generates a bitstream including the calculated encoding coefficients.

On the other hand, when the number of the input three-dimensional points is 1 (if No in S7801), the three-dimensional data encoding device skips the step of generating a RAHT hierarchical structure, quantizes a value of attribute information on the three-dimensional point as an encoding coefficient, and encodes the quantized value by applying binary arithmetic encoding (S7803). For example, the three-dimensional data encoding device generates a bitstream including attribute information a0 on the one three-dimensional point as an encoding coefficient.

In this way, the three-dimensional data encoding device can properly encode the three-dimensional point even when the number of the input three-dimensional points is 1.

Note that the three-dimensional data encoding device may include, in the bitstream, information EnableRAHT=1 that indicates whether to use a RAHT hierarchical structure to encode attribute information on three-dimensional points or not by adding the information to the header of the bitstream. This allows the three-dimensional data decoding device to determine whether RAHT should be used for decoding by decoding EnableRAHT in the header, and thus to properly decode the bitstream. Note that when EnableRAHT=0, attribute information on three-dimensional points included in point cloud data to be encoded may be encoded or decoded in a method that involves predicting attribute information on three-dimensional points to be encoded by generating a LoD hierarchical structure.

Note that when attribute information is N-dimensional, the three-dimensional data encoding device may independently apply a Haar transform for each dimension and calculate an encoding coefficient for each dimension. If attribute information is color information (RGB or YUV, for example), the three-dimensional data encoding device may apply a Haar transform for each component of the color information and calculate an encoding coefficient for each component.

The three-dimensional data encoding device may apply a Haar transform to layers L, L+1, ..., and Lmax in the listed order. In that case, the closer to layer Lmax the encoding coefficient, the more the lower frequency components of the input attribute information included in the encoding coefficient is.

When decoding a bitstream encoded using RAHT, the three-dimensional data decoding device reconstructs attribute information on a three-dimensional point by applying an inverse Haar transform on an inverse-quantized encoding coefficient. In this case, when the number of the three-dimensional points to be decoded obtained from the bitstream is 1, the three-dimensional data decoding device may decode the attribute information on the three-dimensional point to be decoded without applying an inverse Haar transform of RAHT.

Figure 114:
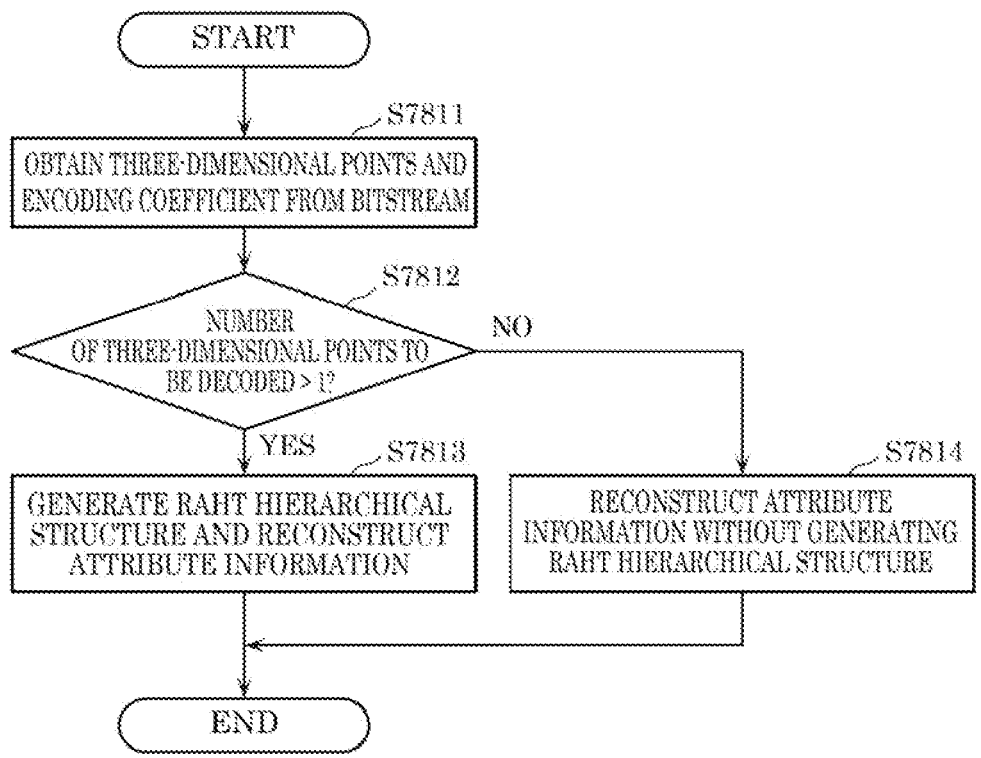
FIG. 114 is a flowchart of a three-dimensional data decoding method according to Embodiment 10.

FIG. 114 is a flowchart of a three-dimensional data decoding method according to this embodiment.

The three-dimensional data decoding device obtains one or more three-dimensional points and an encoding coefficient from a bitstream (S7811).

The three-dimensional data decoding device determines whether or not the number of the three-dimensional points to be decoded obtained from the bitstream is greater than 1 (S7812). Note that the number of the three-dimensional points to be decoded is the number of the three-dimensional points to be decoded on a decoding unit basis. The decoding unit is a slice or a tile, for example.

Figure 115:
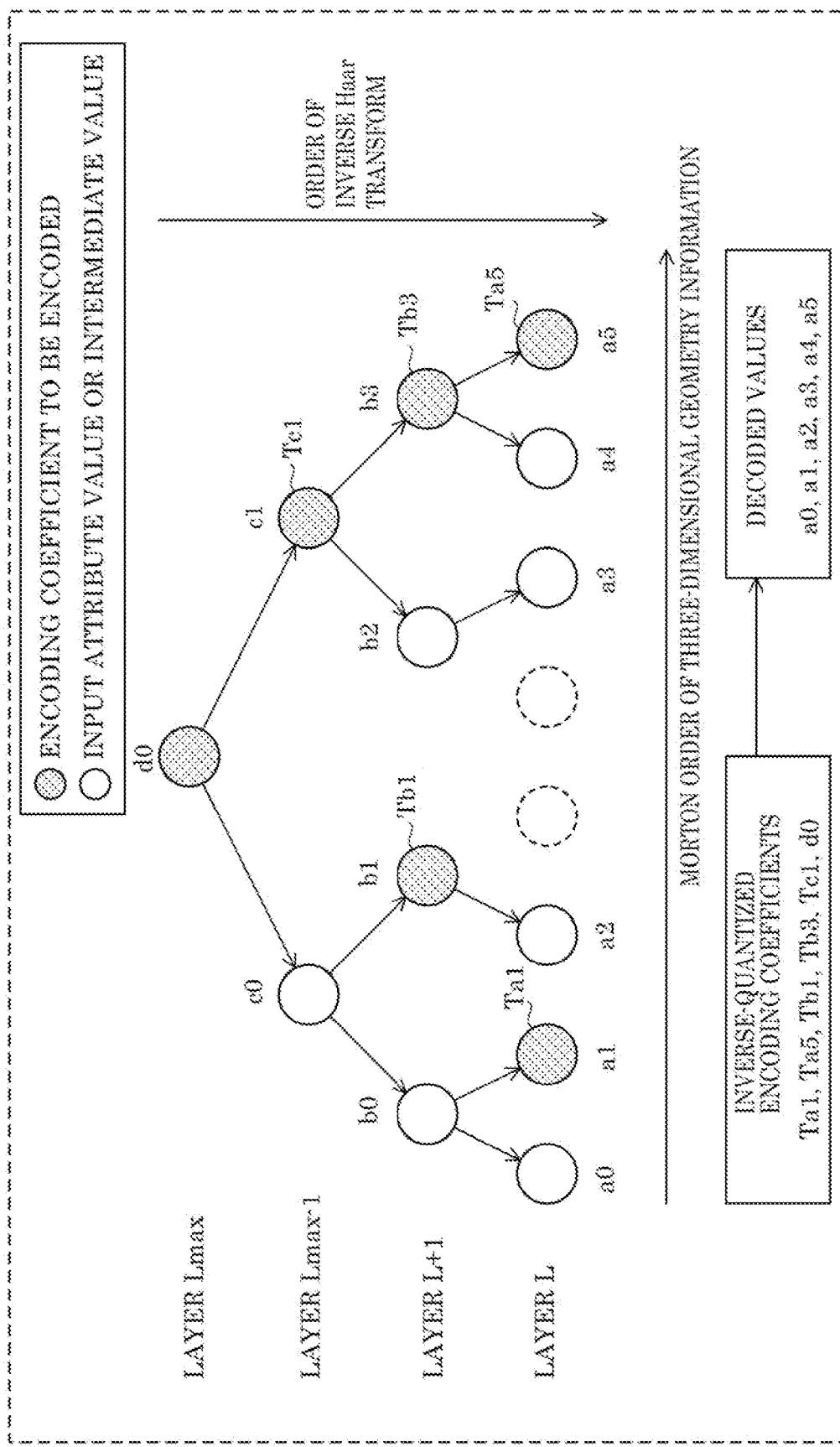
FIG. 115 is a diagram for illustrating decoding of attribute information using RAHT according to Embodiment 10.

When the number of the three-dimensional points to be decoded obtained from the bitstream is greater than 1 of Yes in S7812), the three-dimensional data decoding device generates a RAHT hierarchical structure, such as that shown in FIG. 115, for the plurality of three-dimensional points, and reconstructs attribute information as described above in Embodiment 7 with reference to FIG. 31 or the like (S7813). Specifically, the three-dimensional data decoding device obtains inverse-quantized encoding coefficients Ta1, Ta5, Tb1, Tb3, Tc1, and d0, and reconstructs a plurality of pieces of attribute information a0, a1, a2, a3, a4, and a5 on a plurality of input three-dimensional points by applying an inverse Haar transform on encoding coefficients Ta1, Ta5, Tb1, Tb3, Tc1, and d0 using the generated RAHT hierarchical structure.

On the other hand, when the number of the three-dimensional points to be decoded obtained from the bitstream is 1 (if No in S7812), the three-dimensional data decoding device skips the step of generating a RAHT hierarchical structure, and reconstructs attribute information on the three-dimensional point by using an inverse-quantized encoding coefficient as a value of the attribute information on the three-dimensional point (S7814). For example, the three-dimensional data decoding device reconstructs attribute information by using an encoding coefficient included in the bitstream as attribute information a0.

In this way, the three-dimensional data decoding device can properly decode the three-dimensional point even when the number of the three-dimensional points to be decoded is 1.

Note that when attribute information is N-dimensional, the three-dimensional data decoding device may independently apply an inverse Haar transform for each dimension and decode an encoding coefficient for each dimension. If attribute information is color information (RGB or YUV, for example), for example, the three-dimensional data decoding device may apply an inverse Haar transform to an encoding coefficient for each component of the color information and decode an attribute value for each component.

Figure 116:
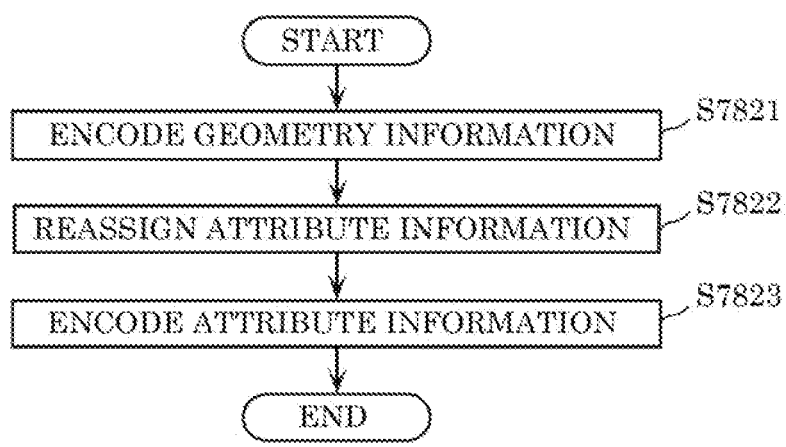
FIG. 116 is a flowchart of a three-dimensional data encoding process according to Embodiment 10.

FIG. 116 is a flowchart of a three-dimensional data encoding process according to this embodiment. First, the three-dimensional data encoding device encodes geometry information (geometry) (S7821). For example, the three-dimensional data encoding device performs the encoding using an octree representation.

The three-dimensional data encoding device then transforms attribute information (S7822). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7823). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. This allows the three-dimensional data decoding device to selectively decode attribute information that needs to be decoded and therefore omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

Figure 117:
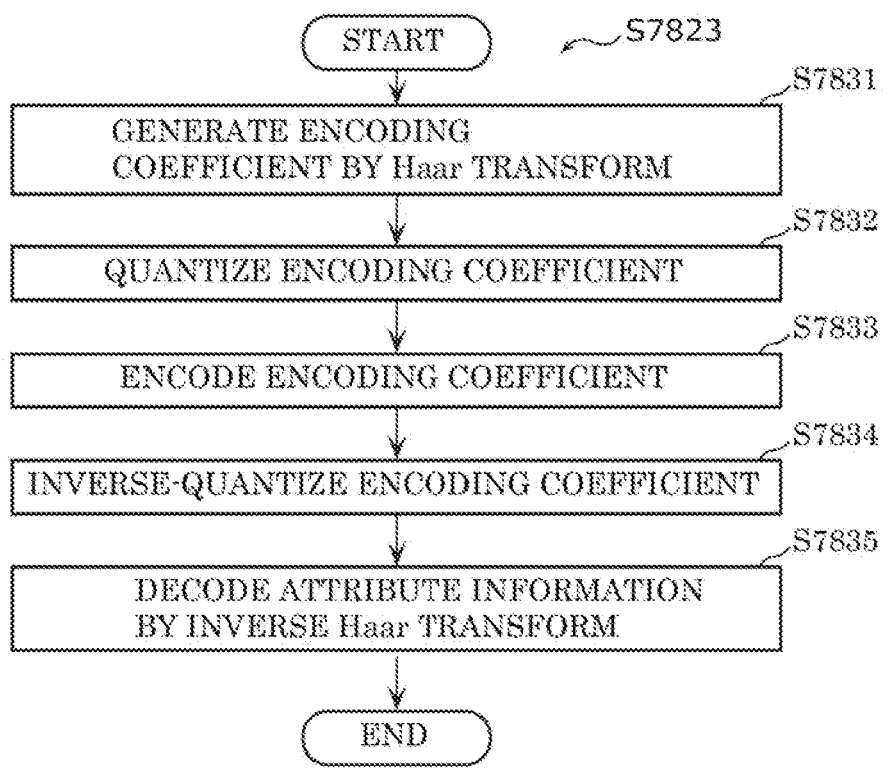
FIG. 117 is a flowchart of an attribute information encoding process according to Embodiment 10.

FIG. 117 is a flowchart of an attribute information encoding process (S7823). First, the three-dimensional data encoding device generates an encoding coefficient from attribute information by Haar transform (S7831). Specifically, in step S7831, the three-dimensional data encoding device performs the series of steps S7801 to S7803 described above with reference to FIG. 112. The three-dimensional data encoding device then applies quantization to the encoding coefficient (S7832). The three-dimensional data encoding device then encodes the quantized encoding coefficient to generate encoded attribute information (bitstream) (S7833).

The three-dimensional data encoding device also applies an inverse quantization to the quantized encoding coefficient (S7834). The three-dimensional data decoding device then decodes the attribute information by applying an inverse Haar transform to the inverse-quantized encoding coefficient (S7835). For example, the decoded attribute information is to be referred to in a subsequent encoding.

Figure 118:
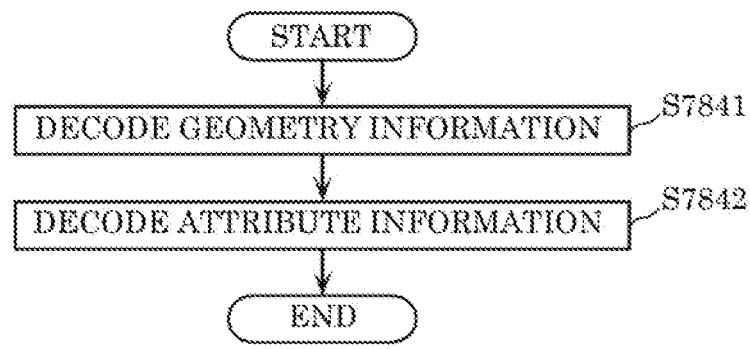
FIG. 118 is a flowchart of a three-dimensional data decoding process according to Embodiment 10.

FIG. 118 is a flowchart of a three-dimensional data decoding process according to this embodiment. First, the three-dimensional data decoding device decodes geometry information (geometry) from the bitstream (S7841). For example, the three-dimensional data decoding device performs the decoding using an octree representation.

The three-dimensional data decoding device then decodes attribute information from the bitstream (S7842). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device may decode the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

Figure 119:
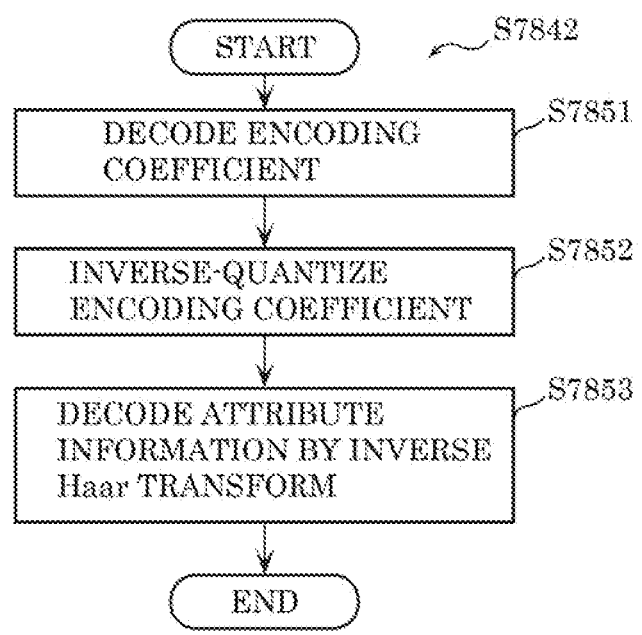

FIG. 119 is a flowchart of an attribute information decoding process (S7842). First, the three-dimensional data decoding device decodes an encoding coefficient from a bitstream (S7851). The three-dimensional data decoding device then applies an inverse quantization to the encoding coefficient (S7852). The three-dimensional data decoding device then decodes attribute information by applying an inverse Haar transform to the inverse-quantized encoding coefficient (S7853). Specifically, in step S7853, the three-dimensional data decoding device performs the series of steps S7811 to S7814 described above with reference to FIG. 114.

Figure 120:
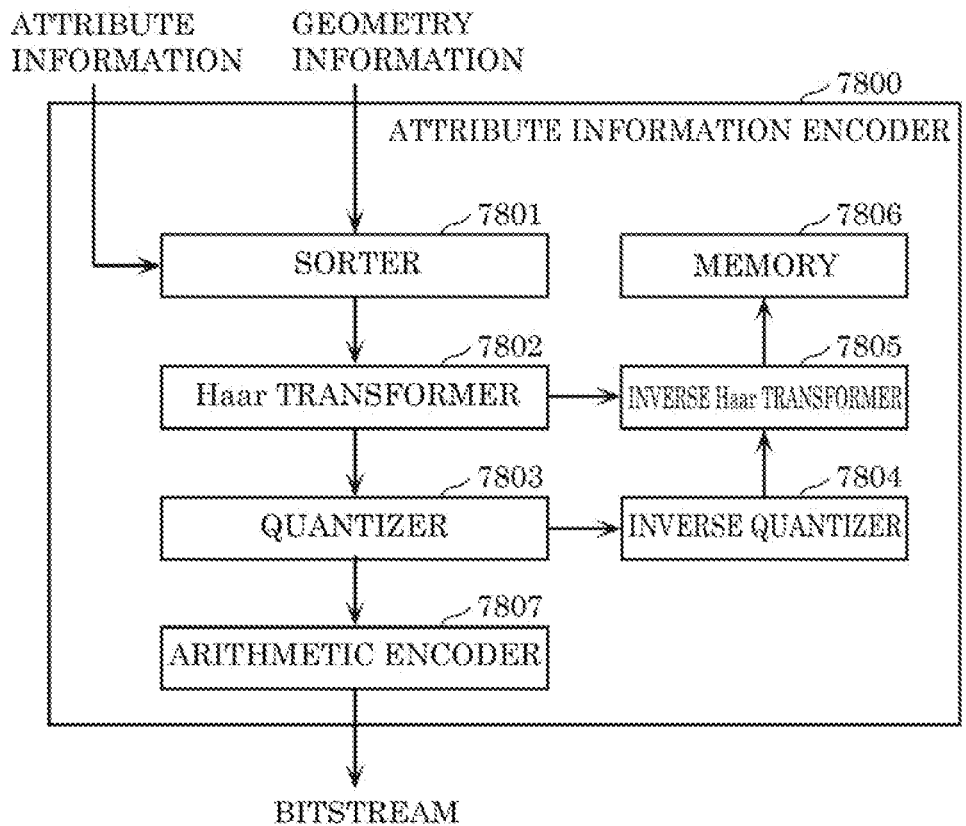

FIG. 120 is a block diagram of attribute information encoder 7800 included in the three-dimensional data encoding device. Attribute information encoder 7800 includes sorter 7801, Haar transformer 7802, quantizer 7803, inverse quantizer 7804, inverse Haar transformer 7805, memory 7806, and arithmetic encoder 7807.

Sorter 7801 generates a Morton code using geometry information on a three-dimensional point, and sorts a plurality of three-dimensional points in the order of Morton codes. Haar transformer 7802 generates an encoding coefficient by applying a Haar transform to attribute information. Specifically, Haar transformer 7802 performs the series of steps S7801 to S7803 described above with reference to FIG. 112. Quantizer 7803 quantizes the encoding coefficient of the attribute information.

Inverse quantizer 7804 inverse-quantizes the quantized encoding coefficient. Inverse Haar transformer 7805 applies an inverse Haar transform to the encoding coefficient. Specifically, inverse Haar transformer 7805 performs a process similar to the series of steps S7811 to S7814 described above with reference to FIG. 114. Memory 7806 stores values of the decoded attribute information on the plurality of three-dimensional points. For example, the decoded attribute information on the three-dimensional points stored in memory 7806 may be used for prediction of a three-dimensional point yet to be encoded.

Arithmetic encoder 7807 calculates ZeroCnt from the quantized encoding coefficient, and arithmetically encodes ZeroCnt. Arithmetic encoder 7807 also arithmetically encodes any quantized encoding coefficient that is not zero. Arithmetic encoder 7807 may binarize the encoding coefficient before the arithmetic encoding. Arithmetic encoder 7807 may generate and encode various kinds of header information.

Figure 121:
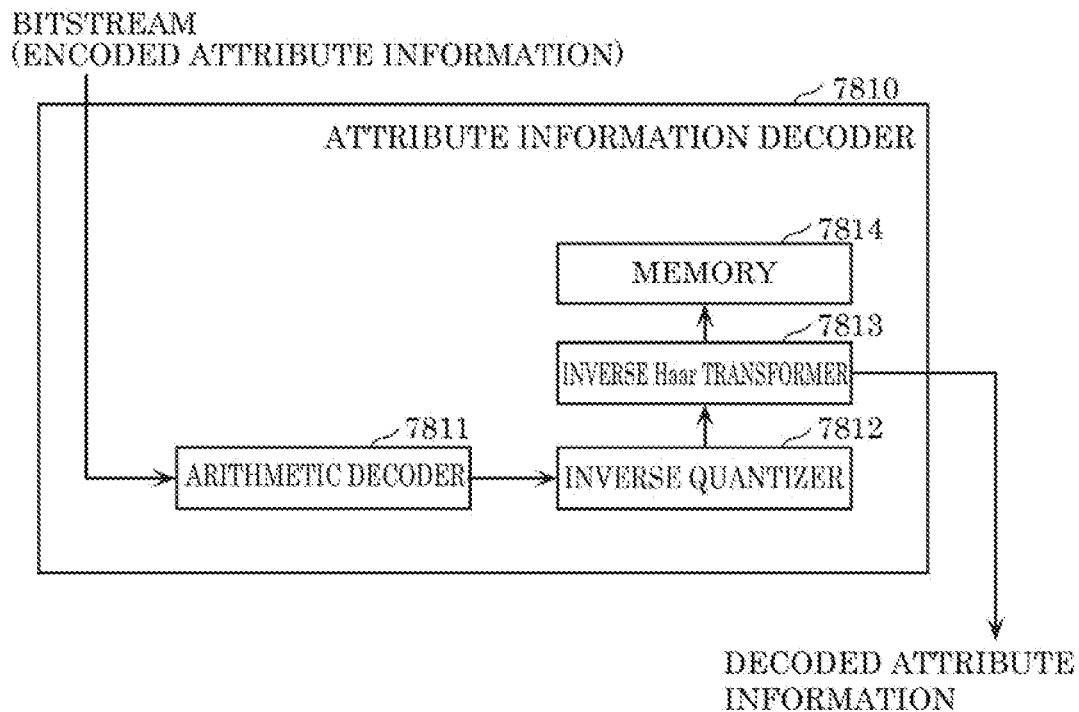

FIG. 121 is a block diagram of attribute information decoder 7810 included in the three-dimensional data decoding device. Attribute information decoder 7810 includes arithmetic decoder 7811, inverse quantizer 7812, inverse Haar transformer 7813, and memory 7814.

Arithmetic decoder 7811 arithmetically decodes ZeroCnt and the encoding coefficient included in the bitstream. Note that arithmetic decoder 7811 may decode various kinds of header information.

Inverse quantizer 7812 inverse-quantizes the arithmetically decoded encoding coefficient. Inverse Haar transformer 7813 applies an inverse Haar transform to the inverse-quantized encoding coefficient. Specifically, inverse Haar transformer 7813 performs the series of steps S7811 to S7814 described above with reference to FIG. 114. Memory 7814 stores values of the decoded attribute information on the plurality of three-dimensional points. For example, the decoded attribute information on the three-dimensional points stored in memory 7814 may be used for prediction of a three-dimensional point yet to be decoded.

Note that, although an example in which three-dimensional points are encoded in the order from bottom layer to top layer has been described in the above embodiment, the present disclosure is not necessarily limited thereto. For example, Haar-transformed encoding coefficients may be scanned in the order from top layer to bottom layer. Note that, in that case, the three-dimensional data encoding device may encode the number of successive values of 0 as ZeroCnt.

The three-dimensional data encoding device may change whether to use the encoding method using ZeroCnt described in this embodiment on a WLD, SPC or volume basis. In that case, the three-dimensional data encoding device may add, to the header information, information that indicates whether the encoding method using ZeroCnt has been applied or not. This allows the three-dimensional data decoding device to properly perform decoding. In an example of such changing, the three-dimensional data encoding device counts the number of occurrences of an encoding coefficient having a value of 0 for one volume. The three-dimensional data encoding device applies the method using ZeroCnt to the next volume if the count is greater than a predetermined threshold, and does not apply the method using ZeroCnt to the next volume if the count is smaller than or equal to the threshold. In this way, the three-dimensional data encoding device can appropriately change whether to apply the encoding method using ZeroCnt according to the characteristics of the three-dimensional point to be encoded, so that the encoding efficiency can be improved.

Although an example has been shown above in which the three-dimensional data encoding device or the three-dimensional data decoding device according to this embodiment skips the RAHT process if the number of the input three-dimensional points or the number of the three-dimensional points to be decoded is 1, the present disclosure is not necessarily limited thereto. The three-dimensional data encoding device or the three-dimensional data decoding device may define threshold $\alpha$ ($\alpha$ represents an integer greater than or equal to 1), and calculate an encoding coefficient by performing the RAHT process if the number of the input three-dimensional points or the number of the three-dimensional points to be decoded is greater than $\alpha$, and skip the RAHT process if the number of the input three-dimensional points or the number of the three-dimensional points to be decoded is smaller than or equal to α. Threshold α is an example predetermined number. By performing the encoding or decoding process by skipping the RAHT process when the number of the three-dimensional points to be encoded is smaller than or equal to threshold α in this way, the processing time can be reduced, and the α or less three-dimensional points can be appropriately encoded or decoded. Note that threshold α may be added to the header or the like or may be prescribed by a profile, a level or the like of a standard.

Although an example has been shown above in which the three-dimensional data encoding device or the three-dimensional data decoding device according to this embodiment skips the RAHT process if the number of the input three-dimensional points or the number of the three-dimensional points to be decoded is 1, the present disclosure is not necessarily limited thereto. The three-dimensional data encoding device or the three-dimensional data decoding device may be inhibited from using RAHT for encoding or decoding when the number of the input three-dimensional points or the number of the three-dimensional points to be decoded is 1. Specifically, when the number of the input three-dimensional points or the number of the three-dimensional points to be decoded is 1, the three-dimensional data encoding device or the three-dimensional data decoding device may avoid using RAHT for encoding or decoding by limiting the value of EnableRAHT to 0. In this way, the three-dimensional data encoding device or the three-dimensional data decoding device can appropriately encode or decode one three-dimensional point.

Note that EnableRAHT, which is information used to change whether to encode attribute information on a three-dimensional point by applying RAHT or not, may be added to the header on a processing unit basis, in order that the process is changed on a basis of a processing unit, such as WLD, SPC, or volume. EnableRAHT may be added on a slice basis. For example, when EnableRAHT is added to a slice header, the three-dimensional points in the slice may be encoded by setting EnableRAHT=0 when the number of the three-dimensional points in the slice is smaller than or equal to a certain number, such as when the number is 1, and the three-dimensional points in the slice may be encoded by setting EnableRAHT=1 when the number of the three-dimensional points in the slice is greater than the certain number, such as when the number is greater than or equal to 2. In this way, three-dimensional points can be appropriately encoded by changing whether to apply RAHT or not based on the number of the three-dimensional points in the slice.

Note that an example in which whether to apply RAHT or not is changed based on the number of the three-dimensional points in the slice has been shown above, the present disclosure is not necessarily limited thereto, and whether to apply RAHT or not may be changed based on whether the three-dimensional points in the slice is a dense point cloud or a sparse point cloud. Here, the "dense point cloud" may refer to a point cloud in which the distances between the three-dimensional points are relatively short (that is, smaller than a predetermined distance), and the three-dimensional points are located at relatively equal distances from each other. The "sparse point cloud" may refer to a point cloud in which the distances between the three-dimensional points are relatively long (that is, greater than the predetermined distance), and the three-dimensional points are located at relatively random distances from each other. As a specific example of the changing, the three-dimensional data encoding device may encode attribute information by setting EnableRAHT=0 and EnableUnuniformLoD=0, calculating information on distances between the input three-dimensional points in the method according to Embodiment 8 (described above with reference to FIG. 50) to generate LoD layers when the three-dimensional points in the slice is a dense point cloud, for example, and may encode attribute information by applying RAHT by setting EnableRAHT=1 otherwise, such as when the three-dimensional points in the slice is a sparse point cloud. In this way, the three-dimensional data encoding device can change the attribute information encoding method based on whether the input three-dimensional points or the three-dimensional points in a slice are a dense point cloud or not, so that the encoding efficiency can be improved.

Although an example has been shown above in which the three-dimensional data encoding device according to this embodiment skips the Haar transform process of RAHT and generates a value of attribute information on a three-dimensional point as an encoding coefficient when the number of the input three-dimensional points is 1, the present disclosure is not necessarily limited to cases where RAHT is used, and can be applied to a method of calculating a predicted value by generating a LoD, for example. Specifically, when the number of the input three-dimensional points is 1, the three-dimensional data encoding device may skip a process of generating a LoD and calculating a predicted value, and encode a value of attribute information on the three-dimensional point by quantizing an encoding coefficient used as the value of the attribute information on the three-dimensional point and applying a binary arithmetic encoding on the quantized encoding coefficient. In this way, when the number of the input three-dimensional points is 1, the three-dimensional point can be properly encoded while reducing the processing amount. Similarly, when the number of the three-dimensional points to be decoded is 1, the three-dimensional data decoding device may skip a process of generating a LoD and calculating a predicted value, and decode a value of attribute information on the three-dimensional point by using inverse-quantized encoding coefficient as the value of the attribute information on the three-dimensional point. In this way, when the number of the three-dimensional points to be decoded is 1, the three-dimensional point can be properly decoded while reducing the processing amount.

Embodiment 11

In this embodiment, a reversible (Lossless) attribute encoding will be described. To achieve high compression, attribute information included in Point Cloud Compression (PCC) data is transformed in a plurality of methods, such as Lifting, Region Adaptive Hierarchical Transform (RAHT) and other transform methods. Here, Lifting is one of transform methods using Level of Detail (LoD).

Important signal information tends to be included in a low-frequency component, and therefore the code amount is reduced by quantizing a high-frequency component. That is, the transform process has strong energy compression characteristics.

On the other hand, in order to maintain the original information while reducing the number of bits, the reversible compression is needed. Existing transforms, such as Lifting and RAHT, involves a division and a square-root operator and therefore cannot achieve reversible compression. In order to achieve an efficient and effective reversible compression, an integer-to-integer transform that is not complicated is needed.

Figure 122:
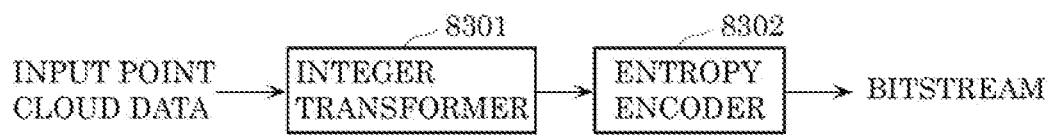

FIG. 122 is a diagram showing a configuration of a three-dimensional data encoding device. As shown in FIG. 122, the three-dimensional data encoding device includes integer transformer 8301 and entropy encoder 8302. Integer transformer 8301 generates a coefficient value by integer-transforming input point cloud data. Entropy encoder 8302 generates a bitstream by entropy-encoding the coefficient value.

Figure 123:
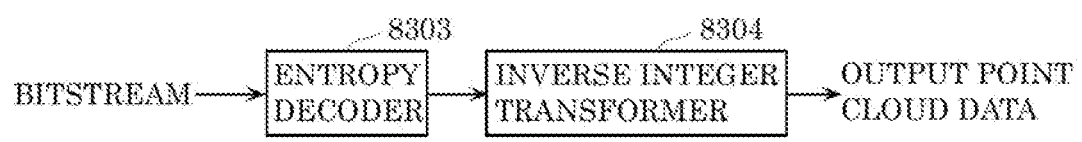

FIG. 123 is a diagram showing a configuration of a three-dimensional data decoding device. As shown in FIG. 123, the three-dimensional data decoding device includes entropy decoder 8303 and inverse integer transformer 8304. Entropy decoder 8303 obtains a coefficient value by decoding a bitstream. Inverse integer transformer 8304 generates output point cloud data by inverse integer-transforming the coefficient value.

Figure 124:
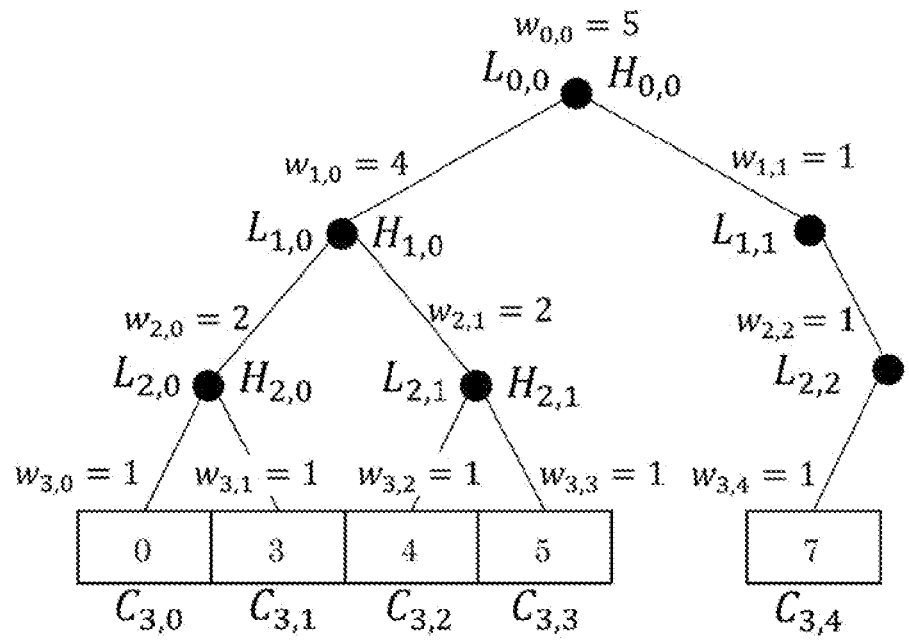

In the following, RAHT will be describe. RAHT is an example of the transform processings applied to three-dimensional points. FIG. 124 is a diagram for illustrating RAHT. m-th Low-frequency component $L_{l,m}$ and m-th high-frequency component $H_{l,m}$ in layer l are expressed by two low-frequency components $C_{l+1,\ 2m}$ and $C_{l+1,\ 2m+1}$ in layer l+1 according to the following (Equation O1). That is, low-frequency component $L_{l,m}$ is expressed by (Equation O2), and high-frequency component $H_{l,m}$ is expressed by (Equation O3).

A high-frequency component is encoded by quantization and entropy encoding. A low-frequency component is used in the subsequent layer as shown by (Equation O4). Coefficient α and β are updated for each upper layer. Coefficients α and β are expressed by (Equation O5) and (Equation O6), respectively. Weight $W_{l,m}$ is expressed by (Equation O7).

[Math. 12]

$$\begin{bmatrix} L_{l,m} \\ H_{l,m} \end{bmatrix} = \begin{bmatrix} \alpha & \beta \\ -\beta & \alpha \end{bmatrix} \begin{bmatrix} C_{l+1,2m} \\ C_{l+1,2m+1} \end{bmatrix} \quad \text{(Equation O1)}$$

$$L_{l,m} = \alpha C_{l+1,2m} + \beta C_{l+1,2m+1} \quad \text{(Equation O2)}$$

$$H_{l,m} = \alpha C_{l+1,2m+1} - \beta C_{l+1,2m} \quad \text{(Equation O3)}$$

$$C_{l,m} = L_{l,m} \quad \text{(Equation O4)}$$

$$\alpha = \frac{\sqrt{w_{l+1,2m}}}{\sqrt{w_{l+1,2m} + w_{l+1,2m+1}}} \quad \text{(Equation O5)}$$

$$\beta = \frac{\sqrt{w_{l+1,2m+1}}}{\sqrt{w_{l+1,2m} + w_{l+1,2m+1}}} \quad \text{(Equation O6)}$$

$$w_{l,m} = w_{l+1,2m} + w_{l+1,2m+1} \quad \text{(Equation O7)}$$

Next, an integer-to-integer transform will be described. The RAHT process involves a square-root operator and a division. This means that information is lost in RAHT, and RAHT cannot achieve reversible compression. On the other hand, the integer-to-integer transform can achieve reversible compression.

Figure 125:
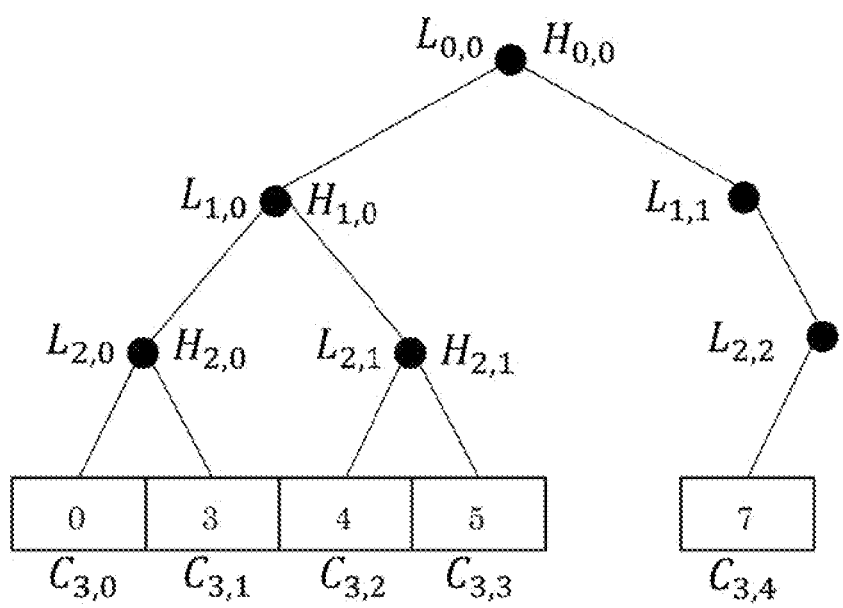

FIG. 125 is a diagram for illustrating an integer-to-integer transform. In the integer-to-integer transform, a fixed value is used as a coefficient in RAHT. For example, an unnormalized Haar transform expressed by the following (Equation O8) is used. That is, low-frequency component $L_{l,m}$ is expressed by (Equation O9), and high-frequency component $H_{l,m}$ is expressed by (Equation O10).

A high-frequency component is encoded by quantization and entropy encoding. A low-frequency component is used in the subsequent layer as shown by (Equation O11).

[Math. 13]

$$\begin{bmatrix} L_{l,m} \\ H_{l,m} \end{bmatrix} = \begin{bmatrix} \frac{1}{2} & \frac{1}{2} \\ -1 & 1 \end{bmatrix} \begin{bmatrix} C_{l+1,2m} \\ C_{l+1,2m+1} \end{bmatrix} \quad \text{(Equation O8)}$$

$$L_{l,m} = (C_{l+1,2m} + C_{l+1,2m+1})/2 \quad \text{(Equation O9)}$$

$$H_{l,m} = C_{l+1,2m+1} - C_{l+1,2m} \quad \text{(Equation O10)}$$

$$C_{l,m} = L_{l,m} \quad \text{(Equation O11)}$$

The unnormalized Haar transform can be rewritten as (Equation O12) and (Equation O13).

[Math. 14]

$$H_{l,m} = C_{l+1,2m+1} - C_{l+1,2m} \quad \text{(Equation O12)}$$

$$L_{l,m} = \frac{C_{l+1,2m} + C_{l+1,2m+1}}{2} \quad \text{(Equation O13)}$$

$$= C_{l+1,2m} + \frac{H_{l,m}}{2}$$

An integer Haar transform is achieved according to (Equation O14) and (Equation O15), and an inverse integer Haar transform is achieved according to (Equation O16) and (Equation O17). Here, ∥ represents a floor function. Since both (Equation O15) and (Equation O16) includes $|H_{l,m}/2|$, a loss caused by $|H_{l,m}/2|$ is cancelled by the integer Haar transform and the inverse integer Haar transform. In this way, reversible compression is achieved. Here, $C_{i,j}$, is defined as an integer, and therefore, $H_{i,j}$ and $L_{i,j}$ are also integers.

[Math. 15]

$$H_{l,m} = C_{l+1,2m+1} - C_{l+1,2m} \quad \text{(Equation O14)}$$

$$L_{l,m} = C_{l+1,2m} + \lfloor H_{l,m}/2 \rfloor \quad \text{(Equation O15)}$$

$$C_{l,2m} = L_{l,m} - \lfloor H_{l,m}/2 \rfloor \quad \text{(Equation O16)}$$

$$C_{l+1,2m+1} = H_{l+m} - C_{l+1,2m} \quad \text{(Equation O17)}$$

Therefore, an efficient implementation can be achieved by the following (Equation O18) to (Equation O21). That is, a transform can be achieved by one addition, one subtraction, and one right shifting (down shifting).

[Math. 16]

$$H_{l,m} = C_{l+1,2m+1} - C_{l+1,2m} \quad \text{(Equation O18)}$$

$$L_{l,m} = C_{l+1,2m} + (H_{l,m} >> 1) \quad \text{(Equation O19)}$$

$$C_{l+1,2m} = L_{l,m} - (H_{l,m} >> 1) \quad \text{(Equation O20)}$$

$$C_{l+1,2m+1} = H_{l,m} + C_{l+1,2m} \quad \text{(Equation O21)}$$

Figure 126:
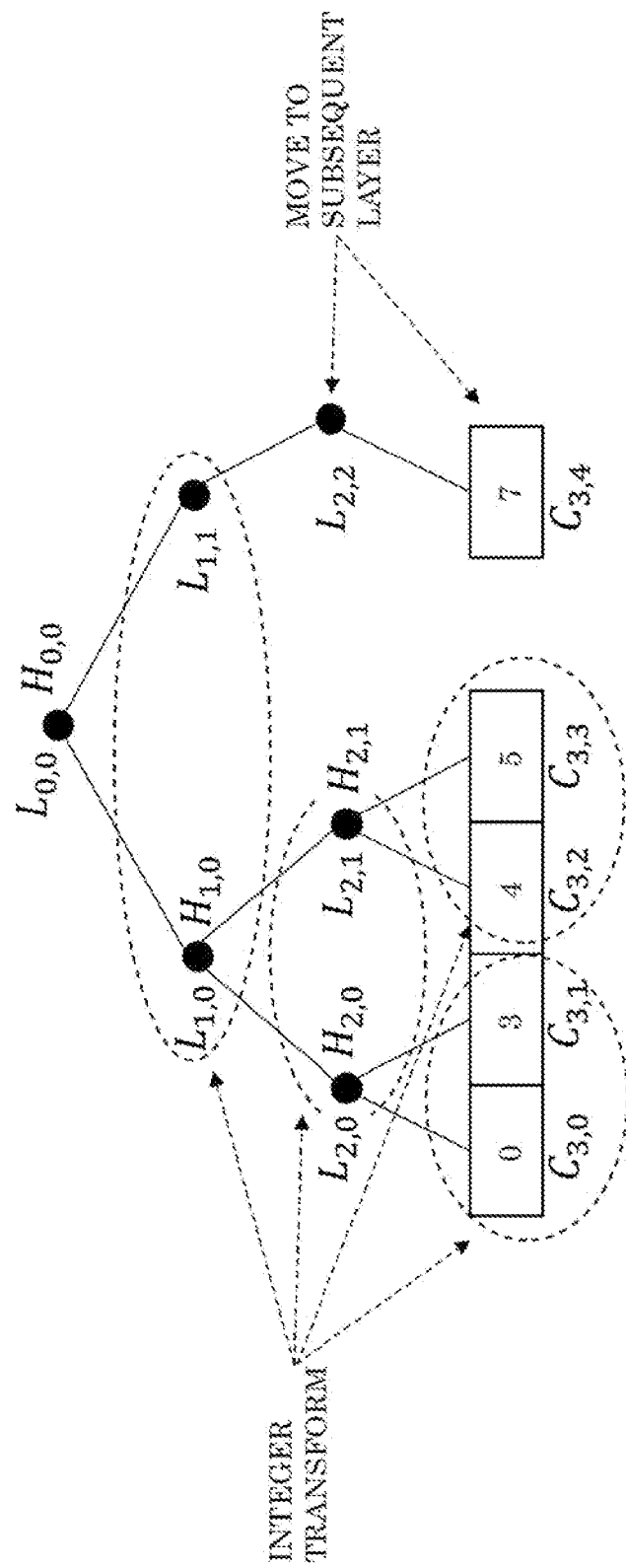

A recursive integer-to-integer transform will be described. FIG. 126 is a diagram for illustrating a hierarchical transform processing. When the Haar transform is applied to an image, a pair of pieces of data is required in order to perform a transform suitable for pixel transform. In the Haar transform for a three-dimensional point cloud, an integer Haar is applied when a three-dimensional point pair, which is a pair of point clouds, can be formed, and data on three-dimensional points is moved to the subsequent layer (level) when a three-dimensional point pair is not available. Then, this process is recursively performed.

Figure 127:
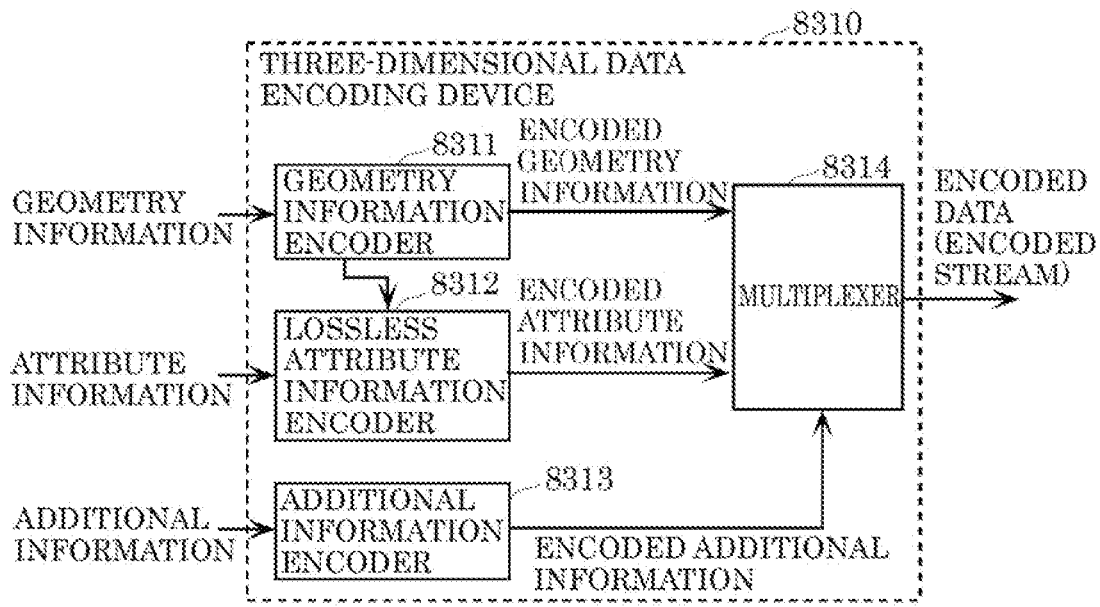

Next, a configuration of a three-dimensional data encoding device will be described. FIG. 127 is a block diagram of three-dimensional data encoding device 8310. Three-dimensional data encoding device 8310 generates encoded data (encoded stream) by encoding point cloud data (point cloud). Three-dimensional data encoding device 8310 includes geometry information encoder 8311, lossless attribute information encoder 8312, additional information encoder 8313, and multiplexer 8314.

Geometry information encoder 8311 generates encoded geometry information by encoding geometry information. For example, geometry information encoder 8311 encodes geometry information using an N-ary tree structure, such as an octree. Specifically, in the case of an octree, a current space is divided into eight nodes (subspaces), and 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined layer is reached or the number of the point clouds included in each node becomes smaller than or equal to a threshold.

Lossless attribute information encoder 8312 generates encoded attribute information, which is encoded data, by encoding attribute information using configuration information generated by geometry information encoder 8311.

Additional information encoder 8313 generates encoded additional information by encoding additional information included in point cloud data.

Multiplexer 8314 generates encoded data (encoded stream) by multiplexing the encoded geometry information, the encoded attribute information, and the encoded additional information, and transmits the generated encoded data. The encoded additional information is used in the decoding.

Figure 128:
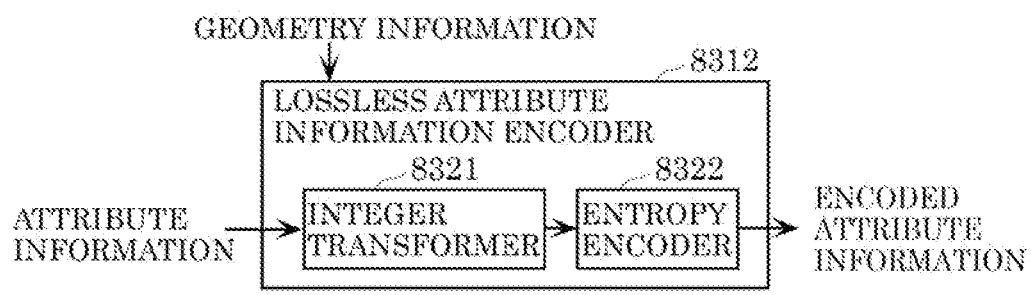

FIG. 128 is a block diagram of lossless attribute information encoder 8312. Lossless attribute information encoder 8312 includes integer transformer 8321 and entropy encoder 8322. Integer transformer 8321 generates a coefficient value by performing an integer transform (such as an integer Haar transform) on attribute information. Entropy encoder 8322 generates encoded attribute information by entropy-encoding the coefficient value.

Figure 129:
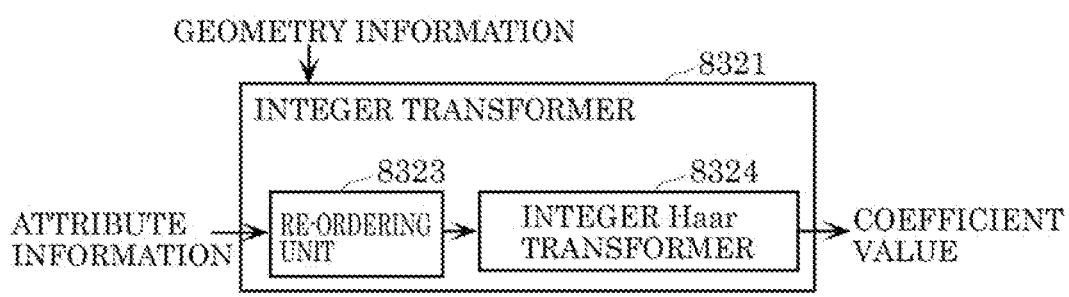

FIG. 129 is a block diagram of integer transformer 8321. Integer transformer 8321 includes re-ordering unit 8323 and integer Haar transformer 8324. Re-ordering unit 8323 re-orders attribute information based on geometry information. For example, re-ordering unit 8323 re-orders attribute information in Morton order. Integer Haar transformer 8324 generates a coefficient value by performing an integer Haar transform on the re-ordered attribute information.

Figure 130:
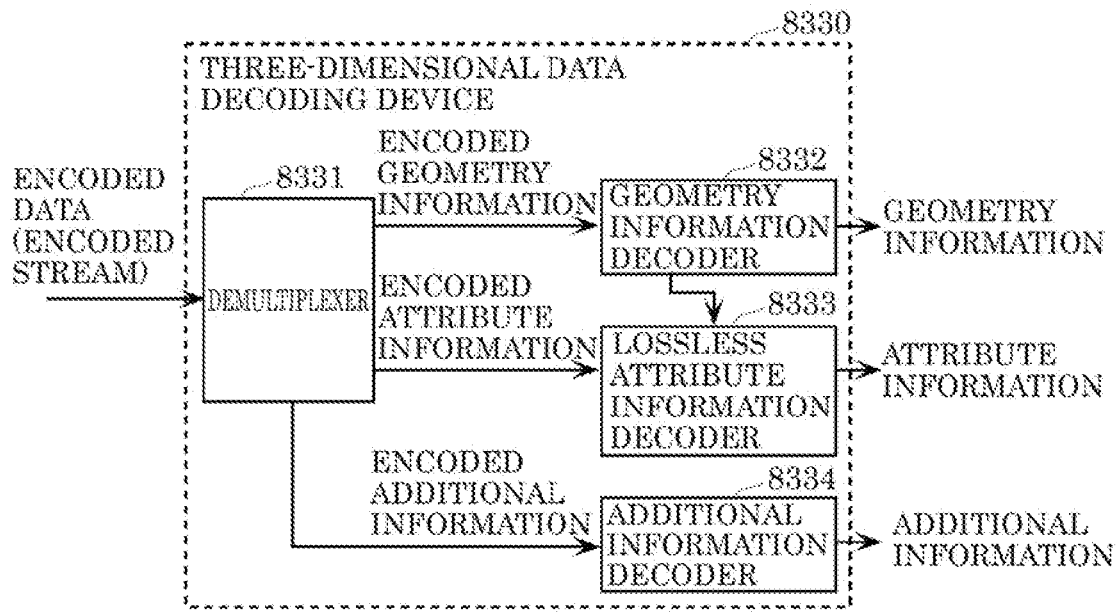

Next, a configuration of a three-dimensional data decoding device according to this embodiment will be described. FIG. 130 is a block diagram showing a configuration of three-dimensional data decoding device 8330. Three-dimensional data decoding device 8330 reproduces point cloud data by decoding encoded data (encoded stream) generated by encoding the point cloud data. Three-dimensional data decoding device 8330 includes demultiplexer 8331, a plurality of geometry information decoders 8332, a plurality of lossless attribute information decoders 8333, and additional information decoder 8334.

Demultiplexer 8331 generates encoded geometry information, encoded attribute information, and encoded additional information by demultiplexing encoded data (encoded stream).

Geometry information decoder 8332 generates geometry information by decoding encoded geometry information. Lossless attribute information decoder 8333 generates attribute information by decoding encoded attribute information. For example, lossless attribute information decoder 8333 generates attribute information by performing an inverse integer transform (such as an inverse integer Haar transform) on encoded attribute information.

FIG. 131 is a block diagram of lossless attribute information decoder 8333. Lossless attribute information decoder 8333 includes entropy decoder 8341 and inverse integer transformer 8342. Entropy decoder 8341 generates a coefficient value by entropy-decoding encoded attribute information. Inverse integer transformer 8342 generates attribute information by performing an inverse integer transform (such as an inverse integer Haar transform) on the coefficient value.

FIG. 132 is a block diagram of inverse integer transformer 8342. Inverse integer transformer 8342 includes re-ordering unit 8343 and inverse integer Haar transformer 8344. Re-ordering unit 8343 re-orders coefficient values based on geometry information. For example, re-ordering unit 8343 re-orders coefficient values in Morton order. Inverse integer Haar transformer 8344 generates attribute information by performing an inverse integer Haar transform on the re-ordered coefficient values.

The three-dimensional data encoding device may add, to the header of the bitstream or the like, information that indicates which of the reversible (Lossless) encoding and the irreversible (lossy) encoding has been used. For example, the three-dimensional data encoding device may add lossless_enable_flag to the header. When lossless_enable_flag=1, the three-dimensional data decoding device decodes the reversibly encoded bitstream by applying the inverse integer Haar transform. When lossless_enable_flag=0, the three-dimensional data decoding device decodes the irreversibly encoded bitstream by applying the inverse RAHT. In this way, the three-dimensional data decoding device can properly decode the bitstream by changing the inverse transform processing in accordance with the value of lossless_enable_flag.

Note that the information that indicates which of the reversible encoding and the irreversible encoding has been used for encoding is not necessarily limited thereto, and the value of quantization parameter QP or quantization step Qstep can also be used, for example. For example, when the value of the quantization parameter or quantization step is a particular value (QP=4 or Qstep=1, for example), the three-dimensional data decoding device may determine that the bitstream has been encoded by reversible encoding, and decode the reversibly encoded bitstream by applying the inverse integer Haar transform. When the value of the quantization parameter or quantization step is greater than the particular value (QP=4 or Qstep=1, for example), the three-dimensional data decoding device may determine that the bitstream has been encoded by irreversible encoding, and decode the irreversibly encoded bitstream by applying the inverse RAHT.

Next, a lossless attribute information encoding processing will be described. FIG. 133 is a flowchart of a lossless attribute information encoding processing.

First, the three-dimensional data encoding device re-orders attribute information on a three-dimensional point cloud (S8301). For example, the three-dimensional data encoding device re-orders attribute information on a three-dimensional point cloud in Morton order.

The three-dimensional data encoding device then selects a current point to be processed from the three-dimensional point cloud (S8302). Specifically, the three-dimensional data encoding device selects the leading three-dimensional point in the three-dimensional point cloud re-ordered in Morton order.

The three-dimensional data encoding device then determines whether or not there is a three-dimensional point pair (Point Pair), which a three-dimensional point located next to the current three-dimensional point in Morton order (S8303). When there is a three-dimensional point pair (if Yes in S8304), the three-dimensional data encoding device generates a coefficient value including a high-frequency component and a low-frequency component by performing the integer Haar transform using the three-dimensional point pair (S8305). The three-dimensional data encoding device then encodes (entropy-encodes, for example) the generated high-frequency component, and stores the encoded high-frequency component in the bitstream (S8306). The three-dimensional data encoding device also stores the low-frequency component in a memory or the like for the processing for the subsequent layer (S8307).

On the other hand, when there is no three-dimensional point pair if No in S8304), the three-dimensional data encoding device stores the attribute information on the current three-dimensional point in the memory or the like for the subsequent layer (S8307).

When the current three-dimensional point is not the last three-dimensional point in the current layer, which is the layer to be processed (if No in S8308), the three-dimensional data encoding device selects the subsequent three-dimensional point in Morton order as a current three-dimensional point (S8302), and performs step S8303 and the following process on the selected current three-dimensional point. The "subsequent three-dimensional point in Morton order" means the three-dimensional point subsequent to the three-dimensional point pair when there is a three-dimensional point pair, and refers to the three-dimensional point subsequent to the current three-dimensional point when there is no three-dimensional point pair.

When the current three-dimensional point is the last three-dimensional point in the current layer of Yes in S8308), the three-dimensional data encoding device starts the processing for the subsequent layer (the layer directly above the current layer) (S8309). When the former current layer is not the last layer (top layer) (if No in S8310), the three-dimensional data encoding device selects the first three-dimensional point in Morton order in the subsequent layer as a current three-dimensional point (S8302), and performs step S8303 and the following process on the selected current three-dimensional point.

When the former current layer is the last layer of Yes in S8310), the three-dimensional data encoding device encodes (entropy-encodes, for example) the low-frequency component generated in the last layer (top layer), and stores the encoded low-frequency component in the bitstream (S8311). By the process described above, encoded attribute information is generated which includes the encoded high-frequency component for the three-dimensional point pair included in each layer and the encoded low-frequency component for the top layer.

Next, a lossless attribute information decoding processing will be described. FIG. 134 is a flowchart of a lossless attribute information decoding processing.

First, the three-dimensional data decoding device decodes coefficient values from the bitstream (S8321). The coefficient value includes the high-frequency component for the three-dimensional point pair included in each layer and the low-frequency component for the top layer. The three-dimensional data decoding device then re-orders the obtained coefficient values (S8322). For example, the three-dimensional data decoding device re-orders a plurality of high-frequency components in Morton order.

The three-dimensional data decoding device then obtains a low-frequency component to be processed and a high-frequency component to be processed, which are the low-frequency component and the high-frequency component of the three-dimensional point pair to be processed (S8323 and S8324). Specifically, the low-frequency component to be processed for the top layer is the low-frequency component decoded from the bitstream, and the low-frequency component to be processed for the layers other than the top layer is the low-frequency component obtained by the inverse transform processing in the layer directly above the layer. The high-frequency component to be processed for the top layer is the leading high-frequency component of the high-frequency components re-ordered in Morton order. Note that, when there is no three-dimensional point pair, there is no high-frequency component to be processed.

When there is a three-dimensional point pair (if Yes in S8325), that is, when there is a high-frequency component to be processed, the three-dimensional data decoding device generates a low-frequency component for the layer directly below the layer by performing the inverse integer Haar transform using the low-frequency component to be processed and the high-frequency component to be processed (S8326). Note that, when the current layer is the bottom layer, attribute information is generated by the inverse integer Haar transform.

The three-dimensional data decoding device stores the generated low-frequency component in a memory or the like for the processing for the subsequent layer (S8327).

On the other hand, when there is no three-dimensional point pair if No in S8325), the three-dimensional data decoding device stores the low-frequency component to be processed in the memory or the like for the subsequent layer (S8327).

When the coefficient value (three-dimensional point pair) to be processed is not the last coefficient value in the current layer (if No in S8328), the three-dimensional data decoding device selects the subsequent three-dimensional point pair in Morton order as a three-dimensional point to be processed, and performs step S8323 and the following process on the selected three-dimensional point pair.

When the coefficient value to be processed is the last coefficient value in the current layer (if Yes in S8328), the three-dimensional data decoding device starts the processing for the subsequent layer (the layer directly below the layer) (S8329). When the former current layer is not the last layer (bottom layer) (if No in S8330), the three-dimensional data decoding device selects the first three-dimensional point pair in Morton order in the subsequent layer as a three-dimensional point pair to be processed, and performs step S8323 and the following process on the selected three-dimensional point pair.

When the former current layer is the last layer of Yes in S8330), the three-dimensional data decoding device ends the processing. By the processing described above, the attribute information on all the three-dimensional points is obtained.

Next, example configurations of integer Haar transformer 8324 and inverse integer Haar transformer 8344 will be described. FIG. 135 is a diagram showing an example configuration of integer Haar transformer 8324. As shown in FIG. 135, integer Haar transformer 8324 includes subtractor 8351, right shifter 8352, and adder 8353. Here, $C_1$ and $C_2$ represent attribute information on a three-dimensional point pair for the bottom layer, and represent low-frequency components of a three-dimensional point pair obtained in the layer directly below the layer for a layer other than the bottom layer. H represents a high-frequency component of a three-dimensional point pair, and L represents a low-frequency component of a three-dimensional point pair. With the configuration in the drawing, the calculations expressed by (Equation O18) and (Equation O19) are implemented.

FIG. 136 is a diagram showing an example configuration of inverse integer Haar transformer 8344. As shown in FIG. 136, inverse integer Haar transformer 8344 includes right shifter 8354, subtractor 8355, and adder 8356. With the configuration in the drawing, the calculations expressed by (Equation O20) and (Equation O21) are implemented.

Note that, in at least any one of the forward transform and the inverse transform, input data may be divided into a plurality of pieces of data on a predetermined unit basis, and the resulting divisional data may be processed in parallel. In this way, the processing speed can be increased.

Next, an example where the encoding is switched between the reversible encoding (integer Haar transform) and the irreversible encoding (RAHT) will be described. FIG. 137 is a diagram showing a configuration of a three-dimensional data encoding device in this case. The three-dimensional data encoding device selectively performs the reversible encoding (reversible compression) or the irreversible encoding (irreversible compression). The three-dimensional data encoding device may indicate the encoding mode with a flag or QP.

The three-dimensional data encoding device shown in FIG. 137 includes re-ordering unit 8361, switcher 8362, RAHT unit 8363, quantizer 8364, integer transformer 8365, and entropy encoder 8366.

Re-ordering unit 8361 re-orders attribute information in Morton order, for example, based on geometry information. Switcher 8362 outputs the re-ordered attribute information to RAHT unit 8363 or integer transformer 8365. For example, switcher 8362 switches between using the RAHT and using the integer Haar transform based on LOSSLESS_FLAG. Here, LOSSLESS_FLAG is a flag that indicates which of RAHT (irreversible encoding) and the integer Haar transform (reversible encoding) is to be used. The integer Haar transform (reversible encoding) is used when LOSSLESS_FLAG is on (a value of 1, for example), and RAHT (irreversible encoding) is used when LOSSLESS_FLAG is off (a value of 0, for example).

Alternatively, the three-dimensional data encoding device may determine to use the reversible encoding when the value of quantization parameter QP is particular value $\alpha$. Here, value $\alpha$ is a value with which the quantized value or the value of quantization step Qstep calculated from the QP value is 1. For example, if Qstep=1 when QP=4, $\alpha$=4.

The switching between RAHT and the integer Haar transform is not exclusively performed based on LOSSLESS_FLAG or QP value, but can be performed in any manner. For example, the three-dimensional data encoding device may add an Enable_Integer_Haar_Transform flag to the header or the like, and applies the integer Haar transform when Enable_Integer_Haar_Transform=1, and apply RAHT when Enable_Integer_Haar_Transform=0.

RAHT unit 8363 generates a coefficient value by applying RAHT to the attribute information. Quantizer 8364 generates a quantized coefficient by quantizing the coefficient value. integer transformer 8365 generates a coefficient value by applying the integer Haar transform on the attribute information. Entropy encoder 8366 generates encoded attribute information by entropy-encoding the quantized value generated by quantizer 8364 or the coefficient value generated by integer transformer 8365.

FIG. 138 is a diagram showing a configuration of a three-dimensional data decoding device corresponding to the three-dimensional data encoding device shown in FIG. 137. The three-dimensional data decoding device shown in FIG. 138 includes entropy decoder 8371, re-ordering unit 8372, switcher 8373, inverse quantizer 8374, inverse RAHT unit 8375, and inverse integer transformer 8376.

Entropy decoder 8371 generates coefficient values (or quantized coefficients) by entropy-decoding encoded attribute information. Re-ordering unit 8372 re-orders the coefficient values in Morton order, for example, based on geometry information. Switcher 8373 outputs the re-ordered coefficient values to inverse quantizer 8374 or inverse integer transformer 8376. For example, switcher 8373 switches between using RAHT and using the integer Haar transform based on LOSSLESS_FLAG. Note that the way of switching by switcher 8373 is the same as the way of switching by switcher 8362 described above. Note that the three-dimensional data decoding device obtains LOSSLESS_FLAG, the QP value, or the Enable_Integer_Haar_Transform flag from the bitstream.

Inverse quantizer 8374 generates a coefficient value by inverse-quantizing the quantized coefficient. Inverse RAHT unit 8375 generates attribute information by applying inverse RAHT on the coefficient value. Inverse integer transformer 8376 generates attribute information by applying the inverse integer Haar transform on the coefficient value.

Note that, although no quantization processing is performed when the integer Haar transform is applied in the example shown in FIG. 137 and FIG. 138, a quantization processing may be performed when the integer Haar transform is applied. FIG. 139 is a diagram showing a configuration of a three-dimensional data encoding device in that case. FIG. 140 is a diagram showing a configuration of a three-dimensional data decoding device in that case.

As shown in FIG. 139, quantizer 8364A generates quantized coefficients by quantizing the coefficient value generated by RAHT unit 8363 and the coefficient value generated by integer transformer 8365.

As shown in FIG. 140, inverse quantizer 8374A generates coefficient values by inverse-quantizing the quantized coefficients. Switcher 8373A outputs the coefficient values to inverse RAHT unit 8375 or inverse integer transformer 8376.

FIG. 141 and FIG. 142 are diagrams showing example configurations of the bitstream (encoded attribute information) generated by the three-dimensional data encoding device. For example, as shown in FIG. 141, LOSSLESS_FLAG is stored in the header of the bitstream. Alternatively, as shown in FIG. 142, the QP value is included in the header of the bitstream. The reversible encoding is applied when the QP value is predetermined value $\alpha$.

Embodiment 12

In this embodiment, an integer RAHT, which is an irreversible transform closer to the reversible transform than the normal RAHT, will be described. In order to facilitate the implementation of the hardware, a fixed point RAHT can be introduced. The fixed point RAHT can be implemented according to the following (Equation O22) and (Equation O23). Here, l represents a low-frequency component, and h represents a high-frequency component. $c_1$ and $c_2$ represent attribute information on a three-dimensional point pair for the bottom layer, and represent low-frequency components of a three-dimensional point pair obtained in the layer directly below the layer for a layer other than the bottom layer. The transform is orthonormal, and (Equation O24) holds.

[Math. 17]

$$\begin{bmatrix} l \\ h \end{bmatrix} = \begin{bmatrix} a & b \\ -b & a \end{bmatrix} \begin{bmatrix} c_1 \\ c_2 \end{bmatrix} \quad \text{(Equation O22)}$$

$$a = \frac{\sqrt{w_1}}{\sqrt{w_1 + w_2}}, \quad b = \frac{\sqrt{w_2}}{\sqrt{w_1 + w_2}} \quad \text{(Equation O23)}$$

$$a^2 + b^2 = \frac{w_1}{w_1 + w_2} + \frac{w_2}{w_1 + w_2} = 1 \quad \text{(Equation O24)}$$

Weight w after the update is expressed as $w = w_1 + w_2$ when $c_1$ and $c_2$ are a three-dimensional point pair, and is expressed as $w = w_1$ when $c_1$ and $c_2$ are not a pair.

The above (Equation O22) is transformed into the following (Equation O25) to (Equation O29).

[Math. 18]

$$\begin{bmatrix} l \\ h \end{bmatrix} = \begin{bmatrix} \frac{\sqrt{w_1}}{\sqrt{w_1+w_2}} & \frac{\sqrt{w_2}}{\sqrt{w_1+w_2}} \\ -\frac{\sqrt{w_2}}{\sqrt{w_1+w_2}} & \frac{\sqrt{w_1}}{\sqrt{w_1+w_2}} \end{bmatrix} \begin{bmatrix} c_1 \\ c_2 \end{bmatrix} \quad \text{(Equation O25)}$$

$$\begin{bmatrix} \frac{l}{\sqrt{w_1+w_2}} \\ h \end{bmatrix} = \begin{bmatrix} \frac{w_1}{w_1+w_2} & \frac{w_2}{w_1+w_2} \\ -\frac{\sqrt{w_1}\sqrt{w_2}}{\sqrt{w_1+w_2}} & \frac{\sqrt{w_1}\sqrt{w_2}}{\sqrt{w_1+w_2}} \end{bmatrix} \begin{bmatrix} \frac{c_1}{\sqrt{w_1}} \\ \frac{c_2}{\sqrt{w_2}} \end{bmatrix} \quad \text{(Equation O26)}$$

$$\begin{bmatrix} \frac{l}{\sqrt{w_1+w_2}} \\ \frac{h\sqrt{w_1+w_2}}{\sqrt{w_1 w_2}} \end{bmatrix} = \begin{bmatrix} \frac{w_1}{w_1+w_2} & \frac{w_2}{w_1+w_2} \\ -1 & 1 \end{bmatrix} \begin{bmatrix} \frac{c_1}{\sqrt{w_1}} \\ \frac{c_2}{\sqrt{w_2}} \end{bmatrix} \quad \text{(Equation O27)}$$

$$\begin{bmatrix} l' \\ h' \end{bmatrix} = \begin{bmatrix} a^2 & b^2 \\ -1 & 1 \end{bmatrix} \begin{bmatrix} c_1' \\ c_2' \end{bmatrix} \quad \text{(Equation O28)}$$

$$l' = \frac{l}{\sqrt{w_1+w_2}}, \quad h' = \frac{h\sqrt{w_1+w_2}}{\sqrt{w_1 w_2}} \quad \text{(Equation O29)}$$

Therefore, the forward transform is expressed by (Equation O30) to (Equation O32).

[Math. 19]

$$\begin{bmatrix} l' \\ h' \end{bmatrix} = \begin{bmatrix} a^2 & b^2 \\ -1 & 1 \end{bmatrix} \begin{bmatrix} c_1' \\ c_2' \end{bmatrix} \quad \text{(Equation O30)}$$

$$h' = c_2' - c_1' \quad \text{(Equation O31)}$$

$$l' = a^2 c_1' + b^2 c_2' = c_1' + b^2 h' \quad \text{(Equation O32)}$$

The inverse transform is expressed by (Equation O33) to (Equation O34).

[Math. 20]

$$c_1' = l' - b^2 h' \quad \text{(Equation O33)}$$

$$c_2' = h' + c_1' \quad \text{(Equation O34)}$$

An adjusted quantization step (Aqs: Adjusted Quantization Step) is expressed by (Equation O36) based on (Equation O35). Therefore, (Equation O37) holds. In this way, the integer RAHT can be implemented by fixed point implementation of $b^2$.

[Math. 21]

$$h' = \frac{h\sqrt{w_1+w_2}}{\sqrt{w_1 w_2}} \quad \text{(Equation O35)}$$

$$Aqs = \frac{QS\sqrt{w_1+w_2}}{\sqrt{w_1 w_2}} \quad \text{(Equation O36)}$$

$$\frac{h'}{Aqs} = \frac{h}{QS} \quad \text{(Equation O37)}$$

In the following, a relationship between the integer RAHT and the integer Haar transform will be described. The integer RAHT and the integer Haar transform can be implemented by a common processing. Specifically, the integer Haar transform can be implemented by setting the weights for all the layers in RAHT so that $w_1 = w_2 = 1$.

That is, the forward transform in the integer RAHT is expressed by (Equation O38) to (Equation O40), and the inverse transform is expressed by (Equation O41) to (Equation O42). In addition, (Equation O43) holds.

[Math. 22]

$$\begin{bmatrix} l' \\ h' \end{bmatrix} = \begin{bmatrix} a^2 & b^2 \\ -1 & 1 \end{bmatrix} \begin{bmatrix} c_1' \\ c_2' \end{bmatrix} \quad \text{(Equation O38)}$$

$$h' = c_2' - c_1' \quad \text{(Equation O39)}$$

$$l' = c_1' + b^2 h' \quad \text{(Equation O40)}$$

$$c_1' = l' - b^2 h' \quad \text{(Equation O41)}$$

$$c_2' = h' + c_1' \quad \text{(Equation O42)}$$

$$a^2 = \frac{w_1}{w_1+w_2}, \quad b_2 = \frac{w_2}{w_1+w_2} \quad \text{(Equation O43)}$$

In (Equation O38) to (Equation O43), if the weight is set so that $w_1=w_2=1$, the forward transform is expressed by (Equation O44) to (Equation O45), and the inverse transform is expressed by (Equation O46) to (Equation O47). That is, the integer Haar transform is implemented.

[Math. 23]

$$h'=c_2'-c_1' \quad \text{(Equation O44)}$$

$$l'=c_1'-h'/2 \quad \text{(Equation O45)}$$

$$c_1'=l'-h'/2 \quad \text{(Equation O40)}$$

$$c_2'=h'-c_1' \quad \text{(Equation O47)}$$

Next, an example will be described in which switching occurs between the irreversible encoding (RAHT), the irreversible encoding (integer RAHT) close to the reversible encoding, and the reversible encoding (integer Haar transform). FIG. 143 is a diagram showing a configuration of a three-dimensional data encoding device in this case. The three-dimensional data encoding device selectively performs the irreversible encoding (RAHT), the irreversible encoding (integer RAHT) close to the reversible encoding, or the reversible encoding (integer Haar transform). The switching is performed based on a flag or a QP value.

The three-dimensional data encoding device shown in FIG. 143 includes re-ordering unit 8401, integer RAHT/Haar transformer 8402, quantizer 8403, and entropy encoder 8404.

Re-ordering unit 8401 re-orders attribute information in Morton order, for example, based on geometry information. Integer RAHT/Haar transformer 8402 generates a coefficient value by transforming the attribute information by selectively using the irreversible encoding (RAHT), the irreversible encoding (integer RAHT) close to the reversible encoding, or the reversible encoding (integer Haar transform).

Specifically, the three-dimensional data encoding device uses the reversible encoding (integer Haar transform) when the value of quantization parameter QP is particular value $\alpha$, and RAHT-HAAR_FLAG=HAAR. Here, value $\alpha$ is a value with which the quantized value or the value of quantization step Qstep calculated from the QP value is 1. For example, if Qstep=1 when QP=4, $\alpha$=4. Alternatively, the value of $\alpha$ may be different between RAHT and Haar.

For example, when RAHT-HAAR_FLAG=RAHT, and QP is greater than $\alpha$, the irreversible encoding (RAHT) is used. When RAHT-HAAR_FLAG=RAHT, and QP=$\alpha$, the irreversible encoding (integer RAHT) close to the reversible encoding is used. When RAHT-HAAR_FLAG=HAAR, and QP=$\alpha$, the reversible encoding (integer Haar transform) is used. When RAHT-HAAR_FLAG=HAAR, and QP is greater than $\alpha$, the irreversible encoding (RAHT) may be used.

When RAHT-HAAR FLAG=HAAR, integer RAHT/Haar transformer 8402 performs the Haar transform by setting $w_1=w_2=1$.

Quantizer 8403 generates a quantized coefficient by quantizing the coefficient value using QP. Entropy encoder 8404 generates encoded attribute information by entropy-encoding the quantized coefficient.

FIG. 144 is a diagram showing a configuration of a three-dimensional data decoding device corresponding to the three-dimensional data encoding device shown in FIG. 143. The three-dimensional data decoding device shown in FIG. 144 includes entropy decoder 8411, inverse quantizer 8412, re-ordering unit 8413, and inverse integer RAHT/Haar transformer 8414.

Entropy decoder 8411 generates quantized coefficients by entropy-decoding encoded attribute information. Inverse quantizer 8412 generates coefficient values by inverse-quantizing the quantized coefficients using QP. Re-ordering unit 8413 re-orders the coefficient values in Morton order, for example, based on geometry information.

Inverse integer RAHT/Haar transformer 8414 generates attribute information by inverse-transforming the coefficient values by selectively using the irreversible encoding (RAHT), the irreversible encoding (integer RAHT) close to the reversible encoding, or the reversible encoding (integer Haar transform). Note that the way of switching is the same as the way of switching by integer RAHT/Haar transformer 8402 described above. Note that the three-dimensional data decoding device obtains LOSSLESS_FLAG and the QP value from the bitstream.

FIG. 145 is a diagram showing an example configuration of the bitstream (encoded attribute information) generated by the three-dimensional data encoding device. For example, as shown in FIG. 145, RAHT-HAAR_FLAG and the QP value are stored in the header of the bitstream. RAHT-HAAR_FLAG is a flag that indicates which of the irreversible encoding (RAHT), the irreversible encoding (integer RAHT) close to the reversible encoding, and the reversible encoding (integer Haar transform) is to be used. Note that RAHT-HAAR_FLAG may indicate which of the reversible encoding (integer Haar transform) and the irreversible encoding (RAHT) or the irreversible encoding (integer RAHT) close to the reversible encoding is to be used.

In the following, an example implementation of a configuration for performing the integer RAHT will be described. The integer RAHT can be implemented as described below. B represents the integer accuracy of $b^2$, and is expressed by (Equation O48).

[Math. 24]

$$B = \frac{(w_2 \ll kBit)}{w_1 + w_2} \quad \text{(Equation O48)}$$

kBit represents the accuracy of B. For example, in the case of 8-bit accuracy, kBit=8. kHalf=(1<<(kBit−1)) represents the accuracy that supports a rounding (such as rounding down or rounding off). The adjusted quantization step (Aqs) can be implemented by (Equation O49).

[Math. 25]

$$Aqs = \text{sqrt\_integer}\left(\frac{QS * QS * (w_1 + w_2)}{w_1 * w_2}\right) \quad \text{(Equation O49)}$$

Here, QS represents a quantization step (Quantization Step). The forward transform is expressed by (Equation O50) to (Equation O51).

[Math. 26]

$$h'=C_2'-c_1' \quad \text{(Equation O50)}$$

$$l'=c_1'+((B*h'+kHalf)\gg kBit) \quad \text{(Equation O31)}$$

The quantized high-frequency component is expressed by (Equation O52). The inverse quantization of the high-frequency component is expressed by (Equation O53).

[Math. 27]

$$\text{quantized\_}h'=((Aqs\gg 1)+(h'\ll k\text{Bit}))/Aqs \quad \text{(Equation O52)}$$

$$h'=((\text{quantized\_}h'*Aqs)+k\text{Half})\gg k\text{Bit} \quad \text{(Equation O53)}$$

The inverse transform is expressed by (Equation O54) to (Equation O55).

[Math. 28]

$$c_1'=l'-((B*h'+k\text{Half})\gg k\text{Bit}) \quad \text{(Equation O54)}$$

$$c_2'=h'+c_1' \quad \text{(Equation O55)}$$

In the following, an example will be described in which the integer Haar is implemented by RAHT by using a conditional flag, setting the bit accuracy of the rounding to be 0, and setting Aqs. When the integer Haar is applied, the three-dimensional data encoding device sets the weight to be 1 ($w_1$=w2=1). The three-dimensional data encoding device also sets kHalf to be 0 (kHalf=0). The three-dimensional data encoding device also switches Aqs as follows. The three-dimensional data encoding device sets Aqs=QS when using the integer Haar transform. The three-dimensional data encoding device sets Aqs=sqrt_integer $(((QS*QS)*(w_1+w_2))/(w_1*w_2))$ when using the integer RAHT. Here, sqrt_integer(n) represents the integer part of the square root of n. Therefore, (Equation O56) holds.

[Math. 29]

$$B = \frac{(1 \ll k Bit)}{2} = (1 \ll (kBit - 1)) \quad \text{(Equation O56)}$$

The forward transform of the integer Haar in RAHT is expressed by (Equation O57) to (Equation O59).

[Math. 30]

$$h'=c_2'-c_1' \quad \text{(Equation O57)}$$

$$l'=c_1'((B*h'+0)\gg k\text{Bit})=c_1'+(h'\gg 1) \quad \text{(Equation O58)}$$

$$\text{quantized\_}h'=((Aqs\gg 1)+(h'\ll k\text{Bit}))/Aqs \quad \text{(Equation O59)}$$

When the reversible encoding is used, QS is set to be 1, and therefore, (Equation O60) holds. When the reversible encoding is used, the quantization and the inverse quantization may be skipped.

[Math. 31]

$$\text{quantized\_}h' = \frac{(1 \gg 1) + (h' \ll kBit)}{1} = h' \ll kBit \quad \text{(Equation O60)}$$

The inverse quantization of the high-frequency component is expressed by (Equation O61). The inverse integer transform is expressed by (Equation O62) to (Equation O63).

[Math. 32]

$$h'=(\text{quantized\_}h'*Aqs)\gg k\text{Bit} \quad \text{(Equation O61)}$$

$$c_1'=l'-((B*h'+0)\gg k\text{Bit})=l'-(h'\gg 1) \quad \text{(Equation O62)}$$

$$c_2'=h'+c_1' \quad \text{(Equation O63)}$$

As another example of the implementation of the reversible encoding, the bits shift calculations described below may be used. These calculations are performed for the integer data type (fixed point calculation). The attribute information is shifted up with the kBit accuracy before the transform processing.

When applying the integer Haar, the three-dimensional data encoding device sets the weight to be 1 ($w_1$=w2=1). The three-dimensional data encoding device also sets kHalf to be 0 (kHalf=0). The three-dimensional data encoding device also switches Aqs as follows. The three-dimensional data encoding device sets Aqs=QS when using the integer Haar transform. The three-dimensional data encoding device sets Aqs=sqrt_integer $(((QS*QS)*(w_1+w_2))/(w_1*w_2))$ when using the integer RAHT. Therefore, (Equation O64) holds.

[Math. 33]

$$B = \frac{(1 \ll kBit)}{2} = (1 \ll (kBit - 1)) \quad \text{(Equation O64)}$$

As shown by (Equation O65), the attribute information is shifted up with the kBit accuracy before the transform processing.

[Math. 34]

$$c_i=c_i\ll k\text{Bit} \quad \text{(Equation O65)}$$

The forward transform of the integer Haar in RATH is expressed by (Equation O66) to (Equation O67), and is performed with the kBit accuracy.

[Math. 35]

$$h'=c_2'-c_1' \quad \text{(Equation O66)}$$

$$t\_l'=((B*h'+k\text{Half})\gg k\text{Bit}) \quad \text{(Equation O67)}$$

In order to remove the floating-point accuracy of B for the floor function, the kBit accuracy for the low-frequency component is removed. Therefore, the low-frequency component is expressed by (Equation O68).

[Math. 36]

$$l'+c_1'((t\_l'\gg k\text{Bit})\ll k\text{Bit}) \quad \text{(Equation O68)}$$

The inverse integer transform is expressed by (Equation O69) to (Equation O71). In this way, switching from the integer RAHT can be reduced.

[Math. 37]

$$t\_l'=((B*h'+k\text{Half})\gg k\text{Bit}) \quad \text{(Equation O69)=}$$

$$c_1'=l'-((t\_l'\gg k\text{Bit})\ll k\text{Bit}) \quad \text{(Equation O70)=}$$

$$c_2'=h'+c_1' \quad \text{(Equation O70)}$$

In the following, an example configuration for the forward transform will be described. FIG. 146 is a diagram showing an example configuration of integer RAHT/Haar transformer 8402. Integer RAHT/Haar transformer 8402 includes left shifters 8421, 8422, and 8430, subtractor 8423, divider 8424, right shifters 8425, 8427, and 8329, multiplier 8426, switcher 8428, and adder 8431.

Left shifters 8421 and 8422 shift up (shift to the left) c1 and c2 by kBit when c1 and c2 are original signals (signals located in the bottom layer of RAHT) of attribute information. As a result, the bit accuracy of the original signals increases, and therefore, the calculation accuracy of the transform processing can be improved. Therefore, the encoding efficiency can be improved. When c1 and c2 are signals in a layer higher than the bottom layer of RAHT, the kBit shift-up need not be applied.

Note that, when the integer Haar transform is applied, and QS=1 (which means the reversible encoding), the three-dimensional data encoding device need not apply the kBit shift-up to the original signals of the attribute information located in the bottom layer of RAHT. In this way, the reversible encoding can be achieved while reducing the processing amount.

Subtractor 8423 subtracts shifted-up el from shifted-up c2. Divider 8424 divides the value obtained by subtractor 8423 by Aqs. Here, Aqs is expressed by (Equation O72). integer_square_root(n) represents the integer part of the square root of n. That is, Aqs depends on QS (quantization step) and the weight. When the integer Haar transform is used, Aqs is set so that Aqs=QS.

[Math. 38]

$$Aqs = \text{integer\_square\_root}\left(\frac{QS * QS * (w_1 + w_2)}{w_1 * w_2}\right) \quad \text{(Equation O72)}$$

Right shifter 8425 generates high-frequency component h by shifting down the value obtained by divider 8424. Multiplier 8426 multiplies the value obtained by subtractor 8423 by B. B is expressed by (Equation O73). When the integer Haar transformer is used, the weight is set so that $w_1=w_2=1$.

[Math. 39]

$$B = \frac{(w_2 \ll kBit)}{w_1 + w_2} \quad \text{(Equation O73)}$$

Right shifter 8427 shifts down the value obtained by multiplier 8426. Switcher 8428 outputs the value obtained by right shifter 8427 to right shifter 8429 when the integer Haar transformer is used, and outputs the value obtained by right shifter 8427 to adder 8431 when the integer Haar transformer is not used.

When the integer Haar transformer is applied, right shifter 8429 shifts down the value obtained by right shifter 8427 by kBit, and left shifter 8430 shifts up the value obtained by right shifter 8427 by kBit. In this way, the values of lower-order kBit bits are set to be 0. That is, the digits after the decimal point resulting from the division by a value of 2 when the integer Haar transformer is applied can be deleted, and thus, the processing of rounding a value down (floor processing) can be achieved. Note that any method that can achieve the process of rounding a value down can be applied.

Note that, when QS>1 (which means the irreversible encoding) in the integer Haar transformer, the kBit shift down and the kBit shift up need not be applied to the value obtained by right shifter 8427. In this way, the accuracy after the decimal point resulting from the division by a value of 2 can be maintained when the integer Haar transformer is applied. Therefore, the calculation accuracy and the encoding efficiency are improved.

When the original signals (located in the bottom layer of RAHT) of the attribute information are not shifted up by kBit, the kBit shift down and the kBit shift up need not be applied to the value obtained by right shifter 8427. In this way, the processing amount can be reduced.

Adder 8431 generates low-frequency component 1 by adding the value obtained by left shifter 8430 or right shifter 8427 to the value obtained by left shifter 8421. Note that, in the calculation for the top layer, resulting low-frequency component 1 is subjected to the kBit shift down.

Next, an example configuration for the inverse transform will be described. FIG. 147 is a diagram showing an example configuration of inverse integer RAHT/Haar transformer 8414. Inverse integer RAHT/Haar transformer 8414 includes left shifters 8441 and 8447, multipliers 8442, 8443, and 8449, right shifters 8444, 8446, 8450, and 8452, switcher 8445, and subtractors 8448 and 8451.

Left shifter 8441 shifts up (shifts to the left) high-frequency component h by kBit. Multiplier 8442 multiplies the value obtained by left shifter 8441 by Aqs. Note that Aqs is the same as Aqs described above with reference to FIG. 146. Multiplier 8443 multiplies the value obtained by multiplier 8442 by B. Note that B is the same as B described above with reference to FIG. 146.

Right shifter 8444 shifts down the value obtained by multiplier 8443. Switcher 8445 outputs the value obtained by right shifter 8444 to right shifter 8446 when the integer Haar transformer is used, and outputs the value obtained by right shifter 8444 to subtractor 8448 when the integer Haar transformer is not used.

When the integer Haar transformer is applied, right shifter 8446 shifts down the value obtained by right shifter 8444 by kBit, and left shifter 8447 shifts up the value obtained by right shifter 8444 by kBit. In this way, the values of lower-order kBit bits are set to be 0. That is, the digits after the decimal point resulting from the division by a value of 2 when the integer Haar transformer is applied can be deleted, and thus, the processing of rounding a value down (floor processing) can be achieved. Note that any method that can achieve the process of rounding a value down can be applied.

Note that, when QS>1 (which means the irreversible encoding) in the integer Haar transformer, the kBit shift down and the kBit shift up need not be applied to the value obtained by right shifter 8444. In this way, the accuracy after the decimal point resulting from the division by a value of 2 can be maintained when the integer Haar transformer is applied. Therefore, a bitstream improved in the calculation accuracy and the encoding efficiency can be properly decoded.

When the decoded signals (located in the bottom layer of RAHT) of the attribute information are not shifted down by kBit, the kBit shift down and the kBit shift up need not be applied to the value obtained by right shifter 8444. In this way, the processing amount can be reduced.

Subtractor 8448 subtracts the value obtained by left shifter 8447 or right shifter 8444 from low-frequency component 1. Note that, in the calculation for the top layer, low-frequency component 1 is shifted up by kBit, and subtractor 8448 subtracts the value obtained by left shifter 8447 or right shifter 8444 from shifted-up low-frequency component 1.

Multiplier 8449 multiplies the value obtained by subtractor 8448 by −1. Right shifter 8450 shifts down the value obtained by multiplier 8449 by kBit. Subtractor 8451 subtracts the value obtained by subtractor 8448 from the value obtained by multiplier 8442. Right shifter 8452 shifts down the value obtained by subtractor 8451 by kBit. In this way, the original bit accuracy of c1 and c2 is recovered. By this processing, the decoding result can be obtained with the original bit accuracy while improving the calculation accuracy of the transform processing. The three-dimensional data decoding device need not apply the kBit shift down to any signal in a layer higher than the bottom layer of RAHT.

Note that, when the integer Haar transform is applied, and QS=1 (which means the reversible encoding), the three-dimensional data decoding device need not apply the kBit shift-up to the decoded signals of the attribute information located in the bottom layer of RAHT. In this way, a reversibly encoded bitstream can be properly decoded while reducing the processing amount.

As stated above, the three-dimensional data encoding device according to the present embodiment performs the process shown by FIG. 148. The three-dimensional data encoding device converts pieces of attribute information of three-dimensional points included in point cloud data into coefficient values (S8401), and encodes the coefficient values to generate a bitstream (S8402). In the converting (S8401), the three-dimensional data encoding device performs weighting calculation hierarchically to generate the coefficient values belonging to one of layers, the weighting calculation separating each of the pieces of attribute information into a high-frequency component and a low-frequency component. In the weighting calculation, the three-dimensional data encoding device performs the weighting calculation using weights fixed or not fixed in the layers. The bitstream includes first information (at least one of RAHT-HAAR FLAG or QP) indicating whether to fix the weights in the layers.

With this, since the three-dimensional data encoding device is capable of reducing the loss caused by the transform, by fixing the weight for a plurality of layers, the three-dimensional data encoding device is capable of improving the accuracy.

For example, when the weights are fixed in the layers, the weights are fixed to 1.

For example, as shown by FIG. 146, in the weighting calculation, the three-dimensional data encoding device subtracts first attribute information (e.g., c1) from second attribute information (e.g., c2) to calculate a first value, the first attribute information and the second attribute information being included in the pieces of attribute information, and divides the first value by a first coefficient (e.g., Aqs) to calculate the high-frequency component (e.g., h). The first coefficient (e.g., Aqs) depends on a quantization step (e.g., QS) and the weights (e.g., $w_1$, $w_2$).

For example, as shown by FIG. 146, in the weighting calculation, the three-dimensional data encoding device multiplies the first value by a second coefficient (e.g., B) depending on the weights to calculate a second value, shifts down the second value by a predetermined bit count and shifts up the second value by the predetermined bit count to calculate a third value, and adds the third value to the first attribute information to calculate the low-frequency component (e.g., 1).

For example, the three-dimensional data encoding device includes a processor and memory, and the processor performs the above process using the memory.

The three-dimensional data decoding device according to the present embodiment performs the process shown by FIG. 149. The three-dimensional data decoding device obtains, from a bitstream, first information (at least one of RAHT-HAAR_FLAG or QP) indicating whether to fix weights in layers (S8411), decodes coefficient values from the bitstream (S8412), and reverse converts the coefficient values to generate pieces of attribute information of three-dimensional points included in point cloud data (S8413). The coefficient values belong to one of the layers. In the reverse converting, the three-dimensional data decoding device performs inverse weighting calculation to generate the pieces of attribute information, the inverse weighting calculation combining the coefficient values with a high-frequency component and a low-frequency component. In the inverse weighting calculation, the three-dimensional data decoding device performs the inverse weighting calculation using the weights fixed or not fixed in the layers, according to the first information.

With this, since the three-dimensional data decoding device is capable of reducing the loss caused by the transform, by fixing the weight for a plurality of layers, the three-dimensional data decoding device is capable of improving the accuracy.

For example, when the weights are fixed in the layers, the weights are fixed to 1.

For example, as shown by FIG. 147, in the inverse weighting calculation, the three-dimensional data decoding device multiplies the high-frequency component by a first coefficient (e.g., Aqs) to calculate a first value, calculates first attribute information (e.g., c1) included in the pieces of attribute information from a second value based on the low-frequency component (e.g., 1), and subtracts the second value from the first value to calculate second attribute information (e.g., c2) included in the pieces of attribute information. The first coefficient (e.g., Aqs) depends on a quantization step (e.g., QS) and the weights (e.g., $w_1$, $w_2$).

For example, as shown by FIG. 147, in the inverse weighting calculation, the three-dimensional data decoding device multiplies the first value by a second coefficient (e.g., B) depending on the weights to calculate a third value, shifts down the third value by a predetermined bit count and shifts up the third value by the predetermined bit count to calculate a fourth value, and subtracts the low-frequency component from the fourth value to calculate the second value.

For example, the three-dimensional data decoding device includes a processor and memory, and the processor performs the above process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
    transforming pieces of attribute information of three-dimensional points included in point cloud data into coefficient values; and
    encoding the coefficient values to generate a bitstream,
    wherein in the transforming, a weighting calculation is performed hierarchically to generate the coefficient values, each of the coefficient values belonging to a corresponding one of layers, the weighting calculation separating each of the pieces of attribute information into a high-frequency component and a low-frequency component,
    in the weighting calculation, the weighting calculation is performed using weights fixed or not fixed in the layers,
    the bitstream includes first information indicating whether to fix the weights in the layers, and
    in the weighting calculation, when the first information indicates that the weights are fixed in the layers, all weights used in the layers are fixed.

2. The three-dimensional data encoding method according to claim 1,
    wherein when the weights are fixed in the layers, the weights are fixed to 1.

3. The three-dimensional data encoding method according to claim 1,
    wherein in the weighting calculation:
        first attribute information is subtracted from second attribute information to calculate a first value, the first attribute information and the second attribute information being included in the pieces of attribute information; and
        the first value is divided by a first coefficient to calculate the high-frequency component, and
    the first coefficient depends on a quantization step and the weights.

4. The three-dimensional data encoding method according to claim 3,
    wherein in the weighting calculation:
        the first value is multiplied by a second coefficient depending on the weights to calculate a second value;
        the second value is shifted down by a predetermined bit count and shifted up by the predetermined bit count to calculate a third value; and
        the third value is added to the first attribute information to calculate the low-frequency component.

5. A three-dimensional data decoding method, comprising:
    obtaining, from a bitstream, first information indicating whether to fix weights in layers;
    decoding coefficient values from the bitstream; and
    inverse transforming the coefficient values to generate pieces of attribute information of three-dimensional points included in point cloud data,
    wherein the coefficient values belong to one of the layers,
    in the inverse transforming, an inverse weighting calculation is performed to generate the pieces of attribute information, the inverse weighting calculation combining the coefficient values with a high-frequency component and a low-frequency component,
    in the inverse weighting calculation, the inverse weighting calculation is performed using the weights fixed or not fixed in the layers, according to the first information, and
    in the inverse weighting calculation, when the first information indicates that the weights are fixed in the layers, all weights used in the layers are fixed.

6. The three-dimensional data decoding method according to claim 5,
    wherein when the weights are fixed in the layers, the weights are fixed to 1.

7. The three-dimensional data decoding method according to claim 5,
    wherein in the inverse weighting calculation:
        the high-frequency component is multiplied by a first coefficient to calculate a first value;
        first attribute information included in the pieces of attribute information is calculated from a second value based on the low-frequency component; and
        the second value is subtracted from the first value to calculate second attribute information included in the pieces of attribute information, and
    the first coefficient depends on a quantization step and the weights.

8. The three-dimensional data decoding method according to claim 7,
wherein in the inverse weighting calculation:
the first value is multiplied by a second coefficient depending on the weights to calculate a third value;
the third value is shifted down by a predetermined bit count and shifted up by the predetermined bit count to calculate a fourth value; and
the low-frequency component is subtracted from the fourth value to calculate the second value.

9. A three-dimensional data encoding device, comprising:
a processor; and
a memory,
wherein using the memory, the processor:
transforms pieces of attribute information of three-dimensional points included in point cloud data into coefficient values; and
encodes the coefficient values to generate a bitstream,
wherein in the transforming, a weighting calculation is performed hierarchically to generate the coefficient values, each of the coefficient values belonging to a corresponding one of layers, the weighting calculation separating each of the pieces of attribute information into a high-frequency component and a low-frequency component,
in the weighting calculation, the weighting calculation is performed using weights fixed or not fixed in the layers,
the bitstream includes first information indicating whether to fix the weights in the layers, and
in the weighting calculation, when the first information indicates that the weights are fixed in the layers, all weights used in the layers are fixed.

10. A three-dimensional data decoding device, comprising:
a processor; and
a memory,
wherein using the memory, the processor:
obtains, from a bitstream, first information indicating whether to fix weights in layers;
decodes coefficient values from the bitstream; and
inverse transforms the coefficient values to generate pieces of attribute information of three-dimensional points included in point cloud data,
wherein the coefficient values belong to one of the layers,
in the inverse transforming, an inverse weighting calculation is performed to generate the pieces of attribute information, the inverse weighting calculation combining the coefficient values with a high-frequency component and a low-frequency component,
in the inverse weighting calculation, the inverse weighting calculation is performed using the weights fixed or not fixed in the layers, according to the first information, and
in the inverse weighting calculation, when the first information indicates that the weights are fixed in the layers, all weights used in the layers are fixed.

* * * * *